US 7,762,582 B2

(12) United States Patent
Breed

(10) Patent No.: US 7,762,582 B2
(45) Date of Patent: Jul. 27, 2010

(54) VEHICLE COMPONENT CONTROL BASED ON OCCUPANT MORPHOLOGY

(75) Inventor: David S. Breed, Boonton Township, NJ (US)

(73) Assignee: Automotive Technologies International, Inc., Denville, NJ (US)

( * ) Notice: Subject to any disclaimer, the term of this patent is extended or adjusted under 35 U.S.C. 154(b) by 776 days.

(21) Appl. No.: 11/470,715

(22) Filed: Sep. 7, 2006

(65) Prior Publication Data
US 2007/0096445 A1 May 3, 2007

Related U.S. Application Data

(63) Continuation-in-part of application No. 10/733,957, filed on Dec. 11, 2003, now Pat. No. 7,243,945, which is a continuation-in-part of application No. 09/849,559, filed on May 4, 2001, now Pat. No. 6,689,962, which is a continuation-in-part of application No. 09/193,209, filed on Nov. 17, 1998, now Pat. No. 6,242,701, which is a continuation-in-part of application No. 09/128,490, filed on Aug. 4, 1998, now Pat. No. 6,078,854, which is a continuation-in-part of application No. 08/474,783, filed on Jun. 7, 1995, now Pat. No. 5,822,707, and a continuation-in-part of application No. 08/970,822, filed on Nov. 14, 1997, now Pat. No. 6,081,757, said application No. 10/733,957 is a continuation-in-part of application No. 10/061,016, filed on Jan. 30, 2002, now Pat. No. 6,833,516, and a continuation-in-part of application No. 09/901,879, filed on Jul. 9, 2001, now Pat. No. 6,555,766, said application No. 10/733,957 is a continuation-in-part of application No. 10/227,781, filed on Aug. 26, 2002, now Pat. No. 6,792,342, which is a continuation-in-part of application No. 09/500,346, filed on Feb. 8, 2000, now Pat. No. 6,442,504, which is a continuation-in-part of application No. 09/128,490, filed on Aug. 4, 1998, now Pat. No. 6,078,854, application No. 11/470,715, which is a continuation-in-part of application No. 10/931,288, filed on Aug. 31, 2004, now Pat. No. 7,164,117, which is a continuation-in-part of application No. 10/303,364, filed on Nov. 25, 2002, now Pat. No. 3,784,379, which is a continuation-in-part of application No. 10/174,803, filed on Jun. 19, 2002, now Pat. No. 6,958,451, which is a continuation-in-part of application No. 09/500,346, and a continuation-in-part of application No. 09/849,558, which is a continuation-in-part of application No. 09/193,209, said application No. 10/174,803 is a continuation-in-part of application No. 09/849,559, and a continuation-in-part of application No. 09/901,879, filed on Jul. 9, 2001, now Pat. No. 6,555,766, application No. 11/470,715, which is a continuation-in-part of application No. 10/940,881, filed on Sep. 13, 2004, now Pat. No. 7,663,502, which is a continuation-in-part of application No. 10/061,016, filed on Jan. 30, 2002, now Pat. No. 6,833,516, and a continuation-in-part of application No. 10/227,781, filed on Aug. 26, 2002, now Pat. No. 6,792,342, application No. 11/470,715, which is a continuation-in-part of application No. 11/131,623, filed on May 18, 2005, now Pat. No. 7,481,453, which is a continuation-in-part of application No. 10/817,379, filed on Apr. 2, 2004, now abandoned, which is a continuation-in-part of application No. 11/278,979, filed on Apr. 7, 2006, now Pat. No. 7,386,372, and a continuation-in-part of application No. 11/420,297, filed on May 25, 2006, now Pat. No. 7,330,784, and a continuation-in-part of application No. 11/423,521, filed on Jun. 12, 2006, now Pat. No. 7,523,803, and a continuation-in-part of application No. 11/457,907, filed on Jul. 17, 2006.

(51) Int. Cl.
*B60R 21/16* (2006.01)
(52) U.S. Cl. .......................... 280/735; 180/274; 701/45
(58) Field of Classification Search ................. 280/735; 180/271, 274; 701/45
See application file for complete search history.

(56) References Cited

U.S. PATENT DOCUMENTS

| | | | |
|---|---|---|---|
| 4,811,226 | A | 3/1989 | Shinohara |
| 4,823,619 | A | 4/1989 | D'Antonio et al. |
| 5,071,160 | A | 12/1991 | White et al. |
| 5,072,966 | A | 12/1991 | Nishitake et al. |
| 5,074,583 | A | 12/1991 | Fujita et al. |
| 5,118,134 | A | 6/1992 | Mattes et al. |
| 5,161,820 | A | 11/1992 | Vollmer |
| 5,164,645 | A | 11/1992 | Furuse et al. |
| 5,172,790 | A | 12/1992 | Ishikawa et al. |
| 5,174,600 | A | 12/1992 | Jahn et al. |
| 5,176,424 | A | 1/1993 | Tobita et al. |
| 5,178,411 | A | 1/1993 | Fevre et al. |
| 5,184,845 | A | 2/1993 | Omura |
| 5,205,582 | A | 4/1993 | Shiga et al. |
| 5,232,243 | A | 8/1993 | Blackburn et al. |
| 5,330,226 | A | 7/1994 | Gentry et al. |
| 5,377,108 | A | 12/1994 | Nishio |
| 5,413,378 | A | 5/1995 | Steffens, Jr. et al. |
| 5,439,249 | A | 8/1995 | Steffens, Jr. et al. |
| 5,454,591 | A | 10/1995 | Mazur et al. |
| 5,460,061 | A | 10/1995 | Redding et al. |
| 5,474,327 | A | 12/1995 | Schousek |
| 5,573,269 | A | 11/1996 | Gentry et al. |
| 5,583,771 | A | 12/1996 | Lynch et al. |
| 5,653,462 | A | 8/1997 | Breed et al. |
| 5,670,853 | A | 9/1997 | Bauer |
| 5,694,320 | A | 12/1997 | Breed |
| 5,732,375 | A | 3/1998 | Cashler |
| 5,732,378 | A | 3/1998 | Eckert et al. |
| 5,785,347 | A | 7/1998 | Adolph et al. |
| 5,822,707 | A | 10/1998 | Breed et al. |
| 5,927,427 | A | 7/1999 | Sewell et al. |
| 5,957,491 | A | 9/1999 | Cech et al. |
| 5,979,585 | A | 11/1999 | Van Voorhies |
| 5,986,221 | A | 11/1999 | Stanley |
| 5,987,370 | A | 11/1999 | Murphy et al. |
| 5,991,676 | A | 11/1999 | Podoloff et al. |
| 6,039,344 | A | 3/2000 | Mehney et al. |
| 6,055,473 | A | 4/2000 | Zwolinski |
| 6,078,854 | A | 6/2000 | Breed et al. |
| 6,081,757 | A | 6/2000 | Breed et al. |
| 6,134,492 | A | 10/2000 | Breed et al. |
| 6,219,605 | B1 | 4/2001 | Bauer et al. |
| 6,242,701 | B1 | 6/2001 | Breed et al. |
| 6,259,167 | B1 | 7/2001 | Norton |
| 6,327,917 | B1 * | 12/2001 | Nitschke ............... 73/862.041 |
| 6,348,663 | B1 | 2/2002 | Schoos et al. |
| 6,442,504 | B1 | 8/2002 | Breed et al. |
| 6,643,925 | B1 | 11/2003 | Ormachea et al. |
| 6,833,516 | B2 | 12/2004 | Breed et al. |
| 6,958,451 | B2 | 10/2005 | Breed et al. |
| 7,237,443 | B2 * | 7/2007 | Speckhart et al. ...... 73/862.046 |
| 7,422,285 | B2 * | 9/2008 | Phipps ................... 297/284.1 |
| 2007/0096446 | A1 | 5/2007 | Breed |
| 2007/0120347 | A1 | 5/2007 | Breed et al. |
| 2008/0036185 | A1 | 2/2008 | Breed |
| 2008/0042409 | A1 | 2/2008 | Breed |
| 2008/0047770 | A1 | 2/2008 | Breed et al. |

FOREIGN PATENT DOCUMENTS

| | | |
|---|---|---|
| GB | 2301906 A | 12/1996 |
| JP | H2-142357 A | 12/1990 |
| JP | 3-32943 | 2/1991 |
| JP | 4-138996 | 5/1992 |
| JP | H7-25271 A | 1/1995 |
| JP | H9-240406 A | 6/1997 |
| JP | H9-226517 A | 9/1997 |
| JP | H9-39728 A | 10/1997 |
| WO | 9830411 | 7/1998 |

OTHER PUBLICATIONS

Defendant's Preliminary Invalidity Contentions dated Dec. 10, 2008 presented in *Automotive Technologies, Inc.* v. *Delphi Corporation* Civil Action No. 08-CV-11048, United States District Court, Eastern District of Michigan, Southern Division.
Exhibit C to Defendant's Preliminary Invalidity Contentions presented Dec. 10, 2008 in *Automotive Technologies, Inc.* v. *Delphi Corporation* Civil Action No. 08-CV-11048, United States District Court, Eastern District of Michigan, Southern Division.
Exhibit D to Defendant's Preliminary Invalidity Contentions presented Dec. 10, 2008 in *Automotive Technologies, Inc.* v. *Delphi Corporation* Civil Action No. 08-CV-11048, United States District Court, Eastern District of Michigan, Southern Division.
Defendant Preliminary Invalidity Contentions of Claims of U.S. Pat. No. 6,242,701 presented Oct. 9, 2006 in *Automotive Technologies International, Inc.* v. *American Honda Motor Co., Inc., et al.* Civil Action No. 06-187-GMS, United States District Court, District of Delaware.
Opinion and Order, *Automotive Technologies International, Inc.* v. *Delphi Corp.*, 2006 U.S. App. LEXIS 20278 (Fed. Cir. Jul. 24, 2006).
Opinion and Order, *Automotive Technologies International, Inc.* v. *Delphi Corp.*, No. 03 CV 71368 (E.D. Mich. Sep. 29, 2004).
Defendant Preliminary Invalidity Contentions of Claims of U.S. Pat. No. 6,958,451 presented Oct. 9, 2006 in *Automotive Technologies International, Inc.* v. *American Honda Motor Co., Inc., et al.* Civil Action No. 06-187-GMS, United States District Court, District of Delaware.
Abstract of JP 3-32943.
Abstract of JP 4-138996.
Cover page of WO 99/25581 which corresponds to US 6078854 and 6081757.
International Search Report for PCT/US98/24487 (published as WO 99/25581).
Examination Report for EP 98959474.2 dated Mar. 15, 2003 which corresponds to PCT/US98/24487.
Response to Examination Report for EP 98959474.2
Cover page of WO 97/21566 which corresponds to US 6219605.
Notice of Rejection for Japanese Patent Application No. H11-528954 dated Jul. 10, 2007.
Notice of Rejection for Japanese Patent Application No. H11-528954 dated Mar. 4, 2008.

\* cited by examiner

*Primary Examiner*—Toan C To
(74) *Attorney, Agent, or Firm*—Brian Roffe

(57) ABSTRACT

Method for vehicle component control based on occupancy of the vehicle includes determining at least one morphological characteristic of the occupant, classifying the occupant based only on the determined morphological characteristic(s) to provide an identification of the occupant, and adjusting a component of the vehicle based on the identification. Morphological characteristics include weight of the occupant and height of the occupant. The morphological characteristics can be determined using only sensors arranged in a seat on which the occupant is seated. Classification of the occupant can include generating a table of classifications for different determinations of the morphological characteristic, either individually or combinations of two or more morphological characteristics, so that an identification is provided based on each determination, detection or measurement of the morphological characteristic(s).

24 Claims, 29 Drawing Sheets

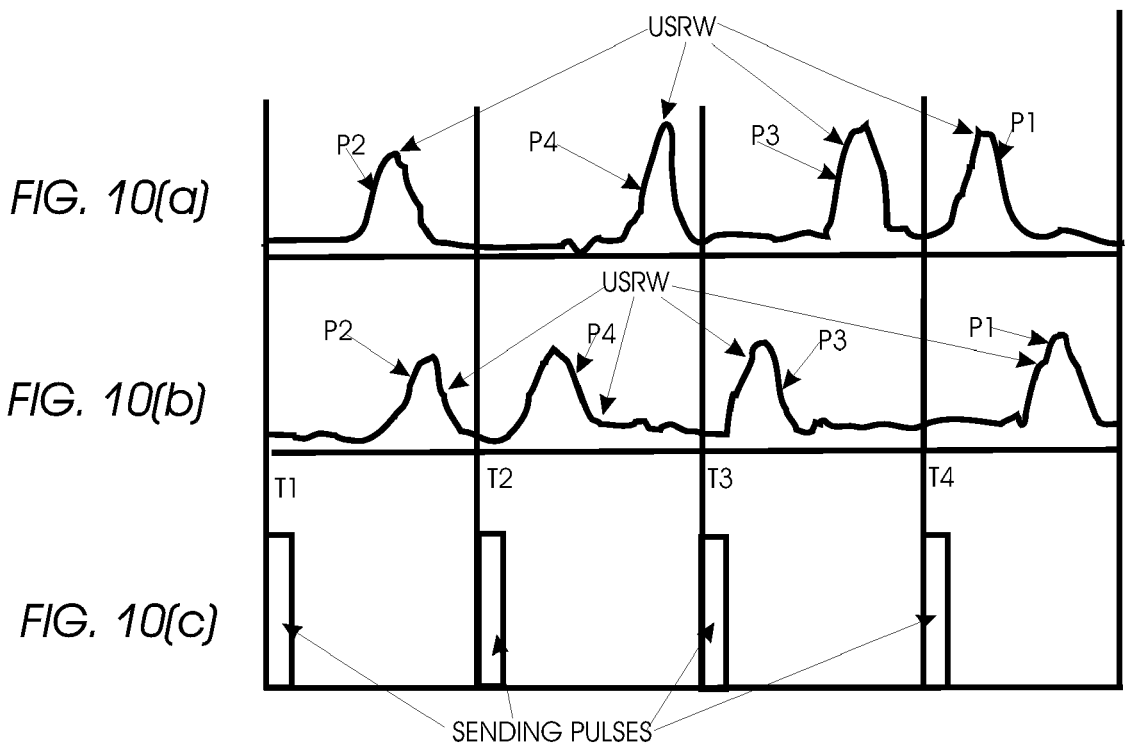
FIG. 10(a)
FIG. 10(b)
FIG. 10(c)
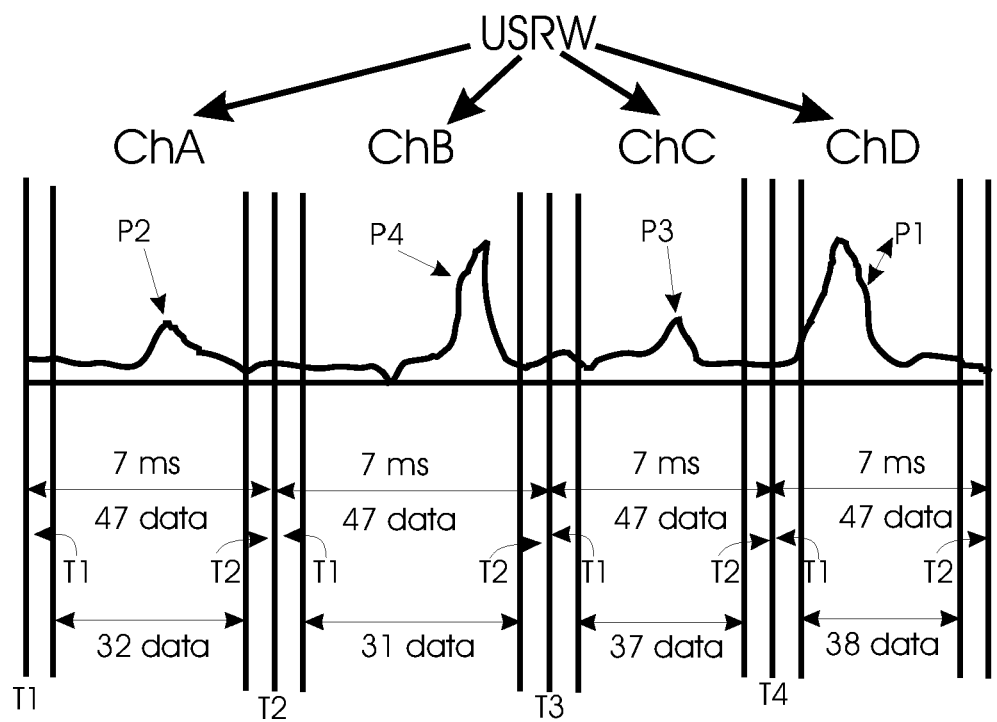
FIG. 11

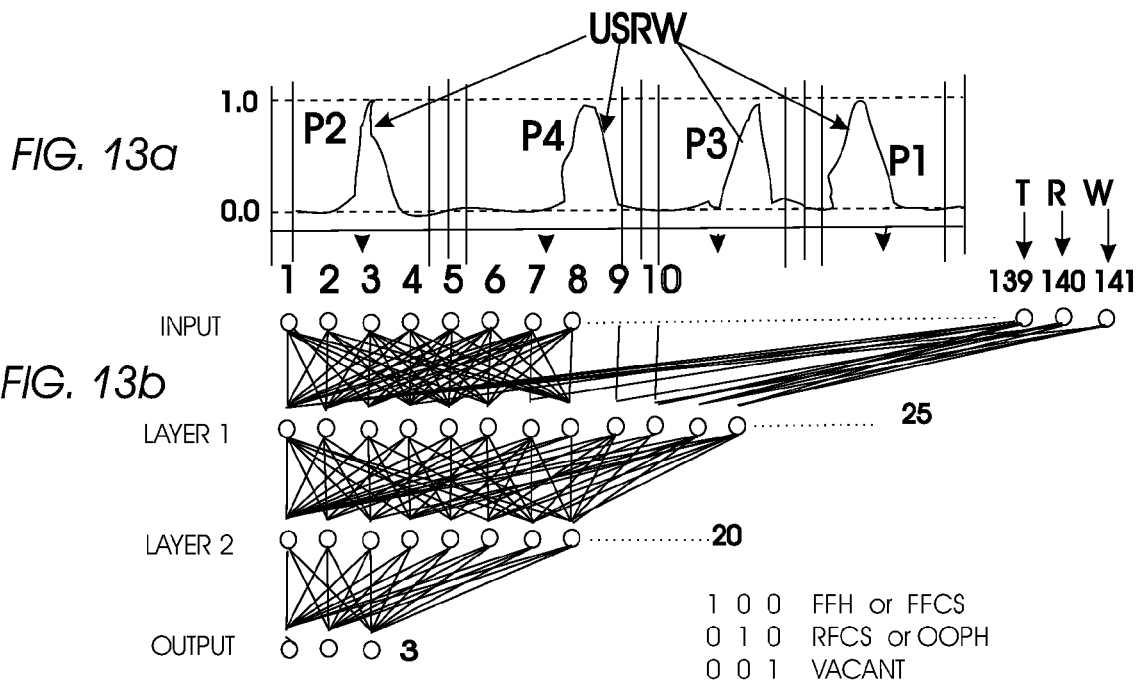
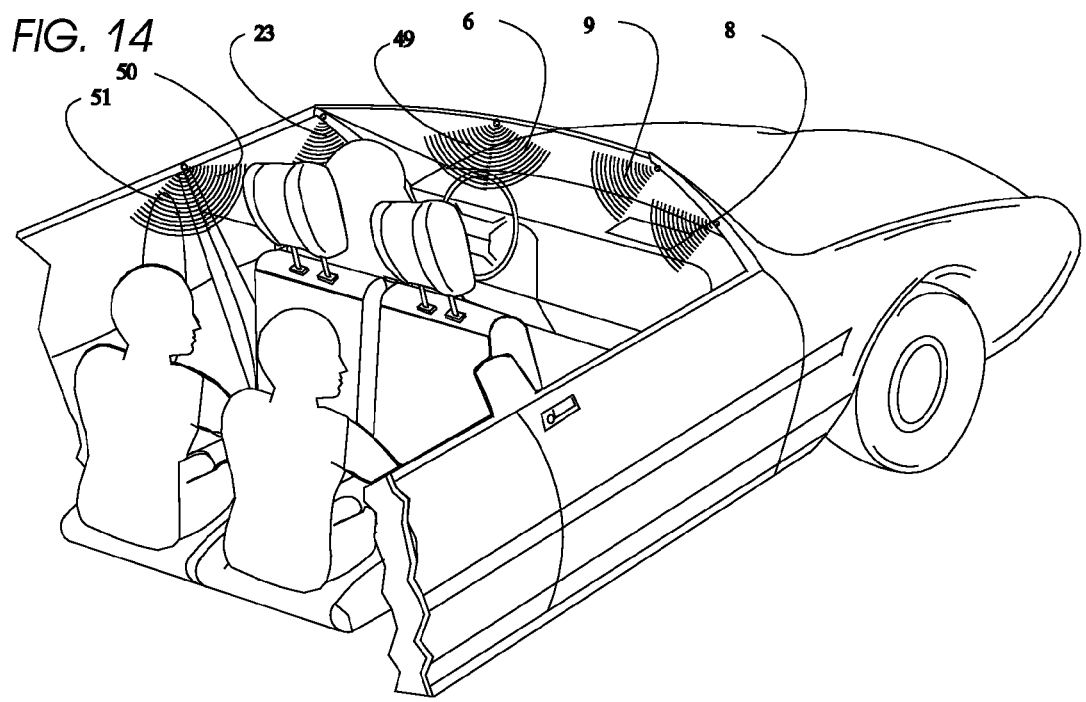

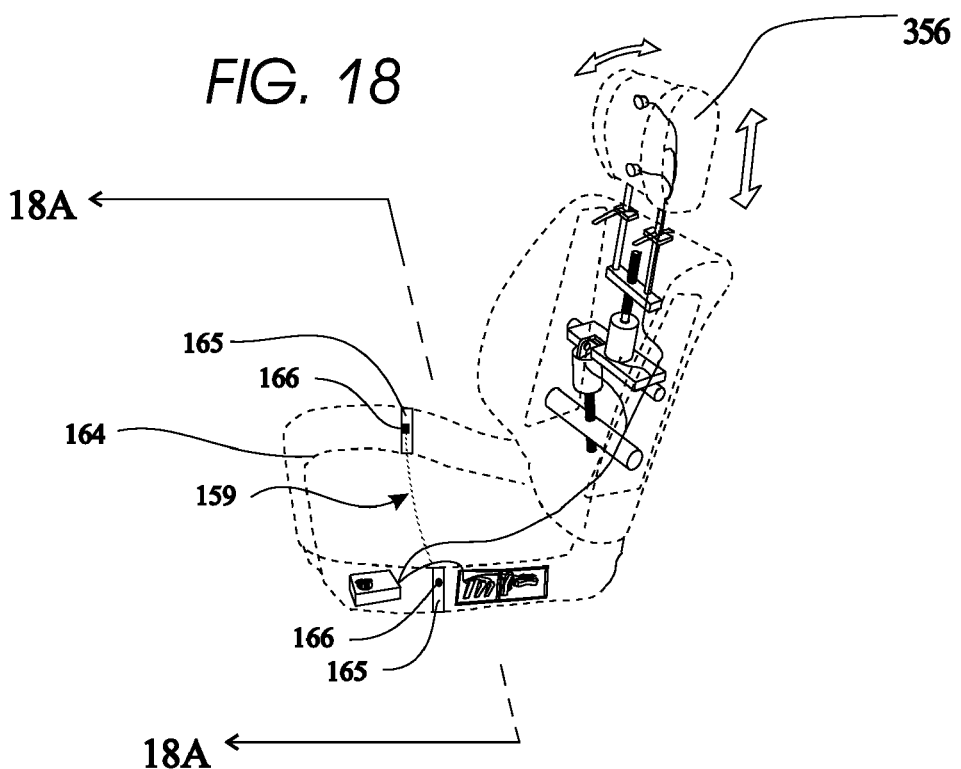
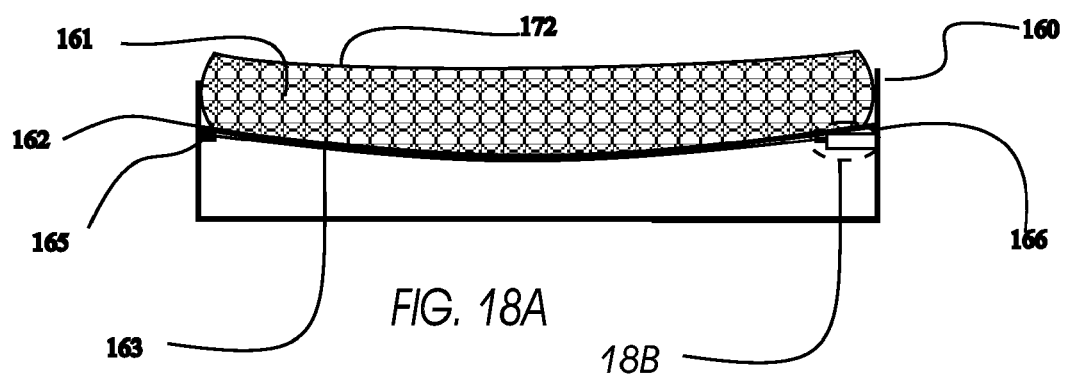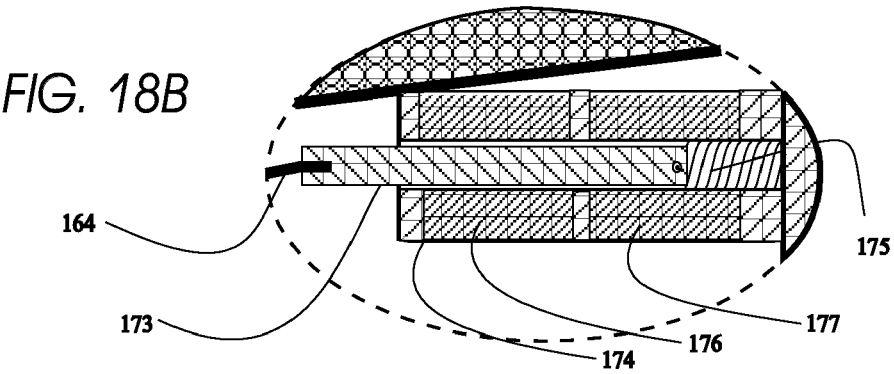

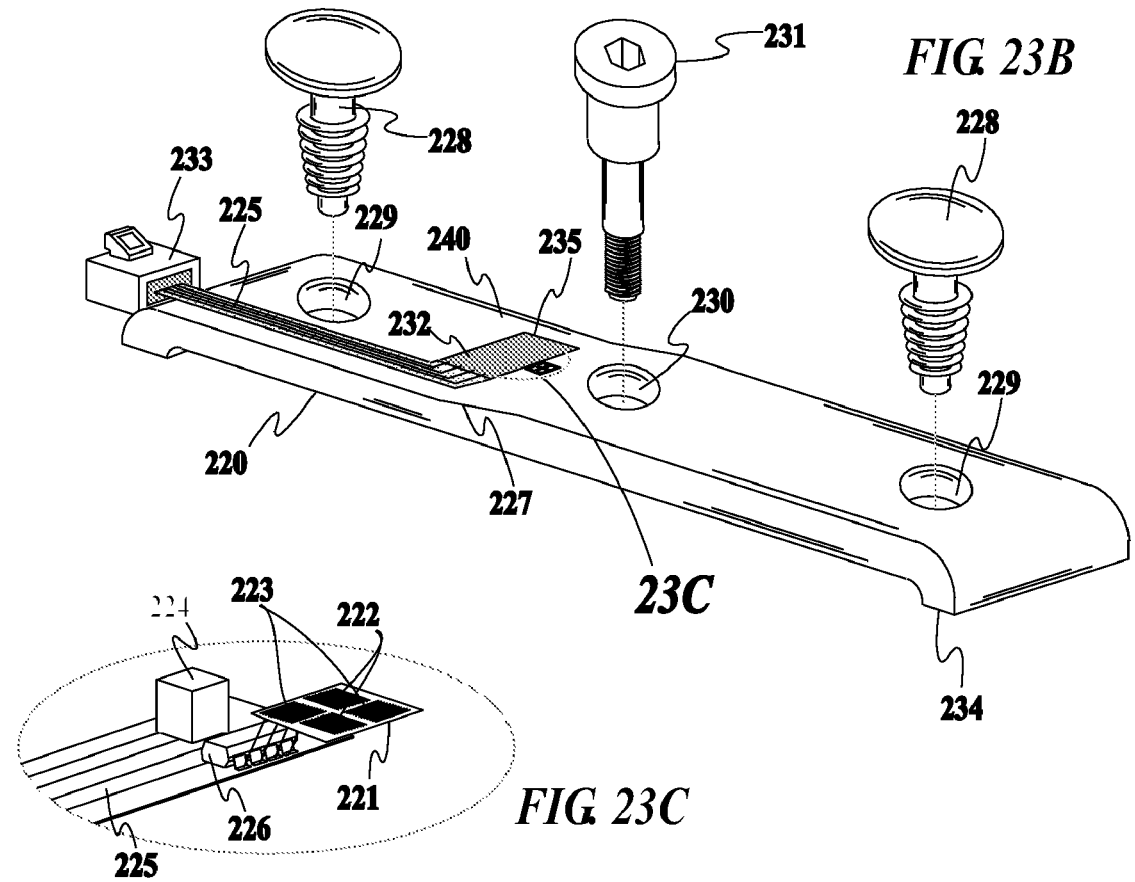
FIG. 23B
FIG. 23C
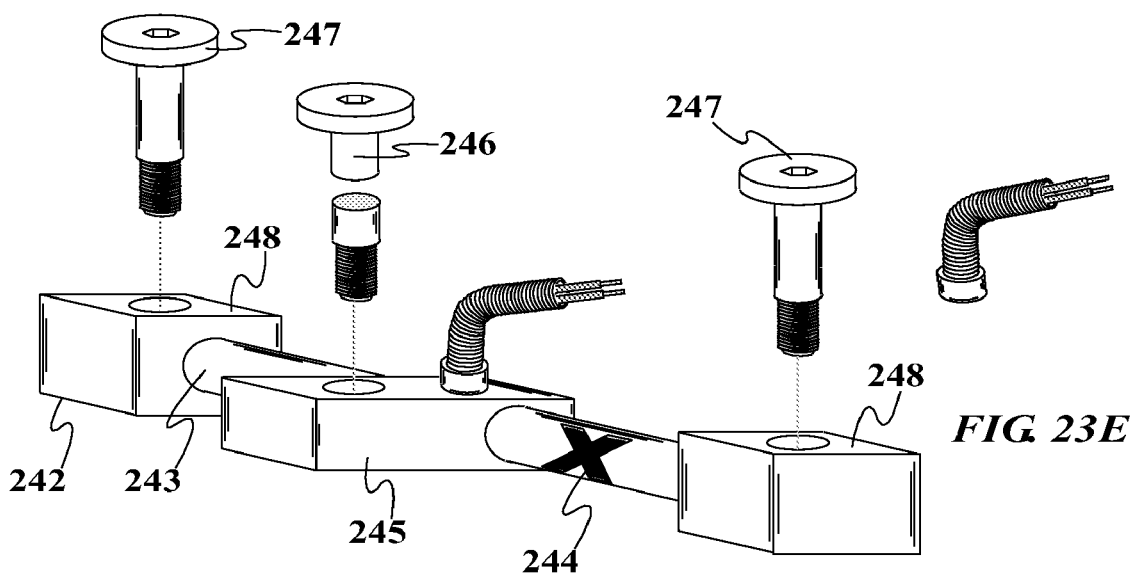
FIG. 23E

FIG. 28
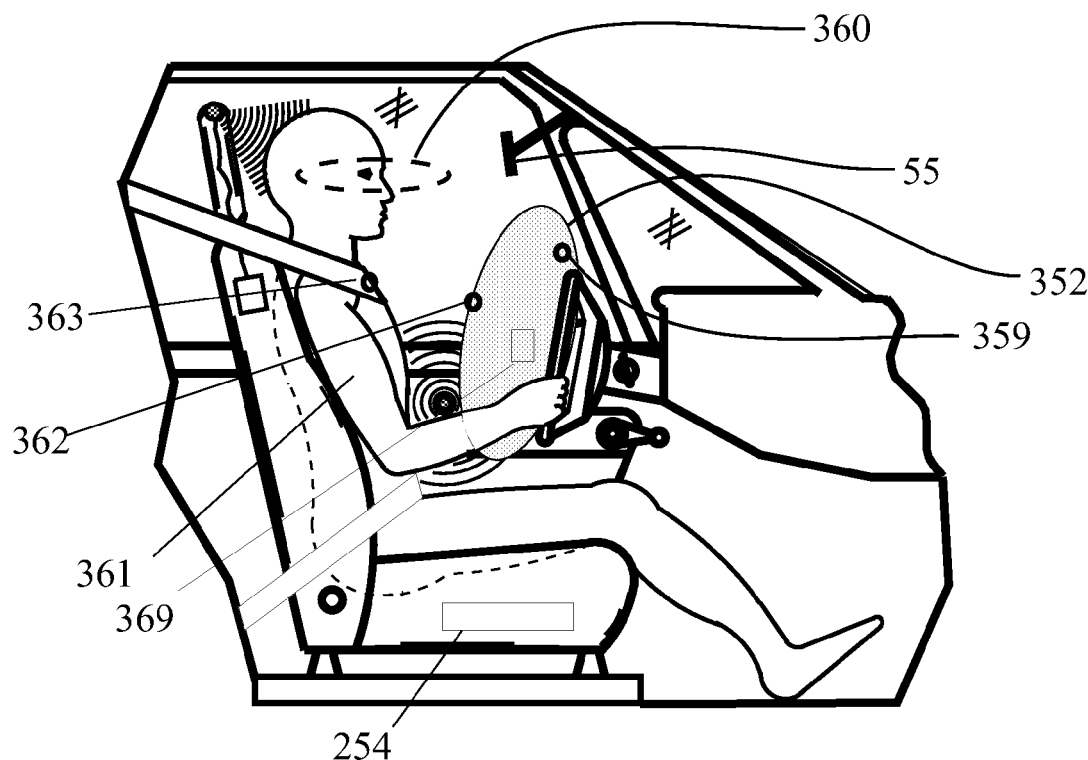
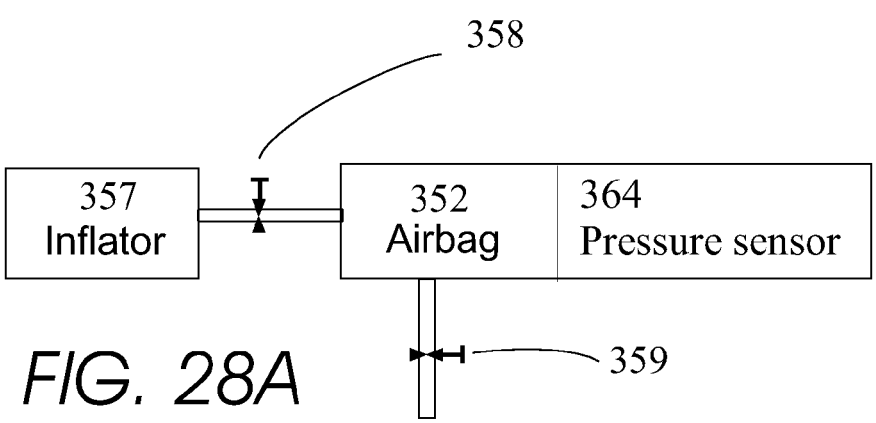
FIG. 28A

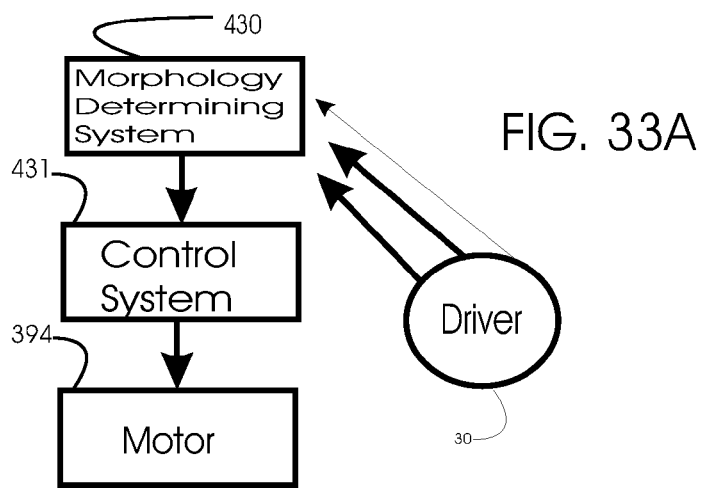
FIG. 33A
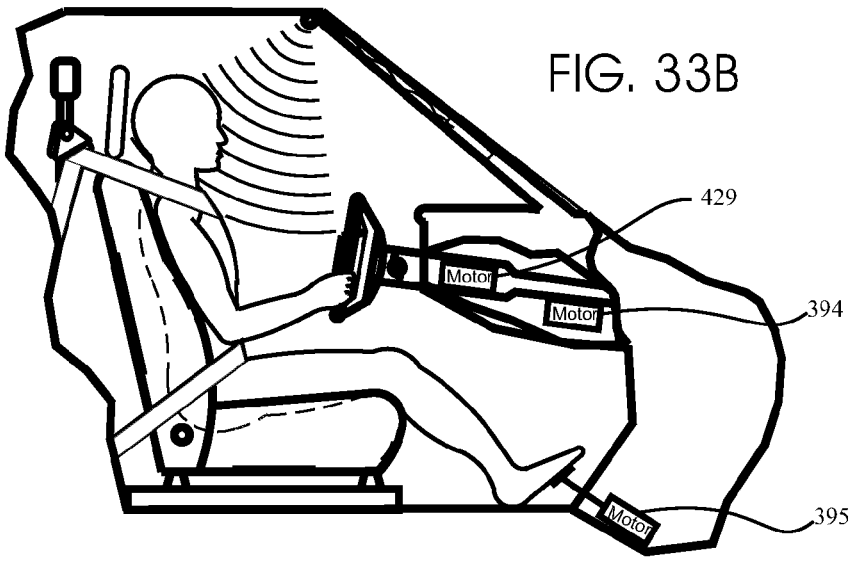
FIG. 33B
FIG. 34
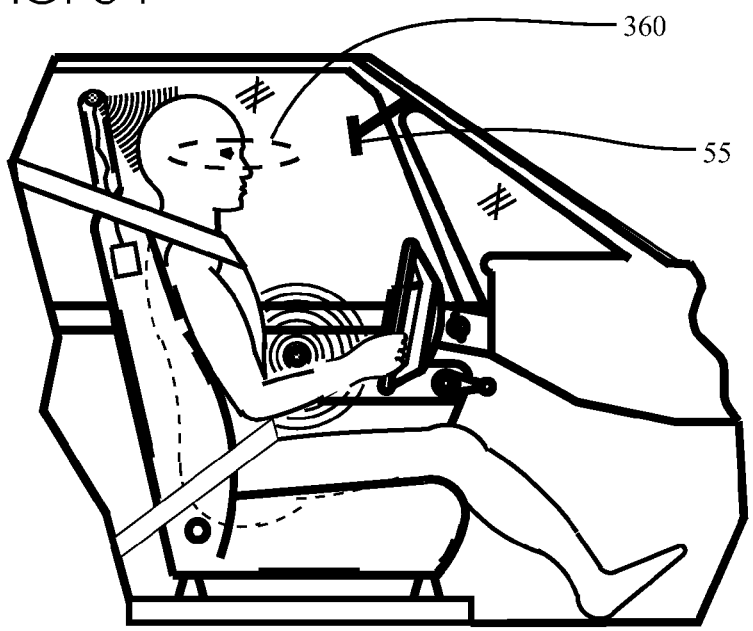

VEHICLE COMPONENT CONTROL BASED ON OCCUPANT MORPHOLOGY

CROSS REFERENCE TO RELATED APPLICATIONS

This application is:
1. a continuation-in-part (CIP) of U.S. patent application Ser. No. 10/733,957 filed Dec. 11, 2003 which is:
   A. a CIP of U.S. patent application Ser. No. 09/849,559 filed May 4, 2001, now U.S. Pat. No. 6,689,962, which is a CIP of U.S. patent application Ser. No. 09/193,209 filed Nov. 17, 1998, now U.S. Pat. No. 6,242,701, which is a CIP of U.S. patent application Ser. No. 09/128,490 filed Aug. 4, 1998, now U.S. Pat. No. 6,078,854, which is:
      1) a CIP of U.S. patent application Ser. No. 08/474,783 filed Jun. 7, 1995, now U.S. Pat. No. 5,822,707; and
      2) a CIP of U.S. patent application Ser. No. 08/970,822 filed Nov. 14, 1997, now U.S. Pat. No. 6,081,757;
   B. a CIP of U.S. patent application Ser. No. 10/061,016 filed Jan. 30, 2002, now U.S. Pat. No. 6,833,516, which is a CIP of U.S. patent application Ser. No. 09/901,879 filed Jul. 9, 2001, now U.S. Pat. No. 6,555,766; and
   C. a CIP of U.S. patent application Ser. No. 10/227,781 filed Aug. 26, 2002, now U.S. Pat. No. 6,792,342, which is a CIP of U.S. patent application Ser. No. 09/500,346 filed Feb. 8, 2000, now U.S. Pat. No. 6,442,504, which is a CIP of U.S. patent application Ser. No. 09/128,490 filed Aug. 4, 1998, now U.S. Pat. No. 6,078,854;
2. a CIP of U.S. patent application Ser. No. 10/931,288 filed Aug. 31, 2004, which is a CIP of U.S. patent application Ser. No. 10/303,364 filed Nov. 25, 2002, now U.S. Pat. No. 6,784,379, which is a CIP of U.S. patent application Ser. No. 10/174,803 filed Jun. 19, 2002, now U.S. Pat. No. 6,958,451, which is:
   A. a CIP of U.S. patent application Ser. No. 09/500,346 filed Feb. 8, 2000, now U.S. Pat. No. 6,442,504;
   B. a CIP of U.S. patent application Ser. No. 09/849,558 filed May 4, 2001, now U.S. Pat. No. 6,653,577, which is a CIP of U.S. patent application Ser. No. 09/193,209 filed Nov. 17, 1998, now U.S. Pat. No. 6,242,701;
   C. a CIP of U.S. patent application Ser. No. 09/849,559 filed May 4, 2001, now U.S. Pat. No. 6,689,962; and
   D. a CIP of U.S. patent application Ser. No. 09/901,879 filed Jul. 9, 2001, now U.S. Pat. No. 6,555,766;
3. a CIP of U.S. patent application Ser. No. 10/940,881 filed Sep. 13, 2004 which is:
   A. a CIP of U.S. patent application Ser. No. 10/061,016 filed Jan. 30, 2002, now U.S. Pat. No. 6,833,516;
   B. a CIP of U.S. patent application Ser. No. 10/174,803 filed Jun. 19, 2002, now U.S. Pat. No. 6,958,451; and
   C. a CIP of U.S. patent application Ser. No. 10/227,781 filed Aug. 26, 2002, now U.S. Pat. No. 6,792,342;
4. a CIP of U.S. patent application Ser. No. 11/131,623 filed May 18, 2005 which is a CIP of U.S. patent application Ser. No. 10/817,379 filed Apr. 2, 2004;
5. a CIP of U.S. patent application Ser. No. 11/278,979 filed Apr. 7, 2006;
6. a CIP of U.S. patent application Ser. No. 11/420,297 filed May 25, 2006;
7. a CIP of U.S. patent application Ser. No. 11/423,521 filed Jun. 12, 2006; and
8. a CIP of U.S. patent application Ser. No. 11/457,904 filed Jul. 17, 2006.

All of the above-referenced applications are incorporated by reference herein.

FIELD OF THE INVENTION

The present invention relates generally to methods and apparatus for controlling one or more components in a vehicle based on an identification of an occupant as determined through analysis of the morphology of the occupant.

BACKGROUND OF THE INVENTION

All of the patents, patent applications, technical papers and other references mentioned below and in the parent applications mentioned above are incorporated herein by reference in their entirety unless stated otherwise.

Background information about the embodiments of the invention claimed herein is found in the '957 application, incorporated by reference herein. Definitions of terms used in the instant application are also set forth in the '957 application, among others. For example, a "morphological characteristic" will generally mean any measurable property of a human such as height, weight, leg or arm length, head diameter, skin color or pattern, blood vessel pattern, voice pattern, finger prints, iris patterns, etc.

Preferred embodiments of the invention are described below and unless specifically noted, it is the applicant's intention that the words and phrases in the specification and claims be given the ordinary and accustomed meaning to those of ordinary skill in the applicable art(s). If the applicant intends any other meaning, he will specifically state he is applying a special meaning to a word or phrase.

Likewise, applicant's use of the word "function" here is not intended to indicate that the applicant seeks to invoke the special provisions of 35 U.S.C. §112, sixth paragraph, to define his invention. To the contrary, if applicant wishes to invoke the provisions of 35 U.S.C. §112, sixth paragraph, to define his invention, he will specifically set forth in the claims the phrases "means for" or "step for" and a function, without also reciting in that phrase any structure, material or act in support of the function. Moreover, even if applicant invokes the provisions of 35 U.S.C. §112, sixth paragraph, to define his invention, it is the applicant's intention that his inventions not be limited to the specific structure, material or acts that are described in the preferred embodiments herein. Rather, if applicant claims his inventions by specifically invoking the provisions of 35 U.S.C. §112, sixth paragraph, it is nonetheless his intention to cover and include any and all structure, materials or acts that perform the claimed function, along with any and all known or later developed equivalent structures, materials or acts for performing the claimed function.

OBJECTS AND SUMMARY OF THE INVENTION

It is an object of the present invention to provide new and improved arrangements and methods for controlling a vehicle component based on the morphology of an occupant of the vehicle.

It is another object of the present invention to provide new and improved arrangements and methods for controlling a vehicle component based on an identification of an occupant of the vehicle obtained through determination, detection or measurement of one or more morphological characteristics of the occupant.

In order to achieve at least one of these objects and others, a first embodiment of a method for vehicle component control based on occupancy of the vehicle includes determining at least one morphological characteristic of the occupant, classifying the occupant based only on the determined morphological characteristic(s) to provide an identification of the occupant, and adjusting a component of the vehicle based on the identification.

Morphological characteristics include weight of the occupant and height of the occupant. Weight of the occupant can be determined by a weight sensor arranged within or underneath a cushion of a seat on which the occupant is seated. Height of the occupant, i.e., height of the occupant from a seat on which the occupant is seated, can be determined by a wave transmitting and receiving sensor in the seat back portion or headrest. The morphological characteristics can be determined using only sensors arranged in a seat on which the occupant is seated.

Classification of the occupant can include generating a table of classifications for different determinations of the morphological characteristic, either individually or combinations of two or more morphological characteristics, so that an identification is provided based on each determination, detection or measurement of the morphological characteristic(s). The identification may be an absolute classification as to size and weight, e.g., the occupant has a height of 68 inches and a weight off 170 pounds.

Optionally, the occupant can modify the component to a further adjusted state which is stored in association with the determined morphological characteristic(s). At a subsequent time when the same morphological characteristic(s) is/are determined, the component is adjusted to the occupant adjusted state.

Components subject to control based on the identification of the occupant as derived from the morphological characteristic(s) include a vehicle seat, a radio, a heat/air-conditioning system, a steering wheel, an airbag system, a seatbelt tension producing system, and a seatbelt system wherein the force exerted on the occupant by the seatbelt during a crash is controlled. Multiple components can be controlled based on the identification.

Another method for vehicle component control based on occupancy of the vehicle includes determining weight of the occupant and height of the occupant from a seat on which the occupant is seated, classifying the occupant based only on the determined weight and height to provide an identification of the occupant, and adjusting a component of the vehicle based on the identification. The same variations described above can be applied to this method as well.

Yet another method for vehicle component control based on occupancy of the vehicle includes determining at least one morphological characteristic of the occupant, classifying the occupant based the determined morphological characteristic(s) to provide an identification of the occupant without determining the occupant's position, and adjusting a component of the vehicle based on the identification. The same variations described above can be applied to this method as well.

Identification or classification of an occupant is enabled by determining, detecting or measuring the morphological characteristics of the occupant. Such measurements can be made of the height and weight, for example, and used not only to adjust a vehicular component to a proper position (even without requiring a determination of the occupant's position) but also to remember that position, as fine tuned by the occupant, for re-positioning the component the next time the occupant occupies the seat. In one implementation, once at least one and preferably two of the morphological characteristics of a driver are determined, for example by measuring his or her height and/or weight, a vehicle component such as the seat can be adjusted, and other features or components can be incorporated into the system including, for example, the automatic adjustment of the rear view and/or side mirrors based on seat position and occupant height. In addition, a determination of an out-of-position occupant can be made and based thereon, airbag deployment suppressed if the occupant is more likely to be injured by the airbag than by the accident without the protection of the airbag. Furthermore, the characteristics of the airbag including the amount of gas produced by the inflator and the size of the airbag exit orifices can be adjusted to provide better protection for small lightweight occupants as well as large, heavy people. Even the direction of the airbag deployment can, in some cases, be controlled. Still other features or components can now be adjusted based on the measured occupant morphology as well as the fact that the occupant can now be identified. Some of these features or components include the adjustment of seat armrest, cup holder, steering wheel (angle and telescoping), pedals, phone location and for that matter the adjustment of all things in the vehicle which a person must reach or interact with. Some items that depend on personal preferences can also be automatically adjusted including the radio station, temperature, ride and others.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIGS. 10(a), 10(b) and 10(c) are each a diagram showing the configuration of the reflected waves of an ultrasonic wave transmitted from each transmitter of the ultrasonic sensors toward the passenger seat, obtained within the time that the reflected wave arrives at a receiver, FIG. 10(a) showing an example of the reflected waves obtained when a passenger is in a normal seated-state, FIG. 10(b) showing an example of the reflected waves obtained when a passenger is in an abnormal seated-state (where the passenger is seated too close to the instrument panel), and FIG. 10(c) showing a transmit pulse.

FIG. 11 is a diagram of the data processing of the reflected waves from the ultrasonic or electromagnetic sensors.

FIG. 13a is an explanatory diagram of a process for normalizing the reflected wave and shows normalized reflected waves.

FIG. 13b is a diagram similar to FIG. 13a showing a step of extracting data based on the normalized reflected waves and a step of weighting the extracted data by employing the data of the seat track position detecting sensor, the data of the reclining angle detecting sensor, and the data of the weight sensor.

FIG. 14 is a perspective view of the interior of the passenger compartment of an automobile, with parts cut away and removed, showing a variety of transmitters that can be used in a phased array system.

FIG. 18 is a perspective view of a seat shown in phantom, with a movable headrest and sensors for measuring the height of the occupant from the vehicle seat, and a weight sensor shown mounted onto the seat.

FIG. 18A is a view taken along line 18A-18A in FIG. 18.

FIG. 18B is an enlarged view of the section designated 18B in FIG. 18.

FIG. 23B is a perspective view of a simply supported beam type load cell for use with the weight measurement system of at least one of the inventions disclosed herein as an alternate to the cantilevered load cell of FIG. 23A.

FIG. 23C is an enlarged view of the portion designated 23C in FIG. 23B.

FIG. 23E is a perspective view of a torsional beam load cell for use with the weight measurement apparatus in accordance with the invention as an alternate to the cantilevered load cell of FIG. 23A.

FIG. 28 is a view showing an inflated airbag and an arrangement for controlling both the flow of gas into and the flow of gas out of the airbag during the crash where the determination is made based on a height sensor located in the headrest and a weight sensor in the seat.

FIG. 28A illustrates the valving system of FIG. 28.

FIG. 33A is a schematic showing the manner in which the steering column is adjusted based on the morphology of the driver.

FIG. 33B is a view similar to FIG. 33 and shows the use of two motors for adjusting the position of the steering wheel.

FIG. 34 is a view similar to FIG. 24 showing the occupant's eyes and the seat adjusted to place the eyes at a particular vertical position for proper viewing through the windshield and rear view mirror.

DETAILED DESCRIPTION OF THE INVENTION

Note whenever a patent or literature is referred to below it is to be assumed that all of that patent or literature is to be incorporated by reference in its entirety to the extent the disclosure of these reference is necessary. Also note that although many of the examples below relate to a particular vehicle, an automobile, the invention is not limited to any particular vehicle and is thus applicable to all relevant vehicles including shipping containers and truck trailers and to all compartments of a vehicle including, for example, the passenger compartment and the trunk of an automobile or truck.

1. General Occupant Sensors

Figure 1:
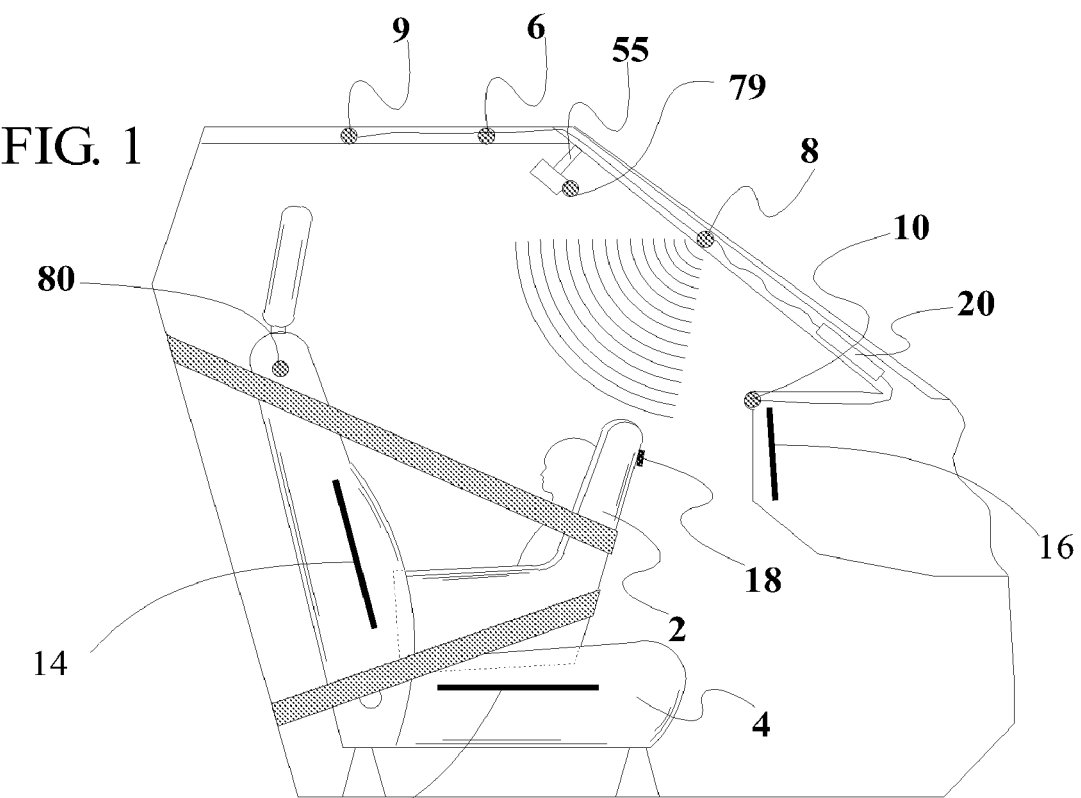
FIG. 1 is a side view with parts cutaway and removed of a vehicle showing the passenger compartment containing a rear facing child seat on the front passenger seat and a preferred mounting location for an occupant and rear facing child seat presence detector including an antenna field sensor and a resonator or reflector placed onto the forward most portion of the child seat.

Referring to the accompanying drawings, FIG. 1 is a side view, with parts cutaway and removed of a vehicle showing the passenger compartment, or passenger container, containing a rear facing child seat 2 on a front passenger seat 4 and a preferred mounting location for a first embodiment of a vehicle interior monitoring system in accordance with the invention. The interior monitoring system is capable of detecting the presence of an object, occupying objects such as a box, an occupant or a rear facing child seat 2, determining the type of object, determining the location of the object, and/or determining another property or characteristic of the object. A property of the object could be the orientation of a child seat, the velocity of an adult and the like. For example, the vehicle interior monitoring system can determine that an object is present on the seat, that the object is a child seat and that the child seat is rear-facing. The vehicle interior monitoring system could also determine that the object is an adult, that he is drunk and that he is out of position relative to the airbag.

In this embodiment, three transducers 6, 8 and 10 are used alone, or, alternately in combination with one or more antenna near field monitoring sensors or transducers, 12, 14 and 16, although any number of wave-transmitting transducers or radiation-receiving receivers may be used. Such transducers or receivers may be of the type that emit or receive a continuous signal, a time varying signal or a spatial varying signal such as in a scanning system and each may comprise only a transmitter which transmits energy, waves or radiation, only a receiver which receives energy, waves or radiation, both a transmitter and a receiver capable of transmitting and receiving energy, waves or radiation, an electric field sensor, a capacitive sensor, or a self-tuning antenna-based sensor, weight sensor, chemical sensor, motion sensor or vibration sensor, for example.

One particular type of radiation-receiving receiver for use in the invention receives electromagnetic waves and another receives ultrasonic waves.

In an ultrasonic embodiment, transducer 8 can be used as a transmitter and transducers 6 and 10 can be used as receivers. Naturally, other combinations can be used such as where all transducers are transceivers (transmitters and receivers). For example, transducer 8 can be constructed to transmit ultrasonic energy toward the front passenger seat, which is modified, in this case by the occupying item of the passenger seat, i.e., the rear facing child seat 2, and the modified waves are received by the transducers 6 and 10, for example. A more common arrangement is where transducers 6, 8 and 10 are all transceivers. Modification of the ultrasonic energy may constitute reflection of the ultrasonic energy as the ultrasonic energy is reflected back by the occupying item of the seat. The waves received by transducers 6 and 10 vary with time depending on the shape of the object occupying the passenger seat, in this case the rear facing child seat 2. Each different occupying item will reflect back waves having a different pattern. Also, the pattern of waves received by transducer 6 will differ from the pattern received by transducer 10 in view of its different mounting location. This difference generally permits the determination of location of the reflecting surface (i.e., the rear facing child seat 2) through triangulation. Through the use of two transducers 6, 10, a sort of stereographic image is received by the two transducers and recorded for analysis by processor 20, which is coupled to the transducers 6, 8, 10, e.g., by wires or wirelessly. This image will differ for each object that is placed on the vehicle seat and it will also change for each position of a particular object and for each position of the vehicle seat. Elements 6, 8, 10, although described as transducers, are representative of any type of component used in a wave-based analysis technique. Also, although the example of an automobile passenger compartment has been shown, the same principle can be used for monitoring the interior of any vehicle including in particular shipping containers and truck trailers.

Wave-type sensors as the transducers 6, 8, 10 as well as electric field sensors 12, 14, 16 are mentioned above. Electric field sensors and wave sensors are essentially the same from the point of view of sensing the presence of an occupant in a vehicle. In both cases, a time varying electric field is disturbed or modified by the presence of the occupant. At high frequencies in the visual, infrared and high frequency radio wave region, the sensor is based on its capability to sense a change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between or near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus, for the purposes of at least one of the inventions disclosed herein, capacitance, electric field or electromagnetic wave sensors are equivalent and although they are all technically "field" sensors they will be considered as "wave" sensors herein. What follows is a discussion comparing the similarities and differences between two types of field or wave sensors, electromagnetic wave sensors and capacitive sensors as exemplified by Kithil in U.S. Ser. No. 05/702,634.

An electromagnetic field disturbed or emitted by a passenger in the case of an electromagnetic wave sensor, for example, and the electric field sensor of Kithil, for example, are in many ways similar and equivalent for the purposes of at least one of the inventions disclosed herein. The electromagnetic wave sensor is an actual electromagnetic wave sensor by definition because they sense parameters of an electromagnetic wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see Column 5, lines 5-7: "The proximity sensor 12 each function by creating an electrostatic field between oscillator input loop 54 and detector output loop 56, which is affected by presence of a person near by, as a result of capacitive coupling, . . . "). It is a potential, non-rotational electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a quasistatic electric field in the space between/near the plates of the capacitor.

Kithil declares that his capacitance sensor uses a static electric field. Thus, from the consideration above, one can conclude that Kithil's sensor cannot be treated as a wave sensor because there are no actual electromagnetic waves but only a static electric field of the capacitor in the sensor system. However, this is not believed to be the case. The Kithil system could not operate with a true static electric field because a steady system does not carry any information. Therefore, Kithil is forced to use an oscillator, causing an alternate current in the capacitor and a reactive quasi-static electric field in the space between the capacitor plates, and a detector to reveal an informative change of the sensor capacitance caused by the presence of an occupant (see FIG. 7 and its description). In this case, the system becomes a "wave sensor" in the sense that it starts generating an actual time-varying electric field that certainly originates electromagnetic waves according to the definition above. That is, Kithil's sensor can be treated as a wave sensor regardless of the shape of the electric field that it creates, a beam or a spread shape.

As follows from the Kithil patent, the capacitor sensor is likely a parametric system where the capacitance of the sensor is controlled by the influence of the passenger body. This influence is transferred by means of the near electromagnetic field (i.e., the wave-like process) coupling the capacitor electrodes and the body. It is important to note that the same influence takes place with a real static electric field also, that is in absence of any wave phenomenon. This would be a situation if there were no oscillator in Kithil's system. However, such a system is not workable and thus Kithil reverts to a dynamic system using time-varying electric fields.

Thus, although Kithil declares that the coupling is due to a static electric field, such a situation is not realized in his system because an alternating electromagnetic field ("quasi-wave") exists in the system due to the oscillator. Thus, his sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is: "11. Physics. A progressive disturbance propagated from point to point in a medium or space without progress or advance of the points themselves, . . . ". In a capacitor, the time that it takes for the disturbance (a change in voltage) to propagate through space, the dielectric and to the opposite plate is generally small and neglected but it is not zero. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam-type electromagnetic wave sensor.

For ultrasonic systems, the "image" recorded from each ultrasonic transducer/receiver, is actually a time series of digitized data of the amplitude of the received signal versus time. Since there are two receivers, two time series are obtained which are processed by the processor 20. The processor 20 may include electronic circuitry and associated, embedded software. Processor 20 constitutes one form of generating means in accordance with the invention which generates information about the occupancy of the passenger compartment based on the waves received by the transducers 6, 8, 10.

When different objects are placed on the front passenger seat, the images from transducers 6, 8, 10 for example, are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition see U.S. RE 37260 to Varga et al.

The determination of these rules is important to the pattern recognition techniques used in at least one of the inventions disclosed herein. In general, three approaches have been useful, artificial intelligence, fuzzy logic and artificial neural networks (including cellular and modular or combination neural networks and support vector machines—although additional types of pattern recognition techniques may also be used, such as sensor fusion). In some implementations of at least one of the inventions disclosed herein, such as the determination that there is an object in the path of a closing window as described below, the rules are sufficiently obvious that a trained researcher can sometimes look at the returned signals and devise a simple algorithm to make the required determinations. In others, such as the determination of the presence of a rear facing child seat or of an occupant, artificial neural networks can be used to determine the rules. One such set of neural network software for determining the pattern recognition rules is available from the International Scientific Research, Inc. of Panama City, Panama.

Electromagnetic energy based occupant sensors exist that use many portions of the electromagnetic spectrum. A system based on the ultraviolet, visible or infrared portions of the spectrum generally operate with a transmitter and a receiver of reflected radiation. The receiver may be a camera or a photo detector such as a pin or avalanche diode as described in detail in above-referenced patents and patent applications. At other frequencies, the absorption of the electromagnetic energy is primarily used and at still other frequencies the capacitance or electric field influencing effects are used. Generally, the human body will reflect, scatter, absorb or transmit electromagnetic energy in various degrees depending on the frequency of the electromagnetic waves. All such occupant sensors are included herein.

In an embodiment wherein electromagnetic energy is used, it is to be appreciated that any portion of the electromagnetic signals that impinges upon, surrounds or involves a body portion of the occupant is at least partially absorbed by the body portion. Sometimes, this is due to the fact that the human body is composed primarily of water, and that electromagnetic energy of certain frequencies is readily absorbed by water. The amount of electromagnetic signal absorption is related to the frequency of the signal, and size or bulk of the body portion that the signal impinges upon. For example, a torso of a human body tends to absorb a greater percentage of electromagnetic energy than a hand of a human body.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, surface reflectivity, etc. depending on the frequency, so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

One or more of the transducers 6, 8, 10 can also be image-receiving devices, such as cameras, which take images of the interior of the passenger compartment. These images can be transmitted to a remote facility to monitor the passenger compartment or can be stored in a memory device for use in the event of an accident, i.e., to determine the status of the occupant(s) of the vehicle prior to the accident. In this manner, it can be ascertained whether the driver was falling asleep, talking on the phone, etc.

A memory device for storing images of the passenger compartment, and also for receiving and storing any other information, parameters and variables relating to the vehicle or occupancy of the vehicle, may be in the form a standardized "black box" (instead of or in addition to a memory part in a processor 20). The IEEE Standards Association is currently beginning to develop an international standard for motor vehicle event data recorders. The information stored in the black box and/or memory unit in the processor 20, can include the images of the interior of the passenger compartment as well as the number of occupants and the health state of the occupant(s). The black box would preferably be tamper-proof and crash-proof and enable retrieval of the information after a crash.

Transducer 8 can also be a source of electromagnetic radiation, such as an LED, and transducers 6 and 10 can be CMOS, CCD imagers or other devices sensitive to electromagnetic radiation or fields. This "image" or return signal will differ for each object that is placed on the vehicle seat, or elsewhere in the vehicle, and it will also change for each position of a particular object and for each position of the vehicle seat or other movable objects within the vehicle. Elements 6, 8, 10, although described as transducers, are representative of any type of component used in a wave-based or electric field analysis technique, including, e.g., a transmitter, receiver, antenna or a capacitor plate.

Transducers 12, 14 and 16 can be antennas placed in the seat and instrument panel, or other convenient location within the vehicle, such that the presence of an object, particularly a water-containing object such as a human, disturbs the near field of the antenna. This disturbance can be detected by various means such as with Micrel parts MICREF102 and MICREF104, which have a built-in antenna auto-tune circuit. Note, these parts cannot be used as is and it is necessary to redesign the chips to allow the auto-tune information to be retrieved from the chip.

Other types of transducers can be used along with the transducers 6, 8, 10 or separately and all are contemplated by at least one of the inventions disclosed herein. Such transducers include other wave devices such as radar or electronic field sensing systems such as described in U.S. Ser. No. 05/366, 241, U.S. Ser. No. 05/602,734, U.S. Ser. No. 05/691,693, U.S. Ser. No. 05/802,479, U.S. Ser. No. 05/844,486, U.S. Ser. No. 06/014,602, and U.S. Ser. No. 06/275,146 to Kithil, and U.S. Ser. No. 05/948,031 to Rittmueller. Another technology, for example, uses the fact that the content of the near field of an antenna affects the resonant tuning of the antenna. Examples of such a device are shown as antennas 12, 14 and 16 in FIG. 1. By going to lower frequencies, the near field range is increased and also at such lower frequencies, a ferrite-type antenna could be used to minimize the size of the antenna. Other antennas that may be applicable for a particular implementation include dipole, microstrip, patch, Yagi etc. The frequency transmitted by the antenna can be swept and the (VSWR) voltage and current in the antenna feed circuit can be measured. Classification by frequency domain is then possible. That is, if the circuit is tuned by the antenna, the frequency can be measured to determine the object in the field.

Figure 2:
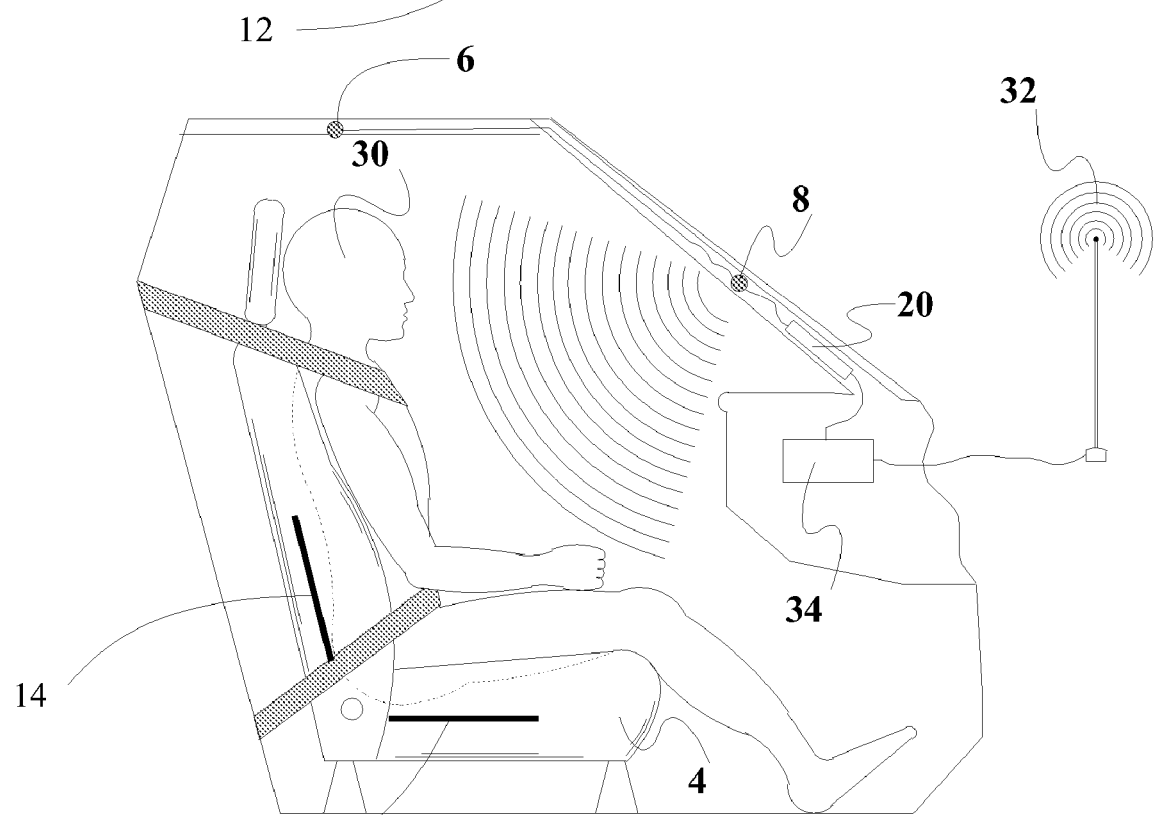
FIG. 2 is a side view with parts cutaway and removed showing schematically the interface between the vehicle interior monitoring system of at least one of the inventions disclosed herein and the vehicle cellular or other telematics communication system including an antenna field sensor.

An alternate system is shown in FIG. 2, which is a side view showing schematically the interface between the vehicle interior monitoring system of at least one of the inventions disclosed herein and the vehicle cellular or other communication system 32, such as a satellite based system such as that supplied by Skybitz, having an associated antenna 34. In this view, an adult occupant 30 is shown sitting on the front passenger seat 4 and two transducers 6 and 8 are used to determine the presence (or absence) of the occupant on that seat 4. One of the transducers 8 in this case acts as both a transmitter and receiver while the other transducer 6 acts only as a receiver. Alternately, transducer 6 could serve as both a transmitter and receiver or the transmitting function could be alternated between the two devices. Also, in many cases, more that two transmitters and receivers are used and in still other cases, other types of sensors, such as weight, chemical, radiation, vibration, acoustic, seatbelt tension sensor or switch, heartbeat, self tuning antennas (12, 14), motion and seat and seatback position sensors, are also used alone or in combination with the transducers 6 and 8. As is also the case in FIG. 1, the transducers 6 and 8 are attached to the vehicle embedded in the A-pillar and headliner trim, where their presence is disguised, and are connected to processor 20 that may also be hidden in the trim as shown or elsewhere. Naturally, other mounting locations can also be used and, in most cases, preferred as disclosed in Varga et. al. (U.S. RE 37260).

The transducers 6 and 8 in conjunction with the pattern recognition hardware and software described below enable the determination of the presence of an occupant within a short time after the vehicle is started. The software is implemented in processor 20 and is packaged on a printed circuit board or flex circuit along with the transducers 6 and 8. Similar systems can be located to monitor the remaining seats in the vehicle, also determine the presence of occupants at the other seating locations and this result is stored in the computer memory, which is part of each monitoring system processor 20. Processor 20 thus enables a count of the number of occupants in the vehicle to be obtained by addition of the determined presence of occupants by the transducers associated with each seating location, and in fact, can be designed to perform such an addition. Naturally, the principles illustrated for automobile vehicles are applicable by those skilled in the art to other vehicles such as shipping containers or truck trailers and to other compartments of an automotive vehicle such as the vehicle trunk.

For a general object, transducers 6, 8, 9, 10 can also be used to determine the type of object, determine the location of the object, and/or determine another property or characteristic of the object. A property of the object could be the orientation of a child seat, the velocity of an adult and the like. For example, the transducers 6, 8, 9, 10 can be designed to enable a determination that an object is present on the seat, that the object is a child seat and that the child seat is rear-facing.

The transducers 6 and 8 are attached to the vehicle buried in the trim such as the A-pillar trim, where their presence can be disguised, and are connected to processor 20 that may also be hidden in the trim as shown (this being a non-limiting position for the processor 20). The A-pillar is the roof support pillar that is closest to the front of the vehicle and which, in addition to supporting the roof, also supports the front windshield and the front door. Other mounting locations can also be used. For example, transducers 6, 8 can be mounted inside the seat (along with or in place of transducers 12 and 14), in the ceiling of the vehicle, in the B-pillar, in the C-pillar and in the doors. Indeed, the vehicle interior monitoring system in accordance with the invention may comprise a plurality of monitoring units, each arranged to monitor a particular seating location. In this case, for the rear seating locations, transducers might be mounted in the B-pillar or C-pillar or in the rear of the front seat or in the rear side doors. Possible mounting locations for transducers, transmitters, receivers and other occupant sensing devices are disclosed in the above-referenced patent applications and all of these mounting locations are contemplated for use with the transducers described herein.

The cellular phone or other communications system 32 outputs to an antenna 34. The transducers 6, 8, 12 and 14 in conjunction with the pattern recognition hardware and software, which is implemented in processor 20 and is packaged on a printed circuit board or flex circuit along with the transducers 6 and 8, determine the presence of an occupant within a few seconds after the vehicle is started, or within a few seconds after the door is closed. Similar systems located to monitor the remaining seats in the vehicle, also determine the presence of occupants at the other seating locations and this result is stored in the computer memory which is part of each monitoring system processor 20.

Periodically and in particular in the event of an accident, the electronic system associated with the cellular phone system 32 interrogates the various interior monitoring system memories and arrives at a count of the number of occupants in the vehicle, and optionally, even makes a determination as to whether each occupant was wearing a seatbelt and if he or she is moving after the accident. The phone or other communications system then automatically dials the EMS operator (such as 911 or through a telematics service such as OnStar®) and the information obtained from the interior monitoring systems is forwarded so that a determination can be made as to the number of ambulances and other equipment to send to the accident site, for example. Such vehicles will also have a system, such as the global positioning system, which permits the vehicle to determine its exact location and to forward this information to the EMS operator. Other systems can be implemented in conjunction with the communication with the emergency services operator. For example, a microphone and speaker can be activated to permit the operator to attempt to communicate with the vehicle occupant(s) and thereby learn directly of the status and seriousness of the condition of the occupant(s) after the accident.

Thus, in basic embodiments of the invention, wave or other energy-receiving transducers are arranged in the vehicle at appropriate locations, trained if necessary depending on the particular embodiment, and function to determine whether a life form is present in the vehicle and if so, how many life forms are present and where they are located etc. To this end, transducers can be arranged to be operative at only a single seating location or at multiple seating locations with a provision being made to eliminate a repetitive count of occupants. A determination can also be made using the transducers as to whether the life forms are humans, or more specifically, adults, child in child seats, etc. As noted herein, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specifically). The degree of detail is limited by several factors, including, for example, the number and position of transducers and training of the pattern recognition algorithm(s).

In addition to the use of transducers to determine the presence and location of occupants in a vehicle, other sensors could also be used. For example, a heartbeat sensor which determines the number and presence of heartbeat signals can also be arranged in the vehicle, which would thus also determine the number of occupants as the number of occupants would be equal to the number of heartbeat signals detected. Conventional heartbeat sensors can be adapted to differentiate between a heartbeat of an adult, a heartbeat of a child and a heartbeat of an animal. As its name implies, a heartbeat sensor detects a heartbeat, and the magnitude and/or frequency thereof, of a human occupant of the seat, if such a human occupant is present. The output of the heartbeat sensor is input to the processor of the interior monitoring system. One heartbeat sensor for use in the invention may be of the types as disclosed in McEwan (U.S. Ser. No. 05/573,012 and U.S. Ser. No. 05/766,208). The heartbeat sensor can be positioned at any convenient position relative to the seats where occupancy is being monitored. A preferred location is within the vehicle seatback.

An alternative way to determine the number of occupants is to monitor the weight being applied to the seats, i.e., each seating location, by arranging weight sensors at each seating location which might also be able to provide a weight distribution of an object on the seat. Analysis of the weight and/or weight distribution by a predetermined method can provide an indication of occupancy by a human, an adult or child, or an inanimate object.

Another type of sensor which is not believed to have been used in an interior monitoring system previously is a micropower impulse radar (MIR) sensor which determines motion of an occupant and thus can determine his or her heartbeat (as evidenced by motion of the chest). Such an MIR sensor can be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan (U.S. Ser. No. 05/361,070), as well as many other patents by the same inventor.

Motion sensing is accomplished by monitoring a particular range from the sensor as disclosed in that patent. MIR is one form of radar which has applicability to occupant sensing and can be mounted at various locations in the vehicle. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency ultrasound is also possible. Additionally, multiple MIR sensors can be used when high speed tracking of the motion of an occupant during a crash is required since they can be individually pulsed without interfering with each through time division multiplexing.

An alternative way to determine motion of the occupant(s) is to monitor the weight distribution of the occupant whereby changes in weight distribution after an accident would be highly suggestive of movement of the occupant. A system for determining the weight distribution of the occupants could be integrated or otherwise arranged in the seats such as the front seat 4 of the vehicle and several patents and publications describe such systems.

More generally, any sensor which determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the passenger compartment of the vehicle which can be correlated to the health state of the occupant(s). The motion sensor and chemical sensor can be designed to have a fixed operational field situated where the occupant's mouth is most likely to be located. In this manner, detection of carbon dioxide in the fixed operational field could be used as an indication of the presence of a human occupant in order to enable the determination of the number of occupants in the vehicle. In the alternative, the motion sensor and chemical sensor can be adjustable and adapted to adjust their operational field in conjunction with a determination by an occupant position and location sensor which would determine the location of specific parts of the occupant's body, e.g., his or her chest or mouth. Furthermore, an occupant position and location sensor can be used to determine the location of the occupant's eyes and determine whether the occupant is conscious, i.e., whether his or her eyes are open or closed or moving.

The use of chemical sensors can also be used to detect whether there is blood present in the vehicle, for example, after an accident. Additionally, microphones can detect whether there is noise in the vehicle caused by groaning, yelling, etc., and transmit any such noise through the cellular or other communication connection to a remote listening facility (such as operated by OnStar®).

Figure 3:
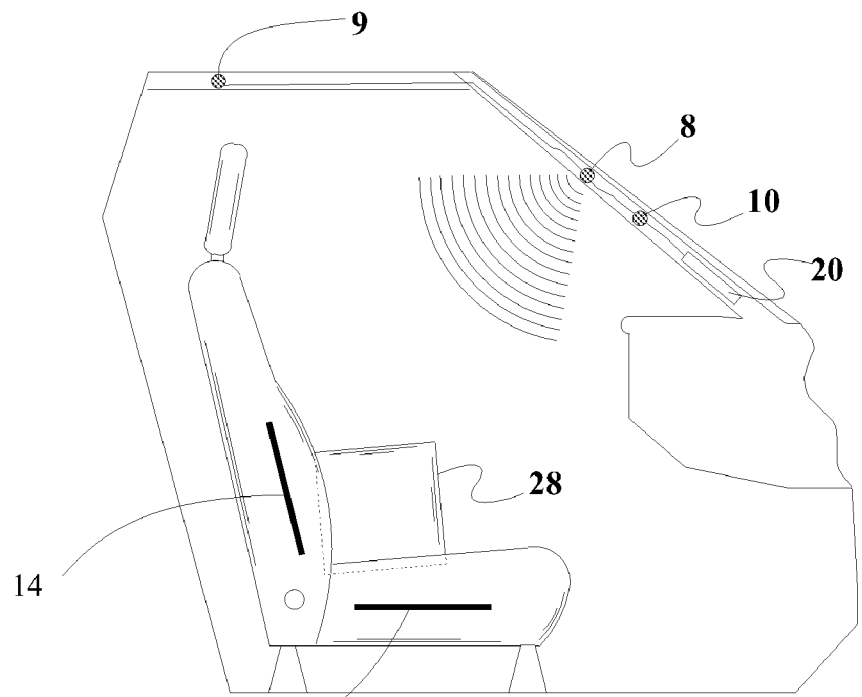
FIG. 3 is a side view with parts cutaway and removed of a vehicle showing the passenger compartment containing a box on the front passenger seat and a preferred mounting location for an occupant and rear facing child seat presence detector and including an antenna field sensor.

In FIG. 3, a view of the system of FIG. 1 is illustrated with a box 28 shown on the front passenger seat in place of a rear facing child seat. The vehicle interior monitoring system is trained to recognize that this box 28 is neither a rear facing child seat nor an occupant and therefore it is treated as an empty seat and the deployment of the airbag or other occupant restraint device is suppressed. For other vehicles, it may be that just the presence of a box or its motion or chemical or radiation effluents that are desired to be monitored. The autotune antenna-based system 12, 14 is particularly adept at making this distinction particularly if the box 28 does not contain substantial amounts of water. Although a simple implementation of the auto-tune antenna system is illustrated, it is of course possible to use multiple antennas located in the seat 4 and elsewhere in the passenger compartment and these antenna systems can either operate at one or a multiple of different frequencies to discriminate type, location and/or relative size of the object being investigated. This training can be accomplished using a neural network or modular neural network with the commercially available software. The system assesses the probability that the box 28 is a person, however, and if there is even the remotest chance that it is a person, the airbag deployment is not suppressed. The system is thus typically biased toward enabling airbag deployment.

In cases where different levels of airbag inflation are possible, and there are different levels of injury associated with an out of position occupant being subjected to varying levels of airbag deployment, it is sometimes possible to permit a depowered or low level airbag deployment in cases of uncertainty. If, for example, the neural network has a problem distinguishing whether a box or a forward facing child seat is present on the vehicle seat, the decision can be made to deploy the airbag in a depowered or low level deployment state. Other situations where such a decision could be made would be when there is confusion as to whether a forward facing human is in position or out-of-position.

Neural networks systems frequently have problems in accurately discriminating the exact location of an occupant especially when different-sized occupants are considered. This results in a gray zone around the border of the keep out zone where the system provides a weak fire or weak no fire decision. For those cases, deployment of the airbag in a depowered state can resolve the situation since an occupant in a gray zone around the keep out zone boundary would be unlikely to be injured by such a depowered deployment while significant airbag protection is still being supplied.

Electromagnetic or ultrasonic energy can be transmitted in three modes in determining the position of an occupant, for example. In most of the cases disclosed above, it is assumed that the energy will be transmitted in a broad diverging beam which interacts with a substantial portion of the occupant or other object to be monitored. This method can have the disadvantage that it will reflect first off the nearest object and, especially if that object is close to the transmitter, it may mask the true position of the occupant or object. It can also reflect off many parts of the object where the reflections can be separated in time and processed as in an ultrasonic occupant sensing system. This can also be partially overcome through the use of the second mode which uses a narrow beam. In this case, several narrow beams are used. These beams are aimed in different directions toward the occupant from a position sufficiently away from the occupant or object such that interference is unlikely.

A single receptor could be used provided the beams are either cycled on at different times or are of different frequencies. Another approach is to use a single beam emanating from a location which has an unimpeded view of the occupant or object such as the windshield header in the case of an automobile or near the roof at one end of a trailer or shipping container, for example. If two spaced apart CCD array receivers are used, the angle of the reflected beam can be determined and the location of the occupant can be calculated. The third mode is to use a single beam in a manner so that it scans back and forth and/or up and down, or in some other pattern, across the occupant, object or the space in general. In this manner, an image of the occupant or object can be obtained using a single receptor and pattern recognition software can be used to locate the head or chest of the occupant or size of the object, for example. The beam approach is most applicable to electromagnetic energy but high frequency ultrasound can also be formed into a narrow beam.

A similar effect to modifying the wave transmission mode can also be obtained by varying the characteristics of the receptors. Through appropriate lenses or reflectors, receptors can be made to be most sensitive to radiation emitted from a particular direction. In this manner, a single broad beam transmitter can be used coupled with an array of focused receivers, or a scanning receiver, to obtain a rough image of the occupant or occupying object.

Figure 5:
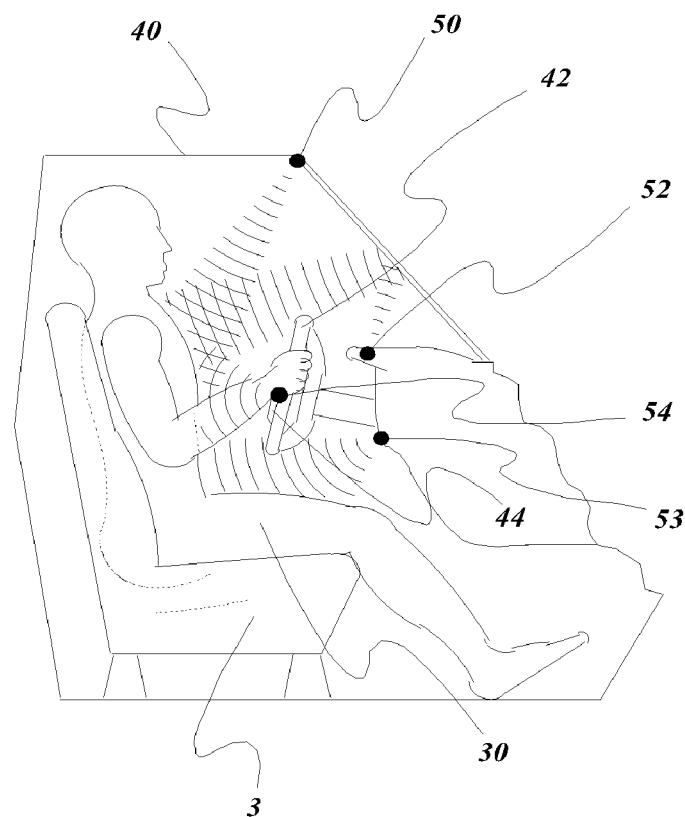
FIG. 5 is a side view, with certain portions removed or cut away, of a portion of the passenger compartment of a vehicle showing several preferred mounting locations of occupant position sensors for sensing the position of the vehicle driver.

Each of these methods of transmission or reception could be used, for example, at any of the preferred mounting locations shown in FIG. 5.

Figure 7:
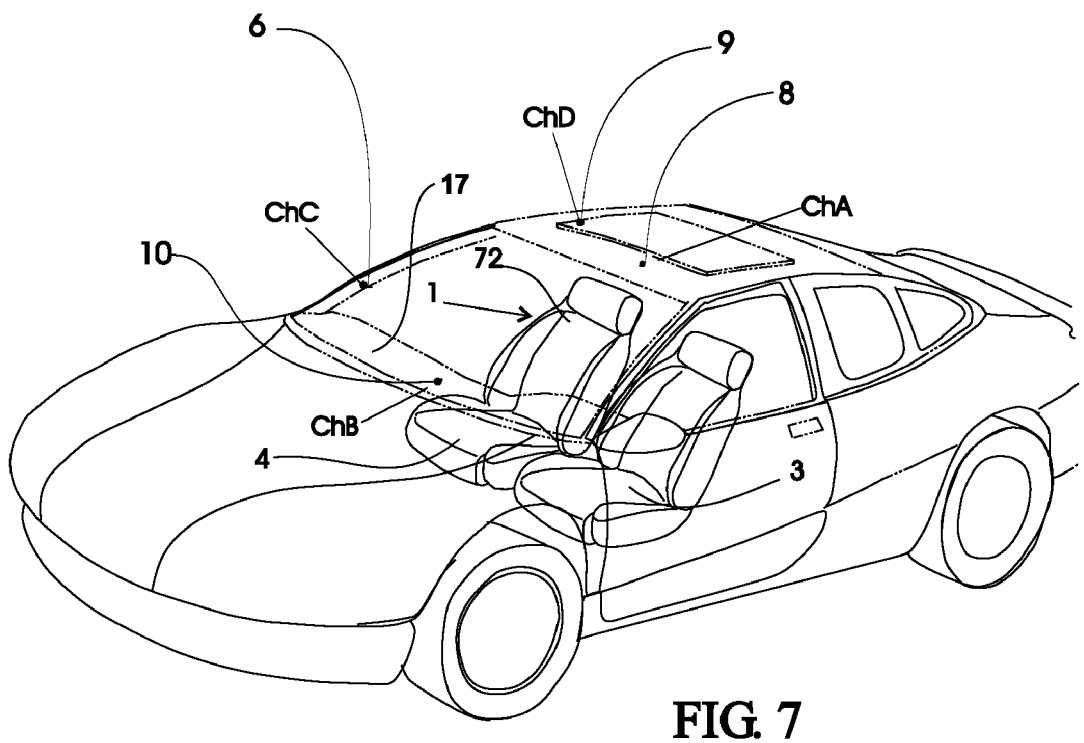
FIG. 7 is a perspective view of a vehicle showing the position of the ultrasonic or electromagnetic sensors relative to the driver and front passenger seats.

As shown in FIG. 7, there are provided four sets of wave-receiving sensor systems 6, 8, 9, 10 mounted within the passenger compartment of an automotive vehicle. Each set of sensor systems 6, 8, 9, 10 comprises a transmitter and a receiver (or just a receiver in some cases), which may be integrated into a single unit or individual components separated from one another. In this embodiment, the sensor system 6 is mounted on the A-Pillar of the vehicle. The sensor system 9 is mounted on the upper portion of the B-Pillar. The sensor system 8 is mounted on the roof ceiling portion or the headliner. The sensor system 10 is mounted near the middle of an instrument panel 17 in front of the driver's seat 3.

The sensor systems 6, 8, 9, 10 are preferably ultrasonic or electromagnetic, although sensor systems 6, 8, 9, 10 can be any other type of sensors which will detect the presence of an occupant from a distance including capacitive or electric field sensors. Also, if the sensor systems 6, 8, 9, 10 are passive infrared sensors, for example, then they may only comprise a wave-receiver. Recent advances in Quantum Well Infrared Photodetectors by NASA show great promise for this application. See "Many Applications Possible For Largest Quantum Infrared Detector", Goddard Space Center News Release Feb. 27, 2002.

The Quantum Well Infrared Photodetector is a new detector which promises to be a low-cost alternative to conventional infrared detector technology for a wide range of scientific and commercial applications, and particularly for sensing inside and outside of a vehicle. The main problem that needs to be solved is that it operates at 76 degrees Kelvin (−323 degrees F.). Chips are being developed capable of cooling other chips economically. It remains to be seen if these low temperatures can be economically achieved.

A section of the passenger compartment of an automobile is shown generally as 40 in FIGS. 8A-8D. A driver 30 of the vehicle sits on a seat 3 behind a steering wheel 42, which contains an airbag assembly 44. Airbag assembly 44 may be integrated into the steering wheel assembly or coupled to the steering wheel 42. Five transmitter and/or receiver assemblies 49, 50, 51, 52 and 54 are positioned at various places in the passenger compartment to determine the location of various parts of the driver, e.g., the head, chest and torso, relative to the airbag and to otherwise monitor the interior of the passenger compartment. Monitoring of the interior of the passenger compartment can entail detecting the presence or absence of the driver and passengers, differentiating between animate and inanimate objects, detecting the presence of occupied or unoccupied child seats, rear-facing or forward-facing, and identifying and ascertaining the identity of the occupying items in the passenger compartment. Naturally, a similar system can be used for monitoring the interior of a truck, shipping container or other containers.

A processor such as control circuitry 20 is connected to the transmitter/receiver assemblies 49, 50, 51, 52, 54 and controls the transmission from the transmitters, if a transmission component is present in the assemblies, and captures the return signals from the receivers, if a receiver component is present in the assemblies. Control circuitry 20 usually contains analog to digital converters (ADCs) or a frame grabber or equivalent, a microprocessor containing sufficient memory and appropriate software including, for example, pattern recognition algorithms, and other appropriate drivers, signal conditioners, signal generators, etc. Usually, in any given implementation, only three or four of the transmitter/receiver assemblies would be used depending on their mounting locations as described below. In some special cases, such as for a simple classification system, only a single or sometimes only two transmitter/receiver assemblies are used.

A portion of the connection between the transmitter/receiver assemblies 49, 50, 51, 52, 54 and the control circuitry 20, is shown as wires. These connections can be wires, either individual wires leading from the control circuitry 20 to each of the transmitter/receiver assemblies 49, 50, 51, 52, 54 or one or more wire buses or in some cases, wireless data transmission can be used.

The location of the control circuitry 20 in the dashboard of the vehicle is for illustration purposes only and does not limit the location of the control circuitry 20. Rather, the control circuitry 20 may be located anywhere convenient or desired in the vehicle.

It is contemplated that a system and method in accordance with the invention can include a single transmitter and multiple receivers, each at a different location. Thus, each receiver would not be associated with a transmitter forming transmitter/receiver assemblies. Rather, for example, with reference to FIG. 8A, only element 51 could constitute a transmitter/receiver assembly and elements 49, 50, 52 and 54 could be receivers only.

On the other hand, it is conceivable that in some implementations, a system and method in accordance with the invention include a single receiver and multiple transmitters. Thus, each transmitter would not be associated with a receiver forming transmitter/receiver assemblies. Rather, for example, with reference to FIG. 8A, only element 51 would constitute a transmitter/receiver assembly and elements 49, 50, 52, 54 would be transmitters only.

One ultrasonic transmitter/receiver as used herein is similar to that used on modern auto-focus cameras such as manufactured by the Polaroid Corporation. Other camera auto-focusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared light can be added to illuminate the driver. In a related implementation, a source of infrared light is reflected off of the windshield and illuminates the vehicle occupant. An infrared receiver 56 is located attached to the rear view mirror assembly 55, as shown in FIG. 8E. Alternately, the infrared can be sent by the device 50 and received by a receiver elsewhere. Since any of the devices shown in these figures could be either transmitters or receivers or both, for simplicity, only the transmitted and not the reflected wave fronts are frequently illustrated.

When using the surface of the windshield as a reflector of infrared radiation (for transmitter/receiver assembly and element 52), care must be taken to assure that the desired reflectivity at the frequency of interest is achieved. Mirror materials, such as metals and other special materials manufactured by Eastman Kodak, have a reflectivity for infrared frequencies that is substantially higher than at visible frequencies. They are thus candidates for coatings to be placed on the windshield surfaces for this purpose.

There are two preferred methods of implementing the vehicle interior monitoring system of at least one of the inventions disclosed herein, a microprocessor system and an application specific integrated circuit system (ASIC). Both of these systems are represented schematically as 20 herein. In some systems, both a microprocessor and an ASIC are used. In other systems, most if not all of the circuitry is combined onto a single chip (system on a chip). The particular implementation depends on the quantity to be made and economic considerations.

1.1 Ultrasonics 1.1.1 General

The maximum acoustic frequency that is practical to use for acoustic imaging in the systems is about 40 to 160 kilohertz (kHz). The wavelength of a 50 kHz acoustic wave is about 0.6 cm which is too coarse to determine the fine features of a person's face, for example. It is well understood by those skilled in the art that features which are much smaller than the wavelength of the irradiating radiation cannot be distinguished. Similarly, the wavelength of common radar systems varies from about 0.9 cm (for 33 GHz K band) to 133 cm (for 225 MHz P band) which are also too coarse for person-identification systems.

Referring now to FIG. 5, a section of the passenger compartment of an automobile is shown generally as 40 in FIG. 5. A driver of a vehicle 30 sits on a seat 3 behind a steering wheel 42 which contains an airbag assembly 44. Four transmitter and/or receiver assemblies 50, 52, 53 and 54 are positioned at various places in or around the passenger compartment to determine the location of the head, chest and torso of the driver 30 relative to the airbag assembly 44. Usually, in any given implementation, only one or two of the transmitters and receivers would be used depending on their mounting locations as described below.

FIG. 5 illustrates several of the possible locations of such devices. For example, transmitter and receiver 50 emits ultrasonic acoustical waves which bounce off the chest of the driver 30 and return. Periodically, a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and determines the distance from the transmitter/receiver to the driver 30 based on the velocity of sound. This information can then be sent to a microprocessor that can be located in the crash sensor and diagnostic circuitry which determines if the driver 30 is close enough to the airbag assembly 44 that a deployment might, by itself, cause injury to the driver 30. In such a case, the circuit disables the airbag system and thereby prevents its deployment. In an alternate case, the sensor algorithm assesses the probability that a crash requiring an airbag is in process and waits until that probability exceeds an amount that is dependent on the position of the driver 30. Thus, for example, the sensor might decide to deploy the airbag based on a need probability assessment of 50%, if the decision must be made immediately for a driver 30 approaching the airbag, but might wait until the probability rises to 95% for a more distant driver. Although a driver system has been illustrated, the passenger system would be similar.

Alternate mountings for the transmitter/receiver include various locations on the instrument panel on either side of the steering column such as 53 in FIG. 5. Also, although some of the devices herein illustrated assume that for the ultrasonic system, the same device is used for both transmitting and receiving waves, there are advantages in separating these functions, at least for standard transducer systems. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously, provided the transmitted signal is modulated such that the received signal can be compared with the transmitted signal to determine the time it takes for the waves to reach and reflect off of the occupant.

Many methods exist for this modulation including varying the frequency or amplitude of the waves or pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant or other object to be monitored, may be several milliseconds, information as to the position of the occupant is received continuously which permits an accurate, although delayed, determination of the occupant's velocity from successive position measurements. Other modulation methods that may be applied to electromagnetic radiations include TDMA, CDMA, noise or pseudo-noise, spatial, etc.

Conventional ultrasonic distance measuring devices must wait for the signal to travel to the occupant or other monitored object and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant or object located one foot from the transmitter can only be obtained every 2 milliseconds which corresponds to a frequency of about 500 Hz. At a three-foot displacement and allowing for some processing time, the frequency is closer to about 100 Hz.

This slow frequency that data can be collected seriously degrades the accuracy of the velocity calculation. The reflection of ultrasonic waves from the clothes of an occupant or the existence of thermal gradients, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. A potentially more accurate method is to make use of the Doppler Effect where the frequency of the reflected waves differs from the transmitted waves by an amount which is proportional to the occupant's velocity. In one embodiment, a single ultrasonic transmitter and a separate receiver are used to measure the position of the occupant, by the travel time of a known signal, and the velocity, by the frequency shift of that signal. Although the Doppler Effect has been used to determine whether an occupant has fallen asleep, it has not previously been used in conjunction with a position measuring device to determine whether an occupant is likely to become out of position, i.e., an extrapolated position in the future based on the occupant's current position and velocity as determined from successive position measurements, and thus in danger of being injured by a deploying airbag, or that a monitored object is moving. This combination is particularly advantageous since both measurements can be accurately and efficiently determined using a single transmitter and receiver pair resulting in a low cost system.

One problem with Doppler measurements is the slight change in frequency that occurs during normal occupant velocities. This requires that sophisticated electronic techniques and a low Q receiver should be utilized to increase the frequency and thereby render it easier to measure the velocity using the phase shift. For many implementations, therefore, the velocity of the occupant is determined by calculating the difference between successive position measurements.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat is the front passenger seat, although a similar discussion can apply to other vehicles and monitoring situations.

Figure 9:
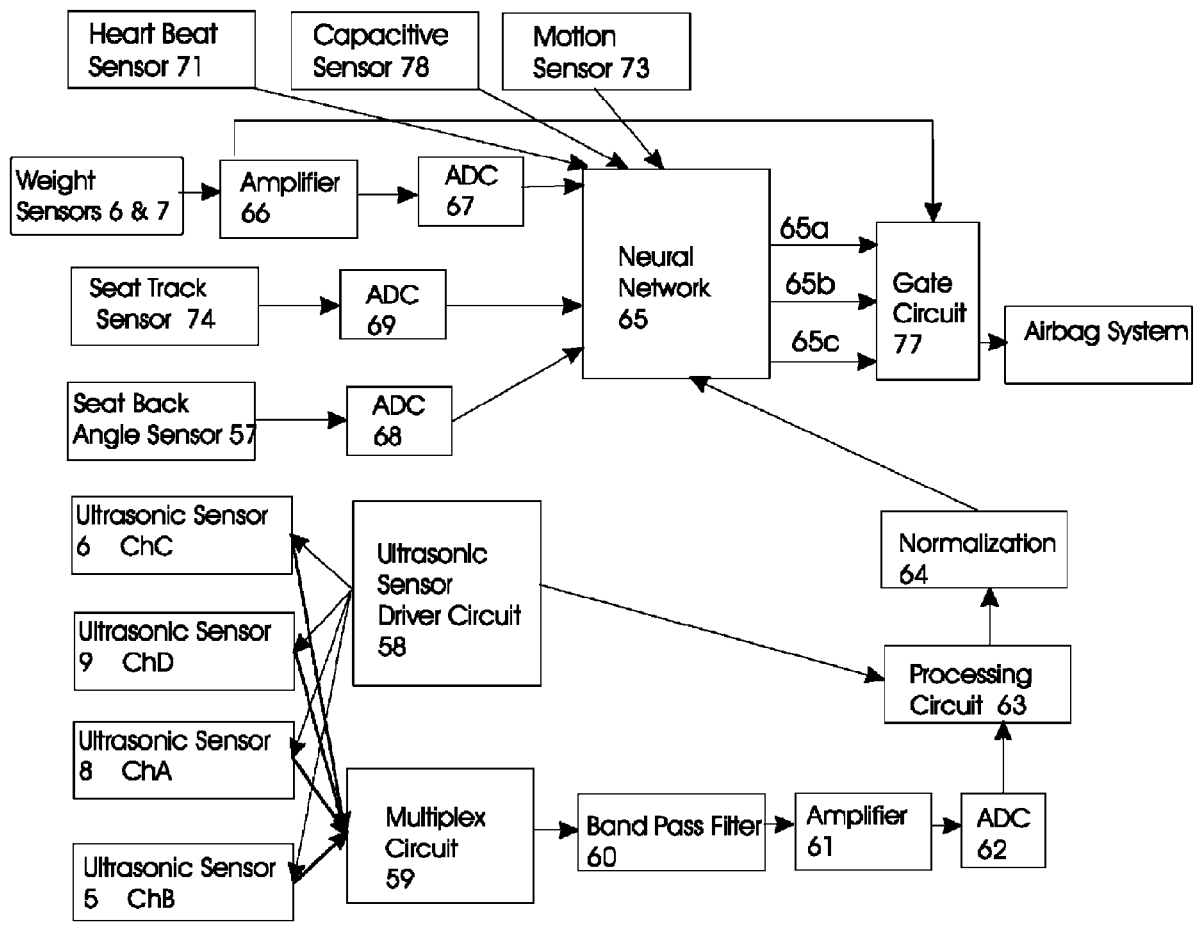
FIG. 9 is a circuit diagram of the seated-state detecting unit of the present invention.

The ultrasonic or electromagnetic sensor systems, 6, 8, 9 and 10 in FIG. 7 can be controlled or driven, one at a time or simultaneously, by an appropriate driver circuit such as ultrasonic or electromagnetic sensor driver circuit 58 shown in FIG. 9. The transmitters of the ultrasonic or electromagnetic sensor systems 6, 8, 9 and 10 transmit respective ultrasonic or electromagnetic waves toward the seat 4 and transmit pulses (see FIG. 10(*c*)) in sequence at times t1, t2, t3 and t4 (t4>t3>t2>t1) or simultaneously (t1=t2=t3=t4). The reflected waves of the ultrasonic or electromagnetic waves are received by the receivers ChA-ChD of the ultrasonic or electromagnetic sensors 6, 8, 9 and 10. The receiver ChA is associated with the ultrasonic or electromagnetic sensor system 8, the receiver ChB is associated with the ultrasonic or electromagnetic sensor system 5, the receiver ChD is associated with the ultrasonic or electromagnetic sensor system 6, and the receiver ChD is associated with the ultrasonic or electromagnetic sensor system 9.

FIGS. 10(*a*) and 10(*b*) show examples of the reflected ultrasonic waves USRW that are received by receivers ChA-ChD. FIG. 10(*a*) shows an example of the reflected wave USRW that is obtained when an adult sits in a normally seated space on the passenger seat 4, while FIG. 10(*b*) shows an example of the reflected wave USRW that are obtained when an adult sits in a slouching state (one of the abnormal seated-states) in the passenger seat 4.

Figure 6:
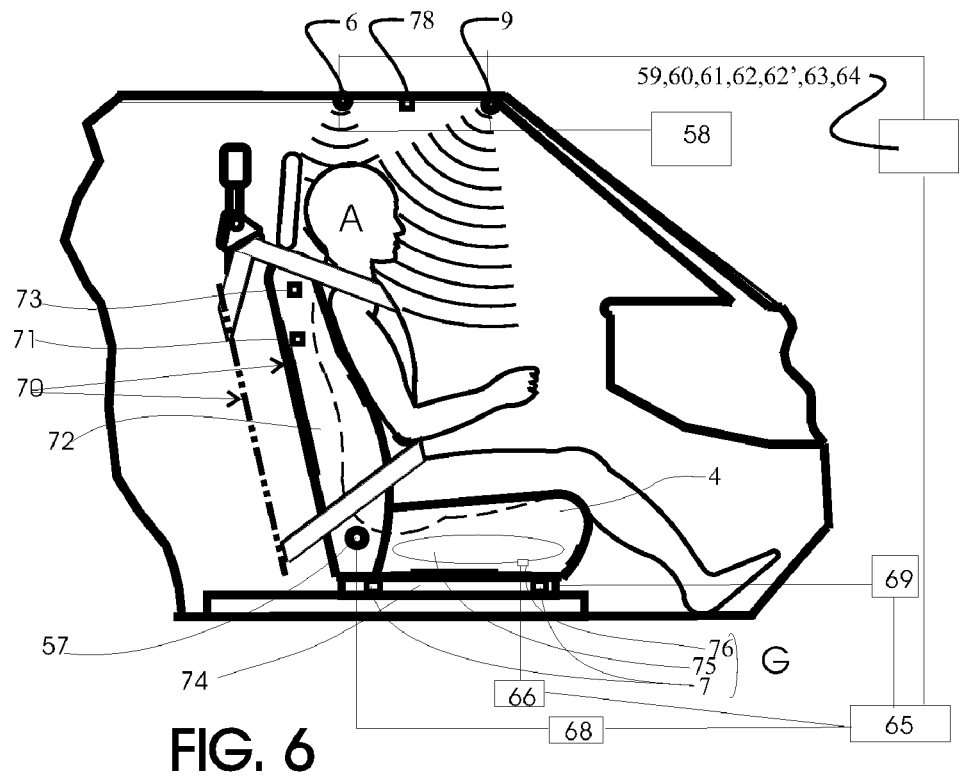
FIG. 6 shows a seated-state detecting unit in accordance with the present invention and the connections between ultrasonic or electromagnetic sensors, a weight sensor, a reclining angle detecting sensor, a seat track position detecting sensor, a heartbeat sensor, a motion sensor, a neural network, and an airbag system installed within a vehicle compartment.

In the case of a normally seated passenger, as shown in FIGS. 6 and 7, the location of the ultrasonic sensor system 6 is closest to the passenger A. Therefore, the reflected wave pulse P1 is received earliest after transmission by the receiver ChD as shown in FIG. 10(*a*), and the width of the reflected wave pulse P1 is larger. Next, the distance from the ultrasonic sensor 8 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 10(*a*). More specifically, since it is believed that the distance from the ultrasonic sensor system 6 to the passenger A is slightly shorter than the distance from the ultrasonic sensor system 10 to the passenger A, the reflected wave pulse P3 is received slightly earlier by the receiver ChC than the reflected wave pulse P4 is received by the receiver ChB.

In the case where the passenger A is sitting in a slouching state in the passenger seat 4, the distance between the ultrasonic sensor system 6 and the passenger A is shortest. Therefore, the time from transmission at time t3 to reception is shortest, and the reflected wave pulse P3 is received by the receiver ChC, as shown in FIG. 10(b). Next, the distances between the ultrasonic sensor system 10 and the passenger A becomes shorter, so the reflected wave pulse P4 is received earlier by the receiver ChB than the remaining reflected wave pulses P2 and P1. When the distance from the ultrasonic sensor system 8 to the passenger A is compared with that from the ultrasonic sensor system 9 to the passenger A, the distance from the ultrasonic sensor system 8 to the passenger A becomes shorter, so the reflected wave pulse P2 is received by the receiver ChA first and the reflected wave pulse P1 is thus received last by the receiver ChD.

The configurations of the reflected wave pulses P1-P4, the times that the reflected wave pulses P1-P4 are received, the sizes of the reflected wave pulses P1-P4 are varied depending upon the configuration and position of an object such as a passenger situated on the front passenger seat 4. FIGS. 10(a) and (b) merely show examples for the purpose of description and therefore the present invention is not limited to these examples.

The outputs of the receivers ChA-ChD, as shown in FIG. 9, are input to a band pass filter 60 through a multiplex circuit 59 which is switched in synchronization with a timing signal from the ultrasonic sensor drive circuit 58. The band pass filter 60 removes a low frequency wave component from the output signal based on each of the reflected wave USRW and also removes some of the noise. The output signal based on each of the reflected wave USRW is passed through the band pass filter 60, then is amplified by an amplifier 61. The amplifier 61 also removes the high frequency carrier wave component in each of the reflected waves USRW and generates an envelope wave signal. This envelope wave signal is input to an analog/digital converter (ADC) 62 and digitized as measured data. The measured data is input to a processing circuit 63, which is controlled by the timing signal which is in turn output from the ultrasonic sensor drive circuit 58.

The processing circuit 63 collects measured data at intervals of 7 ms (or at another time interval with the time interval also being referred to as a time window or time period), and 47 data points are generated for each of the ultrasonic sensor systems 6, 8, 9 and 10. For each of these reflected waves USRW, the initial reflected wave portion T1 and the last reflected wave portion T2 are cut off or removed in each time window. The reason for this will be described when the training procedure of a neural network is described later, and the description is omitted for now. With this, 32, 31, 37 and 38 data points will be sampled by the ultrasonic sensor systems 6, 8, 9 and 10, respectively. The reason why the number of data points differs for each of the ultrasonic sensor systems 6, 8, 9 and 10 is that the distance from the passenger seat 4 to the ultrasonic sensor systems 6, 8, 9 and 10 differ from one another.

Each of the measured data is input to a normalization circuit 64 and normalized. The normalized measured data is input to the neural network 65 as wave data.

A comprehensive occupant sensing system will now be discussed which involves a variety of different sensors, again this is for illustration purposes only and a similar description can be constructed for other vehicles including shipping container and truck trailer monitoring. Many of these sensors will be discussed in more detail under the appropriate sections below. FIG. 6 shows a passenger seat 70 to which an adjustment apparatus including a seated-state detecting unit according to the present invention may be applied. The seat 70 includes a horizontally situated bottom seat portion 4 and a vertically oriented back portion 72. The seat portion 4 is provided with one or more pressure or weight sensors 7, 76 that determine the weight of the object occupying the seat or the pressure applied by the object to the seat. The coupled portion between the seated portion 4 and the back portion 72 is provided with a reclining angle detecting sensor 57, which detects the tilted angle of the back portion 72 relative to the seat portion 4. The seat portion 4 is provided with a seat track position-detecting sensor 74. The seat track position detecting sensor 74 detects the quantity of movement of the seat portion 4 which is moved from a back reference position, indicated by the dotted chain line. Optionally embedded within the back portion 72 are a heartbeat sensor 71 and a motion sensor 73. Attached to the headliner is a capacitance sensor 78. The seat 70 may be the driver seat, the front passenger seat or any other seat in a motor vehicle as well as other seats in transportation vehicles or seats in non-transportation applications.

Pressure or weight measuring means such as the sensors 7 and 76 are associated with the seat, e.g., mounted into or below the seat portion 4 or on the seat structure, for measuring the pressure or weight applied onto the seat. The pressure or weight may be zero if no occupying item is present and the sensors are calibrated to only measure incremental weight or pressure. Sensors 7 and 76 may represent a plurality of different sensors which measure the pressure or weight applied onto the seat at different portions thereof or for redundancy purposes, e.g., such as by means of an airbag or fluid filled bladder 75 in the seat portion 4. Airbag or bladder 75 may contain a single or a plurality of chambers, each of which may be associated with a sensor (transducer) 76 for measuring the pressure in the chamber. Such sensors may be in the form of strain, force or pressure sensors which measure the force or pressure on the seat portion 4 or seat back 72, a part of the seat portion 4 or seat back 72, displacement measuring sensors which measure the displacement of the seat surface or the entire seat 70 such as through the use of strain gages mounted on the seat structural members, such as 7, or other appropriate locations, or systems which convert displacement into a pressure wherein one or more pressure sensors can be used as a measure of weight and/or weight distribution. Sensors 7, 76 may be of the types disclosed in U.S. Ser. No. 06/242,701 and below herein. Although pressure or weight here is disclosed and illustrated with regard to measuring the pressure applied by or weight of an object occupying a seat in an automobile or truck, the same principles can be used to measure the pressure applied by and weight of objects occupying other vehicles including truck trailers and shipping containers. For example, a series of fluid filled bladders under a segmented floor could be used to measure the weight and weight distribution in a truck trailer.

Many practical problems have arisen during the development stages of bladder and strain gage based weight systems. Some of these problems relate to bladder sensors and in particular to gas-filled bladder sensors and are effectively dealt with in U.S. Ser. No. 05/918,696, U.S. Ser. No. 05/927,427, U.S. Ser. No. 05/957,491, U.S. Ser. No. 05/979,585, U.S. Ser. No. 05/984,349, U.S. Ser. No. 06/021,863, U.S. Ser. No. 06/056,079, U.S. Ser. No. 06/076,853, U.S. Ser. No. 06/260,879 and U.S. Ser. No. 06/286,861. Other problems relate to seatbelt usage and to unanticipated stresses and strains that occur in seat mounting structures and will be discussed below.

As illustrated in FIG. 9, the output of the pressure or weight sensor(s) 7 and 76 is amplified by an amplifier 66 coupled to the pressure or weight sensor(s) 7,76 and the amplified output is input to the analog/digital converter 67.

A heartbeat sensor 71 is arranged to detect a heartbeat, and the magnitude thereof, of a human occupant of the seat, if such a human occupant is present. The output of the heartbeat sensor 71 is input to the neural network 65. The heartbeat sensor 71 may be of the type as disclosed in McEwan (U.S. Ser. No. 05/573,012 and U.S. Ser. No. 05/766,208). The heartbeat sensor 71 can be positioned at any convenient position relative to the seat 4 where occupancy is being monitored. A preferred location is within the vehicle seatback. The heartbeat of a stowaway in a cargo container or truck trailer can similarly be measured be a sensor on the vehicle floor or other appropriate location that measures vibrations.

The reclining angle detecting sensor 57 and the seat track position-detecting sensor 74, which each may comprise a variable resistor, can be connected to constant-current circuits, respectively. A constant-current is supplied from the constant-current circuit to the reclining angle detecting sensor 57, and the reclining angle detecting sensor 57 converts a change in the resistance value on the tilt of the back portion 72 to a specific voltage. This output voltage is input to an analog/digital converter 68 as angle data, i.e., representative of the angle between the back portion 72 and the seat portion 4. Similarly, a constant current can be supplied from the constant-current circuit to the seat track position-detecting sensor 74 and the seat track position detecting sensor 74 converts a change in the resistance value based on the track position of the seat portion 4 to a specific voltage. This output voltage is input to an analog/digital converter 69 as seat track data. Thus, the outputs of the reclining angle-detecting sensor 57 and the seat track position-detecting sensor 74 are input to the analog/digital converters 68 and 69, respectively. Each digital data value from the ADCs 68, 69 is input to the neural network 65. Although the digitized data of the pressure or weight sensor(s) 7, 76 is input to the neural network 65, the output of the amplifier 66 is also input to a comparison circuit. The comparison circuit, which is incorporated in the gate circuit algorithm, determines whether or not the weight of an object on the passenger seat 70 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit. A more detailed description of this and similar systems can be found in the above-referenced patents and patent applications assigned to the current assignee and in the description below. The system described above is one example of many systems that can be designed using the teachings of at least one of the inventions disclosed herein for detecting the occupancy state of the seat of a vehicle.

Figure 12:
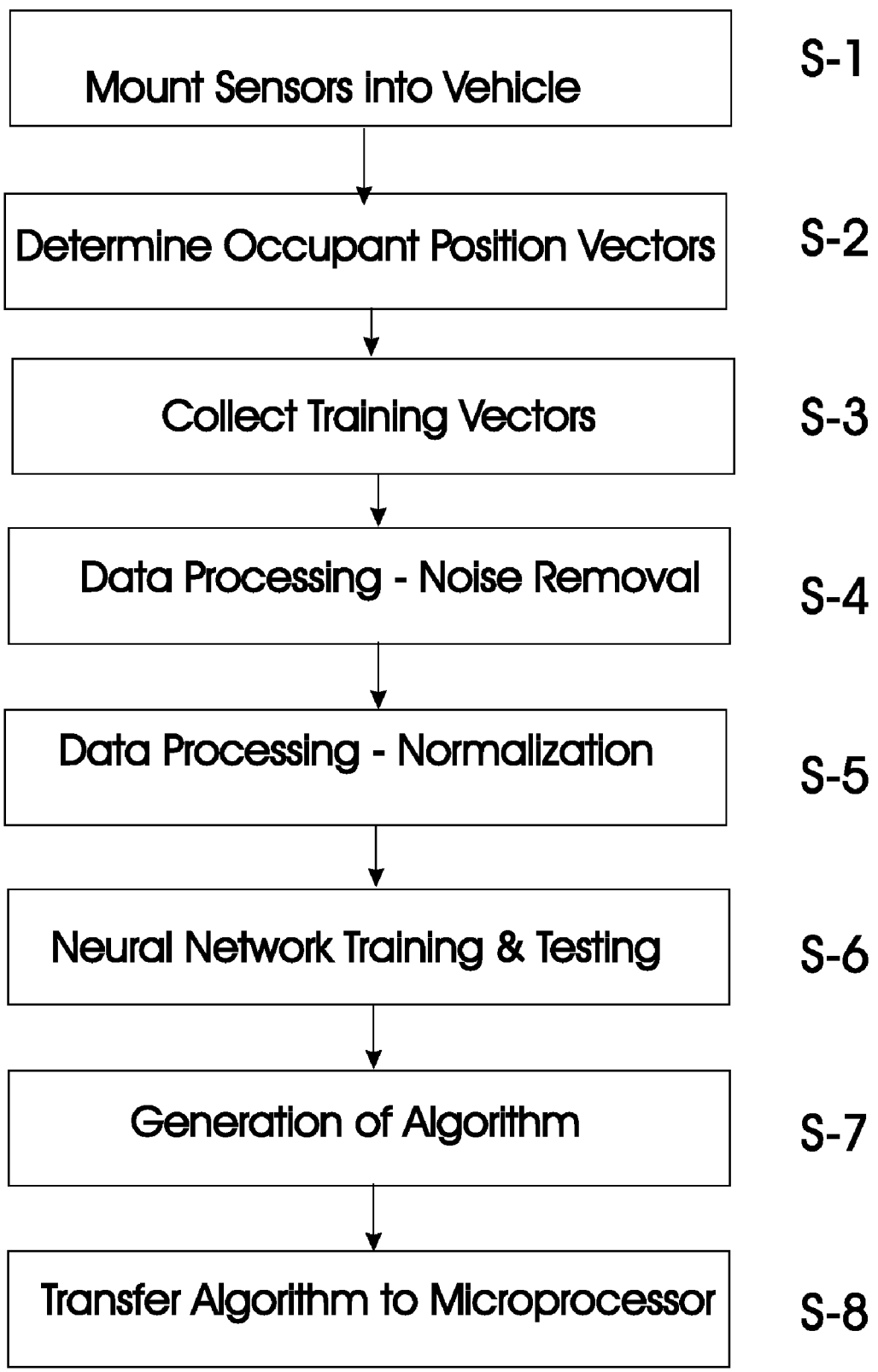
FIG. 12 a flowchart showing the training steps of a neural network.

As diagrammed in FIG. 12, the first step is to mount the four sets of ultrasonic sensor systems 11-14, the weight sensors 7,76, the reclining angle detecting sensor 57, and the seat track position detecting sensor 74, for example, into a vehicle (step S1). For other vehicle monitoring tasks different sets of sensors could be used. Next, in order to provide data for the neural network 65 to learn the patterns of seated states, data is recorded for patterns of all possible seated or occupancy states and a list is maintained recording the seated or occupancy states for which data was acquired. The data from the sensors/transducers 6, 8, 9, 10, 57, 71, 73, 74, 76 and 78 for a particular occupancy of the passenger seat, for example, is called a vector (step S2). It should be pointed out that the use of the reclining angle detecting sensor 57, seat track position detecting sensor 74, heartbeat sensor 71, capacitive sensor 78 and motion sensor 73 is not essential to the detecting apparatus and method in accordance with the invention. However, each of these sensors, in combination with any one or more of the other sensors enhances the evaluation of the seated-state of the seat or the occupancy of the vehicle.

Next, based on the training data from the reflected waves of the ultrasonic sensor systems 6, 8, 9, 10 and the other sensors 7, 71, 73,76, 78 the vector data is collected (step S3). Next, the reflected waves P1-P4 are modified by removing the initial reflected waves from each time window with a short reflection time from an object (range gating) (period T1 in FIG. 11) and the last portion of the reflected waves from each time window with a long reflection time from an object (period P2 in FIG. 11) (step S4). It is believed that the reflected waves with a short reflection time from an object is due to cross-talk, that is, waves from the transmitters which leak into each of their associated receivers ChA-ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Recent advances in ultrasonic transducer design have now permitted the use of a single transducer acting as both a sender (transmitter) and receiver. These same advances have substantially reduced the ringing of the transducer after the excitation pulse has been caused to die out to where targets as close as about 2 inches from the transducer can be sensed. Thus, the magnitude of the T1 time period has been substantially reduced.

As shown in FIG. 13a, the measured data is normalized by making the peaks of the reflected wave pulses P1-P4 equal (step S5 of FIG. 12). This eliminates the effects of different reflectivities of different objects and people depending on the characteristics of their surfaces such as their clothing. Data from the weight sensor, seat track position sensor and seat reclining angle sensor is also frequently normalized based typically on fixed normalization parameters. When other sensors are used for other types of monitoring, similar techniques are used.

The data from the ultrasonic transducers are now also preferably fed through a logarithmic compression circuit that substantially reduces the magnitude of reflected signals from high reflectivity targets compared to those of low reflectivity. Additionally, a time gain circuit is used to compensate for the difference in sonic strength received by the transducer based on the distance of the reflecting object from the transducer.

As various parts of the vehicle interior identification and monitoring system described in the above reference patents and patent applications are implemented, a variety of transmitting and receiving transducers will be present in the vehicle passenger compartment. If several of these transducers are ultrasonic transmitters and receivers, they can be operated in a phased array manner, as described elsewhere for the headrest, to permit precise distance measurements and mapping of the components of the passenger compartment. This is illustrated in FIG. 14 which is a perspective view of the interior of the passenger compartment showing a variety of transmitters and receivers, 6, 8, 9, 23, 49-51 which can be used in a sort of phased array system. In addition, information can be transmitted between the transducers using coded signals in an ultrasonic network through the vehicle compartment airspace. If one of these sensors is an optical CCD or CMOS array, the location of the driver's eyes can be accurately determined and the results sent to the seat ultrasonically. Obviously, many other possibilities exist for automobile and other vehicle monitoring situations.

To use ultrasonic transducers in a phase array mode generally requires that the transducers have a low Q. Certain new micromachined capacitive transducers appear to be suitable for such an application. The range of such transducers is at present limited, however.

Figure 15:
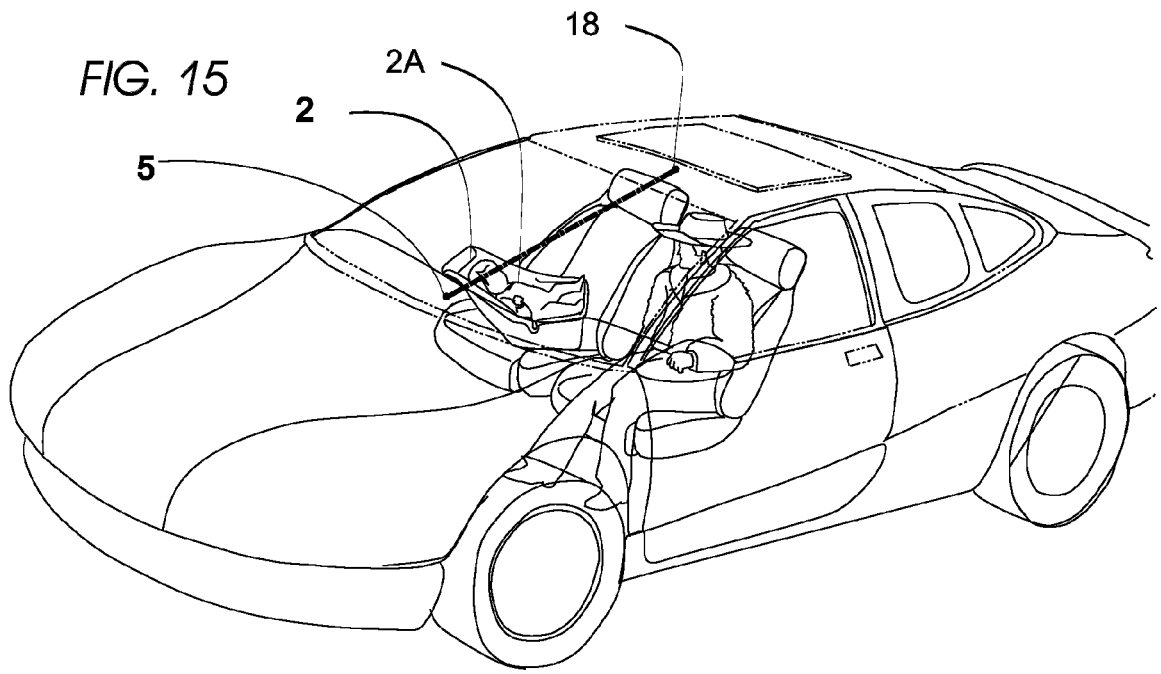
FIG. 15 is a perspective view of a vehicle containing an adult occupant and an occupied infant seat on the front seat with the vehicle shown in phantom illustrating one preferred location of the transducers placed according to the methods taught in at least one of the inventions disclosed herein.

The speed of sound varies with temperature, humidity, and pressure. This can be compensated for by using the fact that the geometry between the transducers is known and the speed of sound can therefore be measured. Thus, on vehicle startup and as often as desired thereafter, the speed of sound can be measured by one transducer, such as transducer 18 in FIG. 15, sending a signal which is directly received by another transducer 5. Since the distance separating them is known, the speed of sound can be calculated and the system automatically adjusted to remove the variation due to variations in the speed of sound. Therefore, the system operates with same accuracy regardless of the temperature, humidity or atmospheric pressure. It may even be possible to use this technique to also automatically compensate for any effects due to wind velocity through an open window. An additional benefit of this system is that it can be used to determine the vehicle interior temperature for use by other control systems within the vehicle since the variation in the velocity of sound is a strong function of temperature and a weak function of pressure and humidity.

The problem with the speed of sound measurement described above is that some object in the vehicle may block the path from one transducer to the other. This of course could be checked and a correction would not be made if the signal from one transducer does not reach the other transducer. The problem, however, is that the path might not be completely blocked but only slightly blocked. This would cause the ultrasonic path length to increase, which would give a false indication of a temperature change. This can be solved by using more than one transducer. All of the transducers can broadcast signals to all of the other transducers. The problem here, of course, is which transducer pair should be believed if they all give different answers. The answer is the one that gives the shortest distance or the greatest calculated speed of sound. By this method, there are a total of 6 separate paths for four ultrasonic transducers.

An alternative method of determining the temperature is to use the transducer circuit to measure some parameter of the transducer that changes with temperature. For example, the natural frequency of ultrasonic transducers changes in a known manner with temperature and therefore by measuring the natural frequency of the transducer, the temperature can be determined. Since this method does not require communication between transducers, it would also work in situations where each transducer has a different resonant frequency.

The process, by which all of the distances are carefully measured from each transducer to the other transducers, and the algorithm developed to determine the speed of sound, is a novel part of the teachings of the instant invention for use with ultrasonic transducers. Prior to this, the speed of sound calculation was based on a single transmission from one transducer to a known second transducer. This resulted in an inaccurate system design and degraded the accuracy of systems in the field.

If the electronic control module that is part of the system is located in generally the same environment as the transducers, another method of determining the temperature is available. This method utilizes a device and whose temperature sensitivity is known and which is located in the same box as the electronic circuit. In fact, in many cases, an existing component on the printed circuit board can be monitored to give an indication of the temperature. For example, the diodes in a log comparison circuit have characteristics that their resistance changes in a known manner with temperature. It can be expected that the electronic module will generally be at a higher temperature than the surrounding environment, however, the temperature difference is a known and predictable amount. Thus, a reasonably good estimation of the temperature in the passenger compartment, or other container compartment, can also be obtained in this manner. Naturally, thermisters or other temperature transducers can be used.

The placement of ultrasonic transducers for the example of ultrasonic occupant position sensor system of at least one of the inventions disclosed herein include the following novel disclosures: (1) the application of two sensors to single-axis monitoring of target volumes; (2) the method of locating two sensors spanning a target volume to sense object positions, that is, transducers are mounted along the sensing axis beyond the objects to be sensed; (3) the method of orientation of the sensor axis for optimal target discrimination parallel to the axis of separation of distinguishing target features; and (4) the method of defining the head and shoulders and supporting surfaces as defining humans for rear facing child seat detection and forward facing human detection.

A similar set of observations is available for the use of electromagnetic, capacitive, electric field or other sensors and for other vehicle monitoring situations. Such rules however must take into account that some of such sensors typically are more accurate in measuring lateral and vertical dimensions relative to the sensor than distances perpendicular to the sensor. This is particularly the case for CMOS and CCD-based transducers.

Considerable work is ongoing to improve the resolution of the ultrasonic transducers. To take advantage of higher resolution transducers, data points should be obtained that are closer together in time. This means that after the envelope has been extracted from the returned signal, the sampling rate should be increased from approximately 1000 samples per second to perhaps 2000 samples per second or even higher. By doubling or tripling the amount of data required to be analyzed, the system which is mounted on the vehicle will require greater computational power. This results in a more expensive electronic system. Not all of the data is of equal importance, however. The position of the occupant in the normal seating position does not need to be known with great accuracy whereas, as that occupant is moving toward the keep out zone boundary during pre-crash braking, the spatial accuracy requirements become more important. Fortunately, the neural network algorithm generating system has the capability of indicating to the system designer the relative value of each data point used by the neural network. Thus, as many as, for example, 500 data points per vector may be collected and fed to the neural network during the training stage and, after careful pruning, the final number of data points to be used by the vehicle mounted system may be reduced to 150, for example. This technique of using the neural network algorithm-generating program to prune the input data is an important teaching of the present invention.

By this method, the advantages of higher resolution transducers can be optimally used without increasing the cost of the electronic vehicle-mounted circuits. Also, once the neural network has determined the spacing of the data points, this can be fine-tuned, for example, by acquiring more data points at the edge of the keep out zone as compared to positions well into the safe zone. The initial technique is done by collecting the full 500 data points, for example, while in the system installed in the vehicle the data digitization spacing can be determined by hardware or software so that only the required data is acquired.

1.1.2 Thermal Gradients

Thermal gradients can affect the propagation of sound within a vehicle interior in at least two general ways. These have been termed "long-term" and "short-term" thermal instability. When ultrasound waves travel through a region of varying air density, the direction the waves travel can be bent in much the same way that light waves are bent when going through the waves of a swimming pool resulting in varying reflection patterns off of the bottom.

Long-term instability is caused when a stable thermal gradient occurs in the vehicle as happens, for example, when the sun beats down on the vehicle's roof and the windows are closed. This effect can be reproduced in vehicles in laboratory tests using a heat lamp within the vehicle. The effect has been largely eliminated through training the neural network with data taken when the gradient is present. Additionally, changes in the electronics hardware including greater signal strength and a log amplifier, as discussed below, have eliminated the effect.

Short-term instability results when there is a flow of hot or cold air within the vehicle, such as caused by operating the heater when the vehicle is cold, or the air conditioner when the vehicle is hot. Bench tests have demonstrated that a combination of greater signal strength and a logarithmic amplification of the return signal can substantially reduce the variability of the reflected ultrasound signal from a target caused by short term instability. As with the long-term instability, it is important to train the neural network with this effect present. When the combination of these hardware changes and training is used, the short-term thermal instability is substantially reduced. If the data from five or more consecutive vectors is averaged, the effect becomes insignificant, see pre and post-processing descriptions below. A vector is the combined digitized data from, for example in this case, the four transducers, which is inputted into the neural network as described above.

Different techniques for compensating for thermal gradients are listed in the '979 application incorporated by reference herein, namely in sections 1.1.2.1-1.1.2.11.

1.1.3 Audible Noise Elimination

Various techniques to eliminate audible noise are discussed in the parent '904 application.

1.2 Optics

Figure 4:
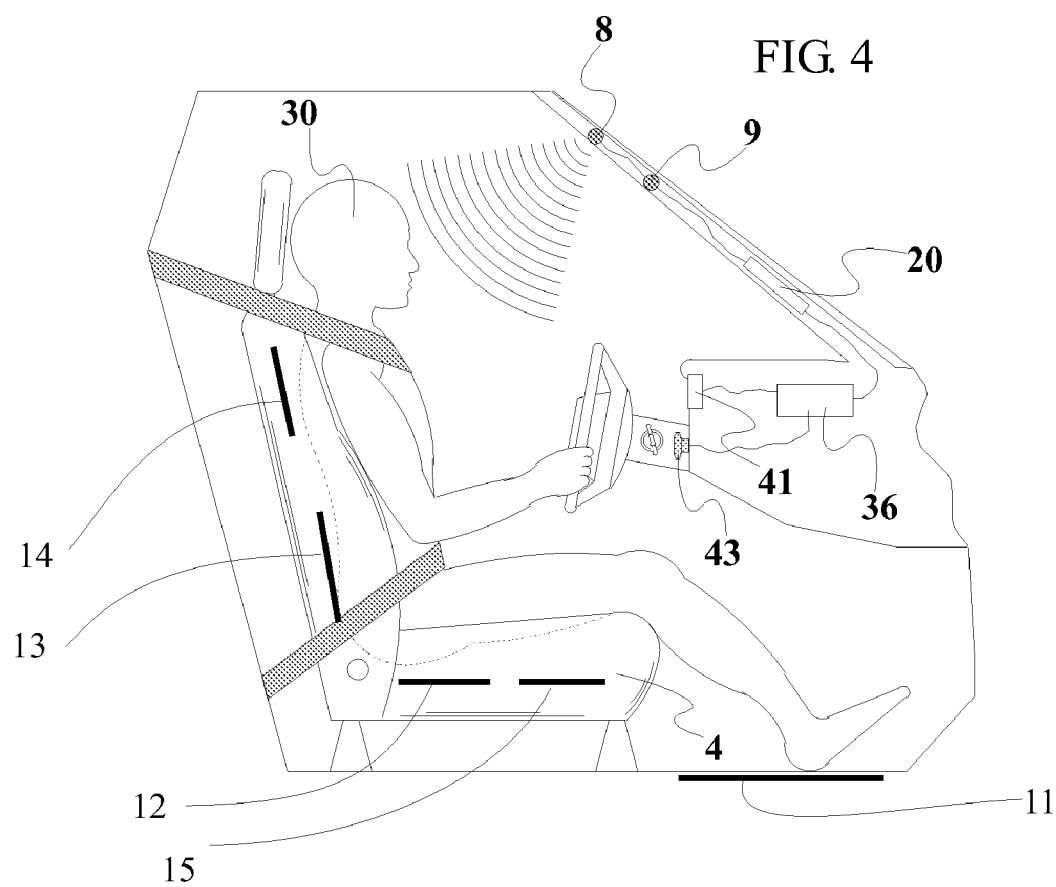
FIG. 4 is a side view with parts cutaway and removed of a vehicle showing the passenger compartment containing a driver and a preferred mounting location for an occupant identification system and including an antenna field sensor and an inattentiveness response button.

In FIG. 4, the ultrasonic transducers of the previous designs are replaced by laser transducers 8 and 9 which are connected to a microprocessor 20. In all other manners, the system operates the same. The design of the electronic circuits for this laser system is described in some detail in U.S. Ser. No. 05/653,462 and in particular FIG. 8 thereof and the corresponding description. In this case, a pattern recognition system such as a neural network system is employed and uses the demodulated signals from the laser transducers 8 and 9.

A more complicated and sophisticated system is shown conceptually in FIG. 5 where transmitter/receiver assembly 52 is illustrated. In this case, as described briefly above, an infrared transmitter and a pair of optical receivers are used to capture the reflection of the passenger. When this system is used to monitor the driver as shown in FIG. 5, with appropriate circuitry and a microprocessor, the behavior of the driver can be monitored. Using this system, not only can the position and velocity of the driver be determined and used in conjunction with an airbag system, but it is also possible to determine whether the driver is falling asleep or exhibiting other potentially dangerous behavior by comparing portions of his/her image over time. In this case, the speed of the vehicle can be reduced or the vehicle even stopped if this action is considered appropriate. This implementation has the highest probability of an unimpeded view of the driver since he/she must have a clear view through the windshield in order to operate the motor vehicle.

The output of microprocessor 20 of the monitoring system is shown connected schematically to a general interface 36 which can be the vehicle ignition enabling system; the entertainment system; the seat, mirror, suspension or other adjustment systems; telematics or any other appropriate vehicle system.

Figure 8A:
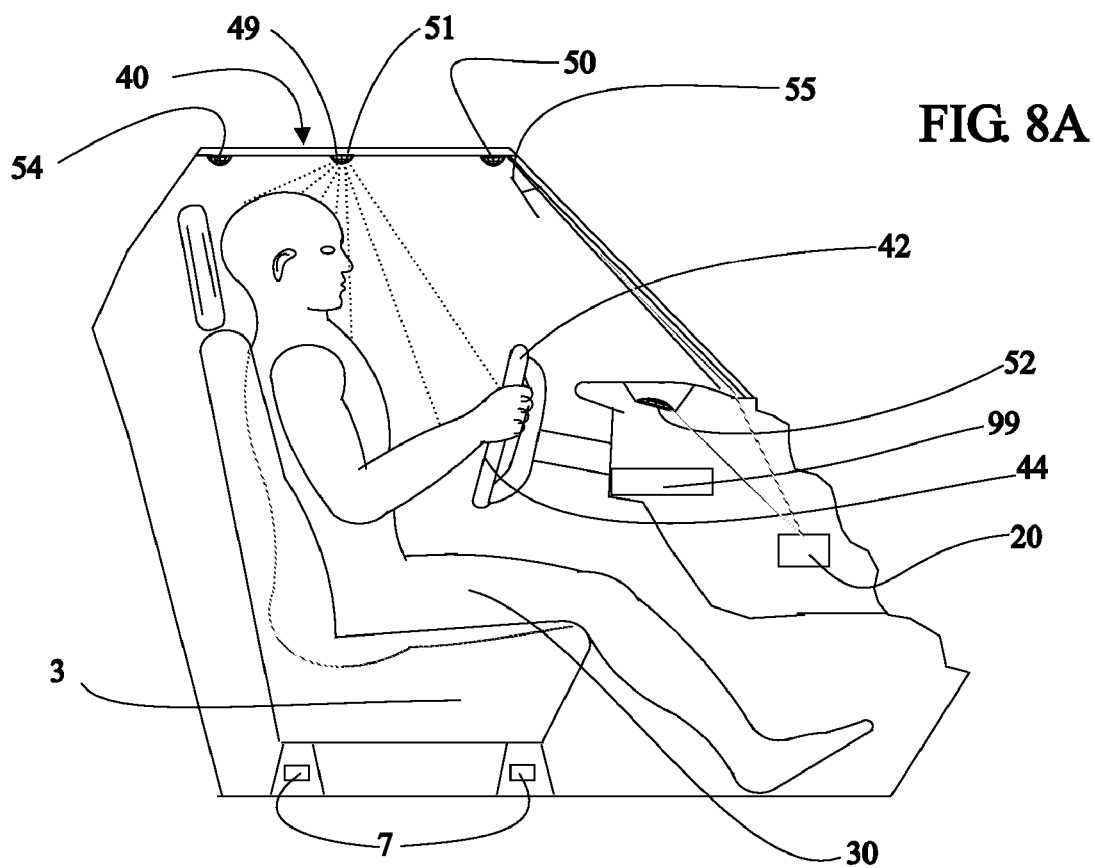
FIG. 8A is a side planar view, with certain portions removed or cut away, of a portion of the passenger compartment of a vehicle showing several preferred mounting locations of interior vehicle monitoring sensors shown particularly for sensing the vehicle driver illustrating the wave pattern from a CCD or CMOS optical position sensor mounted along the side of the driver or centered above his or her head.

FIG. 8A illustrates a typical wave pattern of transmitted infrared waves from transmitter/receiver assembly 49, which is mounted on the side of the vehicle passenger compartment above the front, driver's side door. Transmitter/receiver assembly 51, shown overlaid onto transmitter/receiver 49, is actually mounted in the center headliner of the passenger compartment (and thus between the driver's seat and the front passenger seat), near the dome light, and is aimed toward the driver. Typically, there will be a symmetrical installation for the passenger side of the vehicle. That is, a transmitter/receiver assembly would be arranged above the front, passenger side door and another transmitter/receiver assembly would be arranged in the center headliner, near the dome light, and aimed toward the front, passenger side door. Additional transducers can be mounted in similar places for monitoring both rear seat positions, another can be used for monitoring the trunk or any other interior volumes. As with the ultrasonic installations, most of the examples below are for automobile applications since these are generally the most complicated. Nevertheless, at least one of the inventions disclosed herein is not limited to automobile vehicles and similar but generally simpler designs apply to other vehicles such as shipping containers, railroad cars and truck trailers.

In a preferred embodiment, each transmitter/receiver assembly 49, 51 comprises an optical transducer, which may be a camera and an LED, that will frequently be used in conjunction with other optical transmitter/receiver assemblies such as shown at 50, 52 and 54, which act in a similar manner. In some cases, especially when a low cost system is used primarily to categorize the seat occupancy, a single or dual camera installation is used. In many cases, the source of illumination is not co-located with the camera. For example, in one preferred implementation, two cameras such as 49 and 51 are used with a single illumination source located at 49.

These optical transmitter/receiver assemblies frequently comprise an optical transmitter, which may be an infrared LED (or possibly a near infrared (NIR) LED), a laser with a diverging lens or a scanning laser assembly, and a receiver such as a CCD or CMOS array and particularly an active pixel CMOS camera or array or a HDRL or HDRC camera or array as discussed below. The transducer assemblies map the location of the occupant(s), objects and features thereof, in a two or three-dimensional image as will now be described in more detail.

Optical transducers using CCD arrays are now becoming price competitive and, as mentioned above, will soon be the technology of choice for interior vehicle monitoring. A single CCD array of 160 by 160 pixels, for example, coupled with the appropriate trained pattern recognition software, can be used to form an image of the head of an occupant and accurately locate the head, eyes, ears etc. for some of the purposes of at least one of the inventions disclosed herein.

The location or position of the occupant can be determined in various ways as noted and listed above and below as well. Generally, any type of occupant sensor can be used. Some particular occupant sensors which can be used in the systems and methods in accordance with the invention. Specifically, a camera or other device for obtaining images of a passenger compartment of the vehicle occupied by the occupant and analyzing the images can be mounted at the locations of the transmitter and/or receiver assemblies 49, 50, 51, and 54 in FIG. 8C. The camera or other device may be constructed to obtain three-dimensional images and/or focus the images on one or more optical arrays such as CCDs. Further, a mechanism for moving a beam of radiation through a passenger compartment of the vehicle occupied by the occupant, i.e., a scanning system, can be used. When using ultrasonic or electromagnetic waves, the time of flight between the transmission and reception of the waves can be used to determine the position of the occupant. The occupant sensor can also be arranged to receive infrared radiation from a space in a passenger compartment of the vehicle occupied by the occupant. It can also comprise an electric field sensor operative in a seat occupied by the occupant or a capacitance sensor operative in a seat occupied by the occupant. The implementation of such sensors in the invention will be readily appreciated by one skilled in the art in view of the disclosure herein of general occupant sensors for sensing the position of the occupant using waves, energy or radiation.

Figure 16:
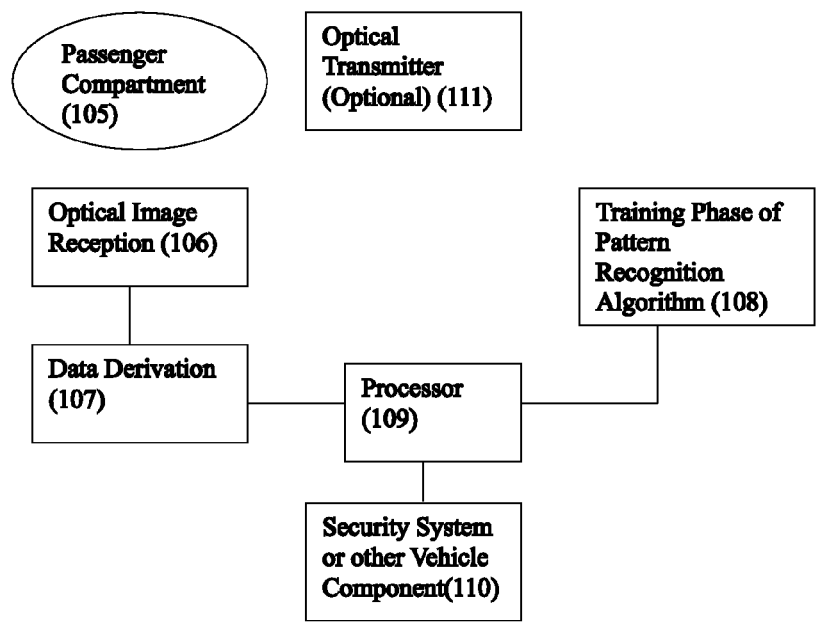
FIG. 16 is a schematic illustration of a system for controlling operation of a vehicle or a component thereof based on recognition of an authorized individual.

Looking now at FIG. 16, a schematic illustration of a system for controlling operation of a vehicle based on recognition of an authorized individual in accordance with the invention is shown. One or more images of the passenger compartment 105 are received at 106 and data derived therefrom at 107. Multiple image receivers may be provided at different locations. The data derivation may entail any one or more of numerous types of image processing techniques such as those described in U.S. Ser. No. 06/397,136 including those designed to improve the clarity of the image. A pattern recognition algorithm, e.g., a neural network, is trained in a training phase 108 to recognize authorized individuals. The training phase can be conducted upon purchase of the vehicle by the dealer or by the owner after performing certain procedures provided to the owner, e.g., entry of a security code or key. In the case of the operator of a truck or when such an operator takes possession of a trailer or cargo container, the identity of the operator can be sent by telematics to a central station for recording and perhaps further processing, In the training phase for a theft prevention system, the authorized driver(s) would sit themselves in the driver or passenger seat and optical images would be taken and processed to obtain the pattern recognition algorithm. A processor 109 is embodied with the pattern recognition algorithm thus trained to identify whether a person is the authorized individual by analysis of subsequently obtained data derived from optical images. The pattern recognition algorithm in processor 109 outputs an indication of whether the person in the image is an authorized individual for which the system is trained to identify. A security system 110 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

Optionally, an optical transmitting unit 111 is provided to transmit electromagnetic energy into the passenger compartment, or other volume in the case of other vehicles, such that electromagnetic energy transmitted by the optical transmitting unit is reflected by the person and received by the optical image reception device 106.

As noted above, several different types of optical reception devices can be used including a CCD array, a CMOS array, focal plane array (FPA), Quantum Well Infrared Photodetector (QWIP), any type of two-dimensional image receiver, any type of three-dimensional image receiver, an active pixel camera and an HDRC camera.

The processor 109 can be trained to determine the position of the individuals included in the images obtained by the optical image reception device, as well as the distance between the optical image reception devices and the individuals.

Instead of a security system, another component in the vehicle can be affected or controlled based on the recognition of a particular individual. For example, the rear view mirror, seat, seat belt anchorage point, headrest, pedals, steering wheel, entertainment system, ride quality, air-conditioning/ventilation system can be adjusted.

Systems based on ultrasonics and neural networks have been very successful in analyzing the seated-state of both the passenger and driver seats of automobiles. Such systems are now going into production for preventing airbag deployment when a rear facing child seat or and out-of-position occupant is present. The ultrasonic systems, however, suffer from certain natural limitations that prevent system accuracy from getting better than about 99 percent. These limitations relate to the fact that the wavelength of ultrasound is typically between 3 mm and 8 mm. As a result, unexpected results occur which are due partially to the interference of reflections from different surfaces. Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches.

In contrast, the wavelength of near infrared is less than one micron and no significant interferences occur. Similarly, the system is not tuned and therefore is theoretically sensitive to a very few cycles. As a result, resolution of the optical system is determined by the pixel spacing in the CCD or CMOS arrays. For this application, typical arrays have been chosen to be 100 pixels by 100 pixels and therefore the space being imaged can be broken up into pieces that are significantly less than 1 cm in size. Naturally, if greater resolution is required arrays having larger numbers of pixels are readily available. Another advantage of optical systems is that special lenses can be used to magnify those areas where the information is most critical and operate at reduced resolution where this is not the case. For example, the area closest to the at-risk zone in front of the airbag can be magnified.

To summarize, although ultrasonic neural network systems are operating with high accuracy, they do not totally eliminate the problem of deaths and injuries caused by airbag deployments. Optical systems, on the other hand, at little or no increase in cost, have the capability of virtually 100 percent accuracy. Additional problems of ultrasonic systems arise from the slow speed of sound and diffraction caused by variations is air density. The slow sound speed limits the rate at which data can be collected and thus eliminates the possibility of tracking the motion of an occupant during a high speed crash.

In an embodiment wherein electromagnetic energy is used, it is to be appreciated that any portion of the electromagnetic signals that impinges upon a body portion of the occupant is at least partially absorbed by the body portion. Sometimes, this is due to the fact that the human body is composed primarily of water, and that electromagnetic energy at certain frequencies can be readily absorbed by water. The amount of electromagnetic signal absorption is related to the frequency of the signal, and size or bulk of the body portion that the signal impinges upon. For example, a torso of a human body tends to absorb a greater percentage of electromagnetic energy as compared to a hand of a human body for some frequencies.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, etc., so that different signals will be received relating to the degree or extent of absorption by the occupying item on a seat or elsewhere in the vehicle. The receiver will produce a signal representative of the returned waves or energy signals which will thus constitute an absorption signal as it corresponds to the absorption of electromagnetic energy by the occupying item in the seat.

Another optical infrared transmitter and receiver assembly is shown generally at 52 in FIG. 5 and is mounted onto the instrument panel facing the windshield. Although not shown in this view, reference 52 consists of three devices, one transmitter and two receivers, one on each side of the transmitter. In this case, the windshield is used to reflect the illumination light, and also the light reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver is determined stereoscopically through the use of the two receivers. In its most elementary sense, this system can be used to measure the distance between the driver and the airbag module. In more sophisticated applications, the position of the driver, and particularly of the driver's head, can be monitored over time and any behavior, such as a drooping head, indicative of the driver falling asleep or of being incapacitated by drugs, alcohol or illness can be detected and appropriate action taken. Other forms of radiation including visual light, radar, terahertz and microwaves as well as high frequency ultrasound could also be used by those skilled in the art.

A passive infrared system could be used to determine the position of an occupant relative to an airbag or even to detect the presence of a human or other life form in a vehicle. Passive infrared measures the infrared radiation emitted by the occupant and compares it to the background. As such, unless it is coupled with an imager and a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position. When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 5 as well as others not illustrated including truck trailers and cargo containers.

Recent advances in Quantum Well Infrared Photodetectors (QWIP) are particularly applicable here due to the range of frequencies that they can be designed to sense (3-18 microns) which encompasses the radiation naturally emitted by the human body. Currently, QWIPs need to be cooled and thus are not quite ready for vehicle applications. There are, however, longer wave IR detectors based of focal plane arrays (FPA) that are available in low resolution now. As the advantages of SWIR, MWIR and LWIR become more evident, devices that image in this part of the electromagnetic spectrum will become more available.

Passive infrared could also be used effectively in conjunction with a pattern recognition system. In this case, the passive infrared radiation emitted from an occupant can be focused onto a QWIP or FPA or even a CCD array, in some cases, and analyzed with appropriate pattern recognition circuitry, or software, to determine the position of the occupant. Such a system could be mounted at any of the preferred mounting locations shown in FIG. 5 as well as others not illustrated.

Lastly, it is possible to use a modulated scanning beam of radiation and a single pixel receiver, PIN or avalanche diode, in the inventions described above. Any form of energy or radiation used above may also be in the infrared or radar spectrums and may be polarized and filters may be used in the receiver to block out sunlight etc. These filters may be notch filters and may be made integral with the lens as one or more coatings on the lens surface as is well known in the art. Note, in many applications, this may not be necessary as window glass blocks all IR except the near IR.

For some cases, such as a laser transceiver that may contain a CMOS array, CCD, PIN or avalanche diode or other light sensitive devices, a scanner is also required that can be either solid state as in the case of some radar systems based on a phased array, an acoustical optical system as is used by some laser systems, or a mirror or MEMS based reflecting scanner, or other appropriate technology.

1.3 Ultrasonics and Optics

In some cases, a combination of an optical system such as a camera and an ultrasonic system can be used. In this case, the optical system can be used to acquire an image providing information as to the vertical and lateral dimensions of the scene and the ultrasound can be used to provide longitudinal information, for example.

A more accurate acoustic system for determining the distance to a particular object, or a part thereof, in the passenger compartment is exemplified by transducers 24 in FIG. 8E. In this case, three ultrasonic transmitter/receivers 24 are shown spaced apart mounted onto the A-pillar of the vehicle. Due to the wavelength, it is difficult to get a narrow beam using ultrasonics without either using high frequencies that have limited range or a large transducer. A commonly available 40 kHz transducer, for example, is about 1 cm. in diameter and emits a sonic wave that spreads at about a sixty-degree angle. To reduce this angle requires making the transducer larger in diameter. An alternate solution is to use several transducers and to phase the transmissions from the transducers so that they arrive at the intended part of the target in phase. Reflections from the selected part of the target are then reinforced whereas reflections from adjacent parts encounter interference with the result that the distance to the brightest portion within the vicinity of interest can be determined. A low-Q transducer may be necessary for this application.

By varying the phase of transmission from the three transducers 24, the location of a reflection source on a curved line can be determined. In order to locate the reflection source in space, at least one additional transmitter/receiver is required which is not co-linear with the others. The waves shown in FIG. 8E coming from the three transducers 24 are actually only the portions of the waves which arrive at the desired point in space together in phase. The effective direction of these wave streams can be varied by changing the transmission phase between the three transmitters 24.

A determination of the approximate location of a point of interest on the occupant can be accomplished by a CCD or CMOS array and appropriate analysis and the phasing of the ultrasonic transmitters is determined so that the distance to the desired point can be determined.

Although the combination of ultrasonics and optics has been described, it will now be obvious to others skilled in the art that other sensor types can be combined with either optical or ultrasonic transducers including weight sensors of all types as discussed below, as well as electric field, chemical, temperature, humidity, radiation, vibration, acceleration, velocity, position, proximity, capacitance, angular rate, heartbeat, radar, other electromagnetic, and other sensors.

1.4 Other Transducers

In FIG. 4, the ultrasonic transducers of the previous designs can be replaced by laser or other electromagnetic wave transducers or transceivers 8 and 9, which are connected to a microprocessor 20. As discussed above, these are only illustrative mounting locations and any of the locations described herein are suitable for particular technologies. Also, such electromagnetic transceivers are meant to include the entire electromagnetic spectrum including from X-rays to low frequencies where sensors such as capacitive or electric field sensors including so called "displacement current sensors" as discussed in detail elsewhere herein, and the auto-tune antenna sensor also discussed herein operate.

2. Adaptation

Let us now consider the process of adapting a system of occupant or object sensing transducers to a vehicle. For example, if a candidate system for an automobile consisting of eight transducers is considered, four ultrasonic transducers and four weight transducers, and if cost considerations require the choice of a smaller total number of transducers, it is a question of which of the eight transducers should be eliminated. Fortunately, the neural network technology discussed below provides a technique for determining which of the eight transducers is most important, which is next most important, etc. If the six most critical transducers are chosen, that is the six transducers which contain or provide the most useful information as determined by the neural network, a neural network can be trained using data from those six transducers and the overall accuracy of the system can be determined. Experience has determined, for example, that typically there is almost no loss in accuracy by eliminating two of the eight transducers, for example, two of the strain gage weight sensors. A slight loss of accuracy occurs when one of the ultrasonic transducers is then eliminated. In this manner, by the process of adaptation, the most cost effective system can be determined from a proposed set of sensors.

This same technique can be used with the additional transducers described throughout this disclosure. A transducer space can be determined with perhaps twenty different transducers comprised of ultrasonic, optical, electromagnetic, electric field, motion, heartbeat, weight, seat track, seatbelt payout, seatback angle and other types of transducers depending on the particular vehicle application. The neural network can then be used in conjunction with a cost function to determine the cost of system accuracy. In this manner, the optimum combination of any system cost and accuracy level can be determined.

System Adaptation involves the process by which the hardware configuration and the software algorithms are determined for a particular vehicle. Each vehicle model or platform will most likely have a different hardware configuration and different algorithms. Some of the various aspects that make up this process are as follows:

The determination of the mounting location and aiming or orientation of the transducers.

The determination of the transducer field angles or area or volume monitored

The use of a combination neural network algorithm generating program such as available from International Scientific Research, Inc. to help generate the algorithms or other pattern recognition algorithm generation program. (as described below)

The process of the collection of data in the vehicle, for example, for neural network training purposes.

The method of automatic movement of the vehicle seats or other structures or objects etc. while data is collected The determination of the quantity of data to acquire and the setups needed to achieve a high system accuracy, typically several hundred thousand vectors or data sets.

The collection of data in the presence of varying environmental conditions such as with thermal gradients.

The photographing of each data setup.

The makeup of the different databases and the use of typically three different databases.

The method by which the data is biased to give higher probabilities for, e.g., forward facing humans.

The automatic recording of the vehicle setup including seat, seat back, headrest, window, visor, armrest, and other object positions, for example, to help insure data integrity.

The use of a daily setup to validate that the transducer configuration and calibration has not changed.

The method by which bad data is culled from the database.

The inclusion of the Fourier transforms and other pre-processors of the data in the algorithm generation process if appropriate.

The use of multiple algorithm levels, for example, for categorization and position.

The use of multiple algorithms in parallel.

The use of post processing filters and the particularities of these filters.

The addition of fuzzy logic or other human intelligence based rules.

The method by which data errors are corrected using, for example, a neural network.

The use of a neural network generation program as the pattern recognition algorithm generating system, if appropriate.

The use of back propagation neural networks for training.

The use of vector or data normalization.

The use of feature extraction techniques, for ultrasonic systems for example, including:
 The number of data points prior to a peak.
 The normalization factor.
 The total number of peaks.
 The vector or data set mean or variance.

The use of feature extraction techniques, for optics systems for example, including:
 Motion.
 Edge detection.
 Feature detection such as the eyes, head etc.
 Texture detection.
 Recognizing specific features of the vehicle.

Line subtraction—i.e., subtracting one line of pixels from the adjacent line with every other line illuminated. This works primarily only with rolling shutter cameras. The equivalent for a snapshot camera is to subtract an artificially illuminated image from one that is illuminated only with natural light.

The use of other computational intelligence systems such as genetic algorithms

The use the data screening techniques.

The techniques used to develop stable networks including the concepts of old and new networks.

The time spent or the number of iterations spent in, and method of, arriving at stable networks.

The technique where a small amount of data is collected first such as 16 sheets followed by a complete data collection sequence.

The use of a cellular neural network for high speed data collection and analysis when electromagnetic transducers are used.

The use of a support vector machine.

The process of adapting the system to the vehicle begins with a survey of the vehicle model. Any existing sensors, such as seat position sensors, seat back sensors, door open sensors etc., are immediate candidates for inclusion into the system. Input from the customer will determine what types of sensors would be acceptable for the final system. These sensors can include: seat structure-mounted weight sensors, pad-type weight sensors, pressure-type weight sensors (e.g., bladders), seat fore and aft position sensors, seat-mounted capacitance, electric field or antenna sensors, seat vertical position sensors, seat angular position sensors, seat back position sensors, headrest position sensors, ultrasonic occupant sensors, optical occupant sensors, capacitive sensors, electric field sensors, inductive sensors, radar sensors, vehicle velocity and acceleration sensors, shock and vibration sensors, temperature sensors, chemical sensors, radiation sensors, brake pressure, seatbelt force, payout and buckle sensors, accelerometers, gyroscopes, etc. A candidate array of sensors is then chosen and mounted onto the vehicle. At least one of the inventions disclosed herein contemplates final systems including any such sensors or combinations of such sensors, where appropriate, for the monitoring of the interior and/or exterior of any vehicle as the term is defined above.

The vehicle can also be instrumented so that data input by humans is minimized. Thus, the positions of the various components in the vehicle such as the seats, windows, sun visor, armrest, etc. are automatically recorded where possible. Also, the position of the occupant while data is being taken is also recorded through a variety of techniques such as direct ultrasonic ranging sensors, optical ranging sensors, radar ranging sensors, optical tracking sensors etc., where appropriate. Special cameras can also be installed to take one or more pictures of the setup to correspond to each vector of data collected or at some other appropriate frequency. Herein, a vector is used to represent a set of data collected at a particular epoch or representative of the occupant or environment of vehicle at a particular point in time.

A standard set of vehicle setups is chosen for initial trial data collection purposes. Typically, the initial trial will consist of between 20,000 and 100,000 setups, although this range is not intended to limit the invention.

Initial digital data collection now proceeds for the trial setup matrix. The data is collected from the transducers, digitized and combined to form to a vector of input data for analysis by a pattern recognition system such as a neural network program or combination neural network program. This analysis should yield a training accuracy of nearly 100%. If this is not achieved, then additional sensors are added to the system or the configuration changed and the data collection and analysis repeated. Note, in some cases the task is sufficiently simple that a neural network is not necessary, such as the determination that a trailer is not empty.

In addition to a variety of seating states for objects in the passenger compartment, for example, the trial database can also include environmental effects such as thermal gradients caused by heat lamps and the operation of the air conditioner and heater, or where appropriate lighting variations or other environmental variations that might affect particular transducer types. A sample of such a matrix is presented in FIGS. 82A-82H of the '881 application, with some of the variables and objects used in the matrix being designated or described in FIGS. 76-81D for automotive occupant sensing (of the '881 application). A similar matrix can be generated for other vehicle monitoring applications such as cargo containers and truck trailers. After the neural network has been trained on the trial database, the trial database will be scanned for vectors that yield erroneous results (which would likely be considered bad data). A study of those vectors along with vectors from associated in time cases are compared with the photographs to determine whether there is erroneous data present. If so, an attempt is made to determine the cause of the erroneous data. If the cause can be found, for example if a voltage spike on the power line corrupted the data, then the vector will be removed from the database and an attempt is made to correct the data collection process so as to remove such disturbances.

At this time, some of the sensors may be eliminated from the sensor matrix. This can be determined during the neural network analysis, for example, by selectively eliminating sensor data from the analysis to see what the effect if any results. Caution should be exercised here, however, since once the sensors have been initially installed in the vehicle, it requires little additional expense to use all of the installed sensors in future data collection and analysis.

The neural network, or other pattern recognition system, that has been developed in this first phase can be used during the data collection in the next phases as an instantaneous check on the integrity of the new vectors being collected.

The next set of data to be collected when neural networks are used, for example, is the training database. This will usually be the largest database initially collected and will cover such setups as listed, for example, in FIGS. 82A-82H of the '881 application for occupant sensing. The training database, which may contain 500,000 or more vectors, will be used to begin training of the neural network or other pattern recognition system. In the foregoing description, a neural network will be used for exemplary purposes with the understanding that the invention is not limited to neural networks and that a similar process exists for other pattern recognition systems. At least one of the inventions disclosed herein is largely concerned with the use of pattern recognition systems for vehicle internal monitoring. The best mode is to use trained pattern recognition systems such as neural networks. While this is taking place, additional data will be collected according to FIGS. 78-80 and 83 of the independent and validation databases (of the '881 application).

The training database is usually selected so that it uniformly covers all seated states that are known to be likely to occur in the vehicle. The independent database may be similar in makeup to the training database or it may evolve to more closely conform to the occupancy state distribution of the validation database. During the neural network training, the independent database is used to check the accuracy of the neural network and to reject a candidate neural network design if its accuracy, measured against the independent database, is less than that of a previous network architecture.

Although the independent database is not actually used in the training of the neural network, nevertheless, it has been found that it significantly influences the network structure or architecture. Therefore, a third database, the validation or real world database, is used as a final accuracy check of the chosen system. It is the accuracy against this validation database that is considered to be the system accuracy. The validation database is usually composed of vectors taken from setups which closely correlate with vehicle occupancy in real vehicles on the roadway or wherever they are used. Initially, the training database is usually the largest of the three databases. As time and resources permit, the independent database, which perhaps starts out with 100,000 vectors, will continue to grow until it becomes approximately the same size or even larger than the training database. The validation database, on the other hand, will typically start out with as few as 50,000 vectors. However, as the hardware configuration is frozen, the validation database will continuously grow until, in some cases, it actually becomes larger than the training database. This is because near the end of the program, vehicles will be operating on highways, ships, railroad tracks etc. and data will be collected in real world situations. If in the real world tests, system failures are discovered, this can lead to additional data being taken for both the training and independent databases as well as the validation database.

Once a neural network, or other pattern recognition system, has been trained or otherwise developed using all of the available data from all of the transducers, it is expected that the accuracy of the network will be very close to 100%. It is usually not practical to use all of the transducers that have been used in the training of the system for final installation in real production vehicle models. This is primarily due to cost and complexity considerations. Usually, the automobile manufacturer, or other customer, will have an idea of how many transducers would be acceptable for installation in a production vehicle. For example, the data may have been collected using 20 different transducers but the customer may restrict the final selection to 6 transducers. The next process, therefore, is to gradually eliminate transducers to determine what is the best combination of six transducers, for example, to achieve the highest system accuracy. Ideally, a series of neural networks, for example, would be trained using all combinations of six transducers from the 20 available. The activity would require a prohibitively long time. Certain constraints can be factored into the system from the beginning to start the pruning process. For example, it would probably not make sense to have both optical and ultrasonic transducers present in the same system since it would complicate the electronics. In fact, the customer may have decided initially that an optical system would be too expensive and therefore would not be considered. The inclusion of optical transducers, therefore, serves as a way of determining the loss in accuracy as a function of cost. Various constraints, therefore, usually allow the immediate elimination of a significant number of the initial group of transducers. This elimination and the training on the remaining transducers provides the resulting accuracy loss that results.

The next step is to remove each of the transducers one at a time and determine which sensor has the least effect on the system accuracy. This process is then repeated until the total number of transducers has been pruned down to the number desired by the customer. At this point, the process is reversed to add in one at a time those transducers that were removed at previous stages. It has been found, for example, that a sensor that appears to be unimportant during the early pruning process can become very important later on. Such a sensor may add a small amount of information due to the presence of various other transducers. Whereas the various other transducers, however, may yield less information than still other transducers and, therefore may have been removed during the pruning process. Reintroducing the sensor that was eliminated early in the cycle therefore can have a significant effect and can change the final choice of transducers to make up the system.

The above method of reducing the number of transducers that make up the system is but one of a variety approaches which have applicability in different situations. In some cases, a Monte Carlo or other statistical approach is warranted, whereas in other cases, a design of experiments approach has proven to be the most successful. In many cases, an operator conducting this activity becomes skilled and after a while knows intuitively what set of transducers is most likely to yield the best results. During the process it is not uncommon to run multiple cases on different computers simultaneously. Also, during this process, a database of the cost of accuracy is generated. The automobile manufacturer, for example, may desire to have the total of 6 transducers in the final system, however, when shown the fact that the addition of one or two additional transducers substantially increases the accuracy of the system, the manufacturer may change his mind. Similarly, the initial number of transducers selected may be 6 but the analysis could show that 4 transducers give substantially the same accuracy as 6 and therefore the other 2 can be eliminated at a cost saving.

While the pruning process is occurring, the vehicle is subjected to a variety of real world tests and would be subjected to presentations to the customer. The real world tests are tests that are run at different locations than where the fundamental training took place. It has been found that unexpected environmental factors can influence the performance of the system and therefore these tests can provide critical information. The system therefore, which is installed in the test vehicle, should have the capability of recording system failures. This recording includes the output of all of the transducers on the vehicle as well as a photograph of the vehicle setup that caused the error. This data is later analyzed to determine whether the training, independent or validation setups need to be modified and/or whether the transducers or positions of the transducers require modification.

Once the final set of transducers in some cases is chosen, the vehicle is again subjected to real world testing on highways, or wherever it is eventually to be used, and at customer demonstrations. Once again, any failures are recorded. In this case, however, since the total number of transducers in the system is probably substantially less than the initial set of transducers, certain failures are to be expected. All such failures, if expected, are reviewed carefully with the customer to be sure that the customer recognizes the system failure modes and is prepared to accept the system with those failure modes.

The system described so far has been based on the use of a single neural network or other pattern recognition system. It is frequently necessary and desirable to use combination neural networks, multiple neural networks, cellular neural networks or support vector machines or other pattern recognition systems. For example, for determining the occupancy state of a vehicle seat or other part of the vehicle, there may be at least two different requirements. The first requirement is to establish what is occupying the seat, for example, and the second requirement is to establish where that object is located. Another requirement might be to simply determine whether an occupying item warranting analysis by the neural networks is present. Generally, a great deal of time, typically many seconds, is available for determining whether a forward facing human or an occupied or unoccupied rear facing child seat, for example, occupies a vehicle seat. On the other hand, if the driver of the vehicle is trying to avoid an accident and is engaged in panic braking, the position of an unbelted occupant can be changing rapidly as he or she is moving toward the airbag. Thus, the problem of determining the location of an occupant is time critical. Typically, the position of the occupant in such situations must be determined in less than 20 milliseconds. There is no reason for the system to have to determine that a forward facing human being is in the seat while simultaneously determining where that forward facing human being is. The system already knows that the forward facing human being is present and therefore all of the resources can be used to determine the occupant's position. Thus, in this situation, a dual level or modular neural network can be advantageously used. The first level determines the occupancy of the vehicle seat and the second level determines the position of that occupant. In some situations, it has been demonstrated that multiple neural networks used in parallel can provide some benefit. This will be discussed in more detail below. Both modular and multiple parallel neural networks are examples of combination neural networks.

The data fed to the pattern recognition system will usually not be the raw vectors of data as captured and digitized from the various transducers. Typically, a substantial amount of preprocessing of the data is undertaken to extract the important information from the data that is fed to the neural network. This is especially true in optical systems and where the quantity of data obtained, if all were used by the neural network, would require very expensive processors. The techniques of preprocessing data will not be described in detail here. However, the preprocessing techniques influence the neural network structure in many ways. For example, the preprocessing used to determine what is occupying a vehicle seat is typically quite different from the preprocessing used to determine the location of that occupant. Some particular preprocessing concepts will be discussed in more detail below.

A pattern recognition system, such as a neural network, can sometimes make irrational decisions. This typically happens when the pattern recognition system is presented with a data set or vector that is unlike any vector that has been in its training set. The variety of seating states of a vehicle is unlimited. Every attempt is made to select from that unlimited universe a set of representative cases. Nevertheless, there will always be cases that are significantly different from any that have been previously presented to the neural network. The final step, therefore, to adapting a system to a vehicle, is to add a measure of human intelligence or common sense. Sometimes this goes under the heading of fuzzy logic and the resulting system has been termed in some cases, a neural fuzzy system. In some cases, this takes the form of an observer studying failures of the system and coming up with rules and that say, for example, that if transducer A perhaps in combination with another transducer produces values in this range, then the system should be programmed to override the pattern recognition decision and substitute therefor a human decision.

An example of this appears in R. Scorcioni, K. Ng, M. M. Trivedi, N. Lassiter; "MoNiF: A Modular Neuro-Fuzzy Controller for Race Car Navigation"; in Proceedings of the 1997 *IEEE Symposium on Computational Intelligence and Robotics Applications*, Monterey, Calif., USA July 1997, which describes the case of where an automobile was designed for autonomous operation and trained with a neural network, in one case, and a neural fuzzy system in another case. As long as both vehicles operated on familiar roads both vehicles performed satisfactorily. However, when placed on an unfamiliar road, the neural network vehicle failed while the neural fuzzy vehicle continued to operate successfully. Naturally, if the neural network vehicle had been trained on the unfamiliar road, it might very well have operated successful. Nevertheless, the critical failure mode of neural networks that most concerns people is this uncertainty as to what a neural network will do when confronted with an unknown state.

One aspect, therefore, of adding human intelligence to the system, is to ferret out those situations where the system is likely to fail. Unfortunately, in the current state-of-the-art, this is largely a trial and error activity. One example is that if the range of certain parts of vector falls outside of the range experienced during training, the system defaults to a particular state. In the case of suppressing deployment of one or more airbags, or other occupant protection apparatus, this case would be to enable airbag deployment even if the pattern recognition system calls for its being disabled. An alternate method is to train a particular module of a modular neural network to recognize good from bad data and reject the bad data before it is fed to the main neural networks.

The foregoing description is applicable to the systems described in the following drawings and the connection between the foregoing description and the systems described below will be explained below. However, it should be appreciated that the systems shown in the drawings do not limit the applicability of the methods or apparatus described above.

Figure 6A:
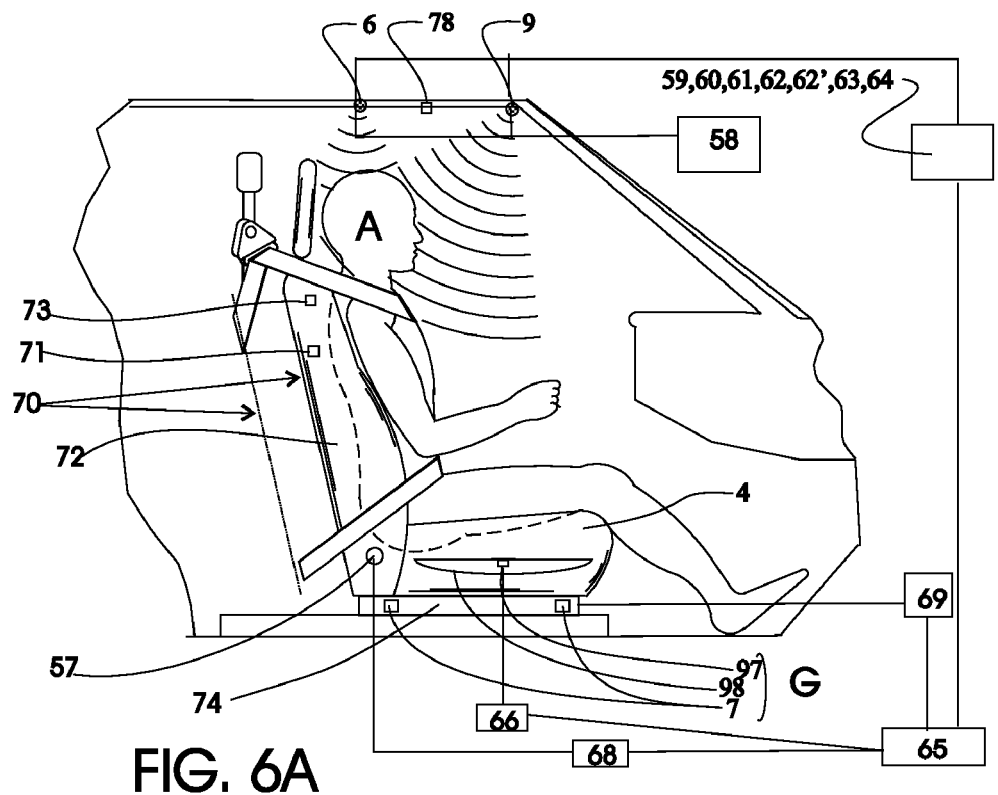
FIG. 6A is an illustration as in FIG. 6 with the replacement of a strain gage weight sensor within a cavity within the seat cushion for the bladder weight sensor of FIG. 6.

Referring again to FIG. 6, and to FIG. 6A which differs from FIG. 6 only in the use of a strain gage weight sensor mounted within the seat cushion, motion sensor 73 can be a discrete sensor that detects relative motion in the passenger compartment of the vehicle. Such sensors are frequently based on ultrasonics and can measure a change in the ultrasonic pattern that occurs over a short time period. Alternately, the subtracting of one position vector from a previous position vector to achieve a differential position vector can detect motion. For the purposes herein, a motion sensor will be used to mean either a particular device that is designed to detect motion for the creation of a special vector based on vector differences or a neural network trained to determine motion based on successive vectors.

An ultrasonic, optical or other sensor or transducer system 9 can be mounted on the upper portion of the front pillar, i.e., the A-Pillar, of the vehicle and a similar sensor system 6 can be mounted on the upper portion of the intermediate pillar, i.e., the B-Pillar. Each sensor system 6, 9 may comprise a transducer. The outputs of the sensor systems 6 and 9 can be input to a band pass filter 60 through a multiplex circuit 59 which can be switched in synchronization with a timing signal from the ultrasonic sensor drive circuit 58, for example, and then can be amplified by an amplifier 61. The band pass filter 60 removes a low frequency wave component from the output signal and also removes some of the noise. The envelope wave signal can be input to an analog/digital converter (ADC) 62 and digitized as measured data. The measured data can be input to a processing circuit 63, which can be controlled by the timing signal which can be in turn output from the sensor drive circuit 58. The above description applies primarily to systems based on ultrasonics and will differ somewhat for optical, electric field and other systems and for different vehicle types.

Each of the measured data can be input to a normalization circuit 64 and normalized. The normalized measured data can be input to the combination neural network (circuit) 65, for example, as wave data.

The output of the pressure or weight sensor(s) 7, 76 or 97 (see FIG. 6A) can be amplified by an amplifier 66 coupled to the pressure or weight sensor(s) 7, 76 and 97 and the amplified output can be input to an analog/digital converter and then directed to the neural network 65, for example, of the processor means. Amplifier 66 can be useful in some embodiments but it may be dispensed with by constructing the sensors 7, 76, 97 to provide a sufficiently strong output signal, and even possibly a digital signal. One manner to do this would be to construct the sensor systems with appropriate electronics.

The neural network 65 can be directly connected to the ADCs 68 and 69, the ADC associated with amplifier 66 and the normalization circuit 64. As such, information from each of the sensors in the system (a stream of data) can be passed directly to the neural network 65 for processing thereby. The streams of data from the sensors are usually not combined prior to the neural network 65 and the neural network 65 can be designed to accept the separate streams of data (e.g., at least a part of the data at each input node) and process them to provide an output indicative of the current occupancy state of the seat or of the vehicle. The neural network 65 thus includes or incorporates a plurality of algorithms derived by training in the manners discussed herein. Once the current occupancy state of the seat or vehicle is determined, it is possible to control vehicular components or systems, such as the airbag system or telematics system, in consideration of the current occupancy state of the seat or vehicle.

A discussion of the methodology of adapting a monitoring system to an automotive vehicle for the purpose primarily of controlling a component such as a restraint system is disclosed in the '881 application with reference to FIGS. 28-36. Generally simpler systems are used for cargo container, truck trailer and other vehicle monitoring cases.

In addition to variations in occupancy or seated states, it is important to consider environmental effects during the data collection. Thermal gradients or thermal instabilities are particularly important for systems based on ultrasound since sound waves can be significantly diffracted by density changes in air. There are two aspects of the use of thermal gradients or instability in training. First, the fact that thermal instabilities exist and therefore data with thermal instabilities present should be part of database. For this case, a rather small amount of data collected with thermal instabilities would be used. A much more important use of thermal instability comes from the fact that they add variability to data. Thus, considerably more data is taken with thermal instability and in fact, in some cases a substantial percentage of the database is taken with time varying thermal gradients in order to provide variability to the data so that the neural network does not memorize but instead generalizes from the data. This is accomplished by taking the data with a cold vehicle with the heater operating and with a hot vehicle with the air conditioner operating, for example. Additional data is also taken with a heat lamp in a closed vehicle to simulate a stable thermal gradient caused by sun loading.

To collect data for 500,000 vehicle configurations is not a formidable task. A trained technician crew can typically collect data on in excess on 2000 configurations or vectors per hour. The data is collected typically every 50 to 100 milliseconds. During this time, the occupant is continuously moving, assuming a continuously varying position and posture in the vehicle including moving from side to side, forward and back, twisting his/her head, reading newspapers and books, moving hands, arms, feet and legs, until the desired number of different seated state examples are obtained. In some cases, this process is practiced by confining the motion of an occupant into a particular zone. In some cases, for example, the occupant is trained to exercise these different seated state motions while remaining in a particular zone that may be the safe zone, the keep out zone, or an intermediate gray zone. In this manner, data is collected representing the airbag disable, depowered airbag-enabled or full power airbag-enabled states. In other cases, the actual position of the back of the head and/or the shoulders of the occupant are tracked using string pots, high frequency ultrasonic transducers, optically, by RF or other equivalent methods. In this manner, the position of the occupant can be measured and the decision as to whether this should be a disable or enable airbag case can be decided later. By continuously monitoring the occupant, an added advantage results in that the data can be collected to permit a comparison of the occupant from one seated state to another. This is particularly valuable in attempting to project the future location of an occupant based on a series of past locations as would be desirable for example to predict when an occupant would cross into the keep out zone during a panic braking situation prior to crash.

It is important to note that it is not necessary to tailor the system for every vehicle produced but rather to tailor it for each model or platform. However, a neural network, and especially a combination neural network, can be designed with some adaptability to compensate for vehicle to vehicle differences within a platform such as mounting tolerances, or to changes made by the owner or due to aging. A platform is an automobile manufacturer's designation of a group of vehicle models that are built on the same vehicle structure. A model would also apply to a particular size, shape or geometry of truck trailer or cargo container The methods above have been described mainly in connection with the use of ultrasonic transducers. Many of the methods, however, are also applicable to optical, radar, capacitive, electric field and other sensing systems and where applicable, at least one of the inventions disclosed herein is not limited to ultrasonic systems. In particular, an important feature of at least one of the inventions disclosed herein is the proper placement of two or more separately located receivers such that the system still operates with high reliability if one of the receivers is blocked by some object such as a newspaper or box. This feature is also applicable to systems using electromagnetic radiation instead of ultrasonic, however the particular locations will differ based on the properties of the particular transducers. Optical sensors based on two-dimensional cameras or other image sensors, for example, are more appropriately placed on the sides of a rectangle surrounding the seat to be monitored, for the automotive vehicle case, rather than at the corners of such a rectangle as is the case with ultrasonic sensors. This is because ultrasonic sensors measure an axial distance from the sensor where the 2D camera is most appropriate for measuring distances up and down and across its field view rather than distances to the object. With the use of electromagnetic radiation and the advances which have recently been made in the field of very low light level sensitivity, it is now possible, in some implementations, to eliminate the transmitters and use background light as the source of illumination along with using a technique such as auto-focusing or stereo vision to obtain the distance from the receiver to the object. Thus, only receivers would be required further reducing the complexity of the system.

Although implicit in the above discussion, an important feature of at least one of the inventions disclosed herein which should be emphasized is the method of developing a system having distributed transducer mountings. Other systems which have attempted to solve the rear facing child seat (RFCS) and out-of-position problems have relied on a single transducer mounting location or at most, two transducer mounting locations. Such systems can be easily blinded by a newspaper or by the hand of an occupant, for example, which is imposed between the occupant and the transducers. This problem is almost completely eliminated through the use of three or more transducers which are mounted so that they have distinctly different views of the passenger compartment volume of interest. If the system is adapted using four transducers, for example, the system suffers only a slight reduction in accuracy even if two of the transducers are covered so as to make them inoperable. However, the automobile manufacturers may not wish to pay the cost of several different mounting locations and an alternate is to mount the sensors high where blockage is difficult and to diagnose whether a blockage state exists.

It is important in order to obtain the full advantages of the system when a transducer is blocked, that the training and independent databases contains many examples of blocked transducers. If the pattern recognition system, the neural network in this case, has not been trained on a substantial number of blocked transducer cases, it will not do a good job in recognizing such cases later. This is yet another instance where the makeup of the databases is crucial to the success of designing the system that will perform with high reliability in a vehicle and is an important aspect of the instant invention. When camera-based transducers are used, for example, an alternative strategy is to diagnose when a newspaper or other object is blocking a camera, for example. In most cases, a short time blockage is of little consequence since earlier decisions provide the seat occupancy and the decision to enable deployment or suppress deployment of the occupant restraint will not change. For a prolonged blockage, the diagnostic system can provide a warning light indicating to the driver, operator or other interested party which may be remote from the vehicle, that the system is malfunctioning and the deployment decision is again either not changed or changed to the default decision, which is usually to enable deployment for the automobile occupant monitoring case.

Specific issues relating to transducers are discussed more fully in the parent application.

It is important to realize that the adaptation process described herein applies to any combination of transducers that provide information about the vehicle occupancy. These include weight sensors, capacitive sensors, electric field sensors, inductive sensors, moisture sensors, chemical sensors, ultrasonic, radiation, optic, infrared, radar, X-ray among others. The adaptation process begins with a selection of candidate transducers for a particular vehicle model. This selection is based on such considerations as cost, alternate uses of the system other than occupant sensing, vehicle interior compartment geometry, desired accuracy and reliability, vehicle aesthetics, vehicle manufacturer preferences, and others. Once a candidate set of transducers has been chosen, these transducers are mounted in the test vehicle according to the teachings of at least one of the inventions disclosed herein. The vehicle is then subjected to an extensive data collection process wherein various objects are placed in the vehicle at various locations as described below and an initial data set is collected. A pattern recognition system is then developed using the acquired data and an accuracy assessment is made. Further studies are made to determine which, if any, of the transducers can be eliminated from the design. In general, the design process begins with a surplus of sensors plus an objective as to how many sensors are to be in the final vehicle installation. The adaptation process can determine which of the transducers are most important and which are least important and the least important transducers can be eliminated to reduce system cost and complexity.

A process for adapting an ultrasonic system to a vehicle will now be described. Note, some steps will not apply to some vehicles. A more detailed list of steps is provided in Appendix 2 of U.S. patent application Ser. No. 10/940,811 incorporated by reference herein. Although the pure ultrasonic system is described here for automotive applications, a similar or analogous set of steps applies for other vehicle types and when other technologies such as weight and optical (scanning or imager) or other electromagnetic wave or electric field systems such as capacitance and field monitoring systems are used. This description is thus provided to be exemplary and not limiting:

1. Select transducer, horn and grill designs to fit the vehicle. At this stage, usually full horns are used which are mounted so that they project into the compartment. No attempt is made at this time to achieve an esthetic matching of the transducers to the vehicle surfaces. An estimate of the desired transducer fields is made at this time either from measurements in the vehicle directly or from CAD drawings.

2. Make polar plots of the transducer ultrasonic fields. Transducers and candidate horns and grills are assembled and tested to confirm that the desired field angles have been achieved. This frequently requires some adjustment of the transducers in the horn and of the grill. A properly designed grill for ultrasonic systems can perform a similar function as a lens for optical systems.

3. Check to see that the fields cover the required volumes of the vehicle passenger compartment and do not impinge on adjacent flat surfaces that may cause multipath effects. Redesign horns and grills if necessary.

4. Install transducers into vehicle.

5. Map transducer fields in the vehicle and check for multipath effects and proper coverage.

6. Adjust transducer aim and re-map fields if necessary.

7. Install daily calibration fixture and take standard setup data.

8. Acquire 50,000 to 100,000 vectors of data

9. Adjust vectors for volume considerations by removing some initial data points if cross talk or ringing is present and some final points to keep data in the desired passenger compartment volume.

10. Normalize vectors.

11. Run neural network algorithm generating software to create algorithm for vehicle installation.

12. Check the accuracy of the algorithm. If not sufficiently accurate collect more data where necessary and retrain. If still not sufficiently accurate, add additional transducers to cover holes.

13. When sufficient accuracy is attained, proceed to collect ~500,000 training vectors varying:

Occupancy (see Appendices 1 and 3 of U.S. patent application Ser. No. 10/940,881 incorporated by reference herein):

Occupant size, position (zones), clothing etc

Child seat type, size, position etc.

Empty seat

Vehicle configuration:

Seat position

Window position

Visor and armrest position

Presence of other occupants in adjoining seat or rear seat

Temperature

Temperature gradient—stable

Temperature turbulence—heater and air conditioner

Wind turbulence—High speed travel with windows open, top down etc.

Other similar features when the adaptation is to a vehicle other than an automobile.

14. Collect~100,000 vectors of Independent data using other combinations of the above 15. Collect~50,000 vectors of "real world data" to represent the acceptance criteria and more closely represent the actual seated state probabilities in the real world.

16. Train network and create an algorithm using the training vectors and the Independent data vectors.

17. Validate the algorithm using the real world vectors.

18. Install algorithm into the vehicle and test.

19. Decide on post processing methodology to remove final holes (areas of inaccuracy) in system 20. Implement post-processing methods into the algorithm 21. Final test. The process up until step 13 involves the use of transducers with full horns mounted on the surfaces of the interior passenger compartment. At some point, the actual transducers which are to be used in the final vehicle must be substituted for the trial transducers. This is either done prior to step 13 or at this step. This process involves designing transducer holders that blend with the visual surfaces of the vehicle compartment so that they can be covered with a properly designed grill that helps control the field and also serves to retain the esthetic quality of the interior. This is usually a lengthy process and involves several consultations with the customer. Usually, therefore, the steps from 13-20 are repeated at this point after the final transducer and holder design has been selected. The initial data taken with full horns gives a measure of the best system that can be made to operate in the vehicle. Some degradation in performance is expected when the aesthetic horns and grills are substituted for the full horns. By conducting two complete data collection cycles, an accurate measure of this accuracy reduction can be obtained.

22. Up until this point, the best single neural network algorithm has been developed. The final step is to implement the principles of a combination neural network in order to remove some remaining error sources such as bad data and to further improve the accuracy of the system. It has been found that the implementation of combination neural networks can reduce the remaining errors by up to 50 percent. A combination neural network CAD optimization program provided by International Scientific Research Inc. can now be used to derive the neural network architecture. Briefly, the operator lays out a combination neural network involving many different neural networks arranged in parallel and in series and with appropriate feedbacks which the operator believes could be important. The software then optimizes each neural network and also provides an indication of the value of the network. The operator can then selectively eliminate those networks with little or no value and retrain the system. Through this combination of pruning, retraining and optimizing the final candidate combination neural network results.

23. Ship to customers to be used in production vehicles.

24. Collect additional real world validation data for continuous improvement.

More detail on the operation of the transducers and control circuitry as well as the neural network is provided in the above-referenced patents and patent applications and elsewhere herein. One particular example of a successful neural network for the two transducer case had 78 input nodes, 6 hidden nodes and 1 output node and for the four transducer case had 176 input nodes 20 hidden layer nodes on hidden layer one, 7 hidden layer nodes on hidden layer two and 1 output node. The weights of the network were determined by supervised training using the back propagation method as described in the above-referenced patents and patent applications and in more detail in the references cited therein. Other neural network architectures are possible including RCE, Logicon Projection, Stochastic, cellular, or support vector machine, etc. An example of a combination neural network system is shown in FIG. 37 of the '881 application, incorporated by reference herein. Any of the network architectures mention here can be used for any of the boxes in FIG. 37.

Finally, the system is trained and tested with situations representative of the manufacturing and installation tolerances that occur during the production and delivery of the vehicle as well as usage and deterioration effects. Thus, for example, the system is tested with the transducer mounting positions shifted by up to one inch in any direction and rotated by up to 5 degrees, with a simulated accumulation of dirt and other variations. This tolerance to vehicle variation also sometimes permits the installation of the system onto a different but similar model vehicle with, in many cases, only minimal retraining of the system.

3. Mounting Locations for and Quantity of Transducers

Ultrasonic transducers are relatively good at measuring the distance along a radius to a reflective object. An optical array, to be discussed now, on the other hand, can get accurate measurements in two dimensions, the lateral and vertical dimensions relative to the transducer. Assuming the optical array has dimensions of 100 by 100 as compared to an ultrasonic sensor that has a single dimension of 100, an optical array can therefore provide 100 times more information than the ultrasonic sensor. Most importantly, this vastly greater amount of information does not cost significantly more to obtain than the information from the ultrasonic sensor.

As illustrated in FIGS. 8A-8D, the optical sensors are typically located for an automotive vehicle at the positions where the desired information is available with the greatest resolution. These positions are typically in the center front and center rear of the occupancy seat and at the center on each side and top. This is in contrast to the optimum location for ultrasonic sensors, which are the corners of such a rectangle that outlines the seated volume. Styling and other constraints often prevent mounting of transducers at the optimum locations.

Figure 8B:
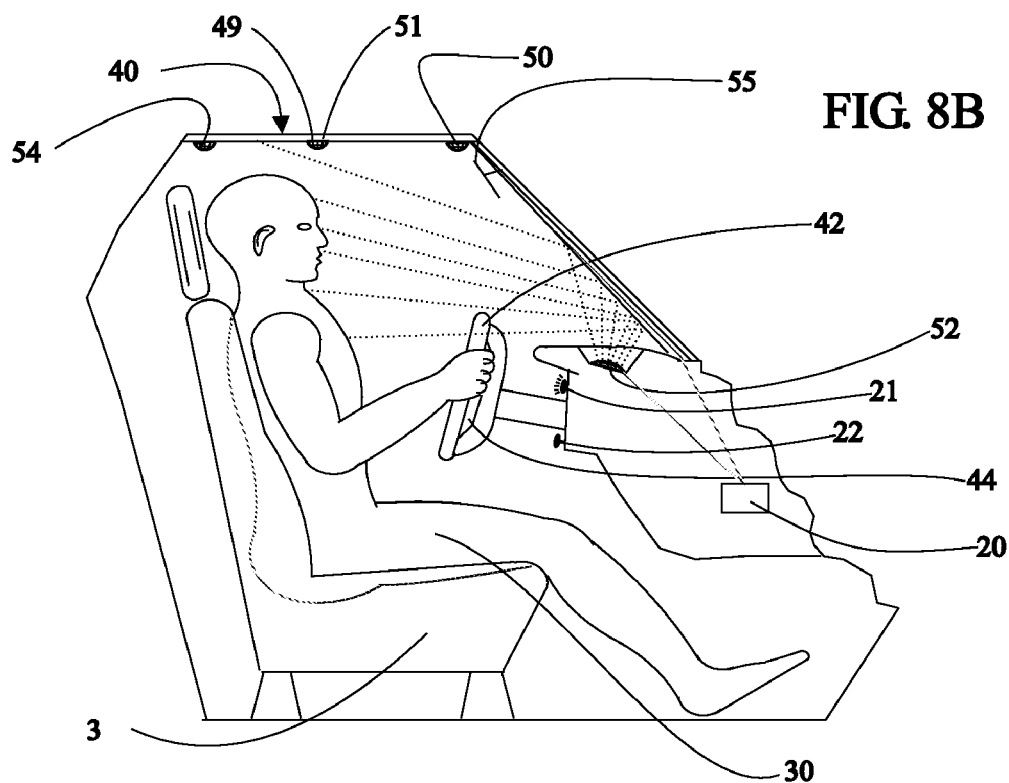
FIG. 8B is a view as in FIG. 8A illustrating the wave pattern from an optical system using an infrared light source and a CCD or CMOS array receiver using the windshield as a reflection surface and showing schematically the interface between the vehicle interior monitoring system of at least one of the inventions disclosed herein and an instrument panel mounted inattentiveness warning light or buzzer and reset button.
Figure 8C:
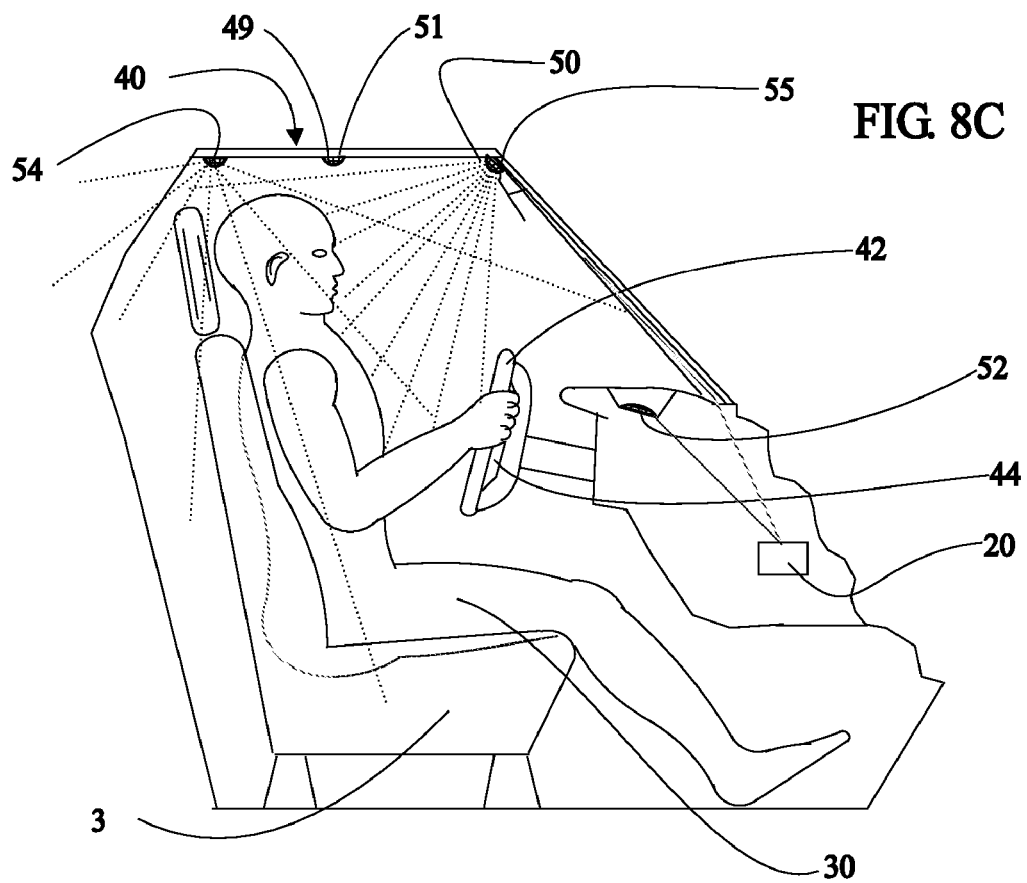
FIG. 8C is a view as in FIG. 8A illustrating the wave pattern from an optical system using an infrared light source and a CCD or CMOS array receiver where the CCD or CMOS array receiver is covered by a lens permitting a wide angle view of the contents of the passenger compartment.
Figure 8D:
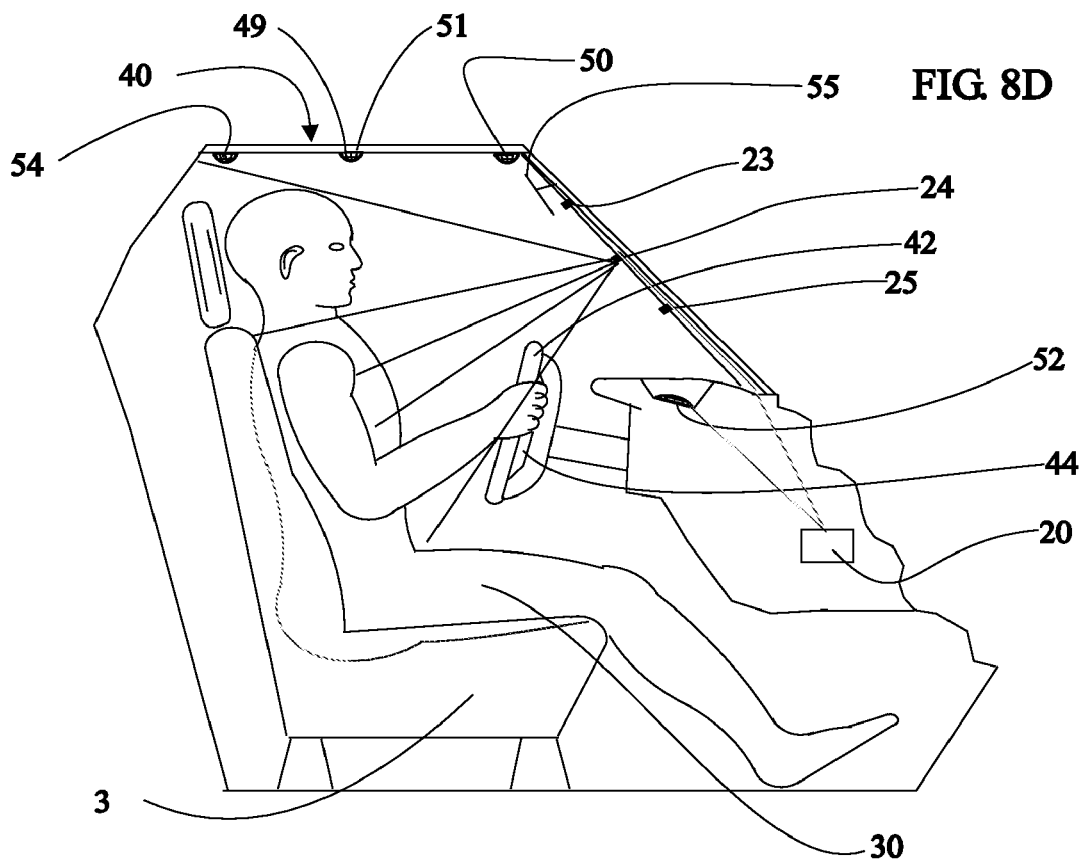
FIG. 8D is a view as in FIG. 8A illustrating the wave pattern from a pair of small CCD or CMOS array receivers and one infrared transmitter where the spacing of the CCD or CMOS arrays permits an accurate measurement of the distance to features on the occupant.
Figure 8E:
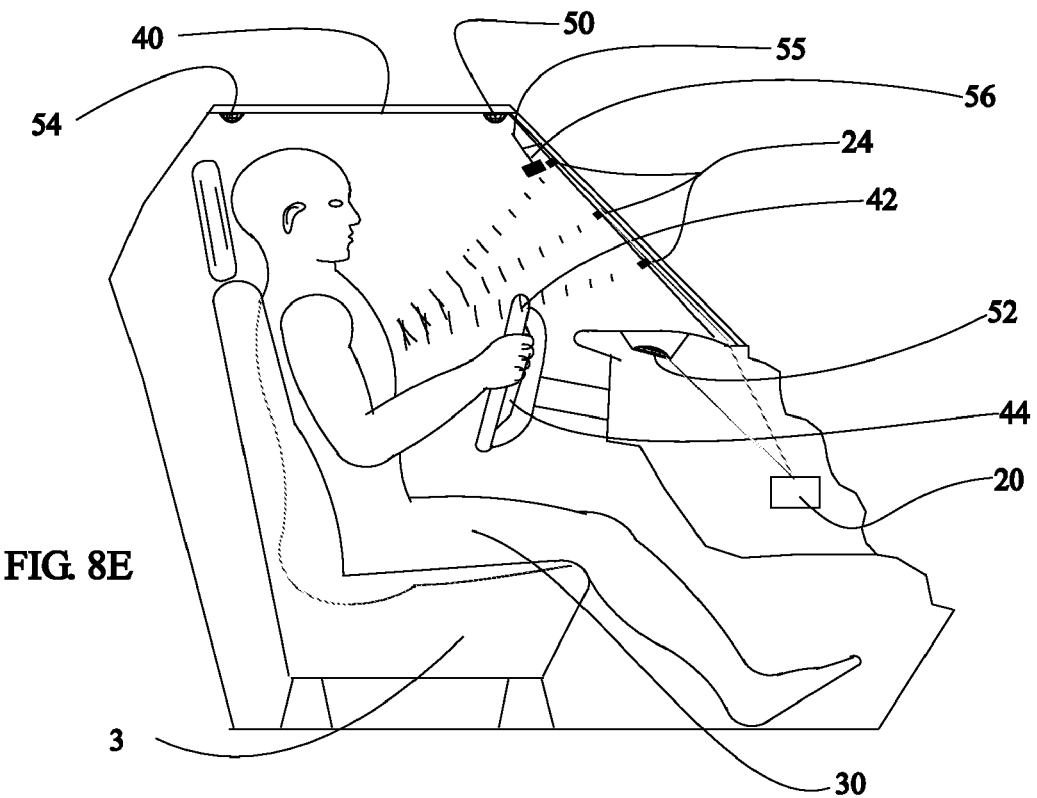
FIG. 8E is a view as in FIG. 8A illustrating the wave pattern from a set of ultrasonic transmitter/receivers where the spacing of the transducers and the phase of the signal permits an accurate focusing of the ultrasonic beam and thus the accurate measurement of a particular point on the surface of the driver.

An optical infrared transmitter and receiver assembly is shown generally at 52 in FIG. 8B and is mounted onto the instrument panel facing the windshield. Assembly 52 can either be recessed below the upper face of the instrument panel or mounted onto the upper face of the instrument panel. Assembly 52, shown enlarged, comprises a source of infrared radiation, or another form of electromagnetic radiation, and a CCD, CMOS or other appropriate arrays of typically 160 pixels by 160 pixels. In this embodiment, the windshield is used to reflect the illumination light provided by the infrared radiation toward the objects in the passenger compartment and also reflect the light being reflected back by the objects in the passenger compartment, in a manner similar to the "heads-up" display which is now being offered on several automobile models. The "heads-up" display, of course, is currently used only to display information to the driver and is not used to reflect light from the driver to a receiver. Once again, unless one of the distance measuring systems as described below is used, this system alone cannot be used to determine distances from the objects to the sensor. Its main purpose is object identification and monitoring. Depending on the application, separate systems can be used for the driver and for the passenger. In some cases, the cameras located in the instrument panel which receive light reflected off of the windshield can be co-located with multiple lenses whereby the respective lenses aimed at the driver and passenger seats respectively.

Assembly 52 is actually about two centimeters or less in diameter and is shown greatly enlarged in FIG. 8B. Also, the reflection area on the windshield is considerably smaller than illustrated and special provisions are made to assure that this area of the windshield is flat and reflective as is done generally when heads-up displays are used. For cases where there is some curvature in the windshield, it can be at least partially compensated for by the CCD optics.

Transducers 23-25 are illustrated mounted onto the A-pillar of the vehicle, however, since these transducers are quite small, typically less than 2 cm on a side, they could alternately be mounted onto the windshield itself, or other convenient location which provides a clear view of the portion of the passenger compartment being monitored. Other preferred mounting locations include the headliner above and also the side of the seat. Some imagers are now being made that are less than 1 cm on a side.

In the preferred implementation, as shown in FIGS. 8A-8E, four transducer assemblies are positioned around the seat to be monitored, each can comprise one or more LEDs with a diverging lenses and a CMOS array. Although illustrated together, the illuminating source in many cases will not be co-located with the receiving array. The LED emits a controlled angle, 120° for example, diverging cone of infrared radiation that illuminates the occupant from both sides and from the front and rear. This angle is not to be confused with the field angle used in ultrasonic systems. With ultrasound, extreme care is required to control the field of the ultrasonic waves so that they will not create multipath effects and add noise to the system. With infrared, there is no reason, in the implementation now being described, other than to make the most efficient use of the infrared energy, why the entire vehicle cannot be flooded with infrared energy either from many small sources or from a few bright ones.

The image from each array is used to capture two dimensions of occupant position information, thus, the array of assembly 50 positioned on the windshield header, which is approximately 25% of the way laterally across the headliner in front of the driver, provides a both vertical and transverse information on the location of the driver. A similar view from the rear is obtained from the array of assembly 54 positioned behind the driver on the roof of the vehicle and above the seatback potion of the seat 72. As such, assembly 54 also provides both vertical and transverse information on the location of the driver. Finally, arrays of assemblies 49 and 51 provide both vertical and longitudinal driver location information. Another preferred location is the headliner centered directly above the seat of interest. The position of the assemblies 49-52 and 54 may differ from that shown in the drawings. In the invention, in order that the information from two or more of the assemblies 49-52 and 54 may provide a three-dimensional image of the occupant, or portion of the passenger compartment, the assemblies generally should not be arranged side-by-side. A side-by-side arrangement as used in several prior art references discussed above, will provide two essentially identical views with the difference being a lateral shift. This does not enable a complete three-dimensional view of the occupant.

One important point concerns the location and number of optical assemblies. It is possible to use fewer than four such assemblies with a possible resulting loss in accuracy. The number of four was chosen so that either a forward or rear assembly or either of the side assemblies can be blocked by a newspaper, for example, without seriously degrading the performance of the system. Since drivers rarely are reading newspapers while driving, fewer than four arrays are usually adequate for the driver side. In fact, one is frequently sufficient. One camera is also usually sufficient for the passenger side if the goal of the system is classification only or if camera blockage is tolerated for occupant tracking.

The particular locations of the optical assemblies were chosen to give the most accurate information as to the locations of the occupant. This is based on an understanding of what information can be best obtained from a visual image. There is a natural tendency on the part of humans to try to gauge distance from the optical sensors directly. This, as can be seen above, is at best complicated involving focusing systems, stereographic systems, multiple arrays and triangulation, time of flight measurement, etc. What is not intuitive to humans is to not try to obtain this distance directly from apparatus or techniques associated with the mounting location. Whereas ultrasound is quite good for measuring distances from the transducer (the z-axis), optical systems are better at measuring distances in the vertical and lateral directions (the x and y-axes). Since the precise locations of the optical transducers are known, that is, the geometry of the transducer locations is known relative to the vehicle, there is no need to try to determine the displacement of an object of interest from the transducer (the z-axis) directly. This can more easily be done indirectly by another transducer. That is, the vehicle z-axis to one transducer is the camera x-axis to another.

Another preferred location of a transmitter/receiver 54 for use with airbags is attached to the steering wheel (see FIG. 5) and gives an accurate determination of the distance of the driver's chest from the airbag module. This implementation would generally be used with another device such as 50 at another location. Details about mounting a transmitter/receiver on a cover of an airbag module are set forth in the '881 application.

One problem of the system using a transmitter/receiver on an airbag cover as shown in FIG. 5 is that a driver may have inadvertently placed his hand over the transmitter/receiver 54, thus defeating the operation of the device. A second confirming transmitter/receiver 50 can therefore be placed at some other convenient position such as on the roof or headliner of the passenger compartment as shown in FIG. 5. This transmitter/receiver 50 operates in a manner similar to transmitter/receiver 54.

The applications described herein have been illustrated using the driver of the vehicle. The same systems of determining the position of the occupant relative to the airbag apply to the passenger, sometimes requiring minor modifications. Also of course, a similar system can be appropriately designed for other monitoring situations such as for cargo containers and truck trailers.

It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant position sensor, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries or a box, for example, which in some cargo container or truck trailer monitoring situations is desired. Finally, there has been much written about the out of position child who is standing or otherwise positioned adjacent to the airbag, perhaps due to pre-crash braking. The occupant position sensor described herein can prevent the deployment of the airbag in this situation.

3.1 Single Camera, Dual Camera with Single Light Source

Many automobile companies are opting to satisfy the requirements of FMVSS-208 by using a weight only system such as the bladder or strain gage systems disclosed here. Such a system provides an elementary measure of the weight of the occupying object but does not give a reliable indication of its position, at least for automotive vehicles. It can also be easily confused by any object that weighs 60 or more pounds and that is interpreted as an adult. Weight only systems are also static systems in that due to vehicle dynamics that frequently accompany a pre crash braking event they are unable to track the position of the occupant. The load from seatbelts can confuse the system and therefore a special additional sensor must be used to measure seatbelt tension. In some systems, the device must be calibrated for each vehicle and there is some concern as to whether this calibration will be proper for the life on the vehicle.

A single camera can frequently provide considerably more information than a weight only system without the disadvantages of weight sensors and do so at a similar cost. Such a single camera in its simplest installation can categorize the occupancy state of the vehicle and determine whether the airbag should be suppressed due to an empty seat or the presence of a child of a size that corresponds to one weighing less than 60 pounds. Of course, a single camera can also easily do considerably more by providing a static out-of-position indication and, with the incorporation of a faster processor, dynamic out-of-position determination can also be provided. Thus, especially with the costs of microprocessors continuing to drop, a single camera system can easily provide considerably more functionality than a weight only system and yet stay in the same price range.

A principal drawback of a single camera system is that it can be blocked by the hand of an occupant or by a newspaper, for example. This is a rare event since the preferred mounting location for the camera is typically high in the vehicle such as on the headliner. Also, it is considerably less likely that the occupant will always be reading a newspaper, for example, and if he or she is not reading it when the system is first started up, or at any other time during the trip, the camera system will still get an opportunity to see the occupant when he or she is not being blocked and make the proper categorization. The ability of the system to track the occupant will be impaired but the system can assume that the occupant has not moved toward the airbag while reading the newspaper and thus the initial position of the occupant can be retained and used for suppression determination. Finally, the fact that the camera is blocked can be determined and the driver made aware of this fact in much the same manner that a seatbelt light notifies the driver that the passenger is not wearing his or her seatbelt.

The accuracy of a single camera system can be above 99% which significantly exceeds the accuracy of weight only systems. Nevertheless, some automobile manufacturers desire even greater accuracy and therefore opt for the addition of a second camera. Such a camera is usually placed on the opposite side of the occupant as the first camera. The first camera may be placed on or near the dome light, for example, and the second camera can be on the headliner above the side door. A dual camera system such as this can operate more accurately in bright daylight situations where the window area needs to be ignored in the view of the camera that is mounted near the dome.

Sometimes, in a dual camera system, only a single light source is used. This provides a known shadow pattern for the second camera and helps to accentuate the edges of the occupying item rendering classification easier. Any of the forms of structured light can also be used and through these and other techniques the corresponding points in the two images can more easily be determined thus providing a three-dimensional model of the occupant or occupying object in the case of other vehicle types such as a cargo container or truck trailer.

As a result, the current assignee has developed a low cost single camera system which has been extensively tested for the most difficult problem of automobile occupant sensing but is nevertheless also applicable for monitoring of other vehicles such as cargo containers and truck trailers. The automotive occupant position sensor system uses a CMOS camera in conjunction with pattern recognition algorithms for the discrimination of out-of-position occupants and rear facing child safety seats. A single imager, located strategically within the occupant compartment, is coupled with an infrared LED that emits unfocused, wide-beam pulses toward the passenger volume. These pulses, which reflect off of objects in the passenger seat and are captured by the camera, contain information for classification and location determination in approximately 10 msec. The decision algorithm processes the returned information using a uniquely trained neural network, which may not be necessary in the simpler cargo container or truck trailer monitoring cases. The logic of the neural network was developed through extensive in-vehicle training with thousands of realistic occupant size and position scenarios. Although the optical occupant position sensor can be used in conjunction with other technologies (such as weight sensing, seat belt sensing, crash severity sensing, etc.), it is a stand-alone system meeting the requirements of FMVSS-208. This device will be discussed in detail below.

3.2 Location of the Transducers

Any of the transducers discussed herein such as an active pixel or other camera can be arranged in various locations in the vehicle including in a headliner, roof, ceiling, rear view mirror assembly, an A-pillar, a B-pillar and a C-pillar or a side wall or even a door in the case of a cargo container or truck trailer. Images of the front seat area or the rear seat area can be obtained by proper placement and orientation of the transducers such as cameras. The rear view mirror assembly can be a good location for a camera, particularly if it is attached to the portion of the mirror support that does not move when the occupant is adjusting the mirror. Cameras at this location can get a good view of the driver, passenger as well as the environment surrounding the vehicle and particularly in the front of the vehicle. It is an ideal location for automatic dimming headlight cameras.

4. Weight Measurement and Biometrics

One way to determine motion of the occupant(s) is to monitor the weight distribution of the occupant whereby changes in weight distribution after an accident would be highly suggestive of movement of the occupant. A system for determining the weight distribution of the occupants can be integrated or otherwise arranged in the seats 3 and 4 of the vehicle and several patents and publications describe such systems.

More generally, any sensor that determines the presence and health state of an occupant can also be integrated into the vehicle interior monitoring system in accordance with the inventions herein. For example, a sensitive motion sensor can determine whether an occupant is breathing and a chemical sensor, such as accomplished using SAW technology, can determine the amount of carbon dioxide, or the concentration of carbon dioxide, in the air in the vehicle, which can be correlated to the health state of the occupant(s). The motion sensor and chemical sensor can be designed to have a fixed operational field situated near the occupant. In the alternative, the motion sensor and chemical sensor can be adjustable and adapted to adjust their operational field in conjunction with a determination by an occupant position and location sensor that would determine the location of specific parts of the occupant's body such as his or her chest or mouth. Furthermore, an occupant position and location sensor can be used to determine the location of the occupant's eyes and determine whether the occupant is conscious, that is, whether his or her eyes are open or closed or moving.

Chemical sensors can also be used to detect whether there is blood present in the vehicle such as after an accident. Additionally, microphones can detect whether there is noise in the vehicle caused by groaning, yelling, etc., and transmit any such noise through the cellular or similar connection to a remote listening facility using a telematics communication system such as operated by OnStar™.

FIG. 2A shows a schematic diagram of an embodiment of the invention including a system for determining the presence and health state of any occupants of the vehicle and a telecommunications link. This embodiment includes means 150 for determining the presence of any occupants 151, which may take the form of a heartbeat sensor, chemical sensor or motion sensor as described above and means for determining the health state of any occupants 151. The latter means may be integrated into the means for determining the presence of any occupants using the same or different component. The presence determining means 150 may encompass a dedicated presence determination device associated with each seating location in the vehicle, or at least sufficient presence determination devices having the ability to determine the presence of an occupant at each seating location in the vehicle. Further, means for determining the location, and optionally velocity, of the occupants or one or more parts thereof 152 are provided and may be any conventional occupant position sensor or preferably, one of the occupant position sensors as described herein such as those utilizing waves such as electromagnetic radiation or fields such as capacitance sensors or as described in the current assignee's patents and patent applications referenced above as well as herein.

A processor 153 is coupled to the presence determining means 150, the health state determining means 151 and the location determining means 152. A communications unit 154 is coupled to the processor 153. The processor 153 and/or communications unit 154 can also be coupled to microphones 158 that can be distributed throughout the vehicle passenger compartment and include voice-processing circuitry to enable the occupant(s) to effect vocal control of the processor 153, communications unit 154 or any coupled component or oral communications via the communications unit 154. The processor 153 is also coupled to another vehicular system, component or subsystem 155 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 156, such as a GPS or differential GPS system, could be coupled to the processor 153 and provides an indication of the absolute position of the vehicle.

Pressure or weight sensors 7, 76 and 97 are also included in the system shown in FIGS. 6 and 6A. Although strain gage-type sensors are schematically illustrated mounted to the supporting structure of the seat portion 4, and a bladder pressure sensor mounted in the seat portion 4, any other type of pressure or weight sensor can be used including mat or butt spring sensors. Strain gage sensors are described in detail in U.S. Ser. No. 06/242,701 as well as herein. Weight can be used to confirm the occupancy of the seat, i.e., the presence or absence of an occupant as well as whether the seat is occupied by a light or heavy object. In the latter case, a measured weight of less than 60 pounds is often determinative of the presence of a child seat whereas a measured weight of greater than 60 pounds is often indicative of the absence of a child seat. The weight sensors 7 can also be used to determine the weight distribution of the occupant of the seat and thereby ascertain whether the occupant is moving and the position of the occupant. As such, the weight sensors 7 could be used to confirm the position and motion of the occupant. The measured pressure or weight or distribution thereof can also be used in combination with the data from the transmitter/receiver assemblies 49, 50, 51, 52 and 54 of FIG. 8C to provide an identification of the occupants in the seat.

As discussed below, weight can be measured both statically and dynamically. Static weight measurements require that the pressure or strain gage system be accurately calibrated and care must be taken to compensate for the effects of seatbelt load, aging, unwanted stresses in the mounting structures, temperature etc. Dynamic measurements, on the other hand, can be used to measure the mass of an object on the seat, the presence of a seatbelt load and can be made insensitive to unwanted static stresses in the supporting members and to aging of the seat and its structure. In the simplest implementation, the natural frequency of seat is determined due to the random vibrations or accelerations that are input to the seat from the vehicle suspension system. In more sophisticated embodiments, an accelerometer and/or seatbelt tension sensor is also used to more accurately determine the forces acting on the occupant. In another embodiment, a vibrator can be used in conjunction with the seat to excite the seat occupying item either on a total basis or on a local basis using PVDF film as an exciter and a determination of the contact pattern of the occupant with the seat determined by the local response to the PVDF film. This latter method using the PVDF film or equivalent is closer to a pattern determination rather than a true weight measurement.

Although many weight sensing systems are described herein, at least one of the inventions disclosed herein is, among other things, directed to the use of weight in any manner to determine the occupancy of a vehicle. Prior art mat sensors determined the occupancy through the butt print of the occupying item rather than actually measuring its weight. In an even more general sense, at least one of the inventions disclosed herein is the use of any biometric measurement to determine vehicle occupancy.

As to the latter issue, when an occupant or object is strapped into the seat using a seatbelt, it can cause an artificial load on a bladder-type weight sensor and/or strain gage-type weight sensors when the seatbelt anchorage points are not on the seat. The effects of seatbelt load can be separated from the effects of object or occupant weight, as disclosed in U.S. Ser.

No. 06/242,701, if the time-varying signals are considered rather than merely using averaging to obtain the static load. If a vehicle-mounted vertical accelerometer is present, then the forcing function on the seat caused by road roughness, steering maneuvers, and the vehicle suspension system can be compared with the response of the seat as measured by the bladder or strain gage pressure or weight sensors. Through mathematical analysis, the magnitude of the bladder pressure or strain caused by seat belt loads can be separated from pressure and strain caused by occupant or object mass. Also, since animated objects such as people cannot sit still indefinitely, such occupants can be distinguished from inanimate objects by similarly observing the change in pressure and strain distribution over time.

A serious problem that has plagued researchers attempting to adapt strain gage technology to seat weight sensing arises from fact that a typical automobile seat is an over-determined structure containing indeterminate stresses and strains in the supporting structure. This arises from a variety of causes such as the connection between the seat structure and the slide mechanisms below the seat or between the slide mechanisms and the floor which induces twisting and bending moments in the seat structural members. Similarly, since most seats have four attachment points and since only three points are necessary to determine a plane, there can be an unexpected distribution of compression and tensile stresses in the support structure. To complicate the situation, these indeterminable stresses and strains can vary as a function of seat position and temperature. The combination of all of these effects produces a significant error in the calculation of the weight of an occupying item and the distribution of this weight.

This problem can be solved by looking at changes in pressure and strain readings in addition to the absolute values. The dynamic response of an occupied seat is a function of the mass of the occupying item. As the car travels down the road, a forcing function is provided to the seat which can be measured by the vertical acceleration component and other acceleration components. This provides a method of measuring the response of the seat as well as the forcing function and thereby determining the mass of occupying item.

For example, when an occupant first enters the vehicle and sits on a seat, the change in pressure and/or strain measurements will provide an accurate measurement of the occupant's weight. This accuracy deteriorates as soon as the occupant attaches a seatbelt and/or moves the seat to a new position. Nevertheless, the change in occupancy of the seat is a significant event that can be easily detected and if the change in pressure and strain measurements are used as the measurement of the occupant weight, then the weight can be accurately determined. Similarly, the sequence of events for attaching a child seat to a vehicle is one that can be easily discerned since the seat is first placed into the vehicle and the seat belt cinched followed by placing the child in the seat or, alternately, the child and seat are placed in the vehicle followed by a cinching of the seatbelt. Either of these event sequences gives a high probability of the occupancy being a child in a child seat. This decision can be confirmed by dynamical measurements as described above.

A control system for controlling a component of the vehicle based on occupancy of the seat in accordance with the invention may comprise a plurality of strain gages, or bladder chambers, mounted in connection with the seat, each measuring strain or pressure of a respective location caused by occupancy of the seat, and a processor coupled to the strain or pressure gages and arranged to determine the weight of an occupying item based on the strain or pressure measurements from the strain or pressure gages over a period of time, i.e., dynamic measurements. The processor controls the vehicle component based at least in part on the determined weight of the occupying item of the seat. The processor can also determine motion of the occupying item of the seat based on the strain or pressure measurements from the strain or pressure gages over the period of time. One or more accelerometers may be mounted on the vehicle for measuring acceleration in which case, the processor may control the component based at least in part on the determined weight of the occupying item of the seat and the acceleration measured by the accelerometer(s). (See the discussion below in reference to FIG. 17.)

By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, or bladder sensors, a characterization can be made of the occupancy of the seat. Not only can the weight of an object occupying the seat be determined, but also the gross motion of such an object can be ascertained and thereby an assessment can be made as to whether the object is a life form such as a human being and whether the seatbelt is engaged. Strain gage weight sensors are disclosed, for example, in U.S. Ser. No. 06/242,701. In particular, the inventor contemplates the combination of all of the ideas expressed in the '701 patent with those expressed in the current invention.

Thus, the combination of the outputs from these accelerometer sensors and the output of strain gage or bladder weight sensors in a vehicle seat, or in or on a support structure of the seat, can be used to make an accurate assessment of the occupancy of the seat and differentiate between animate and inanimate occupants as well as determining where in the seat the occupants are sitting and whether the seatbelt is engaged. This can be done by observing the acceleration signals from the sensors of FIG. 17 and simultaneously the dynamic strain gage measurements from seat-mounted strain or pressure gages or pressure measurements of bladder weight sensors. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being and whether a seatbelt is used and if so how tightly it is cinched.

Both strain gage and bladder weight sensors will be considered in detail below. There are of course several ways to process the acceleration signal and the stain or pressure signal or any other weight measuring apparatus. In general, the dynamic load applied to the seat is measured or a forcing function of the seat is measured, as a function of the acceleration signal. This represents the effect of the movement of the vehicle on the occupant which is reflected in the measurement of weight by the strain or pressure gages. Thus, the measurement obtained by the strain or pressure gages can be considered to have two components, one component resulting from the weight applied by the occupant in a stationary state of the vehicle and the other arising or resulting from the movement of the vehicle. The vehicle-movement component can be separated from the total strain or pressure gage measurement to provide a more accurate indication of the weight of the occupant.

To provide a feeling for the implementation of at least one of the inventions disclosed herein, consider the following approximate analysis.

To begin with, the seatbelt can be represented as a one-way spring in that the force is high for upward motion and low for downward motion. This however introduces non-linearity into the analysis making an exact solution difficult. Therefore for the purposes of this simplified analysis, an assumption is made that the force from the seatbelt is the same in both directions. Although the stiffness of the seat will vary significantly from vehicle to vehicle, assume here that it is about 30 kg per cm. Also assume that the input from the road is 1 Hz with a magnitude of 10 cm for the vertical motion of the vehicle wheels (axle) on the road. The motion of the seat will be much less due to the vehicle suspension system.

The problem is to find is the weight of an occupant from the response of the seat (as measured by strain or pressure gages) to the road displacement acting through the vehicle suspension. The intent here is only to show that it is possible to determine the weight of the occupant and the use of a seatbelt by measuring the dynamic strain or pressure due to the seat motion as a function of the weight of the occupant and the seatbelt force. The functions and equations used below and the solution to them can be implemented in a processor.

Figure 6B:
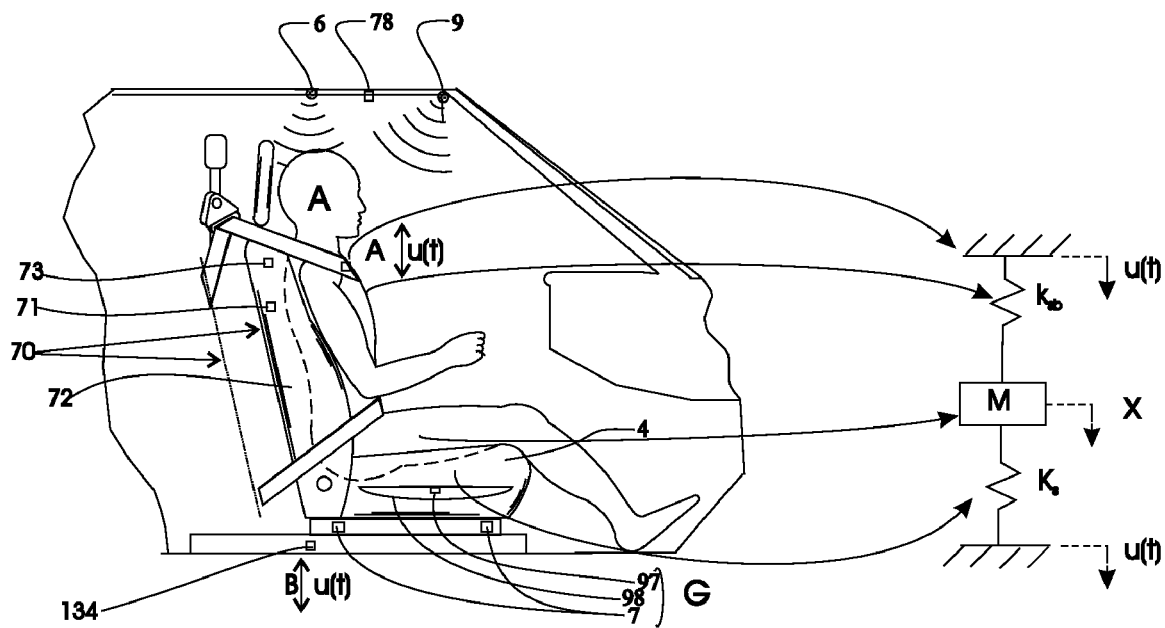
FIG. 6B is a schematic showing the manner in which dynamic forces of the vehicle can be compensated for in a weight measurement of the occupant.

Looking now at FIG. 6B, suppose that point A (the point where a seatbelt is fixed to the seat) and point B are subjected to harmonic displacements $u(t)=U_0 \cos \omega$ caused by a car's vertical movements on the road. As a result, springs modeling a seat and a seatbelt (their corresponding stiffness are $k_s$ and $k_{sb}$) affect a passenger mass m with forces $-k_{sb}(u-x)$ and $k_s(u-x)$. (Minus in the first force is taken because the seatbelt spring contracts when the seat spring stretches and vice versa). Under the action forces, the mass gets accelerated $d^2x/dt^2$, so the initial equation to be solved will be $$m\frac{d^2x}{dt^2} = -k_{sb}(u-x) + k_s(u-x). \tag{1}$$

This equation can be rewritten in the form $$m\frac{d^2x}{dt^2} + (k_s - k_{sb})x = u(t)(k_s - k_{sb}). \tag{2}$$

or $$m\frac{d^2x}{dt^2} + (k_s - k_{sb})x = U_0(k_s - k_{sb})\cos\omega t \tag{3}$$

This is a differential equation of a harmonic oscillator under action of a harmonic external force $f(t)=U_0(t)(k_s-k_{sb}) \cos \omega t$. If there is no seatbelt ($k_{sb}=0$), the solution of this equation in the case of a harmonic external force $f(t)=F_0 \cos \omega t$ is well known [Strelkov S. P. *Introduction in the theory of oscillations*, Moscow, "Nauka", 1964, p. 56]:

$$x(t) = \frac{U_0}{\left(1 - \frac{\omega^2}{\omega_0^2}\right)}\cos\omega t + C_1\cos\omega_0 t + C_2\sin\omega_0 t, \tag{4}$$

where the oscillator natural frequency.

$$\omega_0 = \sqrt{\frac{k_s}{m}}. \tag{5}$$

The second and third terms in equation (4) describe natural oscillations of the oscillator, which decay if there is any, even very small, friction in the system. Having assumed such small friction to be present, for steady forced oscillation, the equation is thus:

$$x(t) = \frac{U_0}{1 - \frac{\omega^2}{\omega_0^2}}\cos\omega t. \tag{6}$$

Thus, in steady mode the system oscillates with the external force frequency ω. Now, it is possible to calculate acceleration of the mass:

$$\frac{d^2x}{dt^2} = -\frac{\omega^2 U_0}{1 - \frac{\omega^2}{\omega_0^2}}\cos\omega t, \tag{7}$$

and the amplitude of the force acting in the system $$F_m = \left|m\frac{d^2x}{dt^2}\right| = \left|-\frac{m\omega^2 U_0}{1 - \frac{\omega^2}{\omega_0^2}}\right|. \tag{8}$$

In the situation where a seatbelt is present, it is not possible to use the same formulae because the seatbelt stiffness is always greater than stiffness of a seat, and $(k_s-k_{sb})<0$. Therefore, instead of equation (3) we should consider the equation $$\frac{d^2x}{dt^2} - \omega_0^2 x = -\omega_0^2 U_0 \cos\omega t, \tag{9}$$

where $\omega_0^2=|k_s-k_{sb}|/m>0$. Following the same procedure (Strelkov S. P., ibid.), one can find a particular solution of inhomogeneous equation (9):

$$x(t) = \frac{U_0}{1 + \frac{\omega^2}{\omega_0^2}}\cos\omega t. \tag{10}$$

Then its general solution will be [as per Korn G. A., Korn T. M. *Mathematical handbook for scientists and engineers*. Russian translation: Moscow, "Nauka", 1970, pp. 268-270]:

$$x(t) = \frac{U_0}{\left(1 + \frac{\omega^2}{\omega_0^2}\right)}\cos\omega t + C_1\cos\omega_0 t + C_2\sin\omega_0 t. \tag{11}$$

Thus, in a steady mode, the amplitude of the acting force is:

$$F_m = \left|-\frac{m\omega^2 U_0}{1 + \frac{\omega^2}{\omega_0^2}}\right|, \tag{12}$$

and the natural frequency of the system is:

$$\omega_0 = \sqrt{\frac{|k_s - k_{sb}|}{m}}. \tag{13}$$

Using the formulae (5), (8) (the "no seatbelt case"), (12) and (13) (the "seatbelt present case"), a table can be created as shown below. In the table, $P_m$ denotes amplitude of pressure acting on the seat surface. The initial data used in calculations are as follows:

$k_s$=30 Kg/cm=3×10$^4$ N/m (the seat stiffness);
$k_{sb}$=600 N/0.3 cm=2×10$^5$ N/m (the seatbelt stiffness);
$U_0$=0.1 m (the acting displacement amplitude);
f=1 Hz (the acting frequency).
S=0.05 m$^2$ (the seat surface square that the passenger acting upon).

Naturally, where the frequency f=$\omega/2\pi$, $f_0$ is natural frequency of the system. Columns "No seatbelt" is calculated when $k_{sb}$=0.

| The passenger mass, kg | No seatbelt | | | There is a seatbelt | | |
|---|---|---|---|---|---|---|
| | $f_0$, Hz | $F_m$, N | $p_m$, Pa | $f_0$, Hz | $F_m$, N | $p_m$, Pa |
| 20 | 6.2 | 81.1 | 1.62 × 10$^3$ | 14.7 | 78.6 | 1.57 × 10$^3$ |
| 40 | 4.4 | 166.7 | 3.33 × 10$^3$ | 10.4 | 156.5 | 3.13 × 10$^3$ |
| 60 | 3.6 | 257.2 | 5.14 × 10$^3$ | 8.5 | 233.6 | 4.67 × 10$^3$ |
| 100 | 2.8 | 454.6 | 9.09 × 10$^3$ | 6.6 | 385.8 | 7.72 × 10$^3$ |

From the above table, it can be seen that there is a different combination of seat structure force (as can be measured by strain gages), or pressure (as can be measured by a bladder and pressure sensor) and natural frequency for each combination of occupant weight and seatbelt use. Indeed, it can easily be seen that use of a seatbelt significantly affects the weight measurement of the weight sensors. By using the acceleration data, e.g., a forcing function, it is possible to eliminate the effect of the seatbelt and the road on the weight measurement. Thus, by observing the response of the seat plus occupant and knowing the input from the road, an estimate of the occupant weight and seatbelt use can be made without even knowing the static forces or pressures in the strain or pressure gages. By considering the dynamic response of the seat to road-induced input vibrations, the occupant weight and seatbelt use can be determined.

In an actual implementation, the above problem can be solved more accurately by using a pattern recognition system that compares the pattern of the seat plus occupant response (pressure or strain gage readings) to the pattern of input accelerations. This can be done through the training of a neural network, modular neural network or other trainable pattern recognition system. Many other mathematical techniques can be used to solve this problem including various simulation methods where the coefficients of dynamical equations are estimated from the response of the seat and occupant to the input acceleration. Thus, although the preferred implementation of the present invention is to use neural networks to solve this problem, the invention is not limited thereby.

4.1 Strain Gage Weight Sensors

Figure 18C:
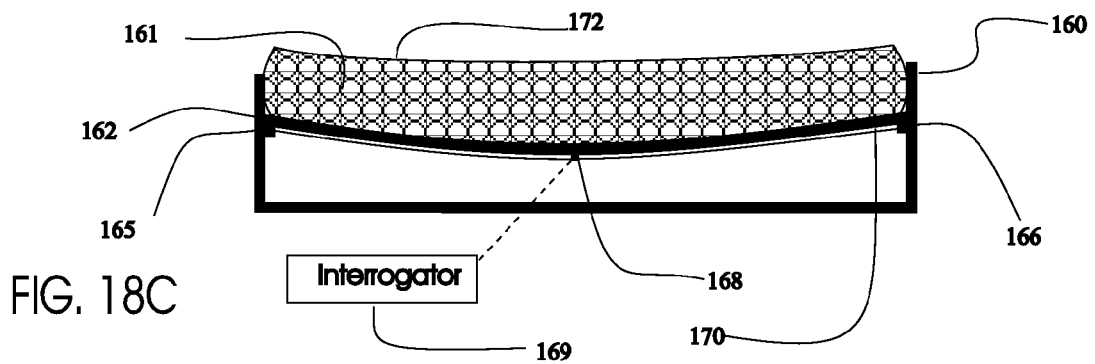
FIG. 18C is a view of another embodiment of a seat with a weight sensor similar to the view shown in FIG. 18A.

Referring now to FIG. 18A, which is a view of the apparatus of FIG. 18 taken along line 18A-18A, seat 160 is constructed from a cushion or foam layer 161 which is supported by a spring system 162 which is in contact and/or association with the displacement sensor 163. As shown, displacement sensor 163 is underneath the spring system 162 but this relative positioning is not a required feature of the invention. The displacement sensor 163 comprises an elongate cable 164 retained at one end by support 165 and a displacement sensor 166 situated at an opposite end. This displacement sensor 166 can be any of a variety of such devices including, but not limited to, a linear rheostat, a linear variable differential transformer (LVDT), a linear variable capacitor, or any other length measuring device. Alternately, as shown in FIG. 18C, the cable can be replaced with one or more springs 167 retained between supports 165 and the tension in the spring(s) 167 measured using a strain gage (conventional wire, foil, silicon or a SAW strain gage) or other force measuring device 168 or the strain in the seat support structure can be measured by appropriately placing strain gages on one or more of the seat supports as described in more detail below. The strain gage or other force measuring device could be arranged in association with the spring system 162 and could measure the deflection of the bottom surface of the cushion or foam layer 161.

When a SAW strain gage 168 is used as part of weight sensor 163, an interrogator 169 could be placed on the vehicle to enable wireless communication and/or power transfer to the SAW strain gage 168. As such, when it is desired to obtain the force being applied by the occupying item on the seat, the interrogator 169 sends a radio signal to the SAW strain gage causing it to transmit a return signal with the measured strain of the spring 170. Interrogator 169 is coupled to the processor used to determine the control of the vehicle component.

Figure 18D:
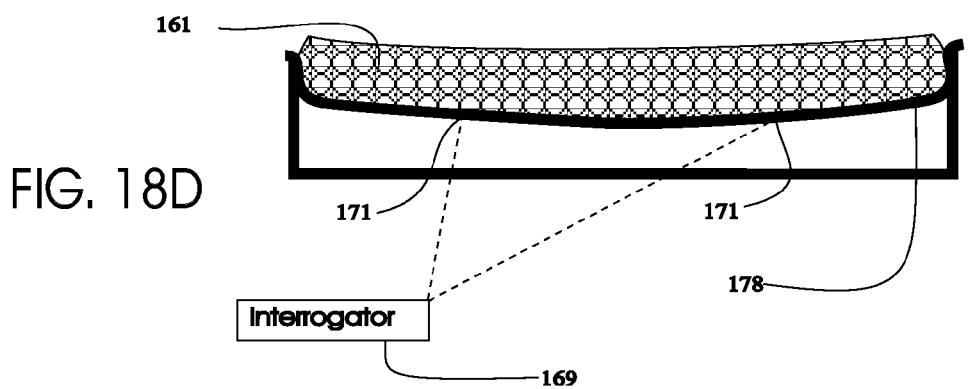
FIG. 18D is a view of another embodiment of a seat with a weight sensor in which a SAW strain gage is placed on the bottom surface of the cushion.

As shown in FIG. 18D, one or more SAW strain gages 171 could also be placed on the bottom surface or support pan 178 of the cushion or foam layer 161 in order to measure the deflection of the bottom surface which is representative of the weight of the occupying item on the seat or the pressure applied by the occupying item to the seat. An interrogator 169 could also be used in this embodiment.

One seat design is illustrated in FIG. 18. Similar weight measurement systems can be designed for other seat designs. Also, some products are available which can approximately measure weight based on pressure measurements made at or near the upper seat surface 172. It should be noted that the weight measured here will not be the entire weight of the occupant since some of the occupant's weight will be supported by his or her feet which are resting on the floor or pedals. As noted above, the weight may also be measured by the weight sensor(s) 7, 76 and 97 described above in the seated-state detecting unit.

As weight is placed on (pressure applied to) the seat surface 172, it is supported by spring system 162 which deflects downward causing cable 164 of the sensor 163 to begin to stretch axially. Using a LVDT as an example of length measuring device 166, the cable 164 pulls on rod 173 tending to remove rod 173 from cylinder 174 (FIG. 18B). The movement of rod 173 out of cylinder 174 is resisted by a spring 175 which returns the rod 173 into the cylinder 174 when the weight is removed from the seat surface 172. The amount which the rod 173 is removed from the cylinder 174 is measured by the amount of coupling between the windings 176 and 177 of the transformer as is well understood by those skilled in the art. LVDT's are commercially available devices. In this matter, the deflection of the seat can be measured which is a measurement of the weight on the seat, i.e., the pressure applied by an occupying item to the seat surface. The exact relationship between weight and LVDT output is generally determined experimentally for this application.

SAW strain gages could also be used to determine the downward deflection of the spring system 162 and the deflection of the cable 164.

By use of a combination of weight and height, the driver of the vehicle can in general be positively identified among the class of drivers who operate the vehicle. Thus, when a particular driver first uses the vehicle, the seat will be automatically adjusted to the proper position. If the driver changes that position within a prescribed time period, the new seat position can be stored in the second table for the particular driver's height and weight. When the driver reenters the vehicle and his or her height and weight are again measured, the seat will go to the location specified in the second table if one exists. Otherwise, the location specified in the first table will be used. Naturally other methods having similar end results can be used.

Figure 19:
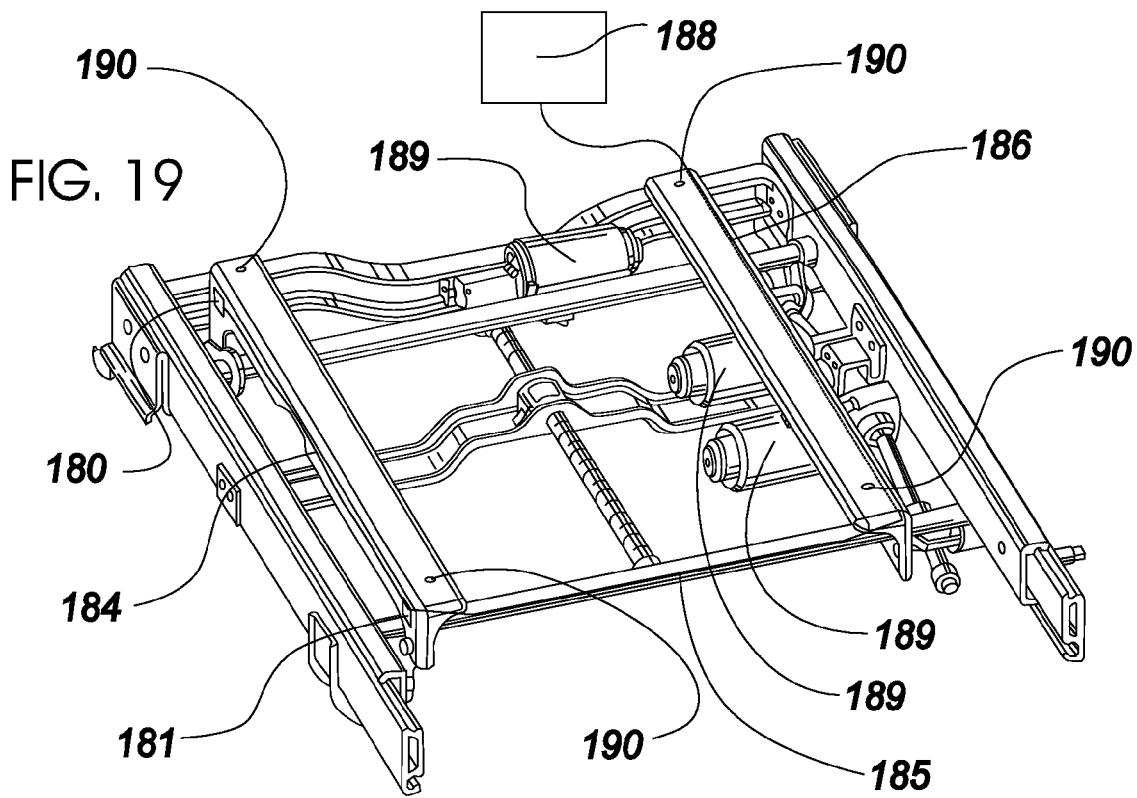
FIG. 19 is a perspective view of a one embodiment of an apparatus for measuring the weight of an occupying item of a seat illustrating weight sensing transducers mounted on a seat control mechanism portion which is attached directly to the seat.

In a first embodiment of a weight measuring apparatus shown in FIG. 19, four strain gage weight sensors or transducers are used, two being illustrated at 180 and 181 on one side of a bracket of the support structure of the seat and the other two being at the same locations on another bracket of the support (i.e., hidden on the corresponding locations on the other side of the support). The support structure of the seat supports the seat on a substrate such as a floor pan of the vehicle. Each of the strain gage transducers 180, 181 also can contain electronic signal conditioning apparatus, e.g., amplifiers, analog to digital converters, filters etc., which is associated such that output from the transducers is a digital signal. Such signal conditioning apparatus can also eliminate residual stresses in the transducer readings that may be present from the manufacturing, assembly or mounting processes or due to seat motion or temperature. The electronic signal travels from transducer 180 to transducer 181 through a wire 184. Similarly, wire 185 transmits the output from transducers 180 and 181 to the next transducer in the sequence (one of the hidden transducers). Additionally, wire 186 carries the output from these three transducers toward the fourth transducer (the other hidden transducer) and wire 187 finally carries all four digital signals to an electronic control system or module 188. These signals from the transducers 180, 181 are time, code or frequency division multiplexed as is well known in the art. The seat position is controlled by motors 189 as described in detail in U.S. Ser. No. 05/179,576. Finally, the seat is bolted onto the support structure through bolts not shown which attach the seat through holes 190 in the brackets.

By placing the signal conditioning electronics, analog to digital converters, and other appropriate electronic circuitry adjacent the strain gage element, the four transducers can be daisy chained or otherwise attach together and only a single wire is required to connect all of the transducers to the control module 188 as well as provide the power to run the transducers and their associated electronics.

The control system 188, e.g., a microprocessor, is arranged to receive the digital signals from the transducers 180,181 and determine the weight of the occupying item of the seat based thereon. In other words, the signals from the transducers 180,181 are processed by the control system 188 to provide an indication of the weight of the occupying item of the seat, i.e., the pressure or force exerted by the occupying item on the seat support structure.

Figure 20:
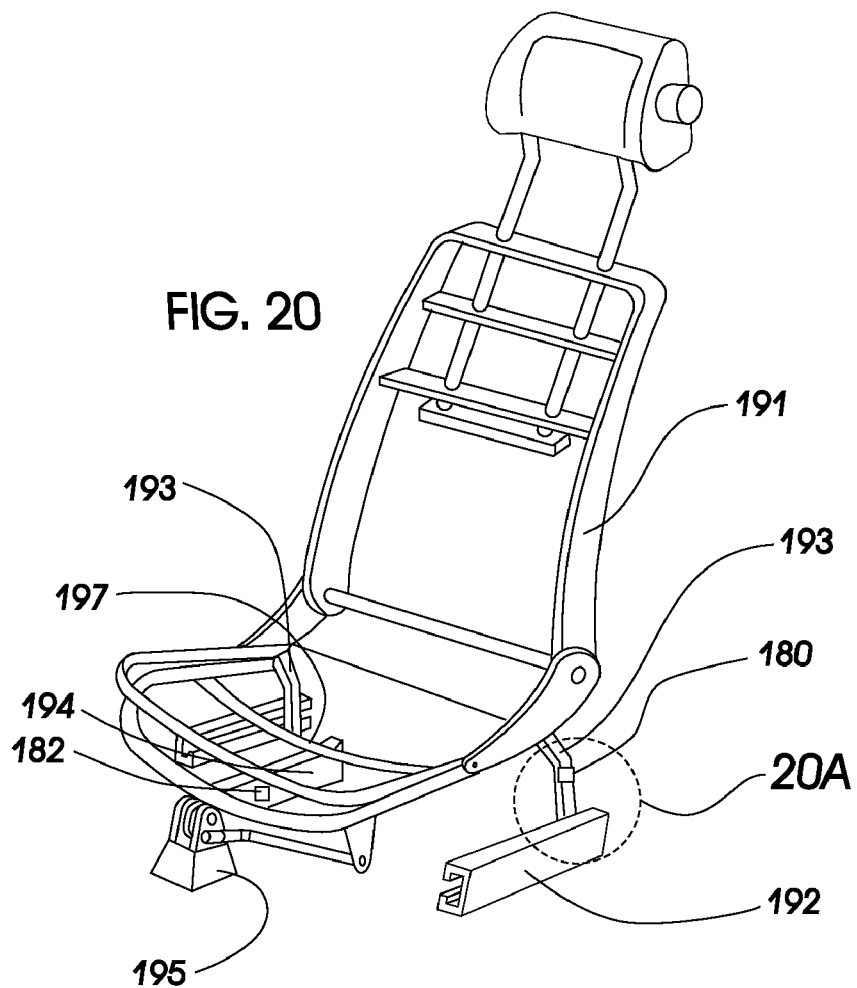
FIG. 20 illustrates a seat structure with the seat cushion and back cushion removed illustrating a three-slide attachment of the seat to the vehicle and preferred mounting locations on the seat structure for strain measuring weight sensors of an apparatus for measuring the weight of an occupying item of a seat in accordance with the invention.

A typical manually controlled seat structure is illustrated in FIG. 20 and described in greater detail in U.S. Ser. No. 04/285,545. The seat 191 (only the frame of which is shown) is attached to a pair of slide mechanisms 192 in the rear thereof through support members such as rectangular tubular structures 193 angled between the seat 191 and the slide mechanisms 192. The front of the seat 191 is attached to the vehicle (more particularly to the floor pan) through another support member such as a slide member 194, which is engaged with a housing 195. Slide mechanisms 192, support members 193, slide member 194 and housing 195 constitute the support structure for mounting the seat on a substrate, i.e., the floor pan. Strain gage transducers are located for this implementation at 180 and 182, strain gage transducer 180 being mounted on each tubular structure 193 (only one of such strain gage is shown) and strain gage transducer 182 being mounted on slide member 194.

When an occupying item is situated on the seat cushion (not shown), each of the support members 193 and 194 are deformed or strained. This strain is measured by transducers 180 and 182, respectively, to enable a determination of the weight of the item occupying the seat, as can be understood by those skilled in the strain gage art. More specifically, a control system or module or other compatible processing unit (not shown) is coupled to the strain gage transducers 180, 182, e.g., via electrical wires (not shown), to receive the measured strain and utilize the measured strain to determine the weight of the occupying item of the seat or the pressure applied by the occupying item to the seat. The determined weight, or the raw measured strain, may be used to control a vehicular component such as the airbag.

Support members 193 are substantially vertically oriented and are preferably made of a sufficiently rigid, non-bending component.

Figure 20A:
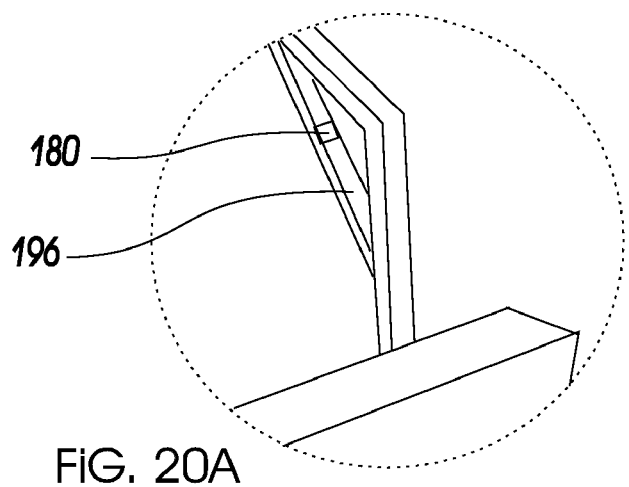
FIG. 20A illustrates an alternate view of the seat structure transducer mounting location taken in the circle 20A of FIG. 20 with the addition of a gusset and where the strain gage is mounted onto the gusset.

FIG. 20A illustrates an alternate arrangement for the seat support structures wherein a gusset 196 has been added to bridge the angle on the support member 193. Strain gage transducer 180 is placed on this gusset 196. Since the gusset 196 is not a supporting member, it can be made considerably thinner than the seat support member 193. As the seat is loaded by an occupying item, the seat support member 193 will bend. Since the gusset 196 is relatively weak, greater strain will occur in the gusset 196 than in the support member 193. The existence of this greater strain permits more efficient use of the strain gage dynamic range thus improving the accuracy of the weight measurement.

Figure 20B:
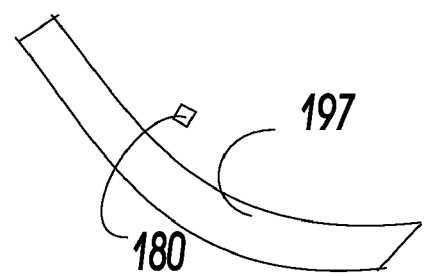
FIG. 20B illustrates a mounting location for a weight sensing transducer on a centralized transverse support member in an apparatus for measuring the weight of an occupying item of a seat in accordance with the invention.

FIG. 20B illustrates a seat transverse support member 197 of the seat shown in FIG. 20, which is situated below the base cushion and extends between opposed lateral sides of the seat. This support member 197 will be directly loaded by the vehicle seat and thus will provide an average measurement of the force exerted or weight of the occupying item. The deflection or strain in support member 197 is measured by a strain gage transducer 180 mounted on the support member 197 for this purpose. In some applications, the support member 197 will occupy the entire space fore and aft below the seat cushion. Here it is shown as a relatively narrow member. The strain gage transducer 180 is coupled, e.g., via an electrical wire (not shown), to a control module or other processing unit (not shown) which utilizes the measured strain to determine the weight of the occupying item of the seat.

Figures 21A, 21B, 21C:
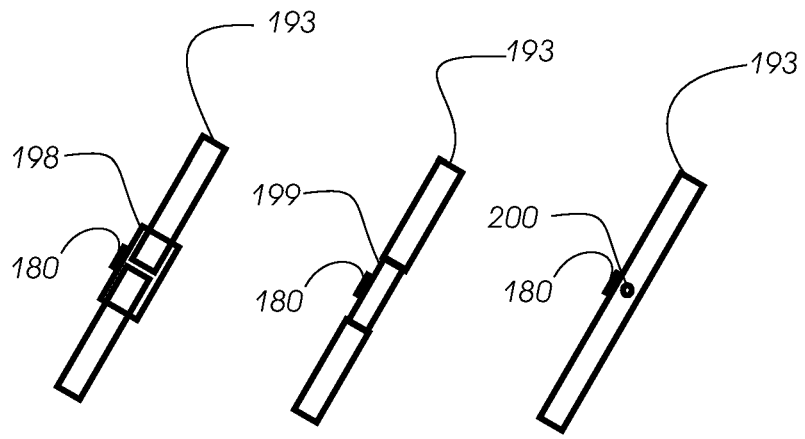
FIGS. 21A, 21B and 21C illustrate three alternate methods of mounting strain transducers of an apparatus for measuring the weight of an occupying item of a seat in accordance with the invention onto a tubular seat support structural member.

In FIG. 20, the support members 193 are shown as rectangular tubes having an end connected to the seat 191 and an opposite end connected to the slide mechanisms 192. In the constructions shown in FIGS. 21A-21C, the rectangular tubular structure has been replaced by a circular tube where only the lower portion of the support is illustrated. FIGS. 21A-21C show three alternate ways of improving the accuracy of the strain gage system, i.e., the accuracy of the measurements of strain by the strain gage transducers. Generally, a reduction in the stiffness of the support member to which the strain gage transducer is mounted will concentrate the force and thereby improve the strain measurement. There are several means disclosed below to reduce the stiffness of the support member. These means are not exclusive and other ways to reduce the stiffness of the support member are included in the invention and the interpretation of the claims.

In each illustrated embodiment, the transducer is represented by 180 and the substantially vertically oriented support member corresponding to support member 193 in FIG. 20 has been labeled 193A. In FIG. 21A, the tube support member 193A has been cut to thereby form two separate tubes having longitudinally opposed ends and an additional tube section 198 is connected, e.g., by welding, to end portions of the two tubes. In this manner, a more accurate tube section 198 can be used to permit a more accurate measurement of the strain by transducer 180, which is mounted on tube section 198.

In FIG. 21B, a small circumferential cut has been made in tube support member 193A so that a region having a smaller circumference than a remaining portion of the tube support member 193A is formed. This cut is used to control the diameter of the tube support member 193A at the location where strain gage transducer 180 is measuring the strain. In other words, the strain gage transducer 180 is placed at a portion wherein the diameter thereof is less than the diameter of remaining portions of the tube support member 193A. The purpose of this cut is to correct for manufacturing variations in the diameter of the tube support member 193A. The magnitude of the cut is selected so as to not significantly weaken the structural member but instead to control the diameter tolerance on the tube so that the strain from one vehicle to another will be the same for a particular loading of the seat.

In FIG. 21C, a small hole 200 is made in the tube support member 193A adjacent the transducer 180 to compensate for manufacturing tolerances on the tube support member 193A.

From this discussion, it can be seen that all three techniques have as their primary purpose to increase the accuracy of the strain in the support member corresponding to weight on the vehicle seat. The preferred approach would be to control the manufacturing tolerances on the support structure tubing so that the variation from vehicle to vehicle is minimized. For some applications where accurate measurements of weight are desired, the seat structure will be designed to optimize the ability to measure the strain in the support members and thereby to optimize the measurement of the weight of the occupying item. The inventions disclosed herein, therefore, are intended to cover the entire seat when the design of the seat is such as to be optimized for the purpose of strain gage weight sensing and alternately for the seat structure when it is so optimized.

Figure 22:
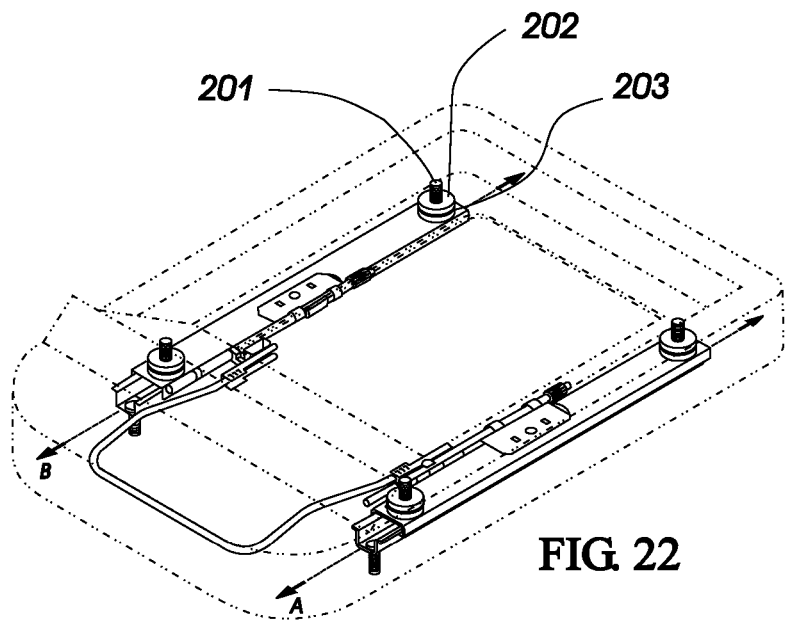
FIG. 22 illustrates an alternate weight sensing transducer utilizing pressure sensitive transducers.

Although strain measurement devices have been discussed above, pressure measurement systems can also be used in the seat support structure to measure the weight on the seat. Such a system is illustrated in FIG. 22. A general description of the operation of this apparatus is disclosed in U.S. Ser. No. 05/785,291. In that patent, the vehicle seat is attached to the slide mechanism by means of bolts 201. Between the seat and the slide mechanism, a shock-absorbing washer has been used for each bolt. In the present invention, this shock-absorbing washer has been replaced by a sandwich construction consisting of two washers of shock absorbing material 202 with a pressure sensitive material 203 sandwiched in between.

A variety of materials can be used for the pressure sensitive material 203, which generally work on either the capacitance or resistive change of the material as it is compressed. The wires from this material 203 leading to the electronic control system are not shown in this view. The pressure sensitive material 203 is coupled to the control system, e.g., a microprocessor, and provides the control system with an indication of the pressure applied by the seat on the slide mechanism which is related to the weight of the occupying item of the seat. Generally, material 203 is constructed with electrodes on the opposing faces such that as the material 202 is compressed, the spacing between the electrodes is decreased. This spacing change thereby changes both the resistive and the capacitance of the sandwich which can be measured and which is a function of the compressive force on the material 202. Measurement of the change in capacitance of the sandwich, i.e., two spaced apart conductive members, is obtained by any method known to those skilled in the art, e.g., connecting the electrodes in a circuit with a source of alternating or direct current. The conductive members may be made of a metal. The use of such a pressure sensor is not limited to the illustrated embodiment wherein the shock absorbing material 202 and pressure sensitive material 203 are placed around bolt 201. It is also not limited to the use or incorporation of shock absorbing material in the implementation.

Figure 22A:
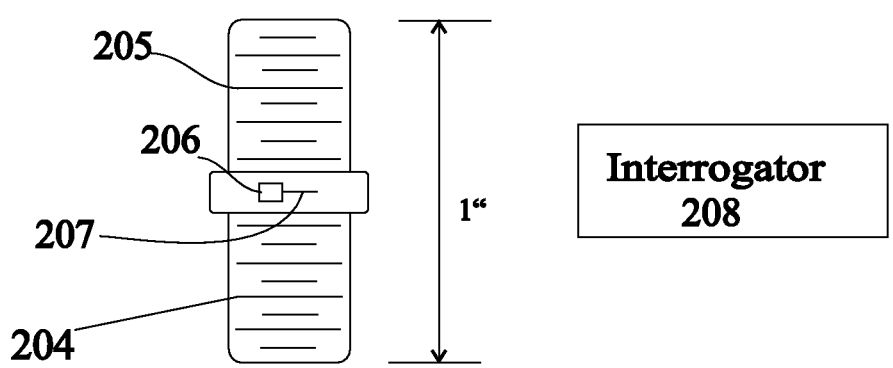
FIG. 22A illustrates a part of another alternate weight sensing system for a seat.

FIG. 22A shows a substitute construction for the bolt 201 in FIG. 22 and which construction is preferably arranged in connection with the seat and the adjustment slide mechanism. A bolt-like member, hereinafter referred to as a stud 204, is threaded 205 on both ends with a portion remaining unthreaded between the ends. A SAW strain measuring device including a SAW strain gage 206 and antenna 207 is arranged on the center unthreaded section of the stud 400 and the stud 400 is attached at its ends to the seat and the slide mechanism using appropriate threaded nuts. Based on the particular geometry of the SAW device used, the stud 400 can result in as little as a 3 mm upward displacement of the seat compared to a normal bolt mounting system. No wires are required to attach the SAW device to the stud 204. The total length of stud 204 may be as little as 1 inch. Antennas larger than one inch may be required depending on the frequency and antenna technology used and other considerations.

In operation, an interrogator 208 transmits a radio frequency pulse at for example, 925 MHz, which excites the antenna 207 associated with the SAW strain gage 206. After a delay caused by the time required for the wave to travel the length of the SAW device, a modified wave is re-transmitted to the interrogator 208 providing an indication of the strain and thus a representative value of the weight of an object occupying the seat. For a seat which is normally bolted to the slide mechanism with four bolts, at least four SAW strain measuring devices or sensors would be used. Each conventional bolt could thus be replaced by a stud as described above. Since the individual SAW devices are very small, multiple such SAW devices can be placed on the stud to provide multiple redundant measurements or to permit the stud to be arbitrarily located with at least one SAW device always within direct view of the interrogator antenna. Note that if quarter wave dipole antennas are used, they may be larger than the strain gage and may in that case need to be mounted to the seat bottom, for example, or some other convenient place. This, however, will also make it easier to align the antennas with the interrogator antenna.

To avoid potential problems with electromagnetic interference, the stud 204 may be made of a non-metallic, possibly composite, material which would not likely cause or contribute to any possible electromagnetic wave interference. The stud 204 could also be modified for use as an antenna.

If the seat is unoccupied, then the interrogation frequency can be substantially reduced in comparison to when the seat is occupied. For an occupied seat, information as to the identity and/or category and position of an occupying item of the seat can be obtained through the use of multiple weight sensors.

For this reason, and due to the fact that during pre-crash event the position of an occupying item of the seat may be changing rapidly, interrogations as frequently as once every 10 milliseconds or even faster can be desirable. This would also enable a distribution of the weight being applied to the seat being obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

Although each of the SAW devices can be interrogated and/or powered using wireless means, in some cases, it may be desirable to supply power to and or obtained information from such devices using wires. Also, strain gage coupled to circuits employing RFID type technology (no on-board power) can also result in a wireless interrogation system. Additionally, energy harvesting techniques can be used to generate the power required. Conventional strain gages can also be used.

Figure 23:
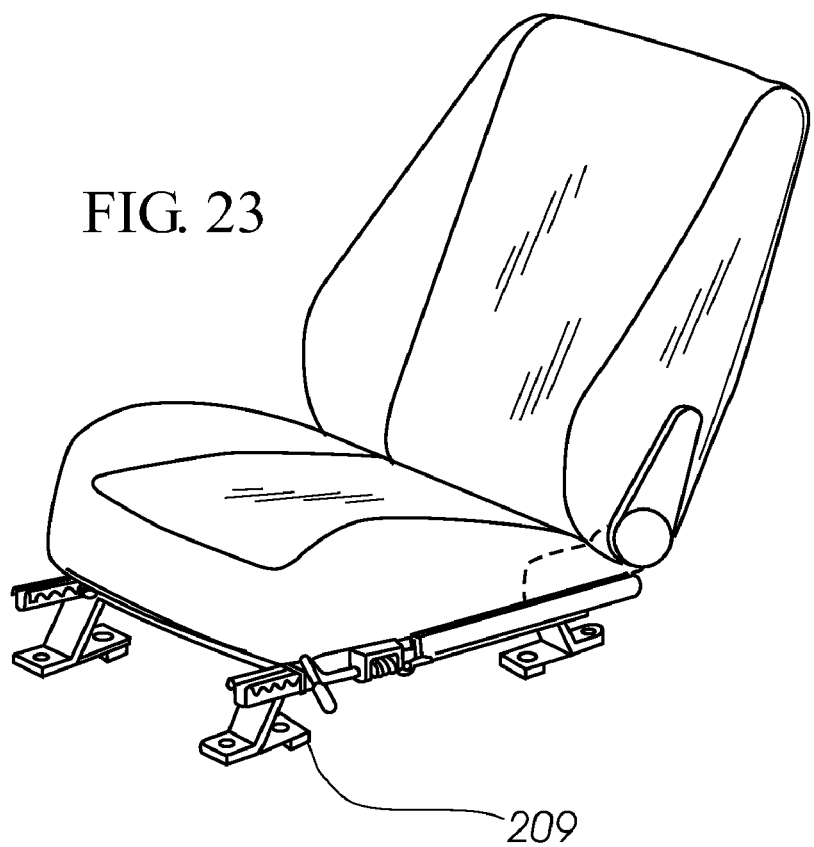
FIG. 23 illustrates an alternate seat structure assembly utilizing strain transducers.

In FIG. 23, which is a view of a seat attachment structure described in U.S. Ser. No. 05/531,503, a more conventional strain gage load cell design designated 209 is utilized. One such load cell design 209 is illustrated in detail in FIG. 23A.

Figure 23A:
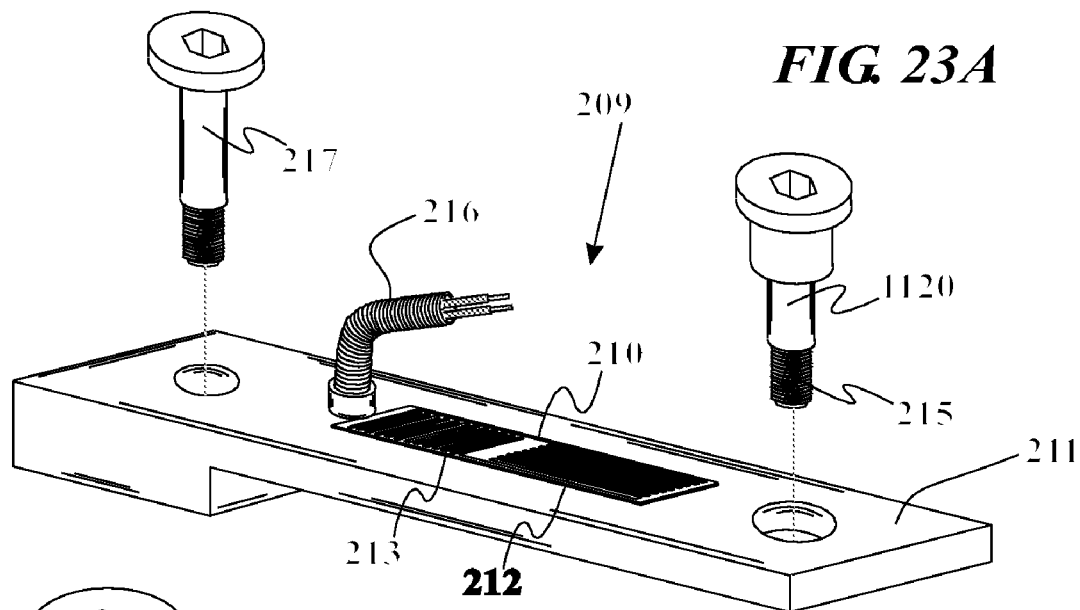
FIG. 23A is a perspective view of a cantilevered beam type load cell for use with the weight measurement system of at least one of the inventions disclosed herein for mounting locations of FIG. 23, for example.

A cantilevered beam load cell design using a half bridge strain gage system 209 is shown in FIG. 23A. Fixed resistors mounted within the electronic package, which are not shown in this drawing, provide the remainder of the whetstone bridge system. The half bridge system is frequently used for economic reasons and where some sacrifice in accuracy is permissible. The load cell 209 includes a member 211 on which the strain gage 210 is situated. The strain gage assembly 209 includes strain-measuring elements 212 and 213 arranged on the load cell. The longitudinal element 212 measures the tensile strain in the beam when it is loaded by the seat and its contents, not shown, which is attached to end 215 of bolt 214. The load cell is mounted to the vehicle or other substrate using bolt 217. Temperature compensation is achieved in this system since the resistance change in strain elements 212 and 213 will vary the same amount with temperature and thus the voltage across the portions of the half bridge will remain the same. The strain gage 209 is coupled to a control system (e.g., a microprocessor—not shown) via wires 216 and receives the measured tensile strain and determines the weight of an occupying item of the seat based thereon.

One problem with using a cantilevered load cell is that it imparts a torque to the member on which it is mounted. One preferred mounting member on an automobile is the floor-pan which will support significant vertical loads but is poor at resisting torques since floor-pans are typically about 1 mm (0.04 inches) thick. This problem can be overcome through the use of a simply supported load cell design designated 220 as shown in FIG. 23B.

In FIGS. 23B and 23C, a full bridge strain gage system 221 is used with all four elements 222, 223 mounted on the top of a beam 240. Elements 222 are mounted parallel to the beam 240 and elements 223 are mounted perpendicular to it. Since the maximum strain is in the middle of the beam 240, strain gage 221 is mounted close to that location. The load cell, shown generally as 220, is supported by the floor pan, not shown, at supports 234 that are formed by bending the beam 240 downward at its ends. Fasteners 228 fit through holes 229 in the beam 240 and serve to hold the load cell 220 to the floor pan without putting significant forces on the load cell 220. Holes are provided in the floor-pan for a bolt 231 and for fasteners 228. Bolt 231 is attached to the load cell 220 through hole 230 of the beam 240 which serves to transfer the force from the seat to the load cell 220 Although this design would place the load cell 220 between the slide mechanism and the floor, in many applications it would be placed between the seat and the slide mechanism. In the first case, the evaluation algorithm may also require a seat position input if the weight distribution is to be determined.

The electronics package can be potted within hole 235 using urethane potting compound 232 and can include signal conditioning circuits, a microprocessor with integral ADCs 226 and a flex circuit 225 (FIG. 23C). The flex circuit 225 terminates at an electrical connector 233 for connection to other vehicle electronics, e.g., a control system. The beam 240 is slightly tapered at location 227 so that the strain is constant in the strain gage.

Figure 23D:
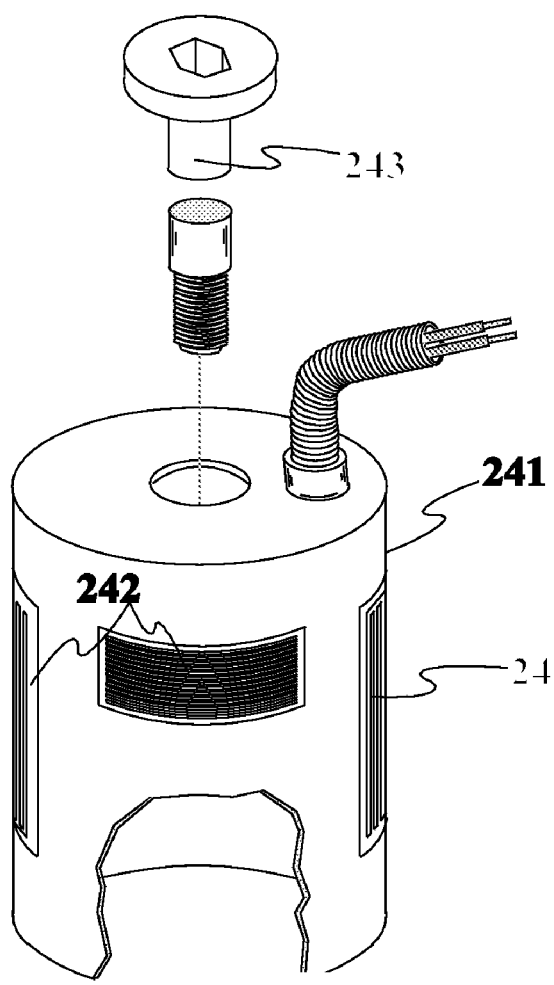
FIG. 23D is a perspective view of a tubular load cell for use with the weight measurement system of at least one of the inventions disclosed herein as an alternate to the cantilevered load cell of FIG. 23A.

Although thus far only beam-type load cells have been described, other geometries can also be used. One such geometry is a tubular type load cell. Such a tubular load cell is shown generally at 241 in FIG. 23D and instead of an elongate beam, it includes a tube. It also comprises a plurality of strain sensing elements 242 for measuring tensile and compressive strains in the tube as well as other elements, not shown, which are placed perpendicular to the elements 242 to provide for temperature compensation. Temperature compensation is achieved in this manner, as is well known to those skilled in the art of the use of strain gages in conjunction with a whetstone bridge circuit, since temperature changes will affect each of the strain gage elements identically and the total effect thus cancels out in the circuit. The same bolt 243 can be used in this case for mounting the load cell to the floor-pan and for attaching the seat to the load cell.

Another alternate load cell design shown generally in FIG. 23E as 242 makes use of a torsion bar 243 and appropriately placed torsional strain sensing elements 244. A torque is imparted to the bar 243 by means of lever 245 and bolt 246 which attaches to the seat structure not shown. Bolts 247 attach the mounting blocks 248 at ends of the torsion bar 243 to the vehicle floor-pan.

The load cells illustrated above are all preferably of the foil strain gage-type. Other types of strain gages exist which would work equally well which include wire strain gages and strain gages made from silicon. Silicon strain gages have the advantage of having a much larger gage factor and the disadvantage of greater temperature effects. For the high-volume implementation of at least one of the inventions disclosed herein, silicon strain gages have an advantage in that the electronic circuitry (signal conditioning, ADCs, etc.) can be integrated with the strain gage for a low cost package.

Other strain gage materials and load cell designs may, of course, be incorporated within the teachings of at least one of the inventions disclosed herein. In particular, a surface acoustical wave (SAW) strain gage can be used in place of conventional wire, foil or silicon strain gages and the strain measured either wirelessly or by a wire connection. For SAW strain gages, the electronic signal conditioning can be associated directly with the gage or remotely in an electronic control module as desired. For SAW strain gages, the problems discussed above with low signal levels requiring bridge structures and the methods for temperature compensation may not apply. Generally, SAW strain gages are more accurate that other technologies but may require a separate sensor to measure the temperature for temperature compensation depending on the material used. Materials that can be considered for SAW strain gages are quartz, lithium niobate, lead zirconate, lead titanate, zinc oxide, polyvinylidene fluoride and other piezoelectric materials.

Many seat designs have four attachment points for the seat structure to attach to the vehicle. Since the plane of attachment is determined by three points, the potential exists for a significant uncertainty or error to be introduced. This problem can be compounded by the method of attachment of the seat to the vehicle. Some attachment methods using bolts, for example, can introduce significant strain in the seat supporting structure. Some compliance therefore should be introduced into the seat structure to reduce these attachment-induced stresses to a minimum. Too much compliance, on the other hand, can significantly weaken the seat structure and thereby potentially cause a safety issue. This problem can be solved by rendering the compliance section of the seat structure highly nonlinear or significantly limiting the range of the compliance. One of the support members, for example, can be attached to the top of the seat structure through the use of the pinned joint wherein the angular rotation of the joint is severely limited. Methods will now be obvious to those skilled in the art to eliminate the attachment-induced stress and strain in the structure which can cause inaccuracies in the strain measuring system.

In the examples illustrated above, strain measuring elements have been shown at each of the support members. This of course is necessary if an accurate measurement of the weight of the occupying item of the seat is to be determined. For this case, typically a single value is inputted into the neural network representing weight. Experiments have shown, however, for the four strain gage transducer system, that most of the weight and thus most of the strain occurs in the strain elements mounted on the rear seat support structural members. In fact, about 85 percent of the load is typically carried by the rear supports. Little accuracy is lost therefore if the forward strain measuring elements are eliminated. Similarly, for most cases, the two rear-mounted support strain elements measure approximately the same strain. Thus, the information represented by the strain in one rear seat support is sufficient to provide a reasonably accurate measurement of the weight of the occupying item of the seat. Thus, at least one of the inventions disclosed herein can be implemented using one or more load cells or strain gages. As disclosed elsewhere herein, other sensors, such as occupant position sensors based on spatial monitoring technologies, can be used in conjunction with one or more load cells or other pressure or weight sensors to augment and improve the accuracy of the system. A simple position sensor mounted in the seat back or headrest, for example, as illustrated at 354-365 in FIGS. 18, 24 and 25 can be used.

If a system consisting of eight transducers is considered, four ultrasonic transducers and four weight transducers, and if cost considerations require the choice of a smaller total number of transducers, it is a question of which of the eight transducers should be eliminated. Fortunately, the neural network technology provides a technique for determining which of the eight transducers is most important, which is next most important, etc. If the six most critical transducers are chosen, that is the six transducers which contain the most useful information as determined by the neural network, a neural network can be trained using data from those six transducers and the overall accuracy of the system can be determined. Experience has determined, for example, that typically there is almost no loss in accuracy by eliminating two of the eight transducers, that is two of the strain gage weight sensors. A slight loss of accuracy occurs when one of the ultrasonic transducers is then eliminated.

This same technique can be used with the additional transducers described above. A transducer space can be determined with perhaps twenty different transducers comprised of ultrasonic, optical, electromagnetic, motion, heartbeat, weight, seat track, seatbelt payout, seatback angle etc. transducers. The neural network can then be used in conjunction with a cost function to determine the cost of system accuracy. In this manner, the optimum combination of any system cost and accuracy level can be determined.

In many situations where the four strain measuring weight sensors are applied to the vehicle seat structure, the distribution of the weight among the four strain gage sensors, for example, will vary significantly depending on the position of the seat in the vehicle, and particularly the fore and aft location, and secondarily, the seatback angle position. A significant improvement to the accuracy of the strain gage weight sensors, particularly if less than four such sensors are used, can result by using information from a seat track position and/or a seatback angle sensor. In many vehicles, such sensors already exist and therefore the incorporation of this information results in little additional cost to the system and results in significant improvements in the accuracy of the weight sensors.

There have been attempts to use seat weight sensors to determine the load distribution of the occupying item and thereby reach a conclusion about the state of seat occupancy. For example, if a forward facing human is out of position, the weight distribution on the seat will be different than if the occupant is in position. Similarly, a rear facing child seat will have a different weight distribution than a forward facing child seat. This information is useful for determining the seated state of the occupying item under static or slowly changing conditions. For example, even when the vehicle is traveling on moderately rough roads, a long term averaging or filtering technique can be used to determine the total weight and weight distribution of the occupying item. Thus, this information can be useful in differentiating between a forward facing and rear facing child seat.

It is much less useful however for the case of a forward facing human or forward facing child seat that becomes out of position during a crash. Panic braking prior to a crash, particularly on a rough road surface, will cause dramatic fluctuations in the output of the strain sensing elements. Filtering algorithms, which require a significant time slice of data, will also not be particularly useful. A neural network or other pattern recognition system, however, can be trained to recognize such situations and provide useful information to improve system accuracy.

Other dynamical techniques can also provide useful information especially if combined with data from the vehicle crash accelerometer. By studying the average weight over a few cycles, as measured by each transducer independently, a determination can be made that the weight distribution is changing. Depending on the magnitude of the change, a determination can be made as to whether the occupant is being restrained by a seatbelt. If a seatbelt restraint is not being used, the output from the crash accelerometer can be used to accurately project the position of the occupant during pre-crash braking and eventually the impact itself providing his or her initial position is known.

In this manner, a weight sensor with provides weight distribution information can provide useful information to improve the accuracy of the occupant position sensing system for dynamic out of position determination. Even without the weight sensor information, the use of the vehicle crash sensor data in conjunction with any means of determining the belted state of the occupant will dramatically improve the dynamic determination of the position of a vehicle occupant. The use of the dynamics of the occupant to measure weight dynamically is disclosed in the current assignee's U.S. patent application Ser. No. 10/174,803 filed Jun. 19, 2002.

Strain gage weight sensors can also be mounted in other locations such as within a cavity within a seat cushion as shown as 97 in FIG. 6A and described above. The strain gage can be mounted on a flexible diaphragm that flexes and thereby strains the strain gage as the seat is loaded. In the example of FIG. 6A, a single chamber 98, diaphragm and strain gage 97 is illustrated. A plurality of such chambers can be used to provide a distribution of the load on the occupying item onto the seat.

There are several applications for weight or load measuring devices in a vehicle including the vehicle suspension system and seat weight sensors for use with automobile safety systems. As reported in U.S. Ser. No. 04/096,740, U.S. Ser. No. 04/623,813, U.S. Ser. No. 05/585,571, U.S. Ser. No. 05/663, 531, U.S. Ser. No. 05/821,425 and U.S. Ser. No. 05/910,647 and International Publication No. WO 00/65320(A1), SAW devices are appropriate candidates for such weight measurement systems. In this case, the surface acoustic wave on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends. A SAW strain device is mounted to the center unthreaded section of the stud and the stud is attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud. The interrogator transmits a radio frequency pulse at, for example, 925 MHz, that excites antenna on the SAW strain measuring system. After a delay caused by the time required for the wave to travel the length of the SAW device, a modified wave is re-transmitted to the interrogator providing an indication of the strain of the stud with the weight of an object occupying the seat corresponding to the strain. For a seat that is normally bolted to the slide mechanism with four bolts, at least four SAW strain sensors would be used. Since the individual SAW devices can be small, multiple devices can be placed on a stud to provide multiple redundant measurements, or permit bending strains to be determined, and/or to permit the stud to be arbitrarily located with at least one SAW device always within direct view of the interrogator antenna. In some cases, the bolt or stud will be made on non-conductive material to limit the blockage of the RF signal. In other cases, it will be insulated from the slide (mechanism) and used as an antenna.

If two longitudinally spaced apart antennas are used to receive the SAW transmissions from the seat weight sensors, one antenna in front of the seat and the other behind the seat, then the position of the seat can be determined eliminating the need for current seat position sensors. A similar system can be used for other seat and seatback position measurements.

For strain gage weight sensing, the frequency of interrogation would be considerably higher than that of the tire monitor, for example. However, if the seat is unoccupied, then the frequency of interrogation can be substantially reduced. For an occupied seat, information as to the identity and/or category and position of an occupying item of the seat can be obtained through the multiple weight sensors described. For this reason, and due to the fact that during the pre-crash event, the position of an occupying item of the seat may be changing rapidly, interrogations as frequently as once every 10 milliseconds or faster can be desirable. This would also enable a distribution of the weight being applied to the seat to be obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

There are many other methods by which SAW devices can be used to determine the weight and/or weight distribution of an occupying item other than the methods described above and all such uses of SAW strain sensors for determining the weight and weight distribution of an occupant are contemplated. For example, SAW devices with appropriate straps can be used to measure the deflection of the seat cushion top or bottom caused by an occupying item, or if placed on the seat belts, the load on the belts can determined wirelessly and powerlessly. Geometries similar to those disclosed in U.S. Ser. No. 06/242,701 (which discloses multiple strain gage geometries) using SAW strain-measuring devices can also be constructed, e.g., any of the multiple strain gage geometries shown therein.

Although a preferred method for using the invention is to interrogate each of the SAW devices using wireless means, in some cases it may be desirable to supply power to and/or obtain information from one or more of the devices using wires. As such, the wires would be an optional feature.

One advantage of the weight sensors of at least one of the inventions disclosed herein along with the geometries disclosed in the '701 patent and herein below, is that in addition to the axial stress in the seat support, the bending moments in the structure can be readily determined. For example, if a seat is supported by four "legs", it is possible to determine the state of stress, assuming that axial twisting can be ignored, using four strain gages on each leg support for a total of sixteen such gages. If the seat is supported by three legs, then this can be reduced to twelve. Naturally, a three-legged support is preferable than four since with four, the seat support is overdetermined severely complicating the determination of the stress caused by an object on the seat. Even with three supports, stresses can be introduced depending on the nature of the support at the seat rails or other floor-mounted supporting structure. If simple supports are used that do not introduce bending moments into the structure, then the number of gages per seat can be reduced to three providing a good model of the seat structure is available. Unfortunately, this is usually not the case and most seats have four supports and the attachments to the vehicle not only introduce bending moments into the structure but these moments vary from one position to another and with temperature. The SAW strain gages of at least one of the inventions disclosed herein lend themselves to the placement of multiple gages onto each support as needed to approximately determine the state of stress and thus the weight of the occupant depending on the particular vehicle application. Furthermore, the wireless nature of these gages greatly simplifies the placement of such gages at those locations that are most appropriate.

One additional point should be mentioned. In many cases, the determination of the weight of an occupant from the static strain gage readings yields inaccurate results due to the indeterminate stress state in the support structure. However, the dynamic stresses to a first order are independent of the residual stress state. Thus, the change in stress that occurs as a vehicle travels down a roadway caused by dips in the roadway can provide an accurate measurement of the weight of an object in a seat. This is especially true if an accelerometer is used to measure the vertical excitation provided to the seat.

4.2 Bladder Weight Sensors

One embodiment of a weight sensor and method for determining the weight of an occupant of a seat, which may be used in the methods and apparatus for adjusting a vehicle component and identifying an occupant of a seat, comprises a bladder having at least one chamber adapted to be arranged in a seat portion of the seat, and at least one transducer for measuring the pressure in a respective chamber. The bladder may comprise a plurality of chambers, each adapted to be arranged at a different location in the seat portion of the seat. Thus, it is possible to determine the weight distribution of the occupant using this weight sensor with several transducers whereby each transducer is associated with one chamber and the weight distribution of the occupant is obtained from the pressure measurements of the transducers. The position of the occupant and the center of gravity of the occupant can also be determined by one skilled in the art based on the weight distribution.

Figure 24:
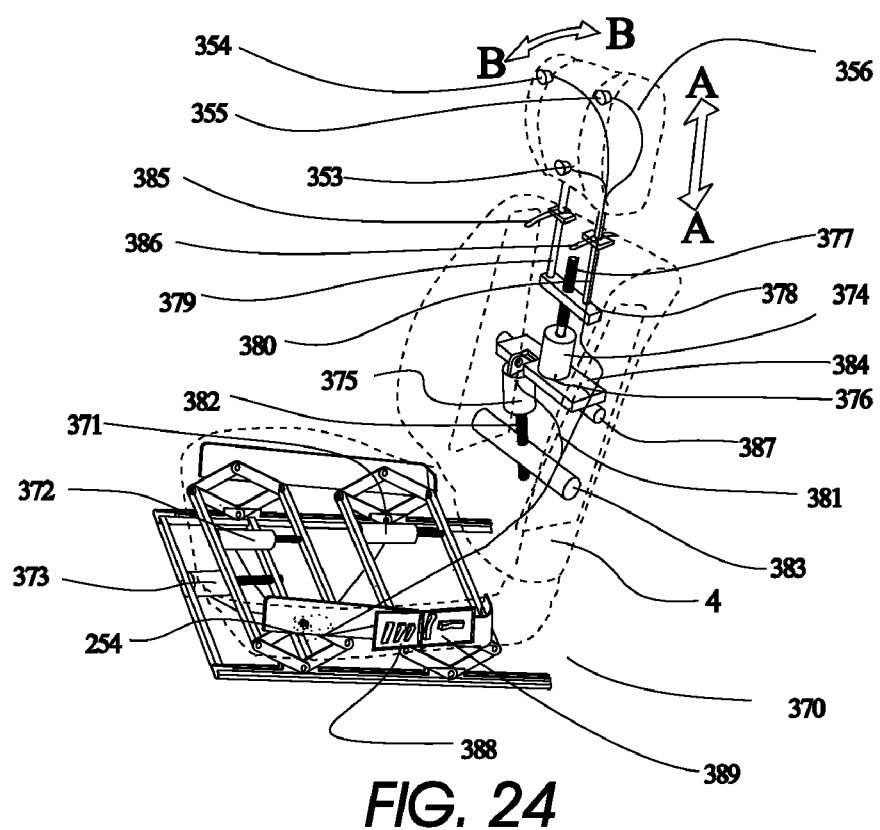
FIG. 24 is a perspective view of an automatic seat adjustment system, with the seat shown in phantom, with a movable headrest and sensors for measuring the height of the occupant from the vehicle seat showing motors for moving the seat and a control circuit connected to the sensors and motors.

With knowledge of the weight of an occupant, additional improvements can be made to automobile and truck seat designs. In particular, the stiffness of the seat can be adjusted so as to provide the same level of comfort for light and for heavy occupants. The damping of occupant motions, which previously has been largely neglected, can also be readily adjusted as shown on FIG. 25 which is a view of the seat of FIG. 24 showing one of several possible arrangements for changing the stiffness and the damping of the seat. In the seat bottom 250, there is a container 251, the conventional foam and spring design has been replaced by an inflated rectangular container very much like an air mattress which contains a cylindrical inner container 252 which is filled with an open cell urethane foam, for example, or other means which constrain the flow of air therein. An adjustable orifice 253 connects the two containers both of which can be bladders 251, 252 so that air, or other fluid, can flow in a controlled manner therebetween. The amount of opening of orifice 253 is controlled by control circuit 254. A small air compressor, or fluid pump, 255 controls the pressure in container 251 under control of the control circuit 254. A pressure transducer 256 monitors the pressure within container 251 and inputs this information into control circuit 254.

The operation of the system is as follows. When an occupant sits on the seat, pressure initially builds up in the seat container or bladder 251 which gives an accurate measurement of the weight of the occupant. Control circuit 254, using an algorithm and a microprocessor, then determines an appropriate stiffness for the seat and adds pressure to achieve that stiffness. The pressure equalizes between the two containers 251 and 252 through the flow of fluid through orifice 253. Control circuit 254 also determines an appropriate damping for the occupant and adjusts the orifice 253 to achieve that damping. As the vehicle travels down the road and the road roughness causes the seat to move up and down, the inertial force on the seat by the occupant causes the fluid pressure to rise and fall in container 252 and also, but, much less so, in container 251 since the occupant sits mainly above container 252 and container 251 is much larger than container 252. The major deflection in the seat takes place first in container 252 which pressurizes and transfers fluid to container 251 through orifice 253. The size of the orifice opening determines the flow rate between the two containers 251, 252 and therefore the damping of the motion of the occupant. Since this opening is controlled by control circuit 254, the amount of damping can thereby also be controlled. Thus, in this simple structure, both the stiffness and damping can be controlled to optimize the seat for a particular driver. Naturally, if the driver does not like the settings made by control circuit 254, he or she can change them to provide a stiffer or softer ride. When fluid is used above, it can mean a gas, liquid, gel or other flowable medium.

The stiffness of a seat is the change in force divided by the change in deflection. This is important for many reasons, one of which is that it controls the natural vibration frequency of the seat occupant combination. It is important that this be different from the frequency of vibrations which are transmitted to the seat from the vehicle in order to minimize the up and down motions of the occupant. The damping is a force which opposes the motion of the occupant and which is dependent on the velocity of relative motion between the occupant and the seat bottom. It thus removes energy and minimizes the oscillatory motion of the occupant. These factors are especially important in trucks where the vibratory motions of the driver's seat, and thus the driver, have caused many serious back injuries among truck drivers.

Figure 25:
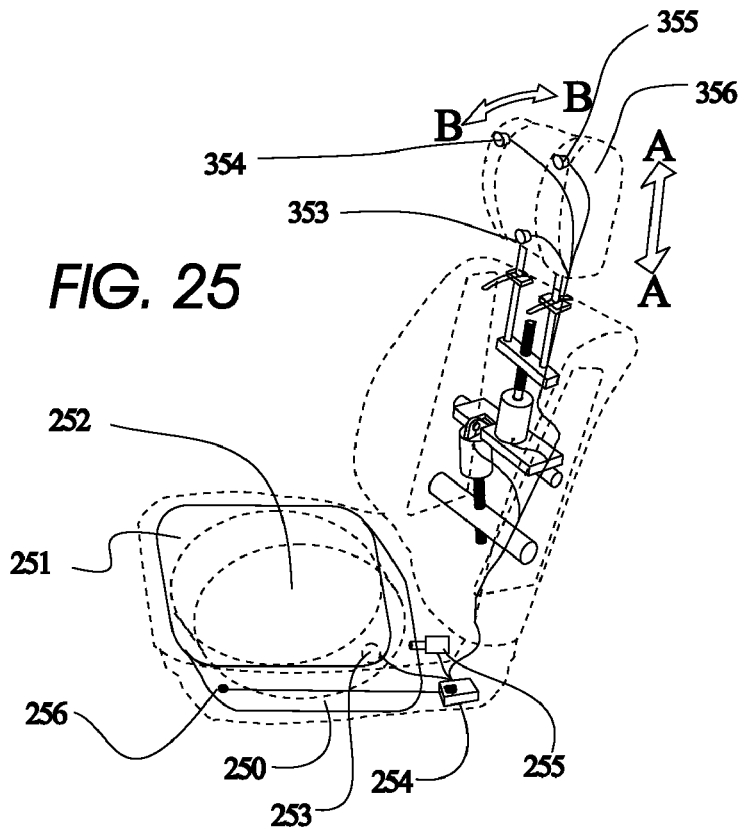
FIG. 25 is a view of the seat of FIG. 24 showing a system for changing the stiffness and the damping of the seat.
Figure 25A:
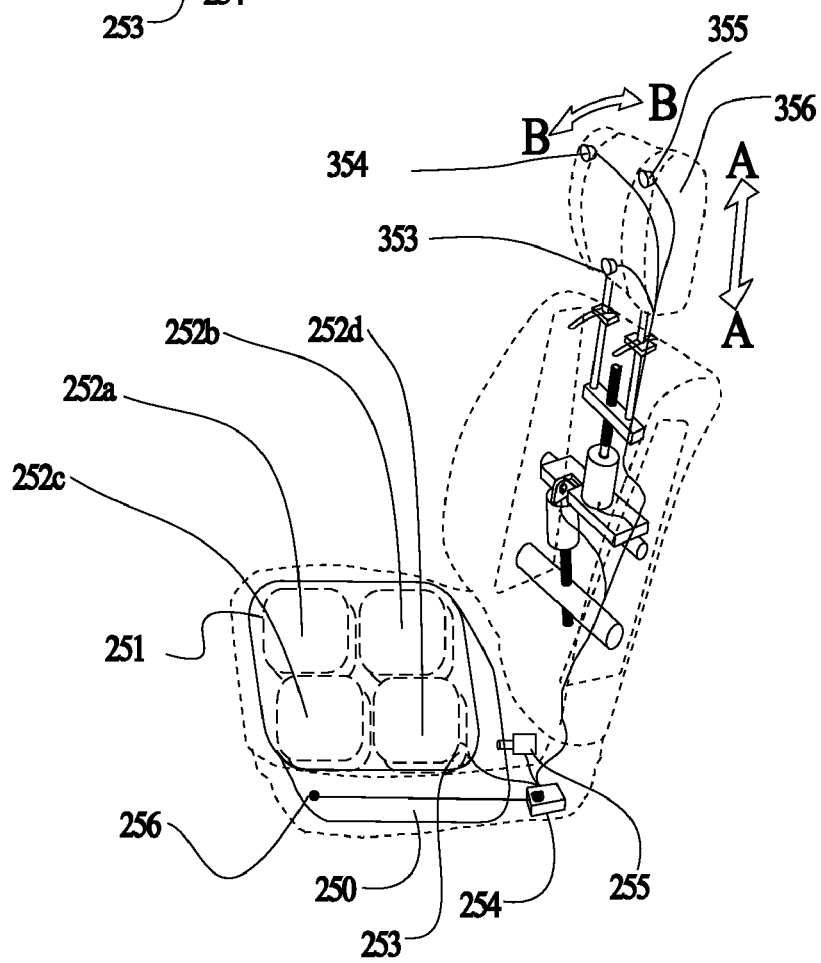
FIG. 25A is a view of the seat of FIG. 24 wherein the bladder contains a plurality of chambers.

In FIG. 25, the airbag or bladder 241 which interacts with the occupant is shown with a single chamber. Naturally, bladder 241 can be composed of multiple chambers 241a, 241b, 241c, and 241d as shown in FIG. 25A. The use of multiple chambers permits the weight distribution of the occupant to be determined if a separate pressure transducer is used in each cell of the bladder, or if a single gage is switched from chamber to chamber. Such a scheme gives the opportunity of determining to some extent the position of the occupant on the seat or at least the position of the center of gravity of the occupant. Naturally, more than four chambers can be used.

Any one of a number of known pressure measuring sensors can be used with the bladder weight sensor disclosed herein. One particular technology that has been developed for measuring the pressure in a rotating tire uses surface acoustic wave (SAW) technology and has the advantage that the sensor is wireless and powerless. Thus, the sensor does not need a battery nor is it required to run wires from the sensor to control circuitry. An interrogator is provided that transmits an RF signal to the sensor and receives a return signal that contains the temperature and pressure of the fluid within the bladder. The interrogator can be the same one that is used for tire pressure monitoring thus making this SAW system very inexpensive to implement and easily expandable to several seats within the vehicle. The switches that control the seat can also now be made wireless using SAW technology and thus they can be placed at any convenient location such as the vehicle door-mounted armrest without requiring wires to connect the switch to the seat motors. Other uses of SAW technology are discussed in the current assignee's U.S. Ser. No. 06/662,642. Although a SAW device has been described above, an equivalent system can be constructed using RFID type technology where the interrogator transmits sufficient RF energy to power the RFID circuit. This generally requires that the interrogator antenna be closer to the device antenna than in the case of SAW devices but the interrogator circuitry is generally simpler and thus less expensive. Also energy harvesting can also be used to provide energy to run the RFID circuit or to boost the SAW circuit.

In the description above, the air is the preferred use as the fluid to fill the bladder 241. In some cases, especially where damping and natural frequency control is not needed, another fluid such as a liquid or jell could be used to fill the bladder 241. In addition to silicone, candidate liquids include ethylene glycol or other low freezing point liquids.

In an apparatus for adjusting the stiffness of a seat in a vehicle, at least two containers are arranged in or near a bottom portion of the seat, the first container substantially supports the load of a seat occupant and the second container is relatively unaffected by this load. The two containers are in flow communication with each other through a variable flow passage. Insertion means, e.g., an air compressor or fluid pump, are provided for directing a medium into one of the container and monitoring means, e.g., a pressure transducer, measuring the pressure in one or both containers. A control circuit is coupled to the medium insertion means and the monitoring means for regulating flow of medium into the first container via the medium insertion means until the pressure in the first container as measured by the monitoring means is indicative of a desired stiffness for the seat. The control circuit may also be arranged to adjust the flow passage to thereby control flow of medium between the two containers and thus damping the motion of on object on the seat. The flow passage may be an orifice in a peripheral wall of the inner container.

A method for adjusting the stiffness of a seat in a vehicle comprises the steps of arranging a first container in a bottom portion of the seat and subjected to the load on the seat, arranging a second container in a position where it is relatively unaffected by the load on the seat, coupling interior volumes of the two containers through a variable flow passage, measuring the pressure in the first container, and introducing medium into the first container until the measured pressure in the first container is indicative of a desired stiffness for the seat.

4.3 Dynamic Weight Sensing

The combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting and the state of the use of the seatbelt. This can be done by observing the acceleration signals from the sensors of FIG. 141 of the '881 application and simultaneously the dynamic strain gage measurements from seat-mounted strain gages. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

Several ways to process the acceleration signal and the stain or pressure signal are discussed with reference to FIG. 167 in the '881 application. In general, the dynamic load applied to the seat is measured or a forcing function of the seat is measured, as a function of the acceleration signal. This represents the effect of the movement of the vehicle on the occupant which is reflected in the measurement of weight by the strain or pressure gages. Thus, the measurement obtained by the strain or pressure gages can be considered to have two components, one component resulting from the weight applied by the occupant in a stationary state of the vehicle and the other arising or resulting from the movement of the vehicle. The vehicle-movement component can be separated from the total strain or pressure gage measurement to provide a more accurate indication of the weight of the occupant.

4.4 Combined Spatial and Weight

A novel occupant position sensor for a vehicle, for determining the position of the occupant, comprises a weight sensor for determining the weight of an occupant of a seat as described immediately above and processor means for receiving the determined weight of the occupant from the weight sensor and determining the position of the occupant based at least in part on the determined weight of the occupant. The position of the occupant could also be determined based in part on waves received from the space above the seat, data from seat position sensors, reclining angle sensors, etc.

Although spatial sensors such as ultrasonic, electric field and optical occupant sensors can accurately identify and determine the location of an occupying item in the vehicle, a determination of the mass of the item is less accurate as it can be fooled in some cases by a thick but light winter coat, for example. Therefore, it is desirable, when the economics permit, to provide a combined system that includes both weight and spatial sensors. Such a system permits a fine tuning of the deployment time and the amount of gas in the airbag to match the position and the mass of the occupant. If this is coupled with a smart crash severity sensor, then a true smart airbag system can result, as disclosed in the current assignee's U.S. Ser. No. 06/532,408.

As disclosed in several of the current assignee's patents, referenced herein and others, the combination of a reduced number of transducers including weight and spatial can result from a pruning process starting from a larger number of sensors. For example, such a process can begin with four load cells and four ultrasonic sensors and after a pruning process, a system containing two ultrasonic sensors and one load cell can result. At least one of the inventions disclosed herein is therefore not limited to any particular number or combination of sensors and the optimum choice for a particular vehicle will depend on many factors including the specifications of the vehicle manufacturer, cost, accuracy desired, availability of mounting locations and the chosen technologies.

4.5 Face Recognition

A neural network, or other pattern recognition system, can be trained to recognize certain people as permitted operators of a vehicle or for granting access to a cargo container or truck trailer. In this case, if a non-recognized person attempts to operate the vehicle or to gain access, the system can disable the vehicle and/or sound an alarm or send a message to a remote site via telematics. Since it is unlikely that an unauthorized operator will resemble the authorized operator, the neural network system can be quite tolerant of differences in appearance of the operator. The system defaults to where a key or other identification system must be used in the case that the system doesn't recognize the operator or the owner wishes to allow another person to operate the vehicle or have access to the container. The transducers used to identify the operator can be any of the types described in detail above. A preferred method is to use optical imager-based transducers perhaps in conjunction with a weight sensor for automotive applications. This is necessary due to the small size of the features that need to be recognized for a high accuracy of recognition. An alternate system uses an infrared laser, which can be modulated to provide three-dimensional measurements, to irradiate or illuminate the operator and a CCD or CMOS device to receive the reflected image. In this case, the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks*, Ellis Horwood Publishers, New York, 1993. In the present case, a larger CCD element array containing 50,000 or more elements would typically be used instead of the 16 by 16 or 256 element CCD array used by Popesco and Vincent.

FIG. 16 shows a schematic illustration of a system for controlling operation of a vehicle based on recognition of an authorized individual in accordance with the invention. A similar system can be designed for allowing access to a truck trailer, cargo container or railroad car, for example. One or more images of the passenger compartment 260 are received at 261 and data derived therefrom at 262. Multiple image receivers may be provided at different locations. The data derivation may entail any one or more of numerous types of image processing techniques such as those described in the current assignee's U.S. Ser. No. 06/397,136 including those designed to improve the clarity of the image. A pattern recognition algorithm, e.g., a neural network, is trained in a training phase 263 to recognize authorized individuals. The training phase can be conducted upon purchase of the vehicle by the dealer or by the owner after performing certain procedures provided to the owner, e.g., entry of a security code or key or at another appropriate time and place. In the training phase for a theft prevention system, the authorized operator(s) would sit themselves in the passenger seat and optical images would be taken and processed to obtain the pattern recognition algorithm. Alternately, the training can be done away from the vehicle which would be more appropriate for cargo containers and the like.

A processor 264 is embodied with the pattern recognition algorithm thus trained to identify whether a person is the authorized individual by analysis of subsequently obtained data derived from optical images 262. The pattern recognition algorithm in processor 264 outputs an indication of whether the person in the image is an authorized individual for which the system is trained to identify. A security system 265 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

In some cases, the recognition system can be substantially improved if different parts of the electromagnetic spectrum are used. As taught in the book *Alien Vision* referenced above, distinctive facial markings are evident when viewed under near UV or MWIR illumination that can be used to positively identify a person. Other biometric measures can be used with, or in place of, a facial or iris image to further improve the recognition accuracy such as voice recognition (voice-print), finger or hand prints, weight, height, arm length, hand size etc.

Instead of a security system, another component in the vehicle can be affected or controlled based on the recognition of a particular individual. For example, the rear view mirror, seat, seat belt anchorage point, headrest, pedals, steering wheel, entertainment system, air-conditioning/ventilation system can be adjusted. Additionally, the door can be unlocked upon approach of an authorized person.

Figure 17:
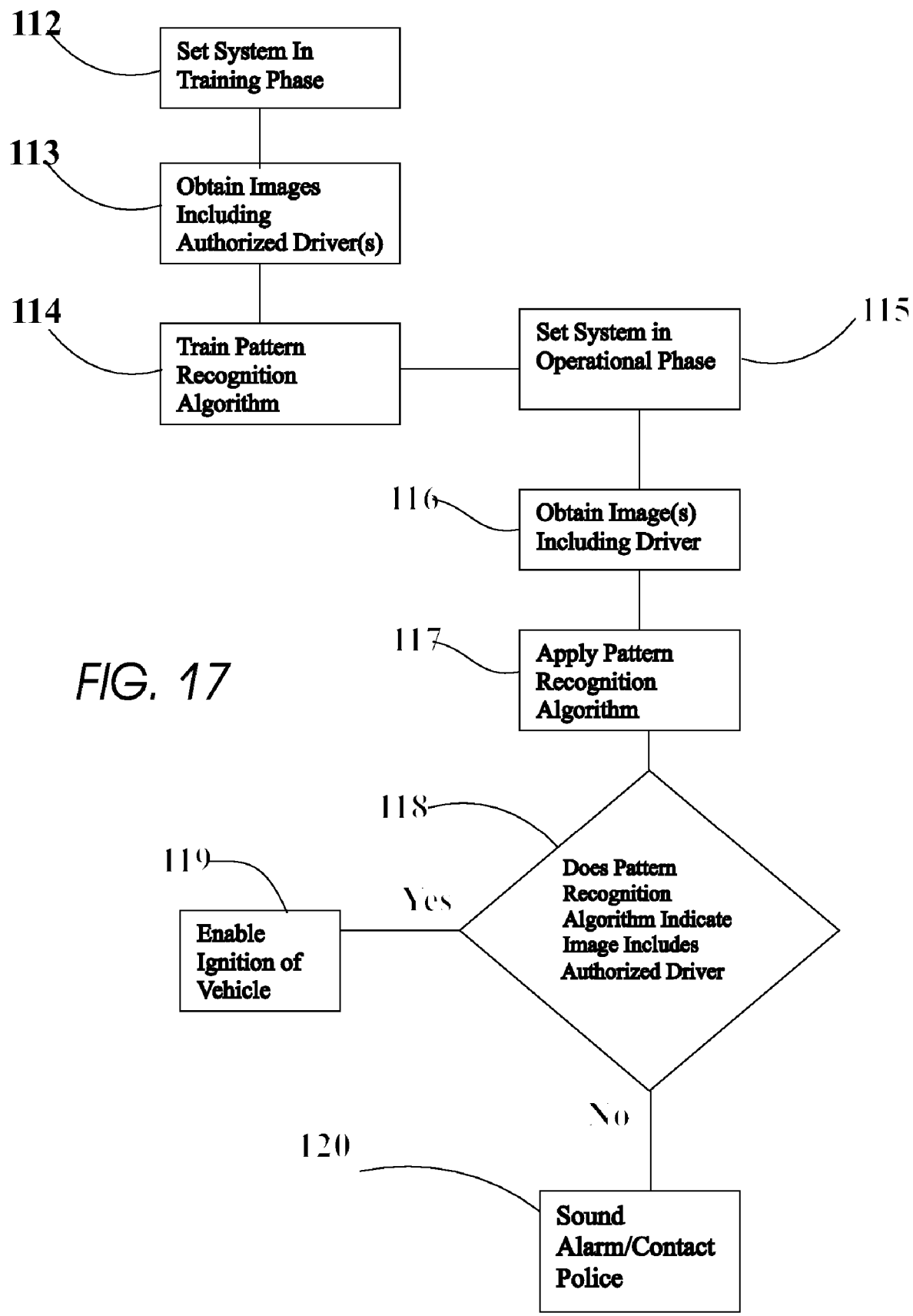
FIG. 17 is a schematic illustration of a method for controlling operation of a vehicle based on recognition of an individual.

FIG. 17 is a schematic illustration of a method for controlling operation of a vehicle based on recognition of a person as one of a set of authorized individuals. Although the method is described and shown for permitting or preventing ignition of the vehicle based on recognition of an authorized driver, it can be used to control for any vehicle component, system or subsystem based on recognition of an individual.

Initially, the system is set in a training phase 266 in which images, and other biometric measures, including the authorized individuals are obtained by means of at least one optical receiving unit 267 and a pattern recognition algorithm is trained based thereon 268, usually after application of one or more image processing techniques to the images. The authorized individual(s) occupy the passenger compartment, or some other appropriate location, and have their picture taken by the optical receiving unit to enable the formation of a database on which the pattern recognition algorithm is trained. Training can be performed by any known method in the art, although combination neural networks are preferred.

The system is then set in an operational phase 269 wherein an image is operatively obtained 270, including the driver when the system is used for a security system. If the system is used for component adjustment, then the image would include any passengers or other occupying items in the vehicle. The obtained image, or images if multiple optical receiving units are used, plus other biometric information, are input into the pattern recognition algorithm 271, preferably after some image processing, and a determination is made whether the pattern recognition algorithm indicates that the image includes an authorized driver 272. If so, ignition, or some other system, of the vehicle is enabled 273, or the vehicle may actually be started automatically. If not, an alarm is sounded and/or the police or other remote site may be contacted 274.

Once an optic-based system is present in a vehicle, other options can be enabled such as eye-tracking as a data input device or to detect drowsiness, as discussed above, and even lip reading as a data input device or to augment voice input. This is discussed, for example, Eisenberg, Anne, "Beyond Voice Recognition to a Computer That Reads Lips", New York Times, Sep. 11, 2003. Lip reading can be implemented in a vehicle through the use of IR illumination and training of a pattern recognition algorithm, such as a neural network or a combination network. This is one example of where an adaptive neural or combination network can be employed that learns as it gains experience with a particular driver. The word "radio", for example, can be associated with lip motions when the vehicle is stopped or moving slowly and then at a later time when the vehicle is traveling at high speed with considerable wind noise, the voice might be difficult for the system to understand. When augmented with lip reading, the word "radio" can be more accurately recognized. Thus, the combination of lip reading and voice recognition can work together to significantly improve accuracy.

Face recognition can of course be done in two or three dimensions and can involve the creation of a model of the person's head that can aid when illumination is poor, for example. Three dimensions are available if multiple two dimensional images are acquired as the occupant moves his or her head or through the use of a three-dimensional camera. A three-dimensional camera generally has two spaced-apart lenses plus software to combine the two views. Normally, the lenses are relatively close together but this may not need to be the case and significantly more information can be acquired if the lenses are spaced further apart and in some cases, even such that one camera has a frontal view and the other a side view, for example. Naturally, the software is complicated for such cases but the system becomes more robust and less likely to be blocked by a newspaper, for example. A scanning laser radar, PMD or similar system with a modulated beam or with range gating as described above can also be used to obtain three-dimensional information or a 3D image.

Eye tracking as disclosed in Jacob, "Eye Tracking in Advanced Interface Design", Robert J. K. Jacob, Human-Computer Interaction Lab, Naval Research Laboratory, Washington, D.C, can be used by vehicle operator to control various vehicle components such as the turn signal, lights, radio, air conditioning, telephone, Internet interactive commands, etc. much as described in U.S. patent application Ser. No. 09/645,709. The display used for the eye tracker can be a heads-up display reflected from the windshield or it can be a plastic electronics display located either in the visor or the windshield.

The eye tracker works most effectively in dim light where the driver's eyes are sufficiently open that the cornea and retina are clearly distinguishable. The direction of operator's gaze is determined by calculation of the center of pupil and the center of the iris that are found by illuminating the eye with infrared radiation. FIG. 8E illustrates a suitable arrangement for illuminating eye along the same axis as the pupil camera. The location of occupant's eyes must be first determined as described elsewhere herein before eye tracking can be implemented. In FIG. 8E, imager system 52, 54, or 56 are candidate locations for eye tracker hardware.

The technique is to shine a collimated beam of infrared light on to be operator's eyeball producing a bright corneal reflection can be bright pupil reflection. Imaging software analyzes the image to identify the large bright circle that is the pupil and a still brighter dot which is the corneal reflection and computes the center of each of these objects. The line of the gaze is determined by connecting the centers of these two reflections.

It is usually necessary only to track a single eye as both eyes tend to look at the same object. In fact, by checking that both eyes are looking at the same object, many errors caused by the occupant looking through the display onto the road or surrounding environment can be eliminated Object selection with a mouse or mouse pad, as disclosed in the '709 application cross-referenced above is accomplished by pointing at the object and depressing a button. Using eye tracking, an additional technique is available based on the length of time the operator gazes at the object. In the implementations herein, both techniques are available. In the simulated mouse case, the operator gazes at an object, such as the air conditioning control, and depresses a button on the steering wheel, for example, to select the object. Alternately, the operator merely gazes at the object for perhaps one-half second and the object is automatically selected. Both techniques can be implemented simultaneously allowing the operator to freely choose between them. The dwell time can be selectable by the operator as an additional option. Typically, the dwell times will range from about 0.1 seconds to about 1 second.

The problem of finding the eyes and tracking the head of the driver, for example, is handled in Smeraldi, F., Carmona, J. B., "Saccadic search with Garbor features applied to eye detection and real-time head tracking", Image and Vision Computing 18 (2000) 323-329, Elsevier Science B.V. The Saccadic system described is a very efficient method of locating the most distinctive part of a persons face, the eyes, and in addition to finding the eyes, a modification of the system can be used to recognize the driver. The system makes use of the motion of the subject's head to locate the head prior to doing a search for the eyes using a modified Garbor decomposition method. By comparing two consecutive frames, the head can usually be located if it is in the field of view of the camera. Although this is the preferred method, other eye location and tracking methods can also be used as reported in the literature and familiar to those skilled in the art.

4.6 Heartbeat and Health State

In addition to the use of transducers to determine the presence and location of occupants in a vehicle, other sensors can also be used. For example, as discussed above, a heartbeat sensor, which determines the number and presence of heartbeats, can also be arranged in the vehicle. Heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat or other position, if such a human occupant is present. The output of the heartbeat sensor is input to the processor of the interior monitoring system. One heartbeat sensor for use in the invention may be of the types as disclosed in McEwan in U.S. Ser. No. 05/573,012 and U.S. Ser. No. 05/766,208. The heartbeat sensor can be positioned at any convenient position relative to the seats or other appropriate location where occupancy is being monitored. A preferred automotive location is within the vehicle seatback.

This type of micropower impulse radar (MIR) sensor is not believed to have been used in an interior monitoring system in the past. It can be used to determine the motion of an occupant and thus can determine his or her heartbeat (as evidenced by motion of the chest), for example. Such an MIR sensor can also be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan U.S. Ser. No. 05/361,070, as well as many other patents by the same inventor. Motion sensing is accomplished by monitoring a particular range from the sensor as disclosed in that patent. MIR is one form of radar that has applicability to occupant sensing and can be mounted at various locations in the vehicle. Other forms include, among others, ultra wideband (UWB) by the Time Domain Corporation and noise radar (NR) by Professor Konstantin Lukin of the National Academy of Sciences of Ukraine Institute of Radiophysics and Electronics. Radar has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR, UWB or NR have additional advantages in their lack of sensitivity to temperature variation and have a comparable resolution to about 40 kHz ultrasound. Resolution comparable to higher frequency is of course possible using millimeter waves, for example. Additionally, multiple MIR, UWB or NR sensors can be used when high-speed tracking of the motion of an occupant during a crash is required since they can be individually pulsed without interfering with each other through frequency, time or code division multiplexing or other multiplexing schemes.

Other methods have been reported for measuring heartbeat including vibrations introduced into a vehicle and variations in the electric field in the vicinity of where an occupant might reside. All such methods are considered encompassed by the teachings of at least one of the inventions disclosed herein. The detection of a heartbeat regardless of how it is accomplished is indicative of the presence of a living being within the vehicle and such a detection as part of an occupant presence detection system is novel to at least one of the inventions disclosed herein. Similarly, any motion of an object that is not induced by the motion of the vehicle itself is indicative of the presence of a living being and thus part of the teachings herein. The sensing of occupant motion regardless of how it is accomplished when used in a system to affect another vehicle system is contemplated herein.

5. Telematics

Some of the inventions herein relate generally to telematics and the transmission of information from a vehicle to one or more remote sites which can react to the position or status of the vehicle and/or occupant(s) therein.

Initially, sensing of the occupancy of the vehicle and the optional transmission of this information, which may include images, to remote locations will be discussed. This entails obtaining information from various sensors about the occupants in the passenger compartment of the vehicle, e.g., the number of occupants, their type and their motion, if any. Then, the concept of a low cost automatic crash notification system will be discussed. Next, a diversion into improvements in cell phones will be discussed followed by a discussion of trapped children and how telematics can help save their lives. Finally, the use of telematics with non-automotive vehicles will round out this section.

Elsewhere in the parent '881 application, e.g., section 13, the use of telematics is described with a discussion of general vehicle diagnostic methods with the diagnosis being transmittable via a communications device to the remote locations. The diagnostics section includes an extensive discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations.

5.1 Transmission of Occupancy Information

The cellular phone system, or other telematics communication device, is shown schematically in FIG. 2 by box 32 and outputs to an antenna 34. The phone system or telematics communication device 34 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched. The telematics system can also be a satellite-based system such as provided by Skybitz.

In the event of an accident, the electronic system associated with the telematics system interrogates the various interior monitoring system memories in processor 20 and can arrive at a count of the number of occupants in the vehicle, if each seat is monitored, and, in more sophisticated systems, even makes a determination as to whether each occupant was wearing a seatbelt and if he or she is moving after the accident, and/or the health state of one or more of the occupants as described above, for example. The telematics communication system then automatically notifies an EMS operator (such as 911, OnStar® or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

Figure 35:
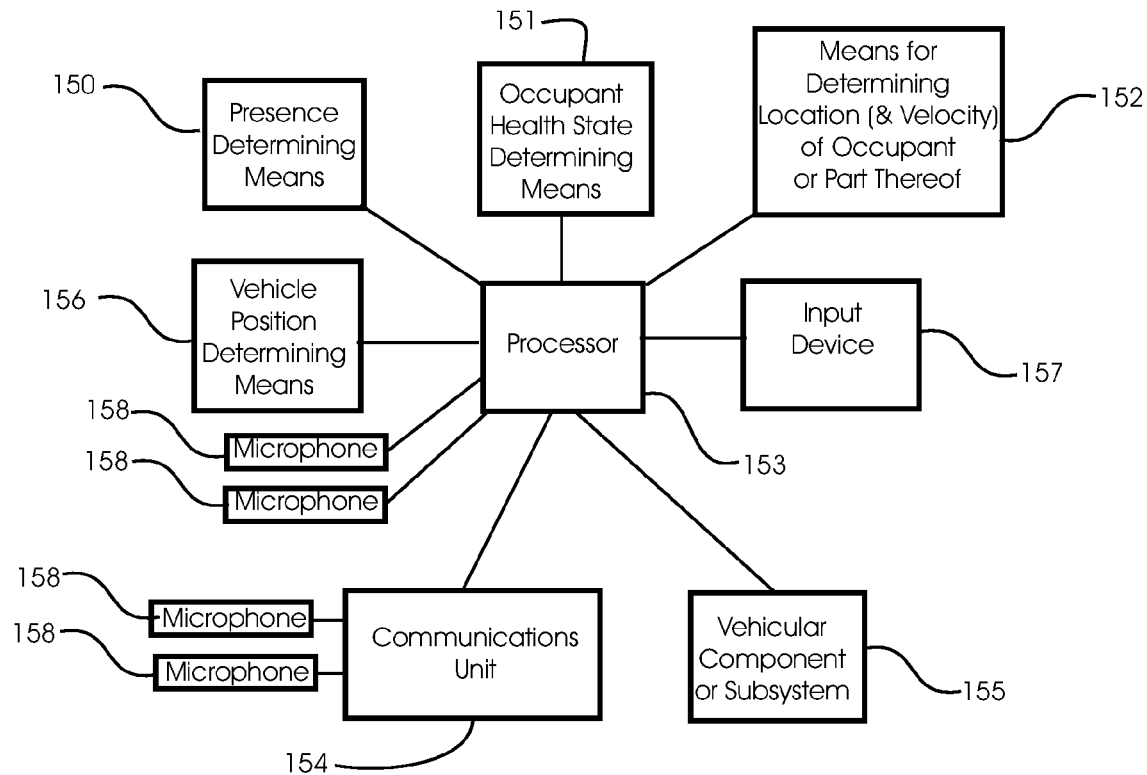
FIG. 35 is a diagram of one exemplifying embodiment of the invention.

FIG. 35 shows a schematic diagram of an embodiment of the invention including a system for determining the presence and health state of any occupants of the vehicle and a telecommunications link. This embodiment includes means for determining the presence of any occupants 150 which may take the form of a heartbeat sensor, chemical sensor and/or motion sensor as described above and means for determining the health state of any occupants 151 as discussed above. The latter means may be integrated into the means for determining the presence of any occupants, i.e., one and the same component, or separate therefrom. Further, means for determining the location, and optionally velocity, of the occupants and/or one or more parts thereof 152 are provided and may be any conventional occupant position sensor or preferably, one of the occupant position sensors as described herein (e.g., those utilizing waves. electromagnetic radiation, electric fields, bladders, strain gages etc.) or as described in the current assignee's patents and patent applications referenced above.

A processor 153 is coupled to the presence determining means 150, the health state determining means 151 and the location determining means 152. A communications unit 154 is coupled to the processor 153. The processor 153 and/or communications unit 154 can also be coupled to microphones 158 that can be distributed throughout the vehicle and include voice-processing circuitry to enable the occupant(s) to effect vocal control of the processor 153, communications unit 154 or any coupled component or oral communications via the communications unit 154. The processor 153 is also coupled to another vehicular system, component or subsystem 155 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 156 could be coupled to the processor 153 and provides an indication of the absolute position of the vehicle, preferably using satellite-based positioning technology (e.g., a GPS receiver).

In normal use (other then after a crash), the presence determining means 150 determine whether any human occupants are present, i.e., adults or children, and the location determining means 152 determine the occupant's location. The processor 153 receives signals representative of the presence of occupants and their location and determines whether the vehicular system, component or subsystem 155 can be modified to optimize its operation for the specific arrangement of occupants. For example, if the processor 153 determines that only the front seats in the vehicle are occupied, it could control the heating system to provide heat only through vents situated to provide heat for the front-seated occupants.

The communications unit 154 performs the function of enabling establishment of a communications channel to a remote facility to receive information about the occupancy of the vehicle as determined by the presence determining means 150, occupant health state determining means 151 and/or occupant location determining means 152. The communications unit 154 thus can be designed to transmit over a sufficiently large range and at an established frequency monitored by the remote facility, which may be an EMS facility, sheriff department, or fire department. Alternately, it can communicate with a satellite system such as the Skybitz system and the information can be forwarded to the appropriate facility via the Internet or other appropriate link.

Another vehicular telematics system, component or subsystem is a navigational aid, such as a route guidance display or map. In this case, the position of the vehicle as determined by the positioning system 156 is conveyed through processor 153 to the communications unit 154 to a remote facility and a map is transmitted from this facility to the vehicle to be displayed on the route display. If directions are needed, a request for such directions can be entered into an input unit 157 associated with the processor 153 and transmitted to the facility. Data for the display map and/or vocal instructions can then be transmitted from this facility to the vehicle.

Moreover, using this embodiment, it is possible to remotely monitor the health state of the occupants in the vehicle and most importantly, the driver. The health state determining means 151 may be used to detect whether the driver's breathing is erratic or indicative of a state in which the driver is dozing off. The health state determining means 151 can also include a breath-analyzer to determine whether the driver's breath contains alcohol. In this case, the health state of the driver is relayed through the processor 153 and the communications unit 154 to the remote facility and appropriate action can be taken. For example, it would be possible to transmit a command, e.g., in the form of a signal, to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 155. The vehicular component or subsystem could be activated directly by the signal from the remote facility, if they include a signal receiver, or indirectly via the communications unit 154 and processor 153.

In use after a crash, the presence determining means 150, health state determining means 151 and location determining means 152 obtain readings from the passenger compartment and direct such readings to the processor 153. The processor 153 analyzes the information and directs or controls the transmission of the information about the occupant(s) to a remote, manned facility. Such information could include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds (as detected by a microphone). The determination of the number of occupants is obtained from the presence determining mechanism 150, i.e., the number of occupants whose presence is detected is the number of occupants in the passenger compartment. The determination of the status of the occupants, i.e., whether they are moving is performed by the health state determining mechanism 151, such as the motion sensors, heartbeat sensors, chemical sensors, etc. Moreover, the communications link through the communications unit 154 can be activated immediately after the crash to enable personnel at the remote facility to initiate communications with the vehicle.

Once an occupying item has been located in a vehicle, or any object outside of the vehicle, the identification or categorization information along with an image, including an IR or multispectral image, or icon of the object can be sent via a telematics channel to a remote location. A passing vehicle, for example, can send a picture of an accident or a system in a vehicle that has had an accident can send an image of the occupant(s) of the vehicle to aid in injury assessment by the EMS team.

Although in most if not all of the embodiments described above, it has been assumed that the transmission of images or other data from the vehicle to the EMS or other off-vehicle (remote) site is initiated by the vehicle, this may not always be the case and in some embodiments, provision is made for the off-vehicle site to initiate the acquisition and/or transmission of data including images from the vehicle. Thus, for example, once an EMS operator knows that there has been an accident, he or she can send a command to the vehicle to control components in the vehicle to cause the components send images and other data so that the situation can be monitored by the operator or other person. The capability to receive and initiate such transmissions can also be provided in an emergency vehicle such as a police car or ambulance. In this manner, for a stolen vehicle situation, the police officer, for example, can continue to monitor the interior of the stolen vehicle.

Figure 36:
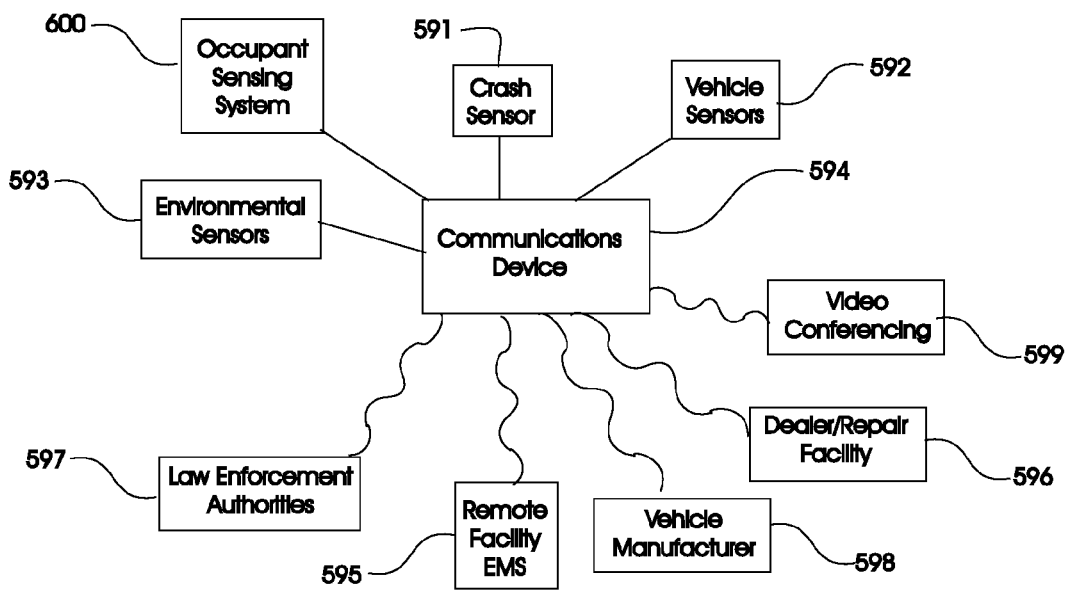
FIG. 36 is a schematic view of overall telematics system in accordance with the invention.

FIG. 36 shows a schematic of the integration of the occupant sensing with a telematics link and the vehicle diagnosis with a telematics link. As envisioned, the occupant sensing system 600 includes those components which determine the presence, position, health state, and other information relating to the occupants, for example the transducers discussed above with reference to FIGS. 1, 2 and 35 and the SAW device discussed above with reference to FIG. 135 of the '881 application. Information relating to the occupants includes information as to what the driver is doing, talking on the phone, communicating with OnStar® or other route guidance, listening to the radio, sleeping, drunk, drugged, having a heart attack The occupant sensing system may also be any of those systems and apparatus described in any of the current assignee's above-referenced patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor system 591 is provided and determines when the vehicle experiences a crash. This crash sensor may be part of the occupant restraint system or independent from it. Crash sensor system 591 may include any type of crash sensors, including one or more crash sensors of the same or different types.

Vehicle sensors 592 include sensors which detect the operating conditions of the vehicle such as those sensors discussed with reference to FIGS. 135-138 of the '881 application and tire sensors such as disclosed in U.S. Ser. No. 06/662,642. Other examples include velocity and acceleration sensors, and angle and angular rate pitch, roll and yaw sensors. Of particular importance are sensors that tell what the car is doing: speed, skidding, sliding, location, communicating with other cars or the infrastructure, etc.

Environment sensors 593 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 600, crash sensors 591, vehicle sensors 592, environment sensors 593 and all other sensors listed above can be coupled to a communications device 594 which may contain a memory unit and appropriate electrical hardware to communicate with the sensors, process data from the sensors, and transmit data from the sensors. The memory unit would be useful to store data from the sensors, updated periodically, so that such information could be transmitted at set time intervals.

The communications device 594 can be designed to transmit information to any number of different types of facilities. For example, the communications device 594 would be designed to transmit information to an emergency response facility 595 in the event of an accident involving the vehicle.

The transmission of the information could be triggered by a signal from a crash sensor 591 that the vehicle was experiencing a crash or experienced a crash. The information transmitted could come from the occupant sensing system 600 so that the emergency response could be tailored to the status of the occupants. For example, if the vehicle was determined to have ten occupants, multiple ambulances might be sent. Also, if the occupants are determined not be breathing, then a higher priority call with living survivors might receive assistance first. As such, the information from the occupant sensing system 600 would be used to prioritize the duties of the emergency response personnel.

Information from the vehicle sensors 592 and environment sensors 593 can also be transmitted to law enforcement authorities 597 in the event of an accident so that the cause(s) of the accident could be determined. Such information can also include information from the occupant sensing system 600, which might reveal that the driver was talking on the phone, putting on make-up, or another distracting activity, information from the vehicle sensors 592 which might reveal a problem with the vehicle, and information from the environment sensors 593 which might reveal the existence of slippery roads, dense fog and the like.

Information from the occupant sensing system 600, vehicle sensors 592 and environment sensors 593 can also be transmitted to the vehicle manufacturer 598 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 592 relating to component failure could be transmitted to a dealer/repair facility 596 which could schedule maintenance to correct the problem.

The communications device 594 can be designed to transmit particular information to each site, i.e., only information important to be considered by the personnel at that site. For example, the emergency response personnel have no need for the fact that the tire pressure was too low but such information is important to the law enforcement authorities 597 (for the possible purpose of issuing a recall of the tire and/or vehicle) and the vehicle manufacturer 598.

In one exemplifying use of the system shown in FIG. 36, the operator at the remote facility 595 could be notified when the vehicle experiences a crash, as detected by the crash sensor system 591 and transmitted to the remote facility 595 via the communications device 594. In this case, if the vehicle occupants are unable to, or do not, initiate communications with the remote facility 595, the operator would be able to receive information from the occupant sensing system 600, as well as the vehicle sensors 592 and environmental sensors 593. The operator could then direct the appropriate emergency response personnel to the vehicle. The communications device 594 could thus be designed to automatically establish the communications channel with the remote facility when the crash sensor system 591 determines that the vehicle has experienced a crash.

The communications device 594 can be a cellular phone, OnStar® or other subscriber-based telematics system, a peer-to-peer vehicle communication system that eventually communicates to the infrastructure and then, perhaps, to the Internet with e-mail to the dealer, manufacturer, vehicle owner, law enforcement authorities or others. It can also be a vehicle to LEO or Geostationary satellite system such as Skybitz which can then forward the information to the appropriate facility either directly or through the Internet.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone system, a communication via GEO, geocentric or other satellite system and any communication that communicates the results of a pattern recognition system analysis. Also, any communication from a vehicle that combines sensor information with location information is anticipated by at least one of the inventions disclosed herein.

When optical sensors are provided as part of the occupant sensing system 600, video conferencing becomes a possibility, whether or not the vehicle experiences a crash. That is, the occupants of the vehicle can engage in a video conference with people at another location 599 via establishment of a communications channel by the communications device 594.

The vehicle diagnostic system described above using a telematics link can transmit information from any type of sensors on the vehicle.

5.2 Telematics with Non-Automotive Vehicles

The transmission of data obtained from imagers, or other transducers, to another location, requiring the processing of the information, using neural networks for example, to a remote location is an important feature of the inventions disclosed herein. This capability can permit an owner of a cargo container or truck trailer to obtain a picture of the interior of the vehicle at any time via telematics. When coupled with occupant sensing, the driver of a vehicle can be recognized and the result sent by telematics for authorization to minimize the theft or unauthorized operation of a vehicle. The recognition of the driver can either be performed on the vehicle or an image of the driver can be sent to a remote location for recognition at that location.

Generally monitoring of containers, trailers, chassis etc. is accomplished through telecommunications primarily with LEO or geostationary satellites or through terrestrial-based communication systems. These systems are commercially available and will not be discussed here. Expected future systems include communication between the container and the infrastructure to indicate to the monitoring authorities that a container with a particular identification number is passing a particular terrestrial point. If this is expected, then no action would be taken. The container identification number can be part of a national database that contains information as to the contents of the container. Thus, for example, if a container containing hazardous materials approaches a bridge or tunnel that forbids such hazardous materials from passing over the bridge or through the tunnel, then an emergency situation can be signaled and preventive action taken.

It is expected that monitoring of the transportation of cargo containers will dramatically increase as the efforts to reduce terrorist activities also increase. If every container that passes within the borders of the United States has an identification number and that number is in a database that provides the contents of that container, then the use of shipping containers by terrorists or criminals should gradually be eliminated. If these containers are carefully monitored by satellite or another communication system that indicates any unusual activity of a container, an immediate investigation can result and then the cargo transportation system will gradually approach perfection where terrorists or criminals are denied this means of transporting material into and within the United States. If any container is found containing contraband material, then the entire history of how that container entered the United States can be checked to determine the source of the failure. If the failure is found to have occurred at a loading port outside of the United States, then sanctions can be imposed on the host country that could have serious effects on that country's ability to trade worldwide. Just the threat of such an action would be a significant deterrent. Thus, the use of containers to transport hazardous materials or weapons of mass destruction as well as people, narcotics, or other contraband and can be effectively eliminated through the use of the container monitoring system of at least one of the inventions disclosed herein.

Prior to the entry of a container ship into a harbor, a Coast Guard boat from the U.S. Customs Service can approach the container vessel and scan all of the containers thereon to be sure that all such containers are registered and tracked including their contents. Where containers contain dangerous material legally, the seals on those containers can be carefully investigated prior to the ship entering U.S. waters. Obviously, many other security precautions can now be conceived once the ability to track all containers and their contents has been achieved according to the teachings of at least one of the inventions disclosed herein.

Containers that enter the United States through land ports of entry can also be interrogated in a similar fashion. As long as the shipper is known and reputable and the container contents are in the database, which would probably be accessible over the Internet, is properly updated, then all containers will be effectively monitored that enter the United States with the penalty of an error resulting in the disenfranchisement of the shipper, and perhaps sanctions against the country, which for most reputable shippers or shipping companies would be a severe penalty sufficient to cause such shippers or shipping companies to take appropriate action to assure the integrity of the shipping containers. Naturally, intelligent selected random inspections guided by the container history would still take place.

Although satellite communication is preferred, communication using cell phones and infrastructure devices placed at appropriate locations along roadways are also possible. Eventually there will be a network linking all vehicles on the highways in a peer-to-peer arrangement (perhaps using Bluetooth, IEEE 802.11 (WI-FI), Wi-Mobile or other local, mesh or ad-hoc network) at which time information relative to container contents etc. can be communicated to the Internet or elsewhere through this peer-to-peer network. It is expected that a pseudo-noise-based or similar communication system such as a code division multiple access (CDMA) system, wherein the identifying code of a vehicle is derived from the vehicle's GPS determined location, will be the technology of choice for this peer-to-peer vehicle network. It is expected that this network will be able to communicate such information to the Internet (with proper security precautions including encryption where necessary or desired) and that all of the important information relative to the contents of moving containers throughout the United States will be available on the Internet on a need-to-know basis. Thus, law enforcement agencies can maintain computer programs that will monitor the contents of containers using information available from the Internet. Similarly, shippers and receivers can monitor the status of their shipments through a connection onto the Internet. Thus, the existence of the Internet or equivalent can be important to the monitoring system described herein.

An alternate method of implementing the invention is to make use of a cell phone or PDA. Cell phones that are now sold contain a GPS-based location system as do many PDAs. Such a system along with minimal additional apparatus can be used to practice the teachings disclosed herein. In this case, the cell phone, PDA or similar portable device could be mounted through a snap-in attachment system, for example, wherein the portable device is firmly attached to the vehicle. The device can at that point, for example, obtain an ID number from the container through a variety of methods such as a RFID, SAW or hardwired based system. It can also connect to a satellite antenna that would permit the device to communicate to a LEO or GEO satellite system, such as Skybitz as described above. Since the portable device would only operate on a low duty cycle, the battery should last for many days or perhaps longer. Of course, if it is connected to the vehicle power system, its life could be indefinite. Naturally, when power is waning, this fact can be sent to the satellite or cell phone system to alert the appropriate personnel. Since a cell phone contains a microphone, it could be trained, using an appropriate pattern recognition system, to recognize the sound of an accident or the deployment of an airbag or similar event. It thus becomes a very low cost OnStar® type telematics system.

As an alternative to using a satellite network, the cell phone network can be used in essentially the same manner when a cell phone signal is available. Naturally, all of the sensors disclosed herein can either be incorporated into the portable device or placed on the vehicle and connected to the portable device when the device is attached to the vehicle. This system has a key advantage of avoiding obsolescence. With technology rapidly changing, the portable device can be exchanged for a later model or upgraded as needed or desired, keeping the overall system at the highest technical state. Existing telematics systems such as OnStar® can of course also be used with this system.

Importantly, an automatic emergency notification system can now be made available to all owners of appropriately configured cell phones, PDAs, or other similar portable devices that can operate on a very low cost basis without the need for a monthly subscription since they can be designed to operate only on an exception basis. Owners would pay only as they use the service. Stolen vehicle location, automatic notification in the event of a crash even with the transmission of a picture for camera-equipped devices is now possible. Automatic door unlocking can also be done by the device since it could transmit a signal to the vehicle, in a similar fashion as a keyless entry system, from either inside or outside the vehicle. The phone can be equipped with a biometric identification system such as fingerprint, voice print, facial or iris recognition etc. thereby giving that capability to vehicles. The device can thus become the general key to the vehicle or house, and can even open the garage door etc. If the cell phone is lost, its whereabouts can be instantly found since it has a GPS receiver and knows where it is. If it is stolen, it will become inoperable without the biometric identification from the owner.

Other communication systems will also frequently be used to connect the container with the chassis and/or the tractor and perhaps the identification of the driver or operator. Thus, information can be available on the Internet showing what tractor, what trailer, what container and what driver is operating at a particular time, at a particular GPS location, on a particular roadway, with what particular container contents. Suitable security will be provided to ensure that this information is not freely available to the general public. Naturally, redundancy can be provided to prevent the destruction or any failure of a particular site from failing the system.

This communication between the various elements of the shipping system which are co-located (truck, trailer, container, container contents, driver etc.) can be connected through a wired or wireless bus such as the CAN bus. Also, an electrical system such as disclosed in U.S. Ser. No. 05/809,437, U.S. Ser. No. 06/175,787 and U.S. Ser. No. 06/326,704 can also be used in the invention.

6. Pattern Recognition

In basic embodiments of the inventions, wave or energy-receiving transducers are arranged in the vehicle at appropriate locations, associated algorithms are trained, if necessary depending on the particular embodiment, and function to determine whether a life form, or other object, is present in the vehicle and if so, how many life forms or objects are present. A determination can also be made using the transducers as to whether the life forms are humans, or more specifically, adults, child in child seats, etc. As noted above and below, this is possible using pattern recognition techniques. Moreover, the processor or processors associated with the transducers can be trained (loaded with a trained pattern recognition algorithm) to determine the location of the life forms or objects, either periodically or continuously or possibly only immediately before, during and after a crash. The location of the life forms or objects can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as determining the position of his or her extremities and head and chest (specific). Or, a determination can be made as to the size or type of objects such as boxes are in a truck trailer or cargo container. The degree of detail is limited by several factors, including, e.g., the number, position and type of transducers and the training of the pattern recognition algorithm.

When different objects are placed on the front passenger seat, the images (here "image" is used to represent any form of signal) from transducers 6, 8, 10 (FIG. 1) are different for different objects but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the set of "rules" or an algorithm that differentiates the images of one type of object from the images of other types of objects, for example which differentiate the adult occupant images from the rear facing child seat images or boxes. The similarities of these images for various child seats are frequently not obvious to a person looking at plots of the time series from ultrasonic sensors, for example, and thus computer algorithms are developed to sort out the various patterns. For a more detailed discussion of pattern recognition see U.S. RE37260 to Varga et. and discussions elsewhere herein.

The determination of these rules is important to the pattern recognition techniques used in at least one of the inventions disclosed herein. In general, three approaches have been useful, artificial intelligence, fuzzy logic and artificial neural networks including modular or combination neural networks. Other types of pattern recognition techniques may also be used, such as sensor fusion as disclosed in Corrado U.S. Ser. No. 05/482,314, U.S. Ser. No. 05/890,085, and U.S. 06/249,729. In some of the inventions disclosed herein, such as the determination that there is an object in the path of a closing window or door using acoustics or optics as described herein, the rules are sufficiently obvious that a trained researcher can look at the returned signals and devise an algorithm to make the required determinations. In others, such as the determination of the presence of a rear facing child seat or of an occupant, artificial neural networks are used to determine the rules. Neural network software for determining the pattern recognition rules is available from various sources such as International Scientific Research, Inc., Panama City, Panama.

The human mind has little problem recognizing faces even when they are partially occluded such as with a hat, sunglasses or a scarf, for example. With the increase in low cost computing power, it is now becoming possible to train a rather large neural network, perhaps a combination neural network, to recognize most of those cases where a human mind will also be successful.

Other techniques which may or may not be part of the process of designing a system for a particular application include the following:

1. Fuzzy logic. Neural networks frequently exhibit the property that when presented with a situation that is totally different from any previously encountered, an irrational decision can result. Frequently, when the trained observer looks at input data, certain boundaries to the data become evident and cases that fall outside of those boundaries are indicative of either corrupted data or data from a totally unexpected situation. It is sometimes desirable for the system designer to add rules to handle these cases. These can be fuzzy logic-based rules or rules based on human intelligence. One example would be that when certain parts of the data vector fall outside of expected bounds that the system defaults to an airbag-enable state or the previously determined state.

2. Genetic algorithms. When developing a neural network algorithm for a particular vehicle, there is no guarantee that the best of all possible algorithms has been selected. One method of improving the probability that the best algorithm has been selected is to incorporate some of the principles of genetic algorithms. In one application of this theory, the network architecture and/or the node weights are varied pseudo-randomly to attempt to find other combinations which have higher success rates. The discussion of such genetic algorithms systems appears in the book *Computational Intelligence* referenced above.

Although neural networks are preferred other classifiers such as Bayesian classifiers can be used as well as any other pattern recognition system. A key feature of most of the inventions disclosed herein is the recognition that the technology of pattern recognition rather than deterministic mathematics should be applied to solving the occupant sensing problem.

6.1 Neural Networks

An occupant can move from a position safely displaced from the airbag to a position where he or she can be seriously injured by the deployment of an airbag within a fraction of a second during pre-crash braking, for example. On the other hand, it takes a substantially longer time period to change the seat occupancy state from a forward facing person to a rear facing child seat, or even from a forward facing child seat to a rear facing child seat. This fact can be used in the discrimination process through post-processing algorithms. One method, which also prepares for DOOP, is to use a two-layered neural network or two separate neural networks. The first one categorizes the seat occupancy into, for example, (1) empty seat, (2) rear facing child seat, (3) forward facing child seat and (4) forward facing human (not in a child seat). The second is used for occupant position determination. In the implementation, the same input layer can be used for both neural networks but separate hidden and output layers are used. This is illustrated in FIG. 53 which is similar to FIG. 19*b* with the addition of a post processing operation for both the categorization and position networks and the separate hidden layer nodes for each network.

If the categorization network determines that either a category (3) or (4) exists, then the second network is run, which determines the location of the occupant. Significant averaging of the vectors is used for the first network and substantial evidence is required before the occupancy class is changed. For example, if data is acquired every 10 milliseconds, the first network might be designed to require 600 out of 1000 changed vectors before a change of state is determined. In this case, at least 6 seconds of confirming data would be required. Such a system would therefore not be fooled by a momentary placement of a newspaper by a forward facing human, for example, that might look like a rear-facing child seat.

If, on the other hand, a forward facing human were chosen, his or her position could be determined every 10 milliseconds. A decision that the occupant had moved out of position would not necessarily be made from one 10 millisecond reading unless that reading was consistent with previous readings. Nevertheless, a series of consistent readings would lead to a decision within 10 milliseconds of when the occupant crossed over into the danger zone proximate to the airbag module. This method of using history is used to eliminate the effects of temperature gradients, for example, or other events that could temporarily distort one or more vectors. The algorithms which perform this analysis are part of the post-processor.

More particularly, in one embodiment of the method in accordance with at least one of the inventions herein in which two neural networks are used in the control of the deployment of an occupant restraint device based on the position of an object in a passenger compartment of a vehicle, several wave-emitting and receiving transducers are mounted on the vehicle. In one preferred embodiment, the transducers are ultrasonic transducers which simultaneously transmit and receive waves at different frequencies from one another. A determination is made by a first neural network whether the object is of a type requiring deployment of the occupant restraint device in the event of a crash involving the vehicle based on the waves received by at least some of the transducers after being modified by passing through the passenger compartment. If so, another determination is made by a second neural network whether the position of the object relative to the occupant restraint device would cause injury to the object upon deployment of the occupant restraint device based on the waves received by at least some of the transducers. The first neural network is trained on signals from at least some of the transducers representative of waves received by the transducers when different objects are situated in the passenger compartment. The second neural network is trained on signals from at least some of the transducers when different objects in different positions are situated in the passenger compartment.

The transducers used in the training of the first and second neural networks and operational use of method are not necessary the same transducers and different sets of transducers can be used for the typing or categorizing of the object via the first neural network and the position determination of the object via the second neural network.

The modifications described above with respect to the use of ultrasonic transducers can also be used in conjunction with a dual neural network system. For example, motion of a respective vibrating element or cone of one or more of the transducers may be electronically or mechanically diminished or suppressed to reduce ringing of the transducer and/or one or more of the transducers may be arranged in a respective tube having an opening through which the waves are transmitted and received.

In another embodiment of the invention, a method for categorizing and determining the position of an object in a passenger compartment of a vehicle entails mounting a plurality of wave-receiving transducers on the vehicle, training a first neural network on signals from at least some of the transducers representative of waves received by the transducers when different objects in different positions are situated in the passenger compartment, and training a second neural network on signals from at least some of the transducers representative of waves received by the transducers when different objects in different positions are situated in the passenger compartment. As such, the first neural network provides an output signal indicative of the categorization of the object while the second neural network provides an output signal indicative of the position of the object. The transducers may be controlled to transmit and receive waves each at a different frequency, as discussed elsewhere herein, and one or more of the transducers may be arranged in a respective tube having an opening through which the waves are transmitted and received.

Although this system is described with particular advantageous use for ultrasonic and optical transducers, it is conceivable that other transducers other than the ultrasonics or optics can also be used in accordance with the invention. A dual neural network is a form of a modular neural network and both are subsets of combination neural networks.

The system used in a preferred implementation of at least one of the inventions disclosed herein for the determination of the presence of a rear facing child seat, of an occupant or of an empty seat, for example, is the artificial neural network, which is also commonly referred to as a trained neural network. In one case, illustrated in FIG. 1, the network operates on the returned signals as sensed by transducers 6, 8, 9 and 10, for example. Through a training session, the system is taught to differentiate between the different cases. This is done by conducting a large number of experiments where a selection of the possible child seats is placed in a large number of possible orientations on the front passenger seat. Similarly, a sufficiently large number of experiments are run with human occupants and with boxes, bags of groceries and other objects (both inanimate and animate). For each experiment with different objects and the same object in different positions, the returned signals from the transducers 6, 8, 9 and 10, for example, are associated with the identification of the occupant in the seat or the empty seat and information about the occupant such as its orientation if it is a child seat and/or position. Data sets are formed from the returned signals and the identification and information about the occupant or the absence of an occupant. The data sets are input into a neural network-generating program that creates a trained neural network that can, upon receiving input of returned signals from the transducers 6, 8, 9 and 10, provide an output of the identification and information about the occupant most likely situated in the seat or ascertained the existence of an empty seat. Sometimes as many as 1,000,000 such experiments are run before the neural network is sufficiently trained and tested so that it can differentiate among the several cases and output the correct decision with a very high probability. The data from each trial is combined to form a one-dimensional array of data called a vector. Of course, it must be realized that a neural network can also be trained to differentiate among additional cases, for example, a forward facing child seat. It can also be trained to recognize the existence of one or more boxes or other cargo within a truck trailer, cargo container, automobile trunk or railroad car, for example.

Considering now FIG. 9, the normalized data from the ultrasonic transducers 6, 8, 9 and 10, the seat track position detecting sensor 74, the reclining angle detecting sensor 57, from the weight sensor(s) 7, 76 and 97, from the heartbeat sensor 71, the capacitive sensor 78 and the motion sensor 73 are input to the neural network 65, and the neural network 65 is then trained on this data. More specifically, the neural network 65 adds up the normalized data from the ultrasonic transducers, from the seat track position detecting sensor 74, from the reclining angle detecting sensor 57, from the weight sensor(s) 7, 76 and 97, from the heartbeat sensor 71, from the capacitive sensor 78 and from the motion sensor 73 with each data point multiplied by an associated weight according to the conventional neural network process to determine correlation function (step S6 in FIG. 12).

Looking now at FIG. 19B, in this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 74, the data (140th) from the reclining angle detecting sensor 57, the data (141st) from the weight sensor(s) 7 or 76, the data ($142^{nd}$) from the heartbeat sensor 71, the data ($143^{rd}$) from the capacitive sensor and the data ($144^{th}$) from the motion sensor (the last three inputs are not shown on FIG. 19B. Each of the connecting points of the layer 1 has an appropriate threshold value, and if the sum of measured data exceeds the threshold value, each of the connecting points will output a signal to the connecting points of layer 2. Although the weight sensor input is shown as a single input, in general there will be a separate input from each weight sensor used. For example, if the seat has four seat supports and a strain measuring element is used on each support, what will be four data inputs to the neural network.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above-referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively, for example.

The neural network 65 recognizes the seated-state of a passenger A by training as described in several books on Neural Networks mentioned in the above referenced patents and patent applications. Then, after training the seated-state of the passenger A and developing the neural network weights, the system is tested. The training procedure and the test procedure of the neural network 65 will hereafter be described with a flowchart shown in FIG. 12.

The threshold value of each connecting point is determined by multiplying weight coefficients and summing up the results in sequence, and the aforementioned training process is to determine a weight coefficient Wj so that the threshold value (ai) is a previously determined output.

$ai=\Sigma Wj \cdot Xj$ (j=1 to N)

wherein

Wj is the weight coefficient,

Xj is the data and

N is the number of samples.

Based on this result of the training, the neural network 65 generates the weights for the coefficients of the correlation function or the algorithm (step S7).

At the time the neural network 65 has learned a suitable number of patterns of the training data, the result of the training is tested by the test data. In the case where the rate of correct answers of the seated-state detecting unit based on this test data is unsatisfactory, the neural network is further trained and the test is repeated. In this embodiment, the test was performed based on about 600,000 test patterns. When the rate of correct test result answers was at about 98%, the training was ended. Further improvements to the ultrasonic occupant sensor system has now resulted in accuracies exceeding 98% and for the optical system exceeding 99%.

The neural network software operates as follows. The training data is used to determine the weights which multiply the values at the various nodes at the lower level when they are combined at nodes at a higher level. Once a sufficient number of iterations have been accomplished, the independent data is used to check the network. If the accuracy of the network using the independent data is lower than the last time that it was checked using the independent data, then the previous weights are substituted for the new weights and training of the network continues on a different path. Thus, although the independent data is not used to train the network, it does strongly affect the weights. It is therefore not really independent. Also, both the training data and the independent data are created so that all occupancy states are roughly equally represented. As a result, a third set of data is used which is structured to more closely represent the real world of vehicle occupancy. This third data set, the "real world" data, is then used to arrive at a figure as to the real accuracy of the system.

The neural network 65 has outputs 65a, 65b and 65c (FIG. 9). Each of the outputs 65a, 65b and 65c outputs a signal of logic 0 or 1 to a gate circuit or algorithm 77. Based on the signals from the outputs 65a, 65b and 65c, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP or OOPA), and the output (100) corresponds to a normally seated passenger (NSP or FFA) or a forward facing child seat (FFCS).

The gate circuit (seated-state evaluation circuit) 77 can be implemented by an electronic circuit or by a computer algorithm by those skilled in the art and the details will not be presented here. The function of the gate circuit 77 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor(s) as being above or below 60 lbs. and thereby separates the two cases just described and results in five discrete outputs.

The use of weight data must be heavily filtered since during driving conditions, especially on rough roads or during an accident, the weight sensors will give highly varying output. The weight sensors, therefore, are of little value during the period of time leading up to and including a crash and their influence must be minimized during this time period. One way of doing this is to average the data over a long period of time such as from 5 seconds to a minute or more.

Thus, the gate circuit 77 fulfills a role of outputting five kinds of seated-state evaluation signals, based on a combination of three kinds of evaluation signals from the neural network 65 and superimposed information from the weight sensor(s). The five seated-state evaluation signals are input to an airbag deployment determining circuit that is part of the airbag system and will not be described here. As disclosed in the above-referenced patents and patent applications, the output of this system can also be used to activate a variety of lights or alarms to indicate to the operator of the vehicle the seated state of the passenger. The system that has been here described for the passenger side is also applicable for the most part for the driver side.

An alternate and preferred method of accomplishing the function performed by the gate circuit is to use a modular neural network. In this case, the first level neural network is trained on determining whether the seat is occupied or vacant. The input to this neural network consists of all of the data points described above. Since the only function of this neural network is to ascertain occupancy, the accuracy of this neural network is very high. If this neural network determines that the seat is not vacant, then the second level neural network determines the occupancy state of the seat.

In this embodiment, although the neural network 65 has been employed as an evaluation circuit, the mapping data of the coefficients of a correlation function may also be implemented or transferred to a microcomputer to constitute the evaluation circuit (see Step S8 in FIG. 12).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

The neural network has been previously trained on a significant number of occupants of the passenger compartment. The number of such occupants depends strongly on whether the driver or the passenger seat is being analyzed. The variety of seating states or occupancies of the passenger seat is vastly greater than that of the driver seat. For the driver seat, a typical training set will consist of approximately 100 different vehicle occupancies. For the passenger seat, this number can exceed 1000. These numbers are used for illustration purposes only and will differ significantly from vehicle model to vehicle model. Of course many vectors of data will be taken for each occupancy as the occupant assumes different positions and postures.

The neural network is now used to determine which of the stored occupancies most closely corresponds to the measured data. The output of the neural network can be an index of the setup that was used during training that most closely matches the current measured state. This index can be used to locate stored information from the matched trained occupancy. Information that has been stored for the trained occupancy typically includes the locus of the centers of the chest and head of the driver, as well as the approximate radius of pixels which is associated with this center to define the head area, for example. For the case of FIG. 8A, it is now known from this exercise where the head, chest, and perhaps the eyes and ears, of the driver are most likely to be located and also which pixels should be tracked in order to know the precise position of the driver's head and chest. What has been described above is the identification process for automobile occupancy and is only representative of the general process. A similar procedure, although usually simpler with fewer steps, is applicable to other vehicle monitoring cases.

The use of trainable pattern recognition technologies such as neural networks is an important part of the some of the inventions discloses herein particularly for the automobile occupancy case, although other non-trained pattern recognition systems such as fuzzy logic, correlation, Kalman filters, and sensor fusion can also be used. These technologies are implemented using computer programs to analyze the patterns of examples to determine the differences between different categories of objects. These computer programs are derived using a set of representative data collected during the training phase, called the training set. After training, the computer programs output a computer algorithm containing the rules permitting classification of the objects of interest based on the data obtained after installation in the vehicle. These rules, in the form of an algorithm, are implemented in the system that is mounted onto the vehicle. The determination of these rules is important to the pattern recognition techniques used in at least one of the inventions disclosed herein. Artificial neural networks using back propagation are thus far the most successful of the rule determination approaches, however, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data than is not within the training data. It is well known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the passenger compartment and another for determining the location of the object dynamically.

Numerous books and articles, including more that 500 U.S. patents, describe neural networks in great detail and thus the theory and application of this technology is well known and will not be repeated here. Except in a few isolated situations where neural networks have been used to solve particular problems limited to engine control, for example, they have not previously been applied to automobiles, trucks or other vehicle monitoring situations.

The system generally used in the instant invention, therefore, for the determination of the presence of a rear facing child seat, an occupant, or an empty seat is the artificial neural network or a neural-fuzzy system. In this case, the network operates on the returned signals from a CCD or CMOS array as sensed by transducers 49, 50, 51 and 54 in FIG. 8D, for example. For the case of the front passenger seat, for example, through a training session, the system is taught to differentiate between the three cases. This is done by conducting a large number of experiments where available child seats are placed in numerous positions and orientations on the front passenger seat of the vehicle.

Once the network is determined, it is possible to examine the result to determine, from the algorithm created by the neural network software, the rules that were finally arrived at by the trial and error training technique. In that case, the rules can then be programmed into a microprocessor. Alternately, a neural computer can be used to implement the neural network directly. In either case, the implementation can be carried out by those skilled in the art of pattern recognition using neural networks. If a microprocessor is used, a memory device is also required to store the data from the analog to digital converters which digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

A review of the literature on neural networks yields the conclusion that the use of such a large training set is unique in the neural network field. The rule of thumb for neural networks is that there must be at least three training cases for each network weight. Thus, for example, if a neural network has 156 input nodes, 10 first hidden layer nodes, 5 second hidden layer nodes, and one output node this results in a total of 1,622 weights. According to conventional theory 5000 training examples should be sufficient. It is highly unexpected, therefore, that greater accuracy would be achieved through 100 times that many cases. It is thus not obvious and cannot be deduced from the neural network literature that the accuracy of the system will improve substantially as the size of the training database increases even to tens of thousands of cases. It is also not obvious looking at the plots of the vectors obtained using ultrasonic transducers that increasing the number of tests or the database size will have such a significant effect on the system accuracy. Each of the vectors is typically a rather course plot with a few significant peaks and valleys. Since the spatial resolution of an ultrasonic system is typically about 2 to 4 inches, it is once again surprising that such a large database is required to achieve significant accuracy improvements.

The back propagation neural network is a very successful general-purpose network. However, for some applications, there are other neural network architectures that can perform better. If it has been found, for example, that a parallel network as described above results in a significant improvement in the system, then, it is likely that the particular neural network architecture chosen has not been successful in retrieving all of the information that is present in the data. In such a case, an RCE, Stochastic, Logicon Projection, cellular, support vector machine or one of the other approximately 30 types of neural network architectures can be tried to see if the results improve. This parallel network test, therefore, is a valuable tool for determining the degree to which the current neural network is capable of using efficiently the available data.

One of the salient features of neural networks is their ability of find patterns in data regardless of its source. Neural networks work well with data from ultrasonic sensors, optical imagers, strain gage and bladder weight sensors, temperature sensors, chemical sensors, radiation sensors, pressure sensors, electric field sensors, capacitance based sensors, any other wave sensors including the entire electromagnetic spectrum, etc. If data from any sensors can be digitized and fed into a neural network generating program and if there is information in the pattern of the data then neural networks can be a viable method of identifying those patterns and correlating them with a desired output function. Note that although the inventions disclosed herein preferably use neural networks and combination neural networks to be described next, these inventions are not limited to this form or method of pattern recognition. The major breakthrough in occupant sensing came with the recognition by the current assignee that ordinary analysis using mathematical equations where the researcher looks at the data and attempts, based on the principles of statistics, engineering or physics, to derive the relevant relationships between the data and the category and location of an occupying item, is not the proper approach and that pattern recognition technologies should be used. This is believed to be the first use of such pattern recognition technologies in the automobile safety and monitoring fields with the exception that neural networks have been used by the current assignee and others as the basis of a crash sensor algorithm and by certain automobile manufacturers for engine control. Note for many monitoring situations in truck trailers, cargo containers and railroad cars where questions such as "is there anything in the vehicle?" are asked, neural networks may not always be required.

7. Other Products, Outputs, Features

Once the occupancy state of the seat (or seats) in the vehicle or of the vehicle itself, as in a cargo container, truck trailer or railroad car, is known, this information can be used to control or affect the operation of a significant number of vehicular systems, components and devices. That is, the systems, components and devices in the vehicle can be controlled and perhaps their operation optimized in consideration of the occupancy of the seat(s) in the vehicle or of the vehicle itself. Thus, the vehicle includes control means coupled to the processor means for controlling a component or device in the vehicle in consideration of the output indicative of the current occupancy state of the seat obtained from the processor means. The component or device can be an airbag system including at least one deployable airbag whereby the deployment of the airbag is suppressed, for example, if the seat is occupied by a rear-facing child seat, or otherwise the parameters of the deployment are controlled. Thus, the seated-state detecting unit described above may be used in a component adjustment system and method described below when the presence of a human being occupying the seat is detected. The component can also be a telematics system such as the Skybitz or OnStar systems where information about the occupancy state of the vehicle, or changes in that state, can be sent to a remote site.

The component adjustment system and methods in accordance with the invention can automatically and passively adjust the component based on the morphology of the occupant of the seat. As noted above, the adjustment system may include the seated-state detecting unit described above so that it will be activated if the seated-state detecting unit detects that an adult or child occupant is seated on the seat, that is, the adjustment system will not operate if the seat is occupied by a child seat, pet or inanimate objects. Obviously, the same system can be used for any seat in the vehicle including the driver seat and the passenger seat(s). This adjustment system may incorporate the same components as the seated-state detecting unit described above, that is, the same components may constitute a part of both the seated-state detecting unit and the adjustment system, for example, the weight measuring system.

The adjustment system described herein, although improved over the prior art, will at best be approximate since two people, even if they are identical in all other respects, may have a different preferred driving position or other preferred adjusted component location or orientation. A system that automatically adjusts the component, therefore, should learn from its errors. Thus, when a new occupant sits in the vehicle, for example, the system automatically estimates the best location of the component for that occupant and moves the component to that location, assuming it is not already at the best location. If the occupant changes the location, the system should remember that change and incorporate it into the adjustment the next time that person enters the vehicle and is seated in the same seat. Therefore, the system need not make a perfect selection the first time but it should remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

Thus, although the above description mentions that the airbag system can be controlled by the control circuitry 20 (FIG. 1), any vehicular system, component or subsystem can be controlled based on the information or data obtained by transmitter and/or receiver assemblies 6, 8, 9 and 10. Control circuitry 20 can be programmed or trained, if for example a neural network is used, to control heating an air-conditioning systems based on the presence of occupants in certain positions so as to optimize the climate control in the vehicle. The entertainment system can also be controlled to provide sound only to locations at which occupants are situated. There is no limit to the number and type of vehicular systems, components and subsystems that can be controlled using the analysis techniques described herein.

Furthermore, if multiple vehicular systems are to be controlled by control circuitry 20, then these systems can be controlled by the control circuitry 20 based on the status of particular components of the vehicle. For example, an indication of whether a key is in the ignition can be used to direct the control circuitry 20 to either control an airbag system (when the key is present in the ignition) or an antitheft system (when the key is not present in the ignition). Control circuitry 20 would thus be responsive to the status of the ignition of the motor vehicle to perform one of a plurality of different functions. More particularly, the pattern recognition algorithm, such as the neural network described herein, could itself be designed to perform in a different way depending on the status of a vehicular component such as the detected presence of a key in the ignition. It could provide one output to control an antitheft system when a key is not present and another output when a key is present using the same inputs from the transmitter and/or receiver assemblies 6, 8, 9 and 10.

The algorithm in control circuitry 20 can also be designed to determine the location of the occupant's eyes either directly or indirectly through a determination of the location of the occupant and an estimation of the position of the eyes therefrom. As such, the position of the rear view mirror 55 can be adjusted to optimize the driver's use thereof.

7.1 Control of Passive Restraints

The use of the vehicle interior monitoring system to control the deployment of an airbag is discussed in detail in U.S. Ser. No. 05/653,462 referenced above. In that case, the control is based on the use of a pattern recognition system, such as a neural network, to differentiate between the occupant and his extremities in order to provide an accurate determination of the position of the occupant relative to the airbag. If the occupant is sufficiently close to the airbag module that he is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of at least one of the inventions disclosed herein and the vehicle airbag system 44. A similar system can be provided for the passenger as described in U.S. patent application Ser. No. 10/151,615 filed May 20, 2002.

In this embodiment, ultrasonic transducers 8 and 9 transmit bursts of ultrasonic waves that travel to the occupant where they are reflected back to transducers or receptors/receivers 8 and 9. The time period required for the waves to travel from the generator and return is used to determine the distance from the occupant to the airbag as described in the aforementioned U.S. Ser. No. 05/653,462, i.e., and thus may also be used to determine the position or location of the occupant. An optical imager based system would also be appropriate. In the invention, however, the portion of the return signal that represents the occupants' head or chest, has been determined based on pattern recognition techniques such as a neural network. The relative velocity of the occupant toward the airbag can then be determined, by Doppler principles or from successive position measurements, which permits a sufficiently accurate prediction of the time when the occupant would become proximate to the airbag. By comparing the occupant relative velocity to the integral of the crash deceleration pulse, a determination as to whether the occupant is being restrained by a seatbelt can also be made which then can affect the airbag deployment initiation decision. Alternately, the mere knowledge that the occupant has moved a distance that would not be possible if he were wearing a seatbelt gives information that he is not wearing one.

Another method of providing a significant improvement to the problem of determining the position of the occupant during vehicle deceleration is to input the vehicle deceleration directly into the occupant sensing system. This can be done through the use of the airbag crash sensor accelerometer or a dedicated accelerometer can be used. This deceleration or its integral can be entered directly into the neural network or can be integrated through an additional post-processing algorithm. Post processing in general is discussed in section 11.7 of the parent '881 application. One significant advantage of neural networks is their ability to efficiently use information from any source. It is the ultimate "sensor fusion" system.

A more detailed discussion of this process and of the advantages of the various technologies, such as acoustic or electromagnetic, can be found in SAE paper 940527, "Vehicle Occupant Position Sensing" by Breed et al. In this paper, it is demonstrated that the time delay required for acoustic waves to travel to the occupant and return does not prevent the use of acoustics for position measurement of occupants during the crash event. For position measurement and for many pattern recognition applications, ultrasonics is the preferred technology due to the lack of adverse health effects and the low cost of ultrasonic systems compared with either camera, laser or radar based systems. This situation has changed, however, as the cost of imagers has come down. The main limiting feature of ultrasonics is the wavelength, which places a limitation on the size of features that can be discerned. Optical systems, for example, are required when the identification of particular individuals is desired.

Figure 26:
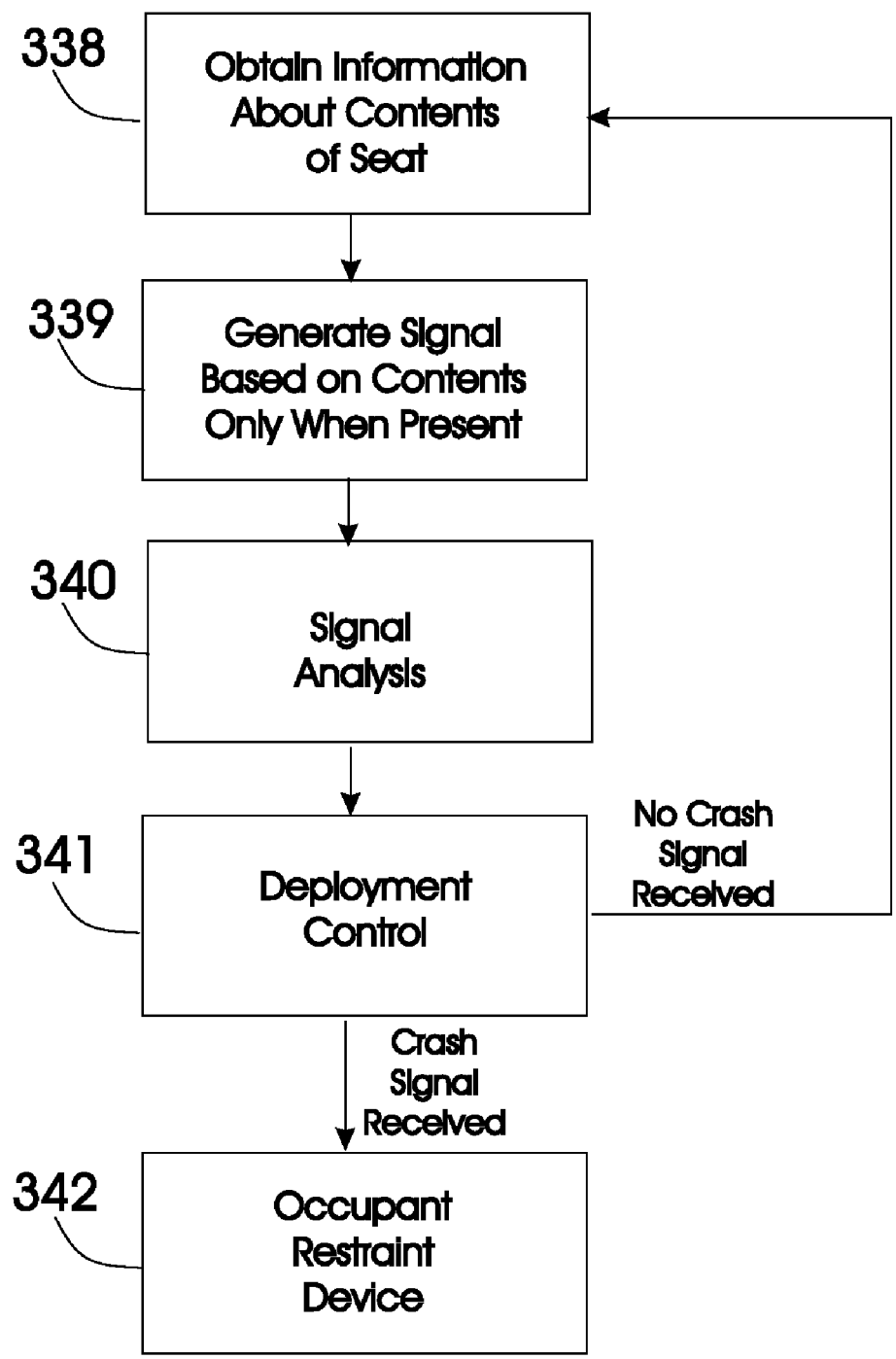
FIG. 26 is a schematic drawing of one embodiment of an occupant restraint device control system in accordance with the invention.

FIG. 26 is a schematic drawing of one embodiment of an occupant restraint device control system in accordance with the invention. The first step is to obtain information about the contents of the seat at step 338, when such contents are present on the seat. To this end, a presence sensor can be employed to activate the system only when the presence of an object, or living being, is detected. Next, at step 339, a signal is generated based on the contents of the seat, with different signals being generated for different contents of the seat. Thus, while a signal for a dog will be different than the signal for a child set, the signals for different child seats will not be that different. Next, at step 340, the signal is analyzed to determine whether a child seat is present, whether a child seat in a particular orientation is present and/or whether a child seat in a particular position is present. Deployment control 341 provides a deployment control signal or command based on the analysis of the signal generated based on the contents of the seat. This signal or command is directed to the occupant protection or restraint device 342 to provide for deployment for that particular content of the seat. The system continually obtains information about the contents of the seat until such time as a deployment signal is received from, e.g., a crash sensor, to initiate deployment of the occupant restraint device.

Figure 27:
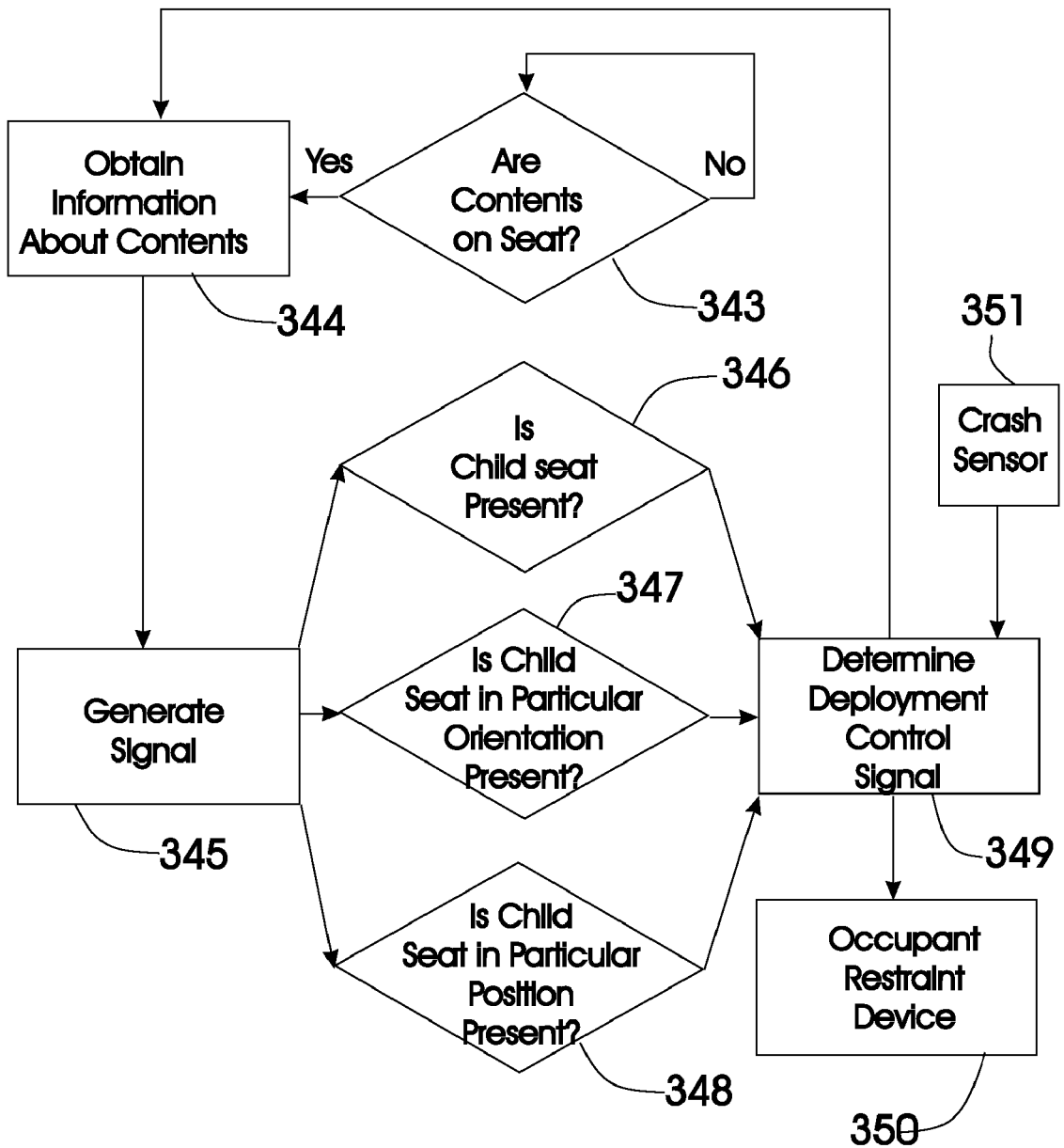
FIG. 27 is a flow chart of the operation of one embodiment of an occupant restraint device control method in accordance with the invention.
Figure 29A:
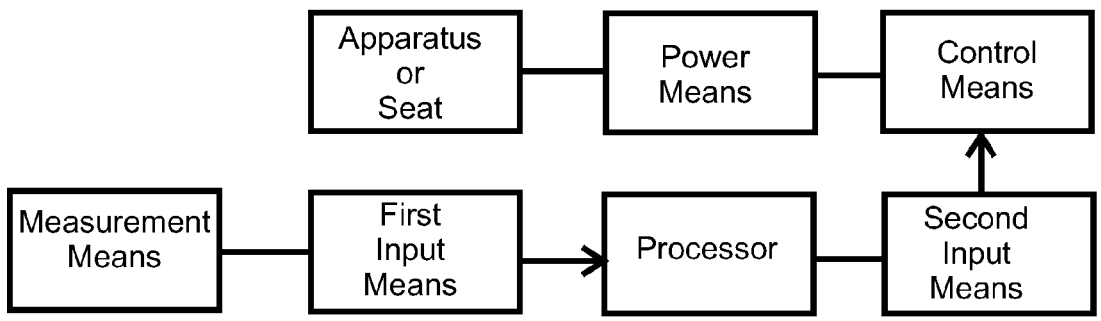
FIGS. 29A and 29B are schematic drawings of basic embodiments of an adjustment system in accordance with the invention.
Figure 29B:
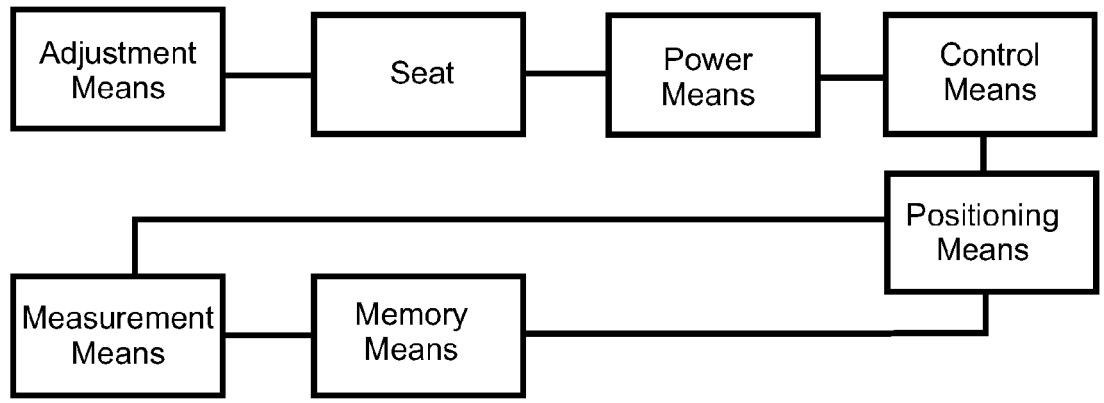

FIG. 27 is a flow chart of the operation of one embodiment of an occupant restraint device control method in accordance with the invention. The first step is to determine whether contents are present on the seat at step 910. If so, information is obtained about the contents of the seat at step 344. At step 345, a signal is generated based on the contents of the seat, with different signals being generated for different contents of the seat. The signal is analyzed to determine whether a child seat is present at step 346, whether a child seat in a particular orientation is present at step 347 and/or whether a child seat in a particular position is present at step 348. Deployment control 349 provides a deployment control signal or command based on the analysis of the signal generated based on the contents of the seat. This signal or command is directed to the occupant protection or restraint device 350 to provide for deployment for those particular contents of the seat. The system continually obtains information about the contents of the seat until such time as a deployment signal is received from, e.g., a crash sensor 351, to initiate deployment of the occupant restraint device.

In another implementation, the sensor algorithm may determine the rate that gas is generated to affect the rate that the airbag is inflated. In all of these cases, the position of the occupant is used to affect the deployment of the airbag either as to whether or not it should be deployed at all, the time of deployment and/or the rate of inflation and/or deflation.

Such a system can also be used to positively identify or confirm the presence of a rear facing child seat in the vehicle, if the child seat is equipped with a resonator. In this case, a resonator 18 is placed on the forward most portion of the child seat, or in some other convenient position, as shown in FIG. 1. The resonator 18, or other type of signal generating device, such as an RFID tag, which generates a signal upon excitation, e.g., by a transmitted energy signal, can be used not only to determine the orientation of the child seat but also to determine the position of the child seat (in essentially the same manner as described above with respect to determining the position of the seat and the position of the seatbelt).

The determination of the presence of a child seat can be used to affect another system in the vehicle. Most importantly, deployment of an occupant restraint device can be controlled depending on whether a child seat is present. Control of the occupant restraint device may entail suppression of deployment of the device. If the occupant restraint device is an airbag, e.g., a frontal airbag or a side airbag, control of the airbag deployment may entail not only suppression of the deployment but also depowered deployment, adjustment of the orientation of the airbag, adjustment of the inflation rate or inflation time and/or adjustment of the deflation rate or time.

Several systems are in development for determining the location of an occupant and modifying the deployment of the airbag based of his or her position. These systems are called "smart airbags". The passive seat control system in accordance with at least one of the inventions disclosed herein can also be used for this purpose as illustrated in FIG. 28. This figure shows an inflated airbag 352 and an arrangement for controlling both the flow of gas into and out of the airbag during a crash. The determination is made based on height sensors 353, 354 and 355 (FIG. 25) located in the headrest, a weight sensor 252 in the seat and the location of the seat which is known by control circuit 254. Other smart airbags systems rely only on the position of the occupant determined from various position sensors using ultrasonics or optical sensors, or equivalent.

The weight sensor coupled with the height sensor and the occupant's velocity relative to the vehicle, as determined by the occupant position sensors, provides information as to the amount of energy that the airbag will need to absorb during the impact of the occupant with the airbag. This, along with the location of the occupant relative to the airbag, is then used to determine the amount of gas that is to be injected into the airbag during deployment and the size of the exit orifices that control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag will need to be reduced.

With further reference to FIG. 28, another and preferred approach is to incorporate an accelerometer 362, 363 into the seatbelt or the airbag surface, respectively, and to measure the deceleration of the occupant 361 and to control the outflow of gas from the airbag 352 to maintain the occupant's chest acceleration below some maximum value such as 40 Gs. This maximum value can be set based on the forecasted severity of the crash. If the occupant is wearing a seatbelt, the outflow from the airbag 352 can be significantly reduced since the seatbelt is taking up most of the load and the airbag 352 then should be used to help spread the load over more of the occupant's chest. A sensor 364 which senses pressure in the airbag 352 (see FIG. 28A) can be used since pressure in the airbag 352 is easily correlated to deceleration of the occupant 361 once the occupant 361 has impacted the airbag 352. Although the pressure in the airbag 352 is one indication of the deceleration being imparted to the occupant, or can be used to detect deceleration of the airbag 352, and thus contact between the airbag 352 and the occupant 361 whereby the deceleration of the airbag 352 after contact is easily correlated to the deceleration of the occupant, it is a relatively crude measure since it does not take into account the mass of the occupant. Since it is acceleration that should be controlled, it is better to measure acceleration rather than pressure in the airbag 352.

Control of the outflow from the airbag 352 is via the control module or control circuit 254 described above, which may be common for all of the embodiments disclosed herein. Control module 254 receives the data from accelerometers 362, 363 and based thereon, determines how to control the continued inflation of the airbag 352. As appreciated by those skilled in the art, a change in acceleration can be correlated to contact between the airbag 352 and the occupant. Any known devices can be used to control outflow of gas from the airbag 352, including an exit control valve or vent 359.

As to forecasting the severity of a crash, anticipatory crash sensors based on pattern recognition technology are disclosed in several of assignee's patents and pending patent applications. The technology now exists based on research by the assignee to permit the identification and relative velocity determination to be made for virtually any airbag-required accident prior to the accident occurring. This achievement now allows airbags to be reliably deployed prior to the accident. The implications of this are significant. Prior to this achievement, the airbag system had to wait until an accident started before a determination could be made whether to deploy one or more of the airbags. The result is that the occupants, especially if unbelted, would frequently achieve a significant velocity relative to the vehicle passenger compartment before the airbags began to interact with the occupant and reduce his or her relative velocity. This would frequently subject the occupant to high accelerations, in some cases in excess of 40 Gs, and in many cases resulted in serious injury or death to the occupant especially if he or she is unrestrained by a seatbelt or airbag. On the other hand, a vehicle typically undergoes less than a maximum of 20 Gs during even the most severe crashes. Most occupants can withstand 20 Gs with little or no injury. Thus, as taught herein, if the accident severity is forecast prior to impact and the outflow of gas from the airbag controlled based on the forecast severity, the occupant can be safely brought to a stationary state during the course of the accident.

One scenario to forecast the severity of a crash is to use a camera, or radar-based or terahertz-based anticipatory sensor to estimate velocity and profile of impacting object. From the profile or image, an identification of the class of impacting object can be made and a determination made of where the object will likely strike the vehicle. Knowing the stiffness of the engagement part of the vehicle allows a calculation of the mass of the impacting object based on an assumption of the stiffness impacting object. Since the impacting velocity is known and the acceleration of the vehicle can be determined, we know the impacting mass and therefore we know the severity or ultimate velocity change of the accident. From this, the average chest acceleration that can be used to just bring the occupant to the velocity of the passenger compartment during the crash can be calculated and therefore the parameters of the airbag system can be set to provide that optimum chest acceleration. By putting the accelerometer 363 on the surface of the airbag 352 that contacts the occupant 361, the actual chest acceleration can be measured and the size of an exit control valve or vent 359 which controls outflow of gas from the airbag 352 can be adjusted to maintain the calculated optimum value. With this system, neither crush zone or occupant sensors are required, thus simplifying and reducing the cost of the system and providing optimum results even without initiating the airbag prior to the start of the crash.

Instead of incorporating or otherwise arranging an accelerometer 363 into or on the airbag surface, or a pressure sensor which measures pressure in the airbag 352, it is possible to use a similar device which measures acceleration of the airbag surface which comes into contact with the occupant 361 during deployment. Examples of such devices include a switch, and an optical system for measuring the surface velocity either from a position within the airbag 352 or a position outside of the airbag 352.

The techniques described immediately above enable a dynamic determination of the movement of the occupant after contact with the deploying airbag based on measurement of a property of the airbag, e.g., measurement of the pressure in the airbag and measurement of the acceleration of the surface of the airbag contacting the occupant. Movement of the occupant, and specifically acceleration or the occupant, is used to control outflow of gas form the airbag, although it may also be used for other purposes.

There are many ways of varying the amount of gas injected into the airbag some of which are covered in the patent literature and include, for example, inflators where the amount of gas generated and the rate of generation is controllable. For example, in a particular hybrid inflator once manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned.

FIG. 28A illustrates schematically an inflator 357 generating gas to fill airbag 352 through control valve 358. If the control valve 358 is closed while a pyrotechnic generator is operating, provision must be made to store or dump the gas being generated so to prevent the inflator from failing from excess pressure. The flow of gas out of airbag 352 is controlled by exit control valve 359. The exit valve 359 can be implemented in many different ways including, for example, a motor operated valve located adjacent the inflator and in fluid communication with the airbag or a digital flow control valve as discussed elsewhere herein. When control circuit 254 (of any of the embodiments disclosed herein) determines the size and weight of the occupant, the seat position and the relative velocity of the occupant, it then determines the appropriate opening for the exit valve 359, which is coupled to the control circuit 254. A signal is then sent from control circuit 254 to the motor controlling this valve which provides the proper opening. Alternatively, the airbag includes a gas exit passage 369 having a controllable and variable size.

Consider, for example, the case of a vehicle that impacts with a pole or brush in front of a barrier. The crash sensor system may deduce that this is a low velocity crash and only initiate the first inflator charge. Then as the occupant is moving close to the airbag the barrier is struck but it may now be too late to get the benefit of the second charge. For this case, a better solution might be to always generate the maximum amount of gas but to store the excess in a supplemental chamber until it is needed.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of at least one of the inventions disclosed herein. The force measured on the seatbelt, if the vehicle deceleration is known, gives a confirmation of the mass of the occupant. This force measurement can also be used to control the chest acceleration given to the occupant to minimize injuries caused by the seatbelt. Naturally, as discussed above, it is better to measure the acceleration of the chest directly.

In the embodiment shown in FIG. 8A, transmitter/receiver assemblies 49, 50, 51 and 54 emit infrared waves that reflect off of the head and chest of the driver and return thereto. Periodically, the device, as commanded by control circuitry 20, transmits a pulse of infrared waves and the reflected signal is detected by the same (i.e. the LEDs and imager are in the same housing) or a different device. The transmitters can either transmit simultaneously or sequentially. An associated electronic circuit and algorithm in control circuitry 20 processes the returned signals as discussed above and determines the location of the occupant in the passenger compartment. This information is then sent to the crash sensor and diagnostic circuitry, which may also be resident in control circuitry 20 (programmed within a control module), which determines if the occupant is close enough to the airbag that a deployment might, by itself, cause injury which exceeds that which might be caused by the accident itself. In such a case, the circuit disables the airbag system and thereby prevents its deployment.

In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises above 95% for a more distant occupant. In the alternative, the crash sensor and diagnostic circuitry optionally resident in control circuitry 20 may tailor the parameters of the deployment (time to initiation of deployment, rate of inflation, rate of deflation, deployment time, etc.) based on the current position and possibly velocity of the occupant, for example a depowered deployment.

In another implementation, the sensor algorithm may determine the rate that gas is generated to affect the rate that the airbag is inflated. One method of controlling the gas generation rate is to control the pressure in the inflator combustion chamber. The higher the internal pressure the faster gas is generated. Once a method of controlling the gas combustion pressure is implemented, the capability exists to significantly reduce the variation in inflator properties with temperature. At lower temperatures the pressure control system would increase the pressure in the combustion chamber and at higher ambient temperatures it would reduce the pressure. In all of these cases, the position of the occupant can be used to affect the deployment of the airbag as to whether or not it should be deployed at all, the time of deployment and/or the rate of inflation.

The applications described herein have been illustrated using the driver and sometimes the passenger of the vehicle. The same systems of determining the position of the occupant relative to the airbag apply to a driver, front and rear seated passengers, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for the passenger and driver, the airbag system can be individually optimized for each occupant and result in further significant injury reduction. In particular, either the driver or passenger system can be disabled if either the driver or passenger is out-of-position or if the passenger seat is unoccupied.

There is almost always a driver present in vehicles that are involved in accidents where an airbag is needed. Only about 30% of these vehicles, however, have a passenger. If the passenger is not present, there is usually no need to deploy the passenger side airbag. The occupant monitoring system, when used for the passenger side with proper pattern recognition circuitry, can also ascertain whether or not the seat is occupied, and if not, can disable the deployment of the passenger side airbag and thereby save the cost of its replacement. The same strategy applies also for monitoring the rear seat of the vehicle. Also, a trainable pattern recognition system, as used herein, can distinguish between an occupant and a bag of groceries, for example. Finally, there has been much written about the out-of-position child who is standing or otherwise positioned adjacent to the airbag, perhaps due to pre-crash braking. The occupant position sensor described herein can prevent the deployment of the airbag in this situation as well as in the situation of a rear facing child seat as described above.

Naturally as discussed elsewhere herein, occupant sensors can also be used for monitoring the rear seats of the vehicle for the purpose, among others, of controlling airbag or other restraint deployment.

7.2 Seat, Seatbelt, Steering Wheel and Pedal Adjustment

Let us now consider the adjustment of a seat to adapt to an occupant. First some measurements of the morphological properties of the occupant are necessary. One characteristic considered is a measurement of the height of the occupant from the vehicle seat. This can be done by a sensor in the ceiling of the vehicle but this becomes difficult since, even for the same seat location, the head of the occupant will not be at the same angle with respect to the seat and therefore the angle to a ceiling mounted sensor is in general unknown at least as long as only one ceiling mounted sensor is used. This problem can be solved if two or three sensors are used as described in more detail below. The simplest implementation is to place the sensor in the seat. In U.S. Ser. No. 05/694,320, a rear impact occupant protection apparatus is disclosed which uses sensors mounted within the headrest. This same system can also be used to measure the height of the occupant from the seat and thus, for no additional cost assuming the rear impact occupant protection system described in the '320 patent is provided, the first measure of the occupant's morphology can be achieved. See also FIGS. 24 and 25. For some applications, this may be sufficient since it is unlikely that two operators will use the vehicle that both have the same height. For other implementations, one or more additional measurements are used. Naturally, a face, fingerprint, voiceprint or iris recognition system will have the least problem identifying a previous occupant.

Referring now to FIG. 24, an automatic adjustment system for adjusting a seat (which is being used only as an example of a vehicle component) is shown generally at 371 with a movable headrest 356 and ultrasonic sensors 353, 354 and 355 for measuring the height of the occupant of the seat. Other types of wave, energy or radiation receiving sensors may also be used in the invention instead of the ultrasonic transmitter/receiver set 353, 354, 355. Power means such as motors 371, 372, and 373 connected to the seat for moving the base of the seat, control means such as a control circuit, system or module 254 connected to the motors and a headrest actuation mechanism using servomotors 374 and 375, which may be servomotors, are also illustrated. The seat 4 and headrest 356 are shown in phantom. Vertical motion of the headrest 356 is accomplished when a signal is sent from control module 254 to servomotor 374 through a wire 376. Servomotor 374 rotates lead screw 377 which engages with a threaded hole in member 378 causing it to move up or down depending on the direction of rotation of the lead screw 377. Headrest support rods 379 and 380 are attached to member 378 and cause the headrest 356 to translate up or down with member 378. In this manner, the vertical position of the headrest can be controlled as depicted by arrow A-A. Ultrasonic transmitters and receivers 353, 354, 355 may be replaced by other appropriate wave-generating and receiving devices, such as electromagnetic, active infrared transmitters and receivers, and capacitance sensors and electric field sensors.

Wire 381 leads from control module 254 to servomotor 375 which rotates lead screw 382. Lead screw 382 engages with a threaded hole in shaft 383 which is attached to supporting structures within the seat shown in phantom. The rotation of lead screw 382 rotates servo motor support 384, upon which servomotor 374 is situated, which in turn rotates headrest support rods 379 and 380 in slots 385 and 386 in the seat 4. Rotation of the servomotor support 384 is facilitated by a rod 387 upon which the servo motor support 384 is positioned. In this manner, the headrest 356 is caused to move in the fore and aft direction as depicted by arrow B-B. Naturally there are other designs which accomplish the same effect in moving the headrest up and down and fore and aft.

The operation of the system is as follows. When an adult or child occupant is seated on a seat containing the headrest and control system described above as determined by the neural network 65, the ultrasonic transmitters 353, 354 and 355 emit ultrasonic energy which reflects off of the head of the occupant and is received by the same transducers. An electronic circuit in control module 254 contains a microprocessor which determines the distance from the head of the occupant based on the time between the transmission and reception of the ultrasonic pulses. In the embodiment wherein capacitance or electric field sensors are used instead of ultrasonic transducers, the manner in which the distance can be determined using such sensors is known to those skilled in the art.

Control module 254 may be within the same microprocessor as neural network 65 or separate therefrom. The headrest 356 moves up and down until it finds the top of the head and then the vertical position closest to the head of the occupant and then remains at that position. Based on the time delay between transmission and reception of an ultrasonic pulse, the system can also determine the longitudinal distance from the headrest to the occupant's head. Since the head may not be located precisely in line with the ultrasonic sensors, or the occupant may be wearing a hat, coat with a high collar, or may have a large hairdo, there may be some error in this longitudinal measurement.

When an occupant sits on seat 4, the headrest 356 moves to find the top of the occupant's head as discussed above. This is accomplished using an algorithm and a microprocessor which is part of control circuit 254. The headrest 356 then moves to the optimum location for rear impact protection as described in the above referenced '320 patent. Once the height of the occupant has been measured, another algorithm in the microprocessor in control circuit 254 compares the occupant's measured height with a table representing the population as a whole and from this table, the appropriate positions for the seat corresponding to the occupant's height is selected. For example, if the occupant measured 33 inches from the top of the seat bottom, this might correspond to an 85% human, depending on the particular seat and statistical table of human measurements.

Careful study of each particular vehicle model provides the data for the table of the location of the seat to properly position the eyes of the occupant within the "eye-ellipse", the steering wheel within a comfortable reach of the occupant's hands and the pedals within a comfortable reach of the occupant's feet, based on his or her size, etc. Of course one or more pedals can be manually adjusted providing they are provided with an actuator such as an electric motor and any such adjustment, either manual or automatic, is contemplated by the inventions disclosed herein.

Once the proper position has been determined by control circuit 254, signals are sent to motors 371, 372, and 373 to move the seat to that position, if such movement is necessary. That is, it is possible that the seat will be in the proper position so that movement of the seat is not required. As such, the position of the motors 371,372,373 and/or the position of the seat prior to occupancy by the occupant may be stored in memory so that after occupancy by the occupant and determination of the desired position of the seat, a comparison is made to determine whether the desired position of the seat deviates from the current position of the seat. If not, movement of the seat is not required. Otherwise, the signals are sent by the control circuit 254 to the motors. In this case, control circuit 254 would encompass a seat controller.

Instead of adjusting the seat to position the driver in an optimum driving position, or for use when adjusting the seat of a passenger, it is possible to perform the adjustment with a view toward optimizing the actuation or deployment of an occupant protection or restraint device. For example, after obtaining one or more morphological characteristics of the occupant, the processor can analyze them and determine one or more preferred positions of the seat, with the position of the seat being related to the position of the occupant, so that if the occupant protection device is deployed, the occupant will be in an advantageous position to be protected against injury by such deployment. In this case then, the seat is adjusted based on the morphology of the occupant view a view toward optimizing deployment of the occupant protection device. The processor is provided in a training or programming stage with the preferred seat positions for different morphologies of occupants.

Movement of the seat can take place either immediately upon the occupant sitting in the seat or immediately prior to a crash requiring deployment of the occupant protection device. In the latter case, if an anticipatory sensing arrangement is used, the seat can be positioned immediately prior to the impact, much in a similar manner as the headrest is adjusted for a rear impact as disclosed in the '320 patent referenced above.

If during some set time period after the seat has been positioned, the operator changes these adjustments, the new positions of the seat are stored in association with an occupant height class in a second table within control circuit 254. When the occupant again occupies the seat and his or her height has once again been determined, the control circuit 254 will find an entry in the second table which takes precedence over the basic, original table and the seat returns to the adjusted position. When the occupant leaves the vehicle, or even when the engine is shut off and the door opened, the seat can be returned to a neutral position which provides for easy entry and exit from the vehicle.

The seat 4 also contains two control switch assemblies 388 and 389 for manually controlling the position of the seat 4 and headrest 356. The seat control switches 388 permits the occupant to adjust the position of the seat if he or she is dissatisfied with the position selected by the algorithm. The headrest control switches 389 permit the occupant to adjust the position of the headrest in the event that the calculated position is uncomfortably close to or far from the occupant's head. A woman with a large hairdo might find that the headrest automatically adjusts so as to contact her hairdo. This adjustment she might find annoying and could then position the headrest further from her head. For those vehicles which have a seat memory system for associating the seat position with a particular occupant, which has been assumed above, the position of the headrest relative to the occupant's head could also be recorded. Later, when the occupant enters the vehicle, and the seat automatically adjusts to the recorded preference, the headrest will similarly automatically adjust as diagrammed in FIGS. 29A and 29B.

The height of the occupant, although probably the best initial morphological characteristic, may not be sufficient especially for distinguishing one driver from another when they are approximately the same height. Another characteristic, the occupant's weight, can also be readily determined from sensors mounted within the seat in a variety of ways as shown in FIG. 18 which is a perspective view of the seat shown in FIG. 24 with a displacement or weight sensor 159 shown mounted onto the seat.

Displacement sensor 159 is supported from supports 165. In general, displacement sensor 164, or another non-displacement sensor, measures a physical state of a component affected by the occupancy of the seat. An occupying item of the seat will cause a force to be exerted downward and the magnitude of this force is representative of the weight of the occupying item. Thus, by measuring this force, information about the weight of the occupying item can be obtained. A physical state may be any force changed by the occupancy of the seat and which is reflected in the component, e.g., strain of a component, compression of a component, tension of a component. Other weight measuring systems as described herein and elsewhere including bladders and strain gages can be used.

An alternative approach is to measure the load on the vehicle suspension system while the vehicle is at rest (static) or when it is in motion (dynamic). The normal empty state of the vehicle can be determined when the vehicle is at rest for a prolonged time period. After then the number and location of occupying items can be determined by measuring the increased load on the suspension devices that attach the vehicle body to its frame. SAW strain measuring elements can be placed on each suspension spring, for example, and used to measure the increased load on the vehicle as an object or occupant is placed in the vehicle. This approach has the advantage that it is not affected by seatbelt loadings, for example. If the vehicle is monitored as each item is paced in the vehicle a characterization of that item can be made. The taking on of fuel, for example, will correspond to a particular loading pattern over time that will permit the identification of the amount of the weight on the suspension that can be attributed to fuel. Dynamic measuring systems are similar to those used in section 6.3 of the parent '881 application and thus will not be repeated here.

The system described above is based on the assumption that the occupant will be satisfied with one seat position throughout an extended driving trip. Studies have shown that for extended travel periods that the comfort of the driver can be improved through variations in the seat position. This variability can be handled in several ways. For example, the amount and type of variation preferred by an occupant of the particular morphology can be determined through case studies and focus groups. If it is found, for example, that the 50 percentile male driver prefers the seat back angle to vary by 5 degrees sinusodially with a one-hour period, this can be programmed to the system. Since the system knows the morphology of the driver it can decide from a lookup table what is the best variability for the average driver of that morphology. The driver then can select from several preferred possibilities if, for example, he or she wishes to have the seat back not move at all or follow an excursion of 10 degrees over two hours.

This system provides an identification of the driver based on at least one and preferably two morphological characteristics, height and/or weight, which is adequate for most cases. As additional features of the vehicle interior identification and monitoring system described in the above referenced patent applications are implemented, it will be possible to obtain additional morphological measurements of the driver which will provide even greater accuracy in driver identification. Such additional measurements include iris scans, voice prints, face recognition, fingerprints, voiceprints hand or palm prints etc. Two characteristics may not be sufficient to rely on for theft and security purposes, however, many other driver preferences can still be added to seat position with this level of occupant recognition accuracy. These include the automatic selection of a preferred radio station, pedal position, vehicle temperature, steering wheel and steering column position, etc.

One advantage of using only the height and weight is that it avoids the necessity of the seat manufacturer from having to interact with the headliner manufacturer, or other component suppliers, since all of the measuring transducers are in the seat. This two characteristic system is generally sufficient to distinguish drivers that normally drive a particular vehicle. This system costs little more than the memory systems now in use and is passive, i.e., it does not require action on the part of the occupant after his initial adjustment has been made.

Instead of measuring the height and weight of the occupant, it is also possible to measure a combination of any two morphological characteristics and during a training phase, derive a relationship between the occupancy of the seat, e.g., adult occupant, child occupant, etc., and the data of the two morphological characteristic. This relationship may be embodied within a neural network so that during use, by measuring the two morphological characteristics, the occupancy of the seat can be determined.

There are other methods of measuring the height of the driver such as placing the transducers at other locations in the vehicle. Some alternatives are shown in other figures herein and include partial side images of the occupant and ultrasonic transducers positioned on or near the vehicle headliner. These transducers may already be present because of other implementations of the vehicle interior identification and monitoring system described in the above referenced patent applications. The use of several transducers provides a more accurate determination of location of the head of the driver. When using a headliner mounted sensor alone, the exact position of the head is ambiguous since the transducer measures the distance to the head regardless of what direction the head is. By knowing the distance from the head to another headliner mounted transducer the ambiguity is substantially reduced. This argument is of course dependent on the use of ultrasonic transducers. Optical transducers using CCD, CMOS or equivalent arrays are now becoming price competitive and, as pointed out in the above referenced patent applications, will be the technology of choice for interior vehicle monitoring. A single CMOS array of 160 by 160 pixels, for example, coupled with the appropriate pattern recognition software, can be used to form an image of the head of an occupant and accurately locate the head for the purposes of at least one of the inventions disclosed herein. It can also be used with a face recognition algorithm to positively identify the occupant.

Figure 31:
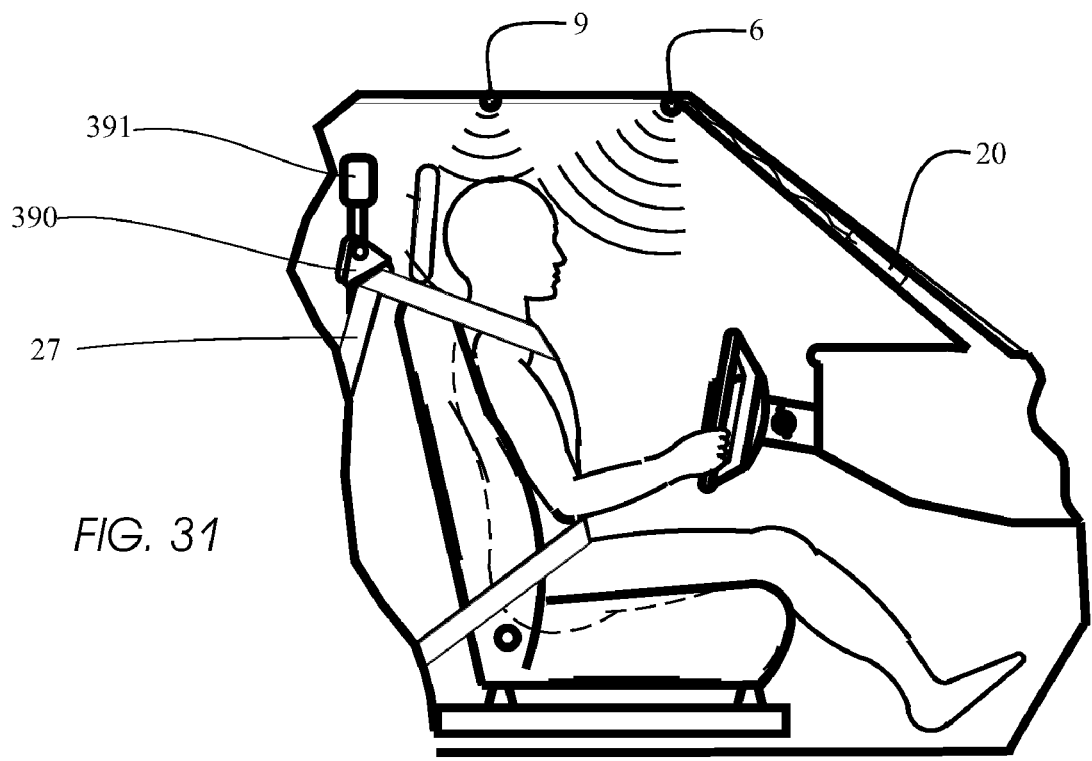
FIG. 31 is a side plan view of the interior of an automobile, with portions cut away and removed, with two occupant height measuring sensors, one mounted into the headliner above the occupant's head and the other mounted onto the A-pillar and also showing a seatbelt associated with the seat wherein the seatbelt has an adjustable upper anchorage point which is automatically adjusted based on the height of the occupant.

FIG. 31 also illustrates a system where the seatbelt 27 has an adjustable upper anchorage point 390 which is automatically adjusted by a motor 391 to a location optimized based on the height of the occupant. In this system, infrared transmitter and CCD array receivers 6 and 9 are positioned in a convenient location proximate the occupant's shoulder, such as in connection with the headliner, above and usually to the outside of the occupant's shoulder. An appropriate pattern recognition system, as may be resident in control circuitry 20 to which the receivers 6 and 9 are coupled, as described above is then used to determine the location and position of the shoulder. This information is provided by control circuitry 20 to the seatbelt anchorage height adjustment system 391 (through a conventional coupling arrangement), shown schematically, which moves the attachment point 390 of the seatbelt 27 to the optimum vertical location for the proper placement of the seatbelt 27.

The calculations for this feature and the appropriate control circuitry can also be located in control module 20 or elsewhere if appropriate. Seatbelts are most effective when the upper attachment point to the vehicle is positioned vertically close to the shoulder of the occupant being restrained. If the attachment point is too low, the occupant experiences discomfort from the rubbing of the belt on his or her shoulder. If it is too high, the occupant may experience discomfort due to the rubbing of the belt against his or her neck and the occupant will move forward by a greater amount during a crash which may result in his or her head striking the steering wheel. For these reasons, it is desirable to have the upper seatbelt attachment point located slightly above the occupant's shoulder. To accomplish this for various sized occupants, the location of the occupant's shoulder should be known, which can be accomplished by the vehicle interior monitoring system described herein.

Figure 32:
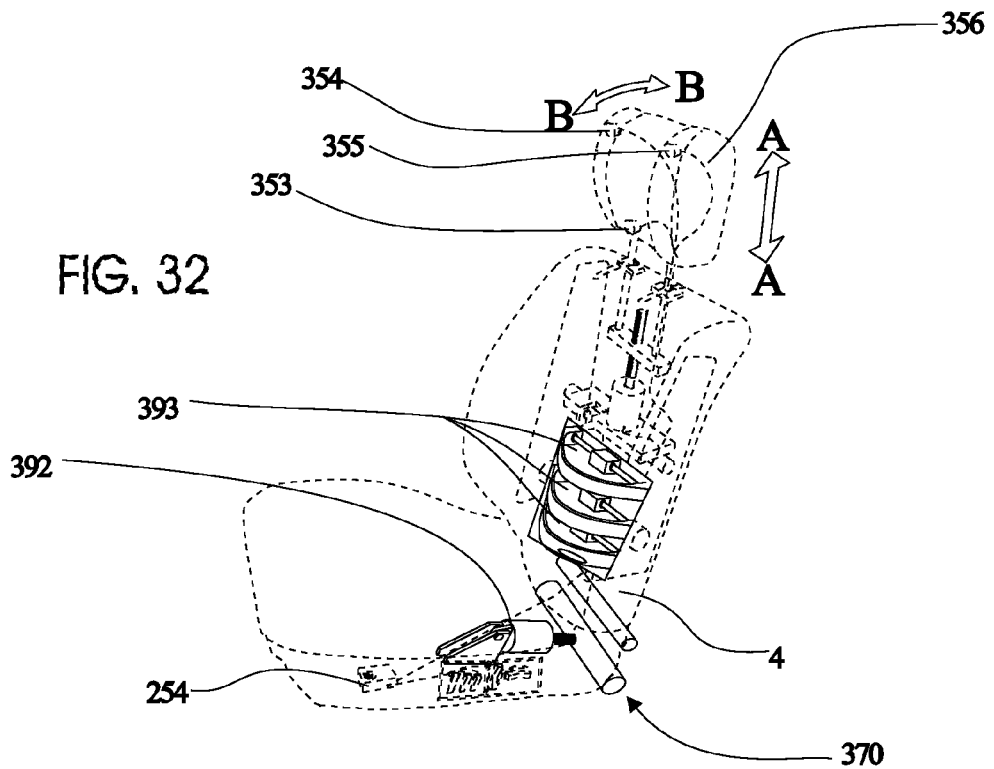
FIG. 32 is a view of the seat of FIG. 24 showing motors for changing the tilt of seat back and the lumbar support.

Many luxury automobiles today have the ability to control the angle of the seat back as well as a lumbar support. These additional motions of the seat can also be controlled by the seat adjustment system in accordance with the invention. FIG. 32 is a view of the seat of FIG. 24 showing motors 392 and 393 for changing the tilt of the seat back and the lumbar support. Three motors 393 are used to adjust the lumbar support in this implementation. The same procedure is used for these additional motions as described for FIG. 24 above.

An initial table is provided based on the optimum positions for various segments of the population. For example, for some applications the table may contain a setting value for each five percentile of the population for each of the 6 possible seat motions, fore and aft, up and down, total seat tilt, seat back angle, lumbar position, and headrest position for a total of 120 table entries. The second table similarly would contain the personal preference modified values of the 6 positions desired by a particular driver.

The angular resolution of a transducer is proportional to the ratio of the wavelength to the diameter of the transmitter. Once three transmitters and receivers are used, the approximate equivalent single transmitter and receiver is one which has a diameter approximately equal to the shortest distance between any pair of transducers. In this case, the equivalent diameter is equal to the distance between transmitter 354 or 355 and 353. This provides far greater resolution and, by controlling the phase between signals sent by the transmitters, the direction of the equivalent ultrasonic beam can be controlled. Thus, the head of the driver can be scanned with great accuracy and a map made of the occupant's head. Using this technology plus an appropriate pattern recognition algorithm, such as a neural network, an accurate location of the driver's head can be found even when the driver's head is partially obscured by a hat, coat, or hairdo. This also provides at least one other identification morphological characteristic which can be used to further identify the occupant, namely the diameter of the driver's head.

In an automobile, there is an approximately fixed vertical distance between the optimum location of the occupant's eyes and the location of the pedals. The distant from a driver's eyes to his or her feet, on the other hand, is not the same for all people. An individual driver now compensates for this discrepancy by moving the seat and by changing the angle between his or hers legs and body. For both small and large drivers, this discrepancy cannot be fully compensated for and as a result, their eyes are not appropriately placed. A similar problem exists with the steering wheel. To help correct these problems, the pedals and steering column should be movable as illustrated in FIG. 33 which is a plan view similar to that of FIG. 31 showing a driver and driver seat with an automatically adjustable steering column and pedal system which is adjusted based on the morphology of the driver.

Figure 33:
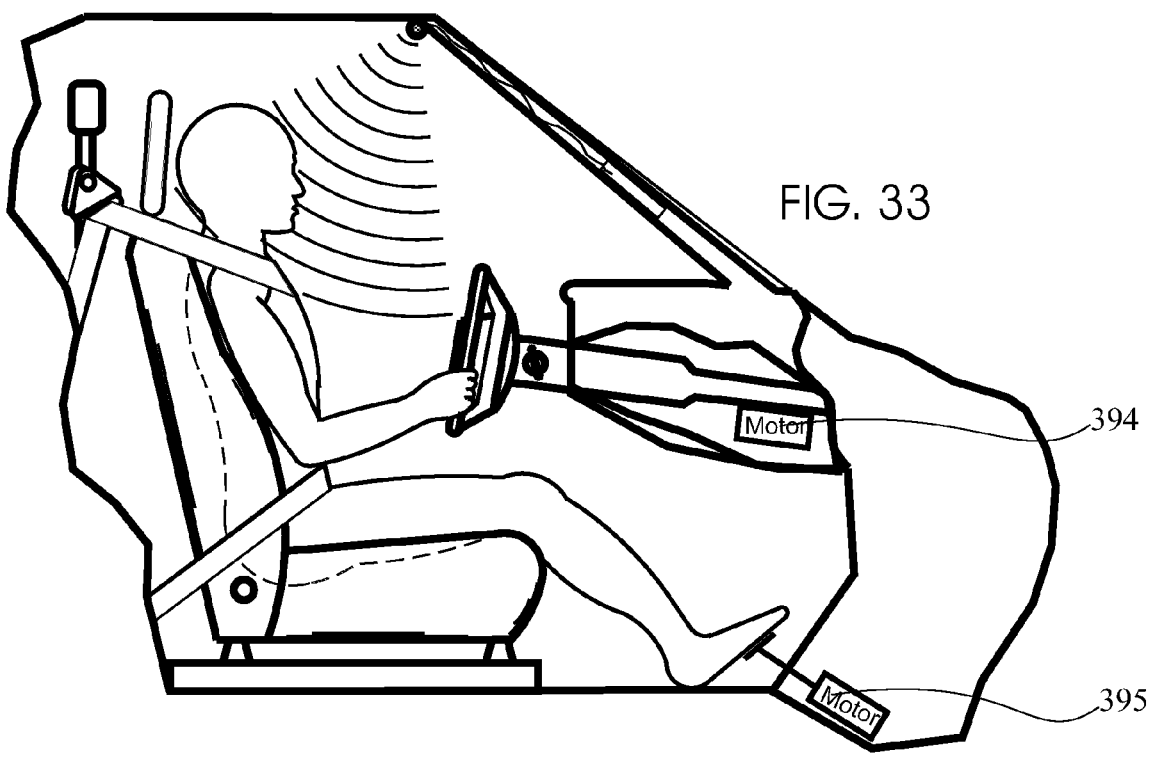
FIG. 33 is a view as in FIG. 31 showing a driver and driver seat with an automatically adjustable steering column and pedal system which is adjusted based on the morphology of the driver.

In FIG. 33, a motor 394 is connected to and controls the position of the steering column and another motor 395 is connected to and controls the position of the pedals. Both motors 394 and 395 are coupled to and controlled by control circuit 254 wherein now the basic table of settings includes values for both the pedals and steering column locations.

The settings may be determined through experimentation or empirically by determining an optimum position of the pedals and steering wheel for drivers having different morphologies, i.e., different heights, different leg lengths, etc.

More specifically, as shown in FIG. 33A, the morphology determination system 430 determines one or more physical properties or characteristics of the driver 30 which would affect the position of the steering column, e.g., leg length, height, and arm length. The determination of these properties may be obtained in any of the manners disclosed herein. For example, height may be determined using the system shown in FIG. 24. Leg length and arm length may be determined by measuring the weight, height, etc of the driver and then using a table to obtain an estimated or average leg length or arm length based on the measured properties. In the latter case, the control circuit 431 could obtain the measurements and include data for the leg length and arm length, or would include data on the position of the steering wheel for the measured driver, i.e., the table of settings.

In either case, the control system 431 is provided with the setting for the steering wheel and if necessary, directs the motor 394 to move the steering wheel to the desired position. Movement of the steering wheel is thus provided in a totally automatic manner without manual intervention by the driver, either, by adjusting a knob on the steering wheel or by depressing a button.

Although movement of the steering wheel is shown here as being controlled by a motor 394 that moves the steering column fore and aft, other methods are sometimes used in various vehicles such as changing the tilt angle of the steering column or the tilt angle of the steering wheel. Naturally, motors can be provided that cause these other motions and are contemplated by at least one of the inventions disclosed herein as is any other method that controls the position of the steering wheel. For example, FIG. 33B shows a schematic of a motor 429 which may be used to control the tilt angle of the steering wheel relative to the steering column.

Regardless of which motor or motors are used, the invention contemplates the adjustment or movement of the steering wheel relative to the front console of the vehicle and thus relative to the driver of the vehicle. This movement may be directly effective on the steering wheel (via motor 429) or effective on the steering column and thus indirectly effective on the steering wheel since movement of the steering column will cause movement of the steering wheel. Additionally when the ignition is turned off the steering wheel and column and any other adjustable device or component can be automatically moved to a more out of the way position to permit easier ingress and egress from the vehicle, for example.

The steering wheel adjustment feature may be designed to be activated upon detection of the presence of an object on the driver's seat. Thus, when a driver's first sits on the seat, the sensors could be designed to initiate measurement of the driver's morphology and then control the motor or motors to adjust the steering wheel, if such adjustment is deemed necessary. This is because an adjustment in the position of the steering wheel is usually not required during the course of driving but is generally only required when a driver first sits in the seat. The detection of the presence of the driver may be achieved using the weight sensors and/or other presence detection means, such as using the wave-based sensors, capacitance sensors, electric field sensors, etc.

The eye ellipse discussed above is illustrated at 360 in FIG. 34, which is a view showing the occupant's eyes and the seat adjusted to place the eyes at a particular vertical position for proper viewing through the windshield and rear view mirror. Many systems are now under development to improve vehicle safety and driving ease. For example, night vision systems are being sold which project an enhanced image of the road ahead of the vehicle onto the windshield in a "heads-up display". The main problem with the systems now being sold is that the projected image does not precisely overlap the image as seen through the windshield. This parallax causes confusion in the driver and can only be corrected if the location of the driver's eyes is accurately known. One method of solving this problem is to use the passive seat adjustment system described herein to place the occupant's eyes at the optimum location as described above. Once this has been accomplished, in addition to solving the parallax problem, the eyes are properly located with respect to the rear view mirror 55 and little if any adjustment is required in order for the driver to have the proper view of what is behind the vehicle. Currently the problem is solved by projecting the heads-up display onto a different portion of the windshield, the bottom.

Although it has been described herein that the seat can be automatically adjusted to place the driver's eyes in the "eye-ellipse", there are many manual methods that can be implemented with feedback to the driver telling him or her when his or her eyes are properly position. At least one of the inventions disclosed herein is not limited by the use of automatic methods.

Once the morphology of the driver and the seat position is known, many other objects in the vehicle can be automatically adjusted to conform to the occupant. An automatically adjustable seat armrest, a cup holder, the cellular phone, or any other objects with which the driver interacts can be now moved to accommodate the driver. This is in addition to the personal preference items such as the radio station, temperature, etc. discussed above.

Once the system of at least one of the inventions disclosed herein is implemented, additional features become possible such as a seat which automatically makes slight adjustments to help alleviate fatigue or to account for a change of position of the driver in the seat, or a seat which automatically changes position slightly based on the time of day. Many people prefer to sit more upright when driving at night, for example. Other similar improvements based on knowledge of the occupant morphology will now become obvious to those skilled in the art.

Figure 30:
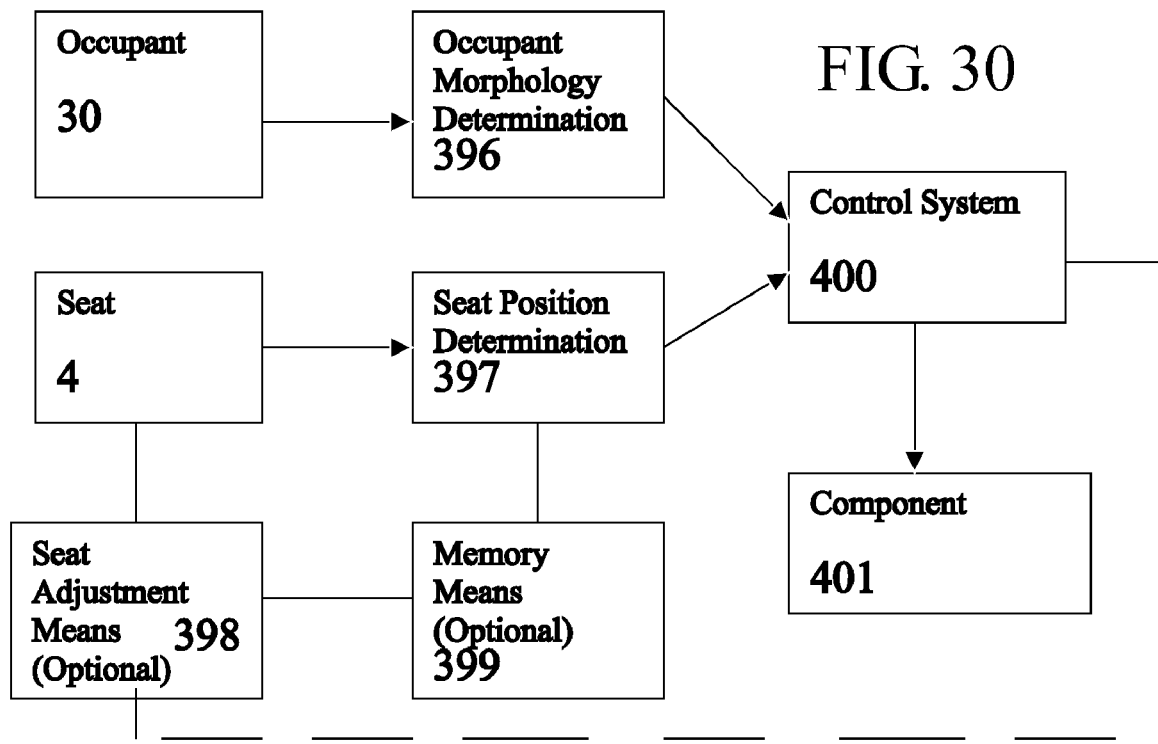
FIG. 30 is a flow chart of an arrangement for controlling a component in accordance with the invention.

FIG. 30 shows a flow chart of one manner in the arrangement and method for controlling a vehicle component in accordance with the invention functions. A measurement of the morphology of the occupant 30 is performed at 396, i.e., one or more morphological characteristics are measured in any of the ways described above. The position of the seat portion 4 is obtained at 397 and both the measured morphological characteristic of the occupant 30 and the position of the seat portion 4 are forwarded to the control system 400. The control system considers these parameters and determines the manner in which the component 401 should be controlled or adjusted, and even whether any adjustment is necessary.

Preferably, seat adjustment means 398 are provided to enable automatic adjustment of the seat portion 4. If so, the current position of the seat portion 4 is stored in memory means 399 (which may be a previously adjusted position) and additional seat adjustment, if any, is determined by the control system 400 to direct the seat adjustment means 398 to move the seat. The seat portion 4 may be moved alone, i.e., considered as the component, or adjusted together with another component, i.e., considered separate from the component (represented by way of the dotted line in FIG. 30).

Although several preferred embodiments are illustrated and described above, there are other possible combinations using different sensors which measure either the same or different morphological characteristics, such as knee position, of an occupant to accomplish the same or similar goals as those described herein.

It should be mentioned that the adjustment system may be used in conjunction with each vehicle seat. In this case, if a seat is determined to be unoccupied, then the processor means may be designed to adjust the seat for the benefit of other occupants, i.e., if a front passenger side seat is unoccupied but the rear passenger side seat is occupied, then adjustment system could adjust the front seat for the benefit of the rear-seated passenger, e.g., move the seat base forward.

In additional embodiments, the present invention involves the measurement of one or more morphological characteristics of a vehicle occupant and the use of these measurements to classify the occupant as to size and weight, and then to use this classification to position a vehicle component, such as the seat, to a near optimum position for that class of occupant. Additional information concerning occupant preferences can also be associated with the occupant class so that when a person belonging to that particular class occupies the vehicle, the preferences associated with that class are implemented. These preferences and associated component adjustments include the seat location after it has been manually adjusted away from the position chosen initially by the system, the mirror location, temperature, radio station, steering wheel and steering column positions, pedal positions etc. The preferred morphological characteristics used are the occupant height from the vehicle seat, weight of the occupant and facial features. The height is determined by sensors, usually ultrasonic or electromagnetic, located in the headrest, headliner or another convenient location. The weight is determined by one of a variety of technologies that measure either pressure on or displacement of the vehicle seat or the force in the seat supporting structure. The facial features are determined by image analysis comprising an imager such as a CCD or CMOS camera plus additional hardware and software.

The eye tracker systems discussed above are facilitated by at least one of the inventions disclosed herein since one of the main purposes of determining the location of the driver's eyes either by directly locating them with trained pattern recognition technology or by inferring their location from the location of the driver's head, is so that the seat can be automatically positioned to place the driver's eyes into the "eye-ellipse". The eye-ellipse is the proper location for the driver's eyes to permit optimal operation of the vehicle and for the location of the mirrors etc. Thus, if the location of the driver's eyes are known, then the driver can be positioned so that his or her eyes are precisely situated in the eye ellipse and the reflection off of the eye can be monitored with a small eye tracker system. Also, by ascertaining the location of the driver's eyes, a rear view mirror positioning device can be controlled to adjust the mirror 55 to an optimal position. See section 6.5 of the parent '881 application.

7.3 Rear Impacts

Rear impact protection is also discussed elsewhere herein. A rear-of-head detector is illustrated in FIG. 24. This detector, which can be one of the types described above, is used to determine the distance from the headrest to the rearmost position of the occupant's head and to therefore control the position of the headrest so that it is properly positioned behind the occupant's head to offer optimum support during a rear impact. Although the headrest of most vehicles is adjustable, it is rare for an occupant to position it properly if at all. Each year there are in excess of 400,000 whiplash injuries in vehicle impacts approximately 90,000 of which are from rear impacts (source: National Highway Traffic Safety Admin.). A properly positioned headrest could substantially reduce the frequency of such injuries, which can be accomplished by the head detector of at least one of the inventions disclosed herein. The head detector is connected to the headrest control mechanism and circuitry. This mechanism is capable of moving the headrest up and down and, in some cases, rotating it fore and aft.

7.4 Monitoring of other Vehicles such as Cargo Containers, Truck Trailers and Railroad Cars Monitoring other vehicles and assets using the inventions disclosed above, alone or in conjunction with inventions disclosed in the '979 application, is discussed in section 7.4 of the '979 application.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations.

Also, any of the apparatus and methods disclosed herein may be used for diagnosing the state of operation or a plurality of discrete components.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method for vehicle component control based on occupancy of a seat in the vehicle, comprising:
  determining at least one morphological characteristic of the occupant in the seat by means of a plurality of measuring transducers arranged in the seat;
  classifying the occupant, using a processor, based only on the determined at least one morphological characteristic to provide an identification of the occupant; and
  adjusting a component of the vehicle based on the identification.

2. The method of claim 1, wherein the at least one morphological characteristic is weight of the occupant.

3. The method of claim 2, wherein one of the measuring transducers is a weight sensor arranged within or underneath a cushion of the seat on which the occupant is seated.

4. The method of claim 1, wherein the at least one morphological characteristic is height from the seat on which the occupant is seated.

5. The method of claim 1, wherein the at least one morphological characteristic is a plurality of morphological characteristics.

6. The method of claim 1, further comprising:
  enabling the occupant to modify the component to a further adjusted state using a component adjustment system;
  storing, in a storage component, the occupant modification of the component in association with the determined at least one morphological characteristic; and
  at a subsequent time when the same at least one morphological characteristic is determined, adjusting the component to the occupant adjusted state.

7. The method of claim 1, wherein the component is the seat.

8. The method of claim 1, wherein the component is a radio, heat/air-conditioning system, or steering wheel.

9. The method of claim 1, wherein the component is an airbag system comprising an airbag that deploys to protect the occupant in the seat.

10. The method of claim 1, wherein the component is a seatbelt tension producing system that produces tension in a seatbelt associated with the seat.

11. The method of claim 1, wherein the component is a seatbelt system that is associated with the seat and wherein the force exerted on the occupant by the seatbelt during a crash involving the vehicle is controlled.

12. The method of claim 1, wherein the measuring transducers consist of sensors arranged in the seat and the at least one morphological characteristic is determined using only the sensors arranged in the seat on which the occupant is seated.

13. The method of claim 1, wherein the step of classifying the occupant comprises generating a table of classifications for different determinations of the at least one morphological characteristic using the measuring transducers.

14. A method for vehicle component control based on occupancy of a seat in the vehicle, comprising:
  determining weight of the occupant and height of the occupant from the seat on which the occupant is seated in the seat by means of at least one weight measuring transducer arranged in the seat and a height measuring transducer arranged in the seat, respectively;
  classifying the occupant, using a processor, based only on the determined weight and height to provide an identification of the occupant; and
  adjusting a component of the vehicle based on the identification.

15. The method of claim 14, wherein the weight is determined by means of a weight sensor arranged underneath a cushion of or within the seat on which the occupant is seated.

16. The method of claim 14, further comprising:
  enabling the occupant to modify the component to a further adjusted state using a component adjustment system;
  storing, in a storage component, the occupant modification of the component in association with the determined weight and height; and
  at a subsequent time when the same weight and height is determined, adjusting the component to the occupant adjusted state.

17. The method of claim 14, wherein the component is the seat.

18. The method of claim 14, wherein the component is a radio, heat/air-conditioning system, or steering wheel.

19. The method of claim 14, wherein the component is an airbag system comprising an airbag that deploys to protect the occupant in the seat.

20. The method of claim 14, wherein the component is a seatbelt tension producing system that produces tension in a seatbelt associated with the seat.

21. The method of claim 14, wherein the component is a seatbelt system that is associated with the seat and wherein the force exerted on the occupant by the seatbelt during a crash involving the vehicle is controlled.

22. The method of claim 14, wherein the at least one weight measuring transducer and the height measuring transducer consist of only sensors arranged in the seat.

23. The method of claim 14, wherein the step of classifying the occupant comprises generating a table of classifications for different determinations of the weight and height.

24. A method for vehicle component control based on occupancy of a seat in the vehicle, comprising:
  determining at least one morphological characteristic of the occupant in the seat by means of a plurality of measuring transducers arranged in the seat;
  classifying the occupant based the determined at least one morphological characteristic to provide an identification of the occupant without determining the occupant's position; and
  adjusting a component of the vehicle based on the identification.

* * * * *